US012402628B2

(12) United States Patent
Alimi et al.

(10) Patent No.: US 12,402,628 B2
(45) **Date of Patent: *Sep. 2, 2025**

(54) COMPOSITIONS, KITS, METHODS AND USES FOR CLEANING, DISINFECTING, STERILIZING AND/OR TREATING

(71) Applicant: Collidion, Inc., Petaluma, CA (US)

(72) Inventors: Hojabr Alimi, Petaluma, CA (US); Sridhar Govinda Prasad, San Diego, CA (US); Surya Kanta De, San Diego, CA (US)

(73) Assignee: Collidion, Inc., Petaluma, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/589,336

(22) Filed: Feb. 27, 2024

(65) Prior Publication Data

US 2024/0196900 A1 Jun. 20, 2024

Related U.S. Application Data

(63) Continuation of application No. 17/654,786, filed on Mar. 14, 2022, now Pat. No. 11,910,797, which is a continuation of application No. 16/247,501, filed on Jan. 14, 2019, now Pat. No. 11,272,710.

(60) Provisional application No. 62/721,991, filed on Aug. 23, 2018, provisional application No. 62/617,263, filed on Jan. 14, 2018.

(51) Int. Cl.

*A01N 59/08* (2006.01)
*A01N 33/12* (2006.01)
*A01N 59/00* (2006.01)
*A01N 59/20* (2006.01)

(52) U.S. Cl.

CPC ............. *A01N 59/08* (2013.01); *A01N 33/12* (2013.01); *A01N 59/00* (2013.01); *A01N 59/20* (2013.01)

(58) Field of Classification Search

None

See application file for complete search history.

(56) References Cited

U.S. PATENT DOCUMENTS

| | | | |
|---|---|---|---|
| 2,140,401 | A | 12/1938 | Fink |
| 2,810,401 | A | 10/1957 | Stansbury |
| 3,914,397 | A | 10/1975 | Mueller |
| 4,105,406 | A | 8/1978 | Murray |
| 4,190,638 | A | 2/1980 | Hoekje et al. |
| 4,394,517 | A | 7/1983 | Martin et al. |
| 4,561,994 | A | 12/1985 | Rubin et al. |
| 4,670,592 | A | 6/1987 | Eakin et al. |
| 4,814,334 | A | 3/1989 | Salkin |
| 4,908,215 | A | 3/1990 | Perlman |
| 5,019,173 | A | 5/1991 | Gettings et al. |
| 5,098,970 | A | 3/1992 | O'Lenick et al. |
| 5,284,833 | A | 2/1994 | McAnalley et al. |
| 5,322,677 | A | 6/1994 | Shaffer et al. |
| 5,332,511 | A | 7/1994 | Gay et al. |
| 5,364,464 | A | 11/1994 | Sereboff |
| 5,368,749 | A | 11/1994 | La Zonby |
| 5,547,662 | A | 8/1996 | Khan et al. |
| 5,700,742 | A | 12/1997 | Payne |
| 5,750,579 | A | 5/1998 | Kamishita et al. |
| 5,885,562 | A | 3/1999 | Lowry et al. |
| 5,902,227 | A | 5/1999 | Rivas |
| 5,914,040 | A | 6/1999 | Pescher et al. |
| 5,987,824 | A | 11/1999 | Fuller |
| 6,029,709 | A | 2/2000 | Burgess |
| 6,127,591 | A | 10/2000 | Shah |
| 6,180,684 | B1 | 1/2001 | Sawan et al. |
| 6,207,201 | B1 | 3/2001 | Piacenza |
| 6,245,361 | B1 | 6/2001 | Merritt |
| 6,333,054 | B1 | 12/2001 | Rogozinski |
| 6,426,066 | B1 | 7/2002 | Najafi et al. |
| 6,455,086 | B1 | 9/2002 | Trinh et al. |
| 6,517,730 | B1 | 2/2003 | Rex |
| 6,544,401 | B1 | 4/2003 | Colic |
| 6,815,408 | B2 | 11/2004 | Wegner |
| 6,866,870 | B2 | 3/2005 | Day |
| 7,008,545 | B2 | 3/2006 | Cronan et al. |
| 7,048,859 | B1 | 5/2006 | Moffett |

(Continued)

FOREIGN PATENT DOCUMENTS

| | | | |
|---|---|---|---|
| CN | 101310726 | A | 11/2008 |
| CN | 101802159 | A | 8/2010 |

(Continued)

OTHER PUBLICATIONS

WIPO, PCT Form ISA237, Written Opinion for International Patent Application Serial No. PCT/US2018/040155, pp. 9 (Aug. 21, 2018).
WIPO, PCT Form ISA237, Written Opinion for International Patent Application Serial No. PCT/US2018/054263, pp. 7 (Feb. 4, 2019).
WIPO, PCT Form ISA237, Written Opinion for International Patent Application Serial No. PCT/US2018/057403, (Jan. 11, 2019).
WIPO, PCT Form ISA237, Written Opinion for International Patent Application Serial No. PCT/US2019/013542, pp. 5 (May 8, 2019).
WIPO, PCT Form ISA237, Written Opinion for International Patent Application Serial No. PCT/US2020/037665, pp. 6 (Sep. 9, 2020).
WIPO, PCT Form ISA237, Written Opinion for International Patent Application Serial No. PCT/US2020/037666, pp. 6 (Sep. 14, 2020).

(Continued)

*Primary Examiner* — Dominic Lazaro

(74) *Attorney, Agent, or Firm* — UltimatEdge IP Law Group, P.C.; Dean G. Stathakis

(57) ABSTRACT

The present specification discloses a composition comprising, consisting essentially of, or consisting of hypochlorous acid or free available chlorine in combination with one or more quaternary compounds or silicon quaternary compounds, one or more guanide-containing compounds, one or more alcohols, one or more metallic particles, one or more metal salts, or any combination thereof. The present specification further discloses a kit comprising, consisting essentially of, or consisting of a one or more containers including a composition disclosed herein or components which make up such compositions as well as methods and uses for such compositions and kits.

20 Claims, No Drawings

(56) References Cited

U.S. PATENT DOCUMENTS

| | | | |
|---|---|---|---|
| 7,192,554 B2 | 3/2007 | Read | |
| 7,323,118 B2 | 1/2008 | Calderon | |
| 7,344,725 B2 | 3/2008 | Ketelson et al. | |
| 7,351,684 B2 | 4/2008 | Tichy et al. | |
| 7,429,556 B2 | 9/2008 | Delcomyn et al. | |
| 7,700,076 B2 | 4/2010 | Tamarkin et al. | |
| 7,700,530 B2 | 4/2010 | Mundschau et al. | |
| 7,718,122 B2 | 5/2010 | Smith et al. | |
| 7,884,089 B2 | 2/2011 | Gimvang | |
| 7,897,403 B2 | 3/2011 | Read | |
| 8,062,500 B2 | 11/2011 | Sumita | |
| 8,147,444 B2 | 4/2012 | Alimi | |
| 8,277,827 B2 | 10/2012 | Toreki et al. | |
| 8,318,654 B2 | 11/2012 | Hoffman et al. | |
| 8,460,701 B2 | 6/2013 | Karagoezian | |
| 8,642,527 B2 | 2/2014 | Van Buskirk et al. | |
| 8,784,901 B2 | 7/2014 | Karagoezian | |
| 8,834,445 B2 | 9/2014 | Alimi | |
| 8,840,873 B2 | 9/2014 | Alimi | |
| 8,840,911 B2 | 9/2014 | Flugge-Berendes et al. | |
| 8,883,222 B2 | 11/2014 | Norton | |
| 8,945,630 B2 | 2/2015 | Calderon | |
| 9,072,717 B2 | 7/2015 | Karagoezian | |
| 9,072,726 B2 | 7/2015 | Alimi et al. | |
| 9,168,318 B2 | 10/2015 | Alimi | |
| 9,226,495 B2 | 1/2016 | Berentsveig et al. | |
| 9,273,220 B2 | 3/2016 | Scheuing | |
| 9,326,995 B2 | 5/2016 | Stucky et al. | |
| 9,381,214 B2 | 7/2016 | Sampson et al. | |
| 9,474,768 B1 | 10/2016 | Richards et al. | |
| 9,486,479 B2 | 11/2016 | Northey | |
| 9,498,548 B2 | 11/2016 | Alimi | |
| 9,597,353 B2 | 3/2017 | Hoover | |
| 9,622,480 B2 | 4/2017 | Karagoezian | |
| 9,642,876 B2 | 5/2017 | Alimi | |
| 9,782,434 B2 | 10/2017 | Alimi | |
| 9,833,471 B1 | 12/2017 | Richards et al. | |
| 10,010,081 B2 | 7/2018 | Karagoezian | |
| 10,412,968 B2 | 9/2019 | Alimi et al. | |
| 10,626,559 B2 | 4/2020 | Kolari et al. | |
| 11,272,710 B2 * | 3/2022 | Alimi ..................... | A01N 59/00 |
| 11,365,524 B1 | 6/2022 | Reardon et al. | |
| 11,910,797 B2 * | 2/2024 | Alimi ..................... | A01N 33/12 |
| 2001/0016589 A1 | 8/2001 | Modak et al. | |
| 2002/0022660 A1 | 2/2002 | Jampani et al. | |
| 2003/0109411 A1 | 6/2003 | Kilkenny et al. | |
| 2003/0138498 A1 | 7/2003 | Yoshikawa et al. | |
| 2003/0150357 A1 | 8/2003 | Cohen | |
| 2003/0209490 A1 | 11/2003 | Camp et al. | |
| 2004/0003473 A1 | 1/2004 | Glenn et al. | |
| 2004/0050781 A1 | 3/2004 | Coffey et al. | |
| 2004/0126514 A1 | 7/2004 | McGee et al. | |
| 2004/0127614 A1 | 7/2004 | Jiang et al. | |
| 2004/0214785 A1 | 10/2004 | Dees et al. | |
| 2004/0219227 A1 | 11/2004 | Modak et al. | |
| 2005/0139808 A1 | 6/2005 | Alimi | |
| 2005/0142157 A1 | 6/2005 | Alimi | |
| 2005/0239675 A1 | 10/2005 | Makansi | |
| 2006/0003023 A1 | 1/2006 | Williams | |
| 2006/0073212 A1 | 4/2006 | Palmer | |
| 2006/0140998 A1 | 6/2006 | Nakanishi et al. | |
| 2006/0193789 A1 | 8/2006 | Tamarkin et al. | |
| 2006/0231505 A1 | 10/2006 | Mayer et al. | |
| 2006/0281663 A1 | 12/2006 | Asmus | |
| 2007/0217946 A1 | 9/2007 | Smith et al. | |
| 2007/0231247 A1 | 10/2007 | Bromberg et al. | |
| 2008/0014289 A1 | 1/2008 | Li | |
| 2008/0031973 A1 | 2/2008 | Lee | |
| 2009/0117164 A1 | 5/2009 | Toreki et al. | |
| 2009/0148342 A1 | 6/2009 | Bromberg et al. | |
| 2009/0246165 A1 | 10/2009 | Toreki et al. | |
| 2009/0258083 A1 * | 10/2009 | Calderon ................ | A61P 31/04 424/600 |
| 2010/0028290 A1 | 2/2010 | Sokol | |
| 2010/0055196 A1 | 3/2010 | MacGregor | |
| 2010/0210745 A1 | 8/2010 | McDaniel et al. | |
| 2010/0284951 A1 | 11/2010 | Pongprapansiri et al. | |
| 2011/0052506 A1 | 3/2011 | Abel et al. | |
| 2011/0135702 A1 | 6/2011 | Hoffman et al. | |
| 2011/0236504 A1 * | 9/2011 | Hata ....................... | A61P 31/00 424/641 |
| 2012/0036787 A1 | 2/2012 | Rodrigue et al. | |
| 2012/0082791 A1 | 4/2012 | Liversage | |
| 2012/0121679 A1 | 5/2012 | Cannon et al. | |
| 2012/0164235 A1 | 6/2012 | Northey | |
| 2012/0164236 A1 * | 6/2012 | Iwasa ....................... | C11D 3/48 424/616 |
| 2012/0223022 A1 | 9/2012 | Hassler et al. | |
| 2012/0258059 A1 | 10/2012 | Iwama et al. | |
| 2012/0269904 A1 | 10/2012 | Northey | |
| 2012/0301528 A1 | 11/2012 | Uhlmann et al. | |
| 2013/0129648 A1 | 5/2013 | Nguyen et al. | |
| 2013/0171224 A1 | 7/2013 | Percival et al. | |
| 2013/0259955 A1 | 10/2013 | Chen et al. | |
| 2014/0115750 A1 | 5/2014 | Kassam et al. | |
| 2014/0115765 A1 | 5/2014 | Carpenter et al. | |
| 2014/0134224 A1 | 5/2014 | Mallet et al. | |
| 2015/0119245 A1 | 4/2015 | Robertson et al. | |
| 2015/0125543 A1 | 5/2015 | Croke et al. | |
| 2015/0190536 A1 | 7/2015 | Degala et al. | |
| 2015/0231173 A1 | 8/2015 | Sampson et al. | |
| 2015/0264935 A1 | 9/2015 | Chang | |
| 2015/0265666 A1 | 9/2015 | Modak et al. | |
| 2015/0290102 A1 | 10/2015 | Cozean et al. | |
| 2015/0297411 A1 | 10/2015 | Wang et al. | |
| 2015/0306137 A1 | 10/2015 | Alimi | |
| 2015/0335544 A1 | 11/2015 | Lull et al. | |
| 2015/0351389 A1 | 12/2015 | Kolari et al. | |
| 2016/0024667 A1 | 1/2016 | Shanahan et al. | |
| 2016/0120183 A1 | 5/2016 | Northey | |
| 2016/0143944 A1 | 5/2016 | Panicheva et al. | |
| 2016/0166495 A1 | 6/2016 | Sarkar et al. | |
| 2016/0166497 A1 | 6/2016 | Saxena et al. | |
| 2016/0256369 A1 | 9/2016 | Dutton et al. | |
| 2016/0289480 A1 | 10/2016 | Maddalone | |
| 2016/0330969 A1 | 11/2016 | O'Connell | |
| 2016/0338917 A1 | 11/2016 | Daniel | |
| 2017/0042800 A1 | 2/2017 | Wenzel et al. | |
| 2017/0071980 A1 | 3/2017 | Alimi | |
| 2017/0156336 A1 | 6/2017 | Joshi | |
| 2017/0202877 A1 | 7/2017 | Hoover et al. | |
| 2017/0290789 A1 | 10/2017 | Dicosmo | |
| 2017/0304874 A1 | 10/2017 | Hennigan | |
| 2018/0235852 A1 | 8/2018 | Rodriguez | |
| 2019/0000086 A1 | 1/2019 | Alimi et al. | |
| 2019/0216090 A1 | 7/2019 | Alimi et al. | |

FOREIGN PATENT DOCUMENTS

| | | |
|---|---|---|
| CN | 102265893 A | 12/2011 |
| CN | 104324047 A | 2/2015 |
| EP | 0099209 A1 | 1/1984 |
| EP | 0129980 B1 | 1/1989 |
| EP | 1119347 B1 | 3/2005 |
| EP | 1465671 B1 | 12/2005 |
| EP | 1355681 B1 | 3/2006 |
| EP | 1418881 B1 | 7/2008 |
| EP | 1874913 B1 | 7/2008 |
| EP | 1941797 B1 | 6/2010 |
| EP | 3028568 A1 | 6/2016 |
| EP | 3205358 A1 | 8/2017 |
| EP | 3223611 B1 | 6/2020 |
| GB | 2541407 A | 2/2017 |
| JP | 57061099 A | 4/1982 |
| JP | S6253902 A | 3/1987 |
| JP | 5068408 B2 | 8/2012 |
| WO | 1997031533 A1 | 9/1997 |
| WO | 2000015036 A1 | 3/2000 |
| WO | 2001041567 A1 | 6/2001 |
| WO | 2006000756 A1 | 1/2006 |
| WO | 2007100776 A2 | 9/2007 |
| WO | 2009005936 A1 | 1/2009 |
| WO | 2009010749 A2 | 1/2009 |
| WO | 2009058274 A1 | 5/2009 |

(56) References Cited

FOREIGN PATENT DOCUMENTS

| | | | |
|---|---|---|---|
| WO | 2009125297 | A2 | 10/2009 |
| WO | 2009133616 | A1 | 11/2009 |
| WO | 2010011856 | A2 | 1/2010 |
| WO | 2010148004 | A1 | 12/2010 |
| WO | 2013051013 | A2 | 4/2013 |
| WO | 2013061082 | A1 | 5/2013 |
| WO | 2013090873 | A2 | 6/2013 |
| WO | 2013109850 | A2 | 7/2013 |
| WO | 2014147643 | A2 | 9/2014 |
| WO | 2015002932 | A1 | 1/2015 |
| WO | 2015145100 | A1 | 10/2015 |
| WO | 2016040738 | A1 | 3/2016 |
| WO | 2016100543 | A2 | 6/2016 |
| WO | 2019006217 | A1 | 1/2019 |
| WO | 2022046955 | A1 | 3/2022 |

OTHER PUBLICATIONS

WIPO, PCT Form ISA237, Written Opinion for International Patent Application Serial No. PCT/US2021/047627, pp. 8 (Feb. 8, 2022).
WIPO, PCT Form ISA237, Written Opinion for International Patent Application Serial No. PCT/US2023/079291, pp. 8 (Apr. 26, 2024).
Wolanov, et al, Zinc Dioxide Nanoparticulates: A Hydrogen Peroxide Source at Moderate pH, Environmental Science and Technology (2013).
You, et al, The progress of silver nanoparticles in the antibacterial mechanism, clinical application and cytotoxicity, Mol Biol Rep (2012).
Yuan, et al., Reaction of Silver Nanoparticles in the Disinfection Process, Chemosphere 93: 619-625 (2013).
Anonymous, Auxopan Product Label, Briotech (2016).
Anonymous, Disinfectant Manual, Features, Usage, and the Cautions on Disinfectants, pp. 15 to 198 Feb. 1, 2012).
Anonymous, Hypochlorous Acid Handling, USDA Technical Evaluation Report (Aug. 13, 2015).
Anonymous, Preventing Cross-Contamination in Endoscope Processing: FDA Safety Communication (Nov. 19, 2009).
CNIPA, First Office Action for Chinese Patent Application Serial No. 201880054035X (Aug. 11, 2021).
CNIPA, Second Office Action for Chinese Patent Application Serial No. 201880054035X (Mar. 23, 2022).
Dequeiroz, et al, Antimicrobial activity and effectiveness of a combination of sodium hypochlorite and hydrogen perozide in killing and removing Pseudomonas aeruginosa biofilms from surfaces, Journal of Applied Microbiology (2007).
Dimapilis, et al, Zinc oxide nanoparticles for water disinfection, Sustainable Environment Research (2018).
Echa-Europa, Polyhexamethylene Biguanide, EU Reg. No. 528/2012, pp. 132 (Jun. 2015).
Eissa, et al., Assessment of Antimicrobial Activity of Novel Disinfectant Based on Peroxygen/Biguanide/Alcohol Combination, Indonesian J. Pharm. 25(3): 153-163 (2014).
Eryilmaz, et al., Hypochlorous Acid - Analytical Methods and Antimicrobial Activity, Trop. J. Pharma. Res. 12(1): 123-126 (2013).
Google Patents English Translation of JPS6253902A (1987).
Gordon, et al., Synthesis and characterization of zinc/iron oxide composite nanoparticles and their antibacterial properties, Colloids and Surfaces A: Physiochemical Engineering Aspects (2011).
Hughson, et al., Inactivation of Prions and Amyloid Seeds with Hypochlorous Acid, PLoS Pathog 12(9): e1005914 (2016).
IMPI, Office Action for Mexican Patent Application Serial No. MX/a/2019/015822 (Mar. 23, 2022).
IPO, Office Action for Israeli Patent Application Serial No. 271623 (Oct. 19, 2021).
IPOS, Invitation to Respond to Written Opinion for Singapore Patent Application Serial No. 11201912534S (Apr. 27, 2021).
IPOS, Invitation to Respond to Written Opinion for Singapore Patent Application Serial No. 11201912534S (Oct. 20, 2021).
IPOS, Notice of Eligibility for Grant, SG Application No. 11201912534S (May 17, 2022).
Kuruvilla, et al., Antimicrobial Activity of 2.5% Sofium Hypochlorite and 0.2% Ch; orhexidine Gluconate Seperately and Combined, as Endodontic Irrigants, J. Endodon. 24(7): 472-476 (1998).
Leung, et al., Topical Hypochlorite Ameliorates NF-κl B-Mediated Skin Diseases in Mice, J. Clin. Invest. 123(12): 5361-5370 (2013).
Li, et al., Synthesis and Characterization of Biocompatible Antimicrobial N-Halamine-Functionalized Titanium Dioxide Core-Shell Nanoparticles, Colloids Surf. B: Biointerfaces 148: 511-517 (2016).
Martin, et al., Antibacterial Properties and Mechanism of Activity of a Novel Silver-Stabilized Hydrogen Peroxide, PLOS (2015).
Mitchell, et al., Evaluation of a Combination of Sodium Hypochlorite and Polyhexamethylene Biguanide as an Egg Wash for Red-Eared Slider Turtles (Trachemys scripta elegans) to Suppress or Eliminate Salmonella Organisms on Egg Surfaces and in Hatchlings, Am. J. Vet. Res. 68(2): 158-164 (2007).
Mohammed, et al, Novel approach for controlling resistant Listeria monocylogenes to anlimicrobials using different disinfectants types loaded on silver nanoparticles (AgNPs), Environmental Science and Pollution Research (2019).
Noguchi, et al., Efficacy of Surgical Antiseptic Handrub Containing Phmb, Bmc Proceedings 5(Suppl 6): P270 (2011).
Phull, et al, "The development and evaluation of ultrasound in the biocidal treatment of water" pp. 157-164, Ultrasonics Sonochermistry, vol. 4, (1997).
Polo, et al, Halide removal from waters by silver nanoparticles and hydrogent peroxide, Science of the Total Environment (2017).
Rutala, et al, Guideline for Disinfection and Sterilization in Healthcare Facilities, 2008, CDC, p. 158 (2008).
Sanchez-Sanhueza, et al, Copper Nanoparticles as Potential Antimicrobial Agent in Disinfecting Root Canals, A Systematic Review, Int. J. Odonlostomal (2016).
Saraya Europe, Alsoft E, pp. 2 (2021).
Shiguki, Detergent Sanitizers as Tools of Harmful Microbe Measures in Food Factories and Their Developments, J. Brewery Assoc. 108(3): 141-155 (2013).
USPTO, Final Office Action for U.S. Appl. No. 16/994,847 (Feb. 16, 2022).
USPTO, Non-Final Office Action for U.S. Appl. No. 16/994,862 (Jul. 21, 2021).
USPTO, Non-Final Office Action for U.S. Appl. No. 16/994,847 (Jul. 8, 2021).
Vervier, et al., A Multifunctional Ingredient for Next-Generation Skin Care Products, Dow Corning Europe Form No. 27-1237B-01 (Unknown Date).
Walia, et al., The Efficacy of Different Cleaning and Disinfection Procedures to Reduce Salmonella and Enterobacteriaceae in the Lairage Environment of a Pig Abattoir, Int. J. Food Microbiol. 246: 64-71 (2017).
WIPO, PCT Form IB373, International Preliminary Report on Patentability for International Patent Application Serial No. PCT/US2018/040155, pp. 11 (Jan. 9, 2020).
WIPO, PCT Form IB373, International Preliminary Report on Patentability for International Patent Application Serial No. PCT/US2018/054263, pp. 9 (Apr. 16, 2020).
WIPO, PCT Form IB373, International Preliminary Report on Patentability for International Patent Application Serial No. PCT/US2018/057403 (May 7, 2020).
WIPO, PCT Form IB373, International Preliminary Report on Patentability for International Patent Application Serial No. PCT/US2019/013542, pp. 7 (Jul. 14, 2020).
WIPO, PCT Form IB373, International Preliminary Report on Patentability for International Patent Application Serial No. PCT/US2020/037665, pp. 8 (Dec. 23, 2021).
WIPO, PCT Form ISA210, International Search Report for International Patent Application Serial No. PCT/US2018/040155, pp. 4 Aug. 21, 2018).
WIPO, PCT Form ISA210, International Search Report for International Patent Application Serial No. PCT/US2018/054263, p. 4 (Feb. 4, 2019).

(56) References Cited

OTHER PUBLICATIONS

WIPO, PCT Form ISA210, International Search Report for International Patent Application Serial No. PCT/US2018/057403, (Jan. 11, 2019).
WIPO, PCT Form ISA210, International Search Report for International Patent Application Serial No. PCT/US2019/013542, pp. 4 (May 8, 2019).
WIPO, PCT Form ISA210, International Search Report for International Patent Application Serial No. PCT/US2020/037665, pp. 4 (Sep. 9, 2020).
WIPO, PCT Form ISA210, International Search Report for International Patent Application Serial No. PCT/US2020/037666, pp. 4 (Sep. 14, 2020).
WIPO, PCT Form ISA210, International Search Report for International Patent Application Serial No. PCT/US2021/047627, pp. 4 (Feb. 8, 2022).
WIPO, PCT Form ISA210, International Search Report for International Patent Application Serial No. PCT/US2023/079291, pp. 4 (Apr. 26, 2024).

* cited by examiner

COMPOSITIONS, KITS, METHODS AND USES FOR CLEANING, DISINFECTING, STERILIZING AND/OR TREATING

This application is a continuation that claims the benefit of priority and is entitled to the filing date pursuant to 35 U.S.C. § 120 of U.S. Non-Provisional patent application Ser. No. 17/654,786, filed Mar. 14, 2022, a continuation that claims the benefit of priority and is entitled to the filing date pursuant to 35 U.S.C. § 120 of U.S. Non-Provisional patent application Ser. No. 16/247,501, filed Jan. 14, 2019, now U.S. Pat. No. 11,272,710, a 35 U.S.C. § 111 patent application which claims the benefit of priority and is entitled to the filing date pursuant to 35 U.S.C. § 119(e) of U.S. Provisional Patent Application 62/721,991, filed Aug. 23, 2018, and U.S. Provisional Patent Application 62/617,263, filed Jan. 14, 2018, the entire content of each of which is hereby incorporated by reference in its entirety.

In the United States, approximately 46.5 million surgical procedures and even more invasive medical procedures, including approximately 5 million gastrointestinal endoscopies, are performed each year. Each procedure involves contact by a medical device with a patient's sterile tissue or mucous membranes. A major risk of all such procedures is the introduction of pathogens that can lead to infection. Failure to properly clean, disinfect and/or sterilize a medical device can exposed a patient to body fluids and tissue contaminants from a prior patient can result in person-to-person or environmental transmission of pathogens and infect large numbers of people.

Sterilization of a medical device is preferred because this process destroys or eliminates all forms of microbial life. However, the high temperature and pressures used in sterilization processes are not suitable for heat-sensitive medical device. Such heat-sensitive devices must be cleaned using a disinfection process. However, one problem associated with currently used disinfection processes is that the type and amounts of disinfectants used are destructive to the medical device. This reduces the overall life-time use of a medical device, ultimately resulting in increased medical costs due to the need to replace the medical device sooner with a new one. In addition, given the recent infectious outbreaks due to contaminated medical devices, a better disinfection method better than currently available methods is needed.

The present specification discloses disinfection compositions, methods and uses that provide superior cleaning and disinfection of a hard surfaces of contamination/biofilm and/or a medical device including a heat-sensitive medical device and a device classified as a critical, semi-critical or noncritical item. At the same time, the disclosed disinfection compositions, methods and uses are less harsh than conventional compositions, methods and uses resulting in a longer lifetime use of a hard surface and/or medical device.

In addition, whether through surgical procedures or due to injury, there is an urgent need to clean and disinfect wounds. The present specification further discloses disinfection compositions, methods and uses that provide superior cleaning and disinfection of tissue in wound care, pre-operative preparation and surgery, to a skin surface in dermatological applications, and an eye in ophthalmological applications. The present specification also discloses compositions, methods and uses to treat an individual.

SUMMARY

Aspects of the present specification disclose a composition comprising hypochlorous acid or free available chlorine and one or more quaternary compound or silicon quaternary compounds. A composition disclosed herein can further comprise one or more guanide-containing compounds, one or more metallic particles and/or one or more metal salts.

Other aspects of the present specification disclose a composition comprising hypochlorous acid or free available chlorine and one or more guanide-containing compounds. A disclosed guanide-containing compound includes an organic compound containing a biguanide functional group, a biguanidine functional group, a triguanide functional group, or any combination thereof. A composition disclosed herein can further comprise one or more quaternary compound or silicon quaternary compounds, one or more metallic particles and/or one or more metal salts.

Other aspects of the present specification disclose a composition comprising one or more alcohols and one or more quaternary compound or silicon quaternary compounds. A disclosed alcohol includes ethanol, methanol, isopropyl alcohol, or any combination thereof. A composition disclosed herein can further comprise one or more guanide-containing compounds, one or more metallic particles and/or one or more metal salts.

Other aspects of the present specification disclose a composition comprising one or more alcohols compound and one or more guanide-containing compounds. A disclosed alcohol includes ethanol, methanol, isopropyl alcohol, or any combination thereof. A disclosed guanide-containing compound includes an organic compound containing a biguanide functional group, a biguanidine functional group, a triguanide functional group, or any combination thereof. A composition disclosed herein can further comprise one or more quaternary compound or silicon quaternary compounds, one or more metallic particles and/or one or more metal salts.

Other aspects of the present specification disclose a composition comprising hypochlorous acid or free available chlorine and one or more metallic particles. A composition disclosed herein can further comprise one or more metal salts.

Other aspects of the present specification disclose a composition comprising hypochlorous acid or free available chlorine and one or more metal salts. A composition disclosed herein can further comprise one or more metallic particles.

Other aspects of the present specification disclose a kit comprising one or more containers including a composition disclosed herein and/or one or more containers including components of a composition disclosed herein. A disclosed kit further comprises one or more delivery or application systems, and/or instructions, and/or a container.

Other aspects of the present specification disclose a method to clean, disinfect and/or sterilize a device. The disclosed method comprising applying a composition disclosed herein to a device, wherein application of the composition cleans, disinfects and/or sterilizes the device. The disclosed method may further comprise rinsing a cleaned, disinfected and/or sterilized device with a rinse solution disclosed herein. In other aspects of the present specification disclose a composition disclosed herein for use in cleaning, disinfecting and/or sterilizing a device. In other aspects of the present specification disclose a use of a disclosed composition clean, disinfect and/or sterilize a device.

Other aspects of the present specification disclose a method to clean, disinfect and/or sterilize a surface area. The disclosed method comprising applying a composition disclosed herein to a surface area, wherein application of the composition cleans, disinfects and/or sterilizes the surface area. The disclosed method may further comprise rinsing a cleaned, disinfected and/or sterilized surface area with a rinse solution disclosed herein. In other aspects of the present specification disclose a composition disclosed herein for use in cleaning, disinfecting and/or sterilizing a surface area. In other aspects of the present specification disclose a use of a disclosed composition clean, disinfect and/or sterilize a surface area.

Other aspects of the present specification disclose a method to clean, disinfect and/or sterilize a wound in an individual. The disclosed method comprising applying a composition disclosed herein to an individual, wherein application of the composition cleans, disinfects and/or sterilizes a wound. In other aspects of the present specification disclose a composition disclosed herein for use in cleaning, disinfecting and/or sterilizing of a wound in an individual. In other aspects of the present specification disclose a use of a disclosed composition clean, disinfect and/or sterilize of a wound in an individual. In other aspects of the present specification disclose a use of a disclosed composition in the manufacture of a medicament to clean, disinfect and/or sterilize of a wound in an individual.

Other aspects of the present specification disclose a method to clean, disinfect and/or sterilize a infection in an individual. The disclosed method comprising applying a composition disclosed herein to an individual, wherein application of the composition cleans, disinfects and/or sterilizes an infection. In other aspects of the present specification disclose a composition disclosed herein for use in cleaning, disinfecting and/or sterilizing of an infection in an individual. In other aspects of the present specification disclose a use of a disclosed composition clean, disinfect and/or sterilize of an infection in an individual. In other aspects of the present specification disclose a use of a disclosed composition in the manufacture of a medicament to clean, disinfect and/or sterilize of an infection in an individual. An infection can be a microbial infection.

Other aspects of the present specification disclose a method to treat a wound in an individual. The disclosed method comprising applying a composition disclosed herein to an individual, wherein application of the composition promotes healing of a wound. In other aspects of the present specification disclose a composition disclosed herein for use in treating a wound in an individual. In other aspects of the present specification disclose a use of a disclosed composition to treat a wound in an individual. In other aspects of the present specification disclose a use of a disclosed composition in the manufacture of a medicament to treat a wound in an individual.

DETAILED DESCRIPTION

A composition disclosed herein has increased stability and efficacy due to the protection of hypochlorous acid. In part, the composition may protect hypochlorous acid from exposure to harmful agents, including, e.g., organic compounds, reactive compounds, positively charged molecules, or other compounds that promote or facilitate degradation of hypochlorous acid. For example, the disclosed compositions are stable in blood serum and in plastic packaging material. In addition, a synergistic effect in efficacy is observed when hypochlorous acid is protected against this exposure. This significantly improved efficacy allows for lower amounts of hypochlorous acid to be used in the disclosed compositions. As concentrations of hypochlorous acid above 350 ppm, particularly above 500 ppm produces instability, the lower amounts of hypochlorous acid used in the disclosed compositions increases stability of the composition even further. As such, a composition disclosed herein is seen as a replacement to any and all prior hypochlorous acid compositions currently in the market or being developed. Uses include cleaning/disinfecting tissue in wound care and surgery, cleaning/disinfecting skin in dermatological applications, cleaning/disinfecting the eye in ophthalmological applications, cleaning/disinfecting hard surfaces of contamination/biofilm, cleaning/disinfecting medical devices of contamination.

The stability of a composition disclosed herein may be due to the positively charged N atom of a quaternary compound or silicon quaternary compound, a metallic particle, a metal salt and/or a guanide-containing compound disclosed herein. Such compounds appear to form a strong ionic interaction with the negatively charged ($OCl^-$), and the complex thus formed retains its stability over period of time compared to hypochlorous acid alone, which is a weaker complex in solution relative to a composition disclosed herein. Further, the use of 500 ppm or lower, an in particular 350 ppm or lower of hypochlorous acid further increases the stability of a composition disclosed herein.

The improved efficacy of a composition disclosed herein may in part be a result of chemical bond formation of a quaternary compound or silicon quaternary compound, a metallic particle, a metal salt and/or a guanide-containing compound disclosed herein with the substrates thereby providing a long-lasting activity combined with the free OCl(−), which has its own antimicrobial activity.

A composition disclosed herein may comprise hypochlorous acid. A weak acid, the chemical formula of hypochlorous acid is HOCl, while its molecular formula is written as HClO. As shown in formula I, hypochlorous acid is a simple molecule with the central oxygen connected to chlorine and hydrogen atoms through single bonds and has molar mass is 52.46 g/mol.

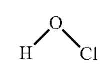

(I)

Hypochlorous acid is a colorless solution, and its exact physical properties are variable, depending on the concentration of hypochlorous in solution. Hypochlorous acid reacts with bases to form salts called hypochlorites. For example, sodium hypochlorite (NaOCl), the active ingredient in bleach, is formed by reacting hypochlorous acid with sodium hydroxide. Hypochlorous acid also readily reacts with a variety of organic molecules and biomolecules.

The hypochlorous acid solution can be produced, e.g., by dissolving chlorine in water, hydrolysis of chlorine gas, electrolysis of a salt solution or acidification of hypochloride. For example, stable hypochlorous salts, such as, e.g., alkali metal hypochlorites like sodium hypochlorite, calcium hypochlorite, potassium hypochlorite, lithium hypochlorite and magnesium hypochlorite, can be obtained by dissolving chlorine gas into an aqueous alkali metal hydroxide solution, like a sodium hydroxide solution, a calcium hydroxide solution, a potassium hydroxide solution, a lithium hydroxide solution, or a magnesium hydroxide solution. Hypochlorous acid can also be prepared by dissolving dichlorine monoxide in water. As another example, hypochlorous acid can also be produced by electrolytically treating a saline solution. In one method, an electrical current is applied to a one-, two-, or three-compartment cell comprising a cathode chamber, an anode chamber, and a central saline solution chamber interposed between the other two chambers where each chamber is separated by a semi-permeable membrane. During electrolysis, sodium chloride (NaCl) dissociates into negatively charged chloride ($Cl^-$) and positively charged sodium ($Na^+$). At the same time, water dissociates into hydroxide (OH−) and hydrogen ($H^+$) ions are formed. The negatively charged chloride ($Cl^-$) and hydroxide ($OH^-$) ions move to the anode to lose electrons and form hypochlorous acid (HOCl) as well as hypochlorite ions ($OCl^-$) and oxygen ($O_2$) and chlorine ($Cl_2$) gases. The reductive water comprising the hypochlorous acid is then dispensed into a collection chamber for subsequent use. Methods to produce hypochlorous acid are described in, e.g., U.S. Pat. Nos. 3,914,397, 4,190,638, 4,908,215, 5,322,677, 6,426,066, 7,323,118, 8,062,500, 8,945,630, 9,168,318, and 9,486,479, each of which is hereby incorporated by reference in its entirety.

In an embodiment, a composition disclosed herein comprises an amount of hypochlorous acid that provides a desired beneficial effect to a composition disclosed herein. In aspects of this embodiment, a composition disclosed herein comprises hypochlorous acid in an amount of, e.g., 0.05 ppm, 0.10 ppm, 0.15 ppm, 0.20 ppm, 0.25 ppm, 0.30 ppm, 0.35 ppm, 0.40 ppm, 0.45 ppm, 0.50 ppm, 0.55 ppm, 0.60 ppm, 0.65 ppm, 0.70 ppm, 0.75 ppm, 0.80 ppm, 0.85 ppm, 0.90 ppm, 0.95 ppm, 1 ppm, 5 ppm, 10 ppm, 15 ppm, 20 ppm, 25 ppm, 30 ppm, 35 ppm, 40 ppm, 45 ppm, 50 ppm, 55 ppm, 60 ppm, 65 ppm, 70 ppm, 75 ppm, 80 ppm, 85 ppm, 90 ppm, 95 ppm, 100 ppm, 125 ppm, 150 ppm, 175 ppm, 200 ppm, 225 ppm, 250 ppm, 275 ppm, 300 ppm, 325 ppm, 350 ppm, 375 ppm, 400 ppm, 425 ppm, 450 ppm, 475 ppm, 500 ppm, 525 ppm, 550 ppm, 575 ppm, 600 ppm, 625 ppm, 650 ppm, 675 ppm, 700 ppm, 725 ppm, 750 ppm, 775 ppm, 800 ppm, 825 ppm, 850 ppm, 875 ppm, 900 ppm, 925 ppm, 950 ppm, 975 ppm, 1,000 ppm, 1,025 ppm, 1,050 ppm, 1075 ppm, 1,100 ppm, 1,125 ppm, 1,150 ppm, 1,175 ppm, 1,200 ppm, 1,225 ppm, 1,250 ppm, 1,275 ppm, 1,300 ppm, 1,325 ppm, 1,350 ppm, 1,375 ppm, 1,400 ppm, 1,425 ppm, 1,450 ppm, 1,475 ppm, 1,500 ppm, 1,600 ppm, 1,700 ppm, 1,800 ppm, 1,900 ppm, or 2,000 ppm. In other aspects of this embodiment, a composition disclosed herein comprises hypochlorous acid in an amount of, e.g., at least 0.05 ppm, at least 0.10 ppm, at least 0.20 ppm, at least 0.30 ppm, at least 0.40 ppm, at least 0.50 ppm, at least 0.60 ppm, at least 0.70 ppm, at least 0.80 ppm, at least 0.90 ppm, at least 1 ppm, at least 10 ppm, at least 20 ppm, at least 30 ppm, at least 40 ppm, at least 50 ppm, at least 60 ppm, at least 70 ppm, at least 80 ppm, at least 90 ppm, at least 100 ppm, at least 125 ppm, at least 150 ppm, at least 175 ppm, at least 200 ppm, at least 225 ppm, at least 250 ppm, at least 275 ppm, at least 300 ppm, at least 325 ppm, at least 350 ppm, at least 375 ppm, at least 400 ppm, at least 425 ppm, at least 450 ppm, at least 475 ppm, at least 500 ppm, at least 525 ppm, at least 550 ppm, at least 575 ppm, at least 600 ppm, at least 625 ppm, at least 650 ppm, at least 675 ppm, at least 700 ppm, at least 725 ppm, at least 750 ppm, at least 775 ppm, at least 800 ppm, at least 825 ppm, at least 850 ppm, at least 875 ppm, at least 900 ppm, at least 925 ppm, at least 950 ppm, at least 975 ppm, at least 1,000 ppm, at least 1,025 ppm, at least 1,050 ppm, at least 1075 ppm, at least 1,100 ppm, at least 1,125 ppm, at least 1,150 ppm, at least 1,175 ppm, at least 1,200 ppm, at least 1,225 ppm, at least 1,250 ppm, at least 1,275 ppm, at least 1,300 ppm, at least 1,325 ppm, at least 1,350 ppm, at least 1,375 ppm, at least 1,400 ppm, at least 1,425 ppm, at least 1,450 ppm, at least 1,475 ppm, at least 1,500 ppm, at least 1,600 ppm, at least 1,700 ppm, at least 1,800 ppm, at least 1,900 ppm, or at least 2,000 ppm. In yet other aspects of this embodiment, a composition disclosed herein comprises hypochlorous acid in an amount of, e.g., at most 0.05 ppm, at most 0.10 ppm, at most 0.20 ppm, at most 0.30 ppm, at most 0.40 ppm, at most 0.50 ppm, at most 0.60 ppm, at most 0.70 ppm, at most 0.80 ppm, at most 0.90 ppm, at most 1 ppm, at most 10 ppm, at most 20 ppm, at most 30 ppm, at most 40 ppm, at most 50 ppm, at most 60 ppm, at most 70 ppm, at most 80 ppm, at most 90 ppm, at most 100 ppm, at most 125 ppm, at most 150 ppm, at most 175 ppm, at most 200 ppm, at most 225 ppm, at most 250 ppm, at most 275 ppm, at most 300 ppm, at most 325 ppm, at most 350 ppm, at most 375 ppm, at most 400 ppm, at most 425 ppm, at most 450 ppm, at most 475 ppm, at most 500 ppm, at most 525 ppm, at most 550 ppm, at most 575 ppm, at most 600 ppm, at most 625 ppm, at most 650 ppm, at most 675 ppm, at most 700 ppm, at most 725 ppm, at most 750 ppm, at most 775 ppm, at most 800 ppm, at most 825 ppm, at most 850 ppm, at most 875 ppm, at most 900 ppm, at most 925 ppm, at most 950 ppm, at most 975 ppm, at most 1,000 ppm, at most 1,025 ppm, at most 1,050 ppm, at most 1075 ppm, at most 1,100 ppm, at most 1,125 ppm, at most 1,150 ppm, at most 1,175 ppm, at most 1,200 ppm, at most 1,225 ppm, at most 1,250 ppm, at most 1,275 ppm, at most 1,300 ppm, at most 1,325 ppm, at most 1,350 ppm, at most 1,375 ppm, at most 1,400 ppm, at most 1,425 ppm, at most 1,450 ppm, at most 1,475 ppm, at most 1,500 ppm, at most 1,600 ppm, at most 1,700 ppm, at most 1,800 ppm, at most 1,900 ppm, or at most 2,000 ppm.

In still other aspects of this embodiment, a composition disclosed herein comprises hypochlorous acid in an amount of from, e.g., about 0.5 ppm to about 20 ppm, about 0.5 ppm to about 25 ppm, about 0.5 ppm to about 30 ppm, about 0.5 ppm to about 35 ppm, about 0.5 ppm to about 40 ppm, about 0.5 ppm to about 45 ppm, about 0.5 ppm to about 50 ppm, about 0.5 ppm to about 55 ppm, about 0.5 ppm to about 60 ppm, about 0.5 ppm to about 65 ppm, about 0.5 ppm to about 70 ppm, about 0.5 ppm to about 75 ppm, about 0.5 ppm to about 80 ppm, about 0.5 ppm to about 85 ppm, about 0.5 ppm to about 90 ppm, about 0.5 ppm to about 95 ppm, about 0.5 ppm to about 100 ppm, about 0.75 ppm to about 20 ppm, about 0.75 ppm to about 25 ppm, about 0.75 ppm to about 30 ppm, about 0.75 ppm to about 35 ppm, about 0.75 ppm to about 40 ppm, about 0.75 ppm to about 45 ppm, about 0.75 ppm to about 50 ppm, about 0.75 ppm to about 55 ppm, about 0.75 ppm to about 60 ppm, about 0.75 ppm to about 65 ppm, about 0.75 ppm to about 70 ppm, about 0.75 ppm to about 75 ppm, about 0.75 ppm to about 80 ppm, about 0.75 ppm to about 85 ppm, about 0.75 ppm to about 90 ppm, about 0.75 ppm to about 95 ppm, about 0.75 ppm to about 100 ppm, about 1 ppm to about 20 ppm, about 1 ppm to about 25 ppm, about 1 ppm to about 30 ppm, about 1 ppm to about 35 ppm, about 1 ppm to about 40 ppm, about 1 ppm to about 45 ppm, about 1 ppm to about 50 ppm, about 1 ppm to about 55 ppm, about 1 ppm to about 60 ppm, about 1 ppm to about 65 ppm, about 1 ppm to about 70 ppm, about 1 ppm to about 75 ppm, about 1 ppm to about 80 ppm, about 1 ppm to about 85 ppm, about 1 ppm to about 90 ppm, about 1 ppm to about 95 ppm, about 1 ppm to about 100 ppm, about 5 ppm to about 20 ppm, about 5 ppm to about 25 ppm, about 5 ppm to about 30 ppm, about 5 ppm to about 35 ppm, about 5 ppm to about 40 ppm, about 5 ppm to about 45 ppm, about 5 ppm to about 50 ppm, about 5 ppm to about 55 ppm, about 5 ppm to about 60 ppm, about 5 ppm to about 65 ppm, about 5 ppm to about 70 ppm, about 5 ppm to about 75 ppm, about 5 ppm to about 80 ppm, about 5 ppm to about 85 ppm, about 5 ppm to about 90 ppm, about 5 ppm to about 95 ppm, about 5 ppm to about 100 ppm, about 10 ppm to about 20 ppm, about 10 ppm to about 25 ppm, about 10 ppm to about 30 ppm, about 10 ppm to about 35 ppm, about 10 ppm to about 40 ppm, about 10 ppm to about 45 ppm, about 10 ppm to about 50 ppm, about 10 ppm to about 55 ppm, about 10 ppm to about 60 ppm, about 10 ppm to about 65 ppm, about 10 ppm to about 70 ppm, about 10 ppm to about 75 ppm, about 10 ppm to about 80 ppm, about 10 ppm to about 85 ppm, about 10 ppm to about 90 ppm, about 10 ppm to about 95 ppm, or about 10 ppm to about 100 ppm.

In other aspects of this embodiment, a composition disclosed herein comprises hypochlorous acid in an amount of from, e.g., about 1 ppm to about 25 ppm, about 1 ppm to about 50 ppm, about 1 ppm to about 75 ppm, about 1 ppm to about 100 ppm, about 1 ppm to about 125 ppm, about 1 ppm to about 150 ppm, about 1 ppm to about 175 ppm, about 1 ppm to about 200 ppm, about 1 ppm to about 225 ppm, about 1 ppm to about 250 ppm, about 1 ppm to about 275 ppm, about 1 ppm to about 300 ppm, about 1 ppm to about 325 ppm, about 1 ppm to about 350 ppm, about 1 ppm to about 375 ppm, about 1 ppm to about 400 ppm, about 10 ppm to about 25 ppm, about 10 ppm to about 50 ppm, about 10 ppm to about 75 ppm, about 10 ppm to about 100 ppm, about 10 ppm to about 125 ppm, about 10 ppm to about 150 ppm, about 10 ppm to about 175 ppm, about 10 ppm to about 200 ppm, about 10 ppm to about 225 ppm, about 10 ppm to about 250 ppm, about 10 ppm to about 275 ppm, about 10 ppm to about 300 ppm, about 10 ppm to about 325 ppm, about 10 ppm to about 350 ppm, about 10 ppm to about 375 ppm, about 10 ppm to about 400 ppm, about 25 ppm to about 50 ppm, about 25 ppm to about 75 ppm, about 25 ppm to about 100 ppm, about 25 ppm to about 125 ppm, about 25 ppm to about 150 ppm, about 25 ppm to about 175 ppm, about 25 ppm to about 200 ppm, about 25 ppm to about 225 ppm, about 25 ppm to about 250 ppm, about 25 ppm to about 275 ppm, about 25 ppm to about 300 ppm, about 25 ppm to about 325 ppm, about 25 ppm to about 350 ppm, about 25 ppm to about 375 ppm, about 25 ppm to about 400 ppm, about 50 ppm to about 75 ppm, about 50 ppm to about 100 ppm, about 50 ppm to about 125 ppm, about 50 ppm to about 150 ppm, about 50 ppm to about 175 ppm, about 50 ppm to about 200 ppm, about 50 ppm to about 225 ppm, about 50 ppm to about 250 ppm, about 50 ppm to about 275 ppm, about 50 ppm to about 300 ppm, about 50 ppm to about 325 ppm, about 50 ppm to about 350 ppm, about 50 ppm to about 375 ppm, about 50 ppm to about 400 ppm, about 75 ppm to about 100 ppm, about 75 ppm to about 125 ppm, about 75 ppm to about 150 ppm, about 75 ppm to about 175 ppm, about 75 ppm to about 200 ppm, about 75 ppm to about 225 ppm, about 75 ppm to about 250 ppm, about 75 ppm to about 275 ppm, about 75 ppm to about 300 ppm, about 75 ppm to about 325 ppm, about 75 ppm to about 350 ppm, about 75 ppm to about 375 ppm, about 75 ppm to about 400 ppm, about 100 ppm to about 125 ppm, about 100 ppm to about 150 ppm, about 100 ppm to about 175 ppm, about 100 ppm to about 200 ppm, about 100 ppm to about 225 ppm, about 100 ppm to about 250 ppm, about 100 ppm to about 275 ppm, about 100 ppm to about 300 ppm, about 100 ppm to about 325 ppm, about 100 ppm to about 350 ppm, about 100 ppm to about 375 ppm, about 100 ppm to about 400 ppm, about 150 ppm to about 175 ppm, about 150 ppm to about 200 ppm, about 150 ppm to about 225 ppm, about 150 ppm to about 250 ppm, about 150 ppm to about 275 ppm, about 150 ppm to about 300 ppm, about 150 ppm to about 325 ppm, about 150 ppm to about 350 ppm, about 150 ppm to about 375 ppm, about 150 ppm to about 400 ppm, about 200 ppm to about 225 ppm, about 200 ppm to about 250 ppm, about 200 ppm to about 275 ppm, about 200 ppm to about 300 ppm, about 200 ppm to about 325 ppm, about 200 ppm to about 350 ppm, about 200 ppm to about 375 ppm, about 200 ppm to about 400 ppm, about 250 ppm to about 275 ppm, about 250 ppm to about 300 ppm, about 250 ppm to about 325 ppm, about 250 ppm to about 350 ppm, about 250 ppm to about 375 ppm, about 250 ppm to about 400 ppm, about 300 ppm to about 325 ppm, about 300 ppm to about 350 ppm, about 300 ppm to about 375 ppm, about 300 ppm to about 400 ppm, about 350 ppm to about 375 ppm, about 350 ppm to about 400 ppm, or about 375 ppm to about 400 ppm.

In other aspects of this embodiment, a composition disclosed herein comprises hypochlorous acid in an amount of, e.g., about 400 ppm to about 500 ppm, about 400 ppm to about 600 ppm, about 400 ppm to about 700 ppm, about 400 ppm to about 800 ppm, about 400 ppm to about 900 ppm, about 400 ppm to about 1,000 ppm, about 400 ppm to about 1,100 ppm, about 400 ppm to about 1,200 ppm, about 400 ppm to about 1,300 ppm, about 400 ppm to about 1,400 ppm, about 400 ppm to about 1,500 ppm, about 400 ppm to about 1,600 ppm, about 400 ppm to about 1,700 ppm, about 400 ppm to about 1,800 ppm, about 400 ppm to about 1,900 ppm, about 400 ppm to about 2,000 ppm, about 500 ppm to about 600 ppm, about 500 ppm to about 700 ppm, about 500 ppm to about 800 ppm, about 500 ppm to about 900 ppm, about 500 ppm to about 1,000 ppm, about 500 ppm to about 1,100 ppm, about 500 ppm to about 1,200 ppm, about 500 ppm to about 1,300 ppm, about 500 ppm to about 1,400 ppm, about 500 ppm to about 1,500 ppm, about 500 ppm to about 1,600 ppm, about 500 ppm to about 1,700 ppm, about 500 ppm to about 1,800 ppm, about 500 ppm to about 1,900 ppm, about 500 ppm to about 2,000 ppm, about 600 ppm to about 700 ppm, about 600 ppm to about 800 ppm, about 600 ppm to about 900 ppm, about 600 ppm to about 1,000 ppm, about 600 ppm to about 1,100 ppm, about 600 ppm to about 1,200 ppm, about 600 ppm to about 1,300 ppm, about 600 ppm to about 1,400 ppm, about 600 ppm to about 1,500 ppm, about 600 ppm to about 1,600 ppm, about 600 ppm to about 1,700 ppm, about 600 ppm to about 1,800 ppm, about 600 ppm to about 1,900 ppm, about 600 ppm to about 2,000 ppm, about 700 ppm to about 800 ppm, about 700 ppm to about 900 ppm, about 700 ppm to about 1,000 ppm, about 700 ppm to about 1,100 ppm, about 700 ppm to about 1,200 ppm, about 700 ppm to about 1,300 ppm, about 700 ppm to about 1,400 ppm, about 700 ppm to about 1,500 ppm, about 700 ppm to about 1,600 ppm, about 700 ppm to about 1,700 ppm, about 700 ppm to about 1,800 ppm, about 700 ppm to about 1,900 ppm, about 700 ppm to about 2,000 ppm, about 800 ppm to about 900 ppm, about 800 ppm to about 1,000 ppm, about 800 ppm to about 1,100 ppm, about 800 ppm to about 1,200 ppm, about 800 ppm to about 1,300 ppm, about 800 ppm to about 1,400 ppm, about 800 ppm to about 1,500 ppm, about 800 ppm to about 1,600 ppm, about 800 ppm to about 1,700 ppm, about 800 ppm to about 1,800 ppm, about 800 ppm to about 1,900 ppm, about 800 ppm to about 2,000 ppm, about 900 ppm to about 1,000 ppm, about 900 ppm to about 1,100 ppm, about 900 ppm to about 1,200 ppm, about 900 ppm to about 1,300 ppm, about 900 ppm to about 1,400 ppm, about 900 ppm to about 1,500 ppm, about 900 ppm to about 1,600 ppm, about 900 ppm to about 1,700 ppm, about 900 ppm to about 1,800 ppm, about 900 ppm to about 1,900 ppm, about 900 ppm to about 2,000 ppm, about 1,000 ppm to about 1,100 ppm, about 1,000 ppm to about 1,200 ppm, about 1,000 ppm to about 1,300 ppm, about 1,000 ppm to about 1,400 ppm, about 1,000 ppm to about 1,500 ppm, about 1,000 ppm to about 1,600 ppm, about 1,000 ppm to about 1,700 ppm, about 1,000 ppm to about 1,800 ppm, about 1,000 ppm to about 1,900 ppm, about 1,000 ppm to about 2,000 ppm, about 1,100 ppm to about 1,200 ppm, about 1,100 ppm to about 1,300 ppm, about 1,100 ppm to about 1,400 ppm, about 1,100 ppm to about 1,500 ppm, about 1,100 ppm to about 1,600 ppm, about 1,100 ppm to about 1,700 ppm, about 1,100 ppm to about 1,800 ppm, about 1,100 ppm to about 1,900 ppm, about 1,100 ppm to about 2,000 ppm, about 1,200 ppm to about 1,300 ppm, about 1,200 ppm to about 1,400 ppm, about 1,200 ppm to about 1,500 ppm, about 1,200 ppm to about 1,600 ppm, about 1,200 ppm to about 1,700 ppm, about 1,200 ppm to about 1,800 ppm, about 1,200 ppm to about 1,900 ppm, about 1,200 ppm to about 2,000 ppm, about 1,300 ppm to about 1,400 ppm, about 1,300 ppm to about 1,500 ppm, about 1,300 ppm to about 1,600 ppm, about 1,300 ppm to about 1,700 ppm, about 1,300 ppm to about 1,800 ppm, about 1,300 ppm to about 1,900 ppm, about 1,300 ppm to about 2,000 ppm, about 1,400 ppm to about 1,500 ppm, about 1,400 ppm to about 1,600 ppm, about 1,400 ppm to about 1,700 ppm, about 1,400 ppm to about 1,800 ppm, about 1,400 ppm to about 1,900 ppm, about 1,400 ppm to about 2,000 ppm, about 1,500 ppm to about 1,600 ppm, about 1,500 ppm to about 1,700 ppm, about 1,500 ppm to about 1,800 ppm, about 1,500 ppm to about 1,900 ppm, about 1,500 ppm to about 2,000 ppm, about 1,600 ppm to about 1,700 ppm, about 1,600 ppm to about 1,800 ppm, about 1,600 ppm to about 1,900 ppm, about 1,600 ppm to about 2,000 ppm, about 1,700 ppm to about 1,800 ppm, about 1,700 ppm to about 1,900 ppm, about 1,700 ppm to about 2,000 ppm, about 1,800 ppm to about 1,900 ppm, about 1,800 ppm to about 2,000 ppm, or about 1,900 ppm to about 2,000 ppm.

In aspects of this embodiment, a composition disclosed herein comprises hypochlorous acid in an amount of, e.g., about 0.10%, about 0.11%, about 0.12%, about 0.13%, about 0.14%, about 0.15%, about 0.16%, about 0.17%, about 0.18%, about 0.19%, about 0.2%, about 0.25%, about 0.3%, about 0.35%, about 0.4%, about 0.45%, or about 0.5% by weight of the composition. In other aspects of this embodiment, a composition disclosed herein comprises hypochlorous acid in an amount of, e.g., at least 0.10%, at least 0.11%, at least 0.12%, at least 0.13%, at least 0.14%, at least 0.15%, at least 0.16%, at least 0.17%, at least 0.18%, at least 0.19%, at least 0.2%, at least 0.25%, at least 0.3%, at least 0.35%, at least 0.4%, at least 0.45%, or at least 0.5% by weight of the composition. In yet other aspects of this embodiment, a composition disclosed herein comprises hypochlorous acid in an amount of, e.g., at most 0.10%, at most 0.11%, at most 0.12%, at most 0.13%, at most 0.14%, at most 0.15%, at most 0.16%, at most 0.17%, at most 0.18%, at most 0.19%, at most 0.2%, at most 0.25%, at most 0.3%, at most 0.35%, at most 0.4%, at most 0.45%, or at most 0.5% by weight of the composition. In still other aspects of this embodiment, a composition disclosed herein comprises hypochlorous acid in an amount of, e.g., about 0.10% to about 0.15%, about 0.10% to about 0.20%, about 0.10% to about 0.25%, about 0.10% to about 0.30%, about 0.10% to about 0.35%, about 0.10% to about 0.40%, about 0.10% to about 0.45%, about 0.10% to about 0.50%, about 0.20% to about 0.25%, about 0.20% to about 0.30%, about 0.20% to about 0.35%, about 0.20% to about 0.40%, about 0.20% to about 0.45%, about 0.20% to about 0.50%, about 0.30% to about 0.35%, about 0.30% to about 0.40%, about 0.30% to about 0.45%, about 0.30% to about 0.50%, about 0.40% to about 0.45%, about 0.40% to about 0.50%, or about 0.40% to about 0.50% by weight of the composition.

In one embodiment, a composition disclosed herein does not comprise hypochlorous acid.

The concentration of hypochlorous acid in solution may be described as free available chlorine in parts per million. Hypochlorous acid is in equilibrium with hypochlorite ions ($OCl^-$) and dissolved chlorine gas ($Cl_2$). The extent of the equilibrium is determined predominately by the salt concentration and pH of the solution. Temperature also impacts the ratio of the free chlorine component. Therefore, both FAC and pH need to be known to understand the amount of chlorine present as hypochlorous acid. In general, when the pH range is about 4.0 to about 5.6, approximately 100% of the available chlorine is present as HOCl. As the pH is lowered below about 4, there is an increase in dissolved chlorine gas ($Cl_2$). Thus, at a pH of about 3, about 90% of the available chlorine is present as hypochlorous acid, at a pH of about 2, about 75% of the available chlorine is present as hypochlorous acid, at a pH of about 1.5, about 50% of the available chlorine is present as hypochlorous acid, while at a pH of about 1, about 25% of the available chlorine is present as hypochlorous acid. As the pH is increase above about 5.6, there is an increase in hypochlorite ions ($OCl^-$). Thus, at a pH a pH of about 6.5, about 90% of the available chlorine is present as hypochlorous acid, at a pH of about 7, about 75% of the available chlorine is present as hypochlorous acid, at a pH of about 7.5, about 50% of the available chlorine is present as hypochlorous acid, while at a pH of about 8, about 25% of the available chlorine is present as hypochlorous acid.

The chlorine amount may be measured by methods known in the art, such as a DPD colorimeter method (Lamotte Company, Chestertown, Md.), a UV spectrophotometry method, or other known methods established by the Environmental Protection Agency. In the DPD colorimeter method, a yellow color is formed by the reaction of free chlorine With N,N-diethyl-p-phenylenediamine (DPD) and the intensity is measured With a calibrated calorimeter that provides the output in parts per million. Further addition of potassium iodide turns the solution a pink color to provide the total chlorine value.

In an embodiment, a composition disclosed herein comprises an amount of free available chlorine that provides a desired beneficial effect to a composition disclosed herein. In aspects of this embodiment, a composition disclosed herein comprises free available chlorine in an amount of, e.g., 0.05 ppm, 0.10 ppm, 0.15 ppm, 0.20 ppm, 0.25 ppm, 0.30 ppm, 0.35 ppm, 0.40 ppm, 0.45 ppm, 0.50 ppm, 0.55 ppm, 0.60 ppm, 0.65 ppm, 0.70 ppm, 0.75 ppm, 0.80 ppm, 0.85 ppm, 0.90 ppm, 0.95 ppm, 1 ppm, 5 ppm, 10 ppm, 15 ppm, 20 ppm, 25 ppm, 30 ppm, 35 ppm, 40 ppm, 45 ppm, 50 ppm, 55 ppm, 60 ppm, 65 ppm, 70 ppm, 75 ppm, 80 ppm, 85 ppm, 90 ppm, 95 ppm, 100 ppm, 125 ppm, 150 ppm, 175 ppm, 200 ppm, 225 ppm, 250 ppm, 275 ppm, 300 ppm, 325 ppm, 350 ppm, 375 ppm, 400 ppm, 425 ppm, 450 ppm, 475 ppm, 500 ppm, 525 ppm, 550 ppm, 575 ppm, 600 ppm, 625 ppm, 650 ppm, 675 ppm, 700 ppm, 725 ppm, 750 ppm, 775 ppm, 800 ppm, 825 ppm, 850 ppm, 875 ppm, 900 ppm, 925 ppm, 950 ppm, 975 ppm, 1,000 ppm, 1,025 ppm, 1,050 ppm, 1075 ppm, 1,100 ppm, 1,125 ppm, 1,150 ppm, 1,175 ppm, 1,200 ppm, 1,225 ppm, 1,250 ppm, 1,275 ppm, 1,300 ppm, 1,325 ppm, 1,350 ppm, 1,375 ppm, 1,400 ppm, 1,425 ppm, 1,450 ppm, 1,475 ppm, 1,500 ppm, 1,600 ppm, 1,700 ppm, 1,800 ppm, 1,900 ppm, or 2,000 ppm. In other aspects of this embodiment, a composition disclosed herein comprises free available chlorine in an amount of, e.g., at least 0.05 ppm, at least 0.10 ppm, at least 0.20 ppm, at least 0.30 ppm, at least 0.40 ppm, at least 0.50 ppm, at least 0.60 ppm, at least 0.70 ppm, at least 0.80 ppm, at least 0.90 ppm, at least 1 ppm, at least 10 ppm, at least 20 ppm, at least 30 ppm, at least 40 ppm, at least 50 ppm, at least 60 ppm, at least 70 ppm, at least 80 ppm, at least 90 ppm, at least 100 ppm, at least 125 ppm, at least 150 ppm, at least 175 ppm, at least 200 ppm, at least 225 ppm, at least 250 ppm, at least 275 ppm, at least 300 ppm, at least 325 ppm, at least 350 ppm, at least 375 ppm, at least 400 ppm, at least 425 ppm, at least 450 ppm, at least 475 ppm, at least 500 ppm, at least 525 ppm, at least 550 ppm, at least 575 ppm, at least 600 ppm, at least 625 ppm, at least 650 ppm, at least 675 ppm, at least 700 ppm, at least 725 ppm, at least 750 ppm, at least 775 ppm, at least 800 ppm, at least 825 ppm, at least 850 ppm, at least 875 ppm, at least 900 ppm, at least 925 ppm, at least 950 ppm, at least 975 ppm, at least 1,000 ppm, at least 1,025 ppm, at least 1,050 ppm, at least 1075 ppm, at least 1,100 ppm, at least 1,125 ppm, at least 1,150 ppm, at least 1,175 ppm, at least 1,200 ppm, at least 1,225 ppm, at least 1,250 ppm, at least 1,275 ppm, at least 1,300 ppm, at least 1,325 ppm, at least 1,350 ppm, at least 1,375 ppm, at least 1,400 ppm, at least 1,425 ppm, at least 1,450 ppm, at least 1,475 ppm, at least 1,500 ppm, at least 1,600 ppm, at least 1,700 ppm, at least 1,800 ppm, at least 1,900 ppm, or at least 2,000 ppm. In yet other aspects of this embodiment, a composition disclosed herein comprises free available chlorine in an amount of, e.g., at most 0.05 ppm, at most 0.10 ppm, at most 0.20 ppm, at most 0.30 ppm, at most 0.40 ppm, at most 0.50 ppm, at most 0.60 ppm, at most 0.70 ppm, at most 0.80 ppm, at most 0.90 ppm, at most 1 ppm, at most 10 ppm, at most 20 ppm, at most 30 ppm, at most 40 ppm, at most 50 ppm, at most 60 ppm, at most 70 ppm, at most 80 ppm, at most 90 ppm, at most 100 ppm, at most 125 ppm, at most 150 ppm, at most 175 ppm, at most 200 ppm, at most 225 ppm, at most 250 ppm, at most 275 ppm, at most 300 ppm, at most 325 ppm, at most 350 ppm, at most 375 ppm, at most 400 ppm, at most 425 ppm, at most 450 ppm, at most 475 ppm, at most 500 ppm, at most 525 ppm, at most 550 ppm, at most 575 ppm, at most 600 ppm, at most 625 ppm, at most 650 ppm, at most 675 ppm, at most 700 ppm, at most 725 ppm, at most 750 ppm, at most 775 ppm, at most 800 ppm, at most 825 ppm, at most 850 ppm, at most 875 ppm, at most 900 ppm, at most 925 ppm, at most 950 ppm, at most 975 ppm, at most 1,000 ppm, at most 1,025 ppm, at most 1,050 ppm, at most 1075 ppm, at most 1,100 ppm, at most 1,125 ppm, at most 1,150 ppm, at most 1,175 ppm, at most 1,200 ppm, at most 1,225 ppm, at most 1,250 ppm, at most 1,275 ppm, at most 1,300 ppm, at most 1,325 ppm, at most 1,350 ppm, at most 1,375 ppm, at most 1,400 ppm, at most 1,425 ppm, at most 1,450 ppm, at most 1,475 ppm, at most 1,500 ppm, at most 1,600 ppm, at most 1,700 ppm, at most 1,800 ppm, at most 1,900 ppm, or at most 2,000 ppm.

In still other aspects of this embodiment, a composition disclosed herein comprises free available chlorine in an amount of from, e.g., about 0.5 ppm to about 20 ppm, about 0.5 ppm to about 25 ppm, about 0.5 ppm to about 30 ppm, about 0.5 ppm to about 35 ppm, about 0.5 ppm to about 40 ppm, about 0.5 ppm to about 45 ppm, about 0.5 ppm to about 50 ppm, about 0.5 ppm to about 55 ppm, about 0.5 ppm to about 60 ppm, about 0.5 ppm to about 65 ppm, about 0.5 ppm to about 70 ppm, about 0.5 ppm to about 75 ppm, about 0.5 ppm to about 80 ppm, about 0.5 ppm to about 85 ppm, about 0.5 ppm to about 90 ppm, about 0.5 ppm to about 95 ppm, about 0.5 ppm to about 100 ppm, about 0.75 ppm to about 20 ppm, about 0.75 ppm to about 25 ppm, about 0.75 ppm to about 30 ppm, about 0.75 ppm to about 35 ppm, about 0.75 ppm to about 40 ppm, about 0.75 ppm to about 45 ppm, about 0.75 ppm to about 50 ppm, about 0.75 ppm to about 55 ppm, about 0.75 ppm to about 60 ppm, about 0.75 ppm to about 65 ppm, about 0.75 ppm to about 70 ppm, about 0.75 ppm to about 75 ppm, about 0.75 ppm to about 80 ppm, about 0.75 ppm to about 85 ppm, about 0.75 ppm to about 90 ppm, about 0.75 ppm to about 95 ppm, about 0.75 ppm to about 100 ppm, about 1 ppm to about 20 ppm, about 1 ppm to about 25 ppm, about 1 ppm to about 30 ppm, about 1 ppm to about 35 ppm, about 1 ppm to about 40 ppm, about 1 ppm to about 45 ppm, about 1 ppm to about 50 ppm, about 1 ppm to about 55 ppm, about 1 ppm to about 60 ppm, about 1 ppm to about 65 ppm, about 1 ppm to about 70 ppm, about 1 ppm to about 75 ppm, about 1 ppm to about 80 ppm, about 1 ppm to about 85 ppm, about 1 ppm to about 90 ppm, about 1 ppm to about 95 ppm, about 1 ppm to about 100 ppm, about 5 ppm to about 20 ppm, about 5 ppm to about 25 ppm, about 5 ppm to about 30 ppm, about 5 ppm to about 35 ppm, about 5 ppm to about 40 ppm, about 5 ppm to about 45 ppm, about 5 ppm to about 50 ppm, about 5 ppm to about 55 ppm, about 5 ppm to about 60 ppm, about 5 ppm to about 65 ppm, about 5 ppm to about 70 ppm, about 5 ppm to about 75 ppm, about 5 ppm to about 80 ppm, about 5 ppm to about 85 ppm, about 5 ppm to about 90 ppm, about 5 ppm to about 95 ppm, about 5 ppm to about 100 ppm, about 10 ppm to about 20 ppm, about 10 ppm to about 25 ppm, about 10 ppm to about 30 ppm, about 10 ppm to about 35 ppm, about 10 ppm to about 40 ppm, about 10 ppm to about 45 ppm, about 10 ppm to about 50 ppm, about 10 ppm to about 55 ppm, about 10 ppm to about 60 ppm, about 10 ppm to about 65 ppm, about 10 ppm to about 70 ppm, about 10 ppm to about 75 ppm, about 10 ppm to about 80 ppm, about 10 ppm to about 85 ppm, about 10 ppm to about 90 ppm, about 10 ppm to about 95 ppm, or about 10 ppm to about 100 ppm.

In other aspects of this embodiment, a composition disclosed herein comprises free available chlorine in an amount of from, e.g., about 1 ppm to about 25 ppm, about 1 ppm to about 50 ppm, about 1 ppm to about 75 ppm, about 1 ppm to about 100 ppm, about 1 ppm to about 125 ppm, about 1 ppm to about 150 ppm, about 1 ppm to about 175 ppm, about 1 ppm to about 200 ppm, about 1 ppm to about 225 ppm, about 1 ppm to about 250 ppm, about 1 ppm to about 275 ppm, about 1 ppm to about 300 ppm, about 1 ppm to about 325 ppm, about 1 ppm to about 350 ppm, about 1 ppm to about 375 ppm, about 1 ppm to about 400 ppm, about 10 ppm to about 25 ppm, about 10 ppm to about 50 ppm, about 10 ppm to about 75 ppm, about 10 ppm to about 100 ppm, about 10 ppm to about 125 ppm, about 10 ppm to about 150 ppm, about 10 ppm to about 175 ppm, about 10 ppm to about 200 ppm, about 10 ppm to about 225 ppm, about 10 ppm to about 250 ppm, about 10 ppm to about 275 ppm, about 10 ppm to about 300 ppm, about 10 ppm to about 325 ppm, about 10 ppm to about 350 ppm, about 10 ppm to about 375 ppm, about 10 ppm to about 400 ppm, about 25 ppm to about 50 ppm, about 25 ppm to about 75 ppm, about 25 ppm to about 100 ppm, about 25 ppm to about 125 ppm, about 25 ppm to about 150 ppm, about 25 ppm to about 175 ppm, about 25 ppm to about 200 ppm, about 25 ppm to about 225 ppm, about 25 ppm to about 250 ppm, about 25 ppm to about 275 ppm, about 25 ppm to about 300 ppm, about 25 ppm to about 325 ppm, about 25 ppm to about 350 ppm, about 25 ppm to about 375 ppm, about 25 ppm to about 400 ppm, about 50 ppm to about 75 ppm, about 50 ppm to about 100 ppm, about 50 ppm to about 125 ppm, about 50 ppm to about 150 ppm, about 50 ppm to about 175 ppm, about 50 ppm to about 200 ppm, about 50 ppm to about 225 ppm, about 50 ppm to about 250 ppm, about 50 ppm to about 275 ppm, about 50 ppm to about 300 ppm, about 50 ppm to about 325 ppm, about 50 ppm to about 350 ppm, about 50 ppm to about 375 ppm, about 50 ppm to about 400 ppm, about 75 ppm to about 100 ppm, about 75 ppm to about 125 ppm, about 75 ppm to about 150 ppm, about 75 ppm to about 175 ppm, about 75 ppm to about 200 ppm, about 75 ppm to about 225 ppm, about 75 ppm to about 250 ppm, about 75 ppm to about 275 ppm, about 75 ppm to about 300 ppm, about 75 ppm to about 325 ppm, about 75 ppm to about 350 ppm, about 75 ppm to about 375 ppm, about 75 ppm to about 400 ppm, about 100 ppm to about 125 ppm, about 100 ppm to about 150 ppm, about 100 ppm to about 175 ppm, about 100 ppm to about 200 ppm, about 100 ppm to about 225 ppm, about 100 ppm to about 250 ppm, about 100 ppm to about 275 ppm, about 100 ppm to about 300 ppm, about 100 ppm to about 325 ppm, about 100 ppm to about 350 ppm, about 100 ppm to about 375 ppm, about 100 ppm to about 400 ppm, about 150 ppm to about 175 ppm, about 150 ppm to about 200 ppm, about 150 ppm to about 225 ppm, about 150 ppm to about 250 ppm, about 150 ppm to about 275 ppm, about 150 ppm to about 300 ppm, about 150 ppm to about 325 ppm, about 150 ppm to about 350 ppm, about 150 ppm to about 375 ppm, about 150 ppm to about 400 ppm, about 200 ppm to about 225 ppm, about 200 ppm to about 250 ppm, about 200 ppm to about 275 ppm, about 200 ppm to about 300 ppm, about 200 ppm to about 325 ppm, about 200 ppm to about 350 ppm, about 200 ppm to about 375 ppm, about 200 ppm to about 400 ppm, about 250 ppm to about 275 ppm, about 250 ppm to about 300 ppm, about 250 ppm to about 325 ppm, about 250 ppm to about 350 ppm, about 250 ppm to about 375 ppm, about 250 ppm to about 400 ppm, about 300 ppm to about 325 ppm, about 300 ppm to about 350 ppm, about 300 ppm to about 375 ppm, about 300 ppm to about 400 ppm, about 350 ppm to about 375 ppm, about 350 ppm to about 400 ppm, or about 375 ppm to about 400 ppm.

In other aspects of this embodiment, a composition disclosed herein comprises free available chlorine in an amount of, e.g., about 400 ppm to about 500 ppm, about 400 ppm to about 600 ppm, about 400 ppm to about 700 ppm, about 400 ppm to about 800 ppm, about 400 ppm to about 900 ppm, about 400 ppm to about 1,000 ppm, about 400 ppm to about 1,100 ppm, about 400 ppm to about 1,200 ppm, about 400 ppm to about 1,300 ppm, about 400 ppm to about 1,400 ppm, about 400 ppm to about 1,500 ppm, about 400 ppm to about 1,600 ppm, about 400 ppm to about 1,700 ppm, about 400 ppm to about 1,800 ppm, about 400 ppm to about 1,900 ppm, about 400 ppm to about 2,000 ppm, about 500 ppm to about 600 ppm, about 500 ppm to about 700 ppm, about 500 ppm to about 800 ppm, about 500 ppm to about 900 ppm, about 500 ppm to about 1,000 ppm, about 500 ppm to about 1,100 ppm, about 500 ppm to about 1,200 ppm, about 500 ppm to about 1,300 ppm, about 500 ppm to about 1,400 ppm, about 500 ppm to about 1,500 ppm, about 500 ppm to about 1,600 ppm, about 500 ppm to about 1,700 ppm, about 500 ppm to about 1,800 ppm, about 500 ppm to about 1,900 ppm, about 500 ppm to about 2,000 ppm, about 600 ppm to about 700 ppm, about 600 ppm to about 800 ppm, about 600 ppm to about 900 ppm, about 600 ppm to about 1,000 ppm, about 600 ppm to about 1,100 ppm, about 600 ppm to about 1,200 ppm, about 600 ppm to about 1,300 ppm, about 600 ppm to about 1,400 ppm, about 600 ppm to about 1,500 ppm, about 600 ppm to about 1,600 ppm, about 600 ppm to about 1,700 ppm, about 600 ppm to about 1,800 ppm, about 600 ppm to about 1,900 ppm, about 600 ppm to about 2,000 ppm, about 700 ppm to about 800 ppm, about 700 ppm to about 900 ppm, about 700 ppm to about 1,000 ppm, about 700 ppm to about 1,100 ppm, about 700 ppm to about 1,200 ppm, about 700 ppm to about 1,300 ppm, about 700 ppm to about 1,400 ppm, about 700 ppm to about 1,500 ppm, about 700 ppm to about 1,600 ppm, about 700 ppm to about 1,700 ppm, about 700 ppm to about 1,800 ppm, about 700 ppm to about 1,900 ppm, about 700 ppm to about 2,000 ppm, about 800 ppm to about 900 ppm, about 800 ppm to about 1,000 ppm, about 800 ppm to about 1,100 ppm, about 800 ppm to about 1,200 ppm, about 800 ppm to about 1,300 ppm, about 800 ppm to about 1,400 ppm, about 800 ppm to about 1,500 ppm, about 800 ppm to about 1,600 ppm, about 800 ppm to about 1,700 ppm, about 800 ppm to about 1,800 ppm, about 800 ppm to about 1,900 ppm, about 800 ppm to about 2,000 ppm, about 900 ppm to about 1,000 ppm, about 900 ppm to about 1,100 ppm, about 900 ppm to about 1,200 ppm, about 900 ppm to about 1,300 ppm, about 900 ppm to about 1,400 ppm, about 900 ppm to about 1,500 ppm, about 900 ppm to about 1,600 ppm, about 900 ppm to about 1,700 ppm, about 900 ppm to about 1,800 ppm, about 900 ppm to about 1,900 ppm, about 900 ppm to about 2,000 ppm, about 1,000 ppm to about 1,100 ppm, about 1,000 ppm to about 1,200 ppm, about 1,000 ppm to about 1,300 ppm, about 1,000 ppm to about 1,400 ppm, about 1,000 ppm to about 1,500 ppm, about 1,000 ppm to about 1,600 ppm, about 1,000 ppm to about 1,700 ppm, about 1,000 ppm to about 1,800 ppm, about 1,000 ppm to about 1,900 ppm, about 1,000 ppm to about 2,000 ppm, about 1,100 ppm to about 1,200 ppm, about 1,100 ppm to about 1,300 ppm, about 1,100 ppm to about 1,400 ppm, about 1,100 ppm to about 1,500 ppm, about 1,100 ppm to about 1,600 ppm, about 1,100 ppm to about 1,700 ppm, about 1,100 ppm to about 1,800 ppm, about 1,100 ppm to about 1,900 ppm, about 1,100 ppm to about 2,000 ppm, about 1,200 ppm to about 1,300 ppm, about 1,200 ppm to about 1,400 ppm, about 1,200 ppm to about 1,500 ppm, about 1,200 ppm to about 1,600 ppm, about 1,200 ppm to about 1,700 ppm, about 1,200 ppm to about 1,800 ppm, about 1,200 ppm to about 1,900 ppm, about 1,200 ppm to about 2,000 ppm, about 1,300 ppm to about 1,400 ppm, about 1,300 ppm to about 1,500 ppm, about 1,300 ppm to about 1,600 ppm, about 1,300 ppm to about 1,700 ppm, about 1,300 ppm to about 1,800 ppm, about 1,300 ppm to about 1,900 ppm, about 1,300 ppm to about 2,000 ppm, about 1,400 ppm to about 1,500 ppm, about 1,400 ppm to about 1,600 ppm, about 1,400 ppm to about 1,700 ppm, about 1,400 ppm to about 1,800 ppm, about 1,400 ppm to about 1,900 ppm, about 1,400 ppm to about 2,000 ppm, about 1,500 ppm to about 1,600 ppm, about 1,500 ppm to about 1,700 ppm, about 1,500 ppm to about 1,800 ppm, about 1,500 ppm to about 1,900 ppm, about 1,500 ppm to about 2,000 ppm, about 1,600 ppm to about 1,700 ppm, about 1,600 ppm to about 1,800 ppm, about 1,600 ppm to about 1,900 ppm, about 1,600 ppm to about 2,000 ppm, about 1,700 ppm to about 1,800 ppm, about 1,700 ppm to about 1,900 ppm, about 1,700 ppm to about 2,000 ppm, about 1,800 ppm to about 1,900 ppm, about 1,800 ppm to about 2,000 ppm, or about 1,900 ppm to about 2,000 ppm.

In aspects of this embodiment, a composition disclosed herein comprises free available chlorine in an amount of, e.g., about 0.10%, about 0.11%, about 0.12%, about 0.13%, about 0.14%, about 0.15%, about 0.16%, about 0.17%, about 0.18%, about 0.19%, about 0.2%, about 0.25%, about 0.3%, about 0.35%, about 0.4%, about 0.45%, or about 0.5% by weight of the composition. In other aspects of this embodiment, a composition disclosed herein comprises free available chlorine in an amount of, e.g., at least 0.10%, at least 0.11%, at least 0.12%, at least 0.13%, at least 0.14%, at least 0.15%, at least 0.16%, at least 0.17%, at least 0.18%, at least 0.19%, at least 0.2%, at least 0.25%, at least 0.3%, at least 0.35%, at least 0.4%, at least 0.45%, or at least 0.5% by weight of the composition. In yet other aspects of this embodiment, a composition disclosed herein comprises free available chlorine in an amount of, e.g., at most 0.10%, at most 0.11%, at most 0.12%, at most 0.13%, at most 0.14%, at most 0.15%, at most 0.16%, at most 0.17%, at most 0.18%, at most 0.19%, at most 0.2%, at most 0.25%, at most 0.3%, at most 0.35%, at most 0.4%, at most 0.45%, or at most 0.5% by weight of the composition. In still other aspects of this embodiment, a composition disclosed herein comprises free available chlorine in an amount of, e.g., about 0.10% to about 0.15%, about 0.10% to about 0.20%, about 0.10% to about 0.25%, about 0.10% to about 0.30%, about 0.10% to about 0.35%, about 0.10% to about 0.40%, about 0.10% to about 0.45%, about 0.10% to about 0.50%, about 0.20% to about 0.25%, about 0.20% to about 0.30%, about 0.20% to about 0.35%, about 0.20% to about 0.40%, about 0.20% to about 0.45%, about 0.20% to about 0.50%, about 0.30% to about 0.35%, about 0.30% to about 0.40%, about 0.30% to about 0.45%, about 0.30% to about 0.50%, about 0.40% to about 0.45%, about 0.40% to about 0.50%, or about 0.40% to about 0.50% by weight of the composition.

In one embodiment, a composition disclosed herein does not comprise free available chlorine.

In one embodiment, a composition disclosed herein does not comprise ozone. In another embodiment, a composition disclosed herein can comprise ozone.

In one embodiment, a composition disclosed herein does not comprise hydrogen peroxide. In another embodiment, a composition disclosed herein can comprise hydrogen peroxide.

A composition disclosed herein may comprise a quaternary compound. Non-limiting examples of a quaternary compound includes a dialkyl quaternary compound and a polyether fatty quaternary compound. Examples of a dialkyl quaternary compound includes, didodecyldimethylammonium chloride and di-n-alkyldimethyl ammonium chloride. A quaternary compound includes a silicon quaternary compound. Non-limiting examples of a silicon quaternary compound includes a silicone dialkyl quaternary compound and a silicone polyether fatty quaternary compound. Examples of a silicone dialkyl quaternary compound includes, without limitation, dimethyloctadecyl[3-(trimethoxysilyl)propyl] ammonium chloride (DTSACl) and tetradecyldimethyl-(3-trimethoxysilyl)propyl ammonium chloride (TTSACl). Examples of other quaternary compounds include, without limitation, a quaternary ammonium salt, such as, e.g., Quaternium-15 and Quaternium-18 and a polycationic polymer, such as, e.g., cetylpyridinium chloride, and a polyquaternium like Polyquaterniums 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, and 47. Other none-limiting examples of a quaternary compound include those with the formula $NR_4^+$, where R is an alkyl or an aryl group.

In one embodiment, a single quaternary compound or silicon quaternary compound is present in a composition disclosed herein. In another embodiment, a plurality of quaternary compounds or silicon quaternary compounds is present in a composition disclosed herein. In aspects of this embodiment, a composition disclosed herein comprises, e.g., one or more quaternary compounds or silicon quaternary compounds, two or more quaternary compounds or silicon quaternary compounds, three or more quaternary compounds or silicon quaternary compounds, four or more quaternary compounds or silicon quaternary compounds or five or more quaternary compounds or silicon quaternary compounds. In other aspects of this embodiment, a composition disclosed herein comprises, e.g., only one quaternary compound or silicon quaternary compound, at most two quaternary compounds or silicon quaternary compounds, at most three quaternary compounds or silicon quaternary compounds, at most four quaternary compounds or silicon quaternary compounds, or at most five quaternary compounds or silicon quaternary compounds. In yet other aspects of this embodiment, a composition disclosed herein comprises from, e.g., 1 to 2 quaternary compounds or silicon quaternary compounds, 1 to 3 quaternary compounds or silicon quaternary compounds, 1 to 4 quaternary compounds or silicon quaternary compounds, 1 to 5 quaternary compounds or silicon quaternary compounds, 2 to 3 quaternary compounds or silicon quaternary compounds, 2 to 4 quaternary compounds or silicon quaternary compounds, 2 to 5 quaternary compounds or silicon quaternary compounds, 3 to 4 quaternary compounds or silicon quaternary compounds, 3 to 5 quaternary compounds or silicon quaternary compounds or 4 to 5 quaternary compounds or silicon quaternary compounds.

In an embodiment, a composition disclosed herein comprises an amount of a quaternary compound or silicon quaternary compound that provides a desired beneficial effect to a composition disclosed herein. In aspects of this embodiment, a composition disclosed herein comprises a quaternary compound or silicon quaternary compound in an amount of, e.g., 0.05 ppm, 0.10 ppm, 0.15 ppm, 0.20 ppm, 0.25 ppm, 0.30 ppm, 0.35 ppm, 0.40 ppm, 0.45 ppm, 0.50 ppm, 0.55 ppm, 0.60 ppm, 0.65 ppm, 0.70 ppm, 0.75 ppm, 0.80 ppm, 0.85 ppm, 0.90 ppm, 0.95 ppm, 1 ppm, 5 ppm, 10 ppm, 15 ppm, 20 ppm, 25 ppm, 30 ppm, 35 ppm, 40 ppm, 45 ppm, 50 ppm, 55 ppm, 60 ppm, 65 ppm, 70 ppm, 75 ppm, 80 ppm, 85 ppm, 90 ppm, 95 ppm, 100 ppm, 125 ppm, 150 ppm, 175 ppm, 200 ppm, 225 ppm, 250 ppm, 275 ppm, 300 ppm, 325 ppm, 350 ppm, 375 ppm, 400 ppm, 425 ppm, 450 ppm, 475 ppm, 500 ppm, 525 ppm, 550 ppm, 575 ppm, 600 ppm, 625 ppm, 650 ppm, 675 ppm, 700 ppm, 725 ppm, 750 ppm, 775 ppm, 800 ppm, 825 ppm, 850 ppm, 875 ppm, 900 ppm, 925 ppm, 950 ppm, 975 ppm, 1,000 ppm, 1,025 ppm, 1,050 ppm, 1075 ppm, 1,100 ppm, 1,125 ppm, 1,150 ppm, 1,175 ppm, 1,200 ppm, 1,225 ppm, 1,250 ppm, 1,275 ppm, 1,300 ppm, 1,325 ppm, 1,350 ppm, 1,375 ppm, 1,400 ppm, 1,425 ppm, 1,450 ppm, 1,475 ppm, 1,500 ppm, 1,600 ppm, 1,700 ppm, 1,800 ppm, 1,900 ppm, or 2,000 ppm. In other aspects of this embodiment, a composition disclosed herein comprises a quaternary compound or silicon quaternary compound in an amount of, e.g., at least 0.05 ppm, at least 0.10 ppm, at least 0.20 ppm, at least 0.30 ppm, at least 0.40 ppm, at least 0.50 ppm, at least 0.60 ppm, at least 0.70 ppm, at least 0.80 ppm, at least 0.90 ppm, at least 1 ppm, at least 10 ppm, at least 20 ppm, at least 30 ppm, at least 40 ppm, at least 50 ppm, at least 60 ppm, at least 70 ppm, at least 80 ppm, at least 90 ppm, at least 100 ppm, at least 125 ppm, at least 150 ppm, at least 175 ppm, at least 200 ppm, at least 225 ppm, at least 250 ppm, at least 275 ppm, at least 300 ppm, at least 325 ppm, at least 350 ppm, at least 375 ppm, at least 400 ppm, at least 425 ppm, at least 450 ppm, at least 475 ppm, at least 500 ppm, at least 525 ppm, at least 550 ppm, at least 575 ppm, at least 600 ppm, at least 625 ppm, at least 650 ppm, at least 675 ppm, at least 700 ppm, at least 725 ppm, at least 750 ppm, at least 775 ppm, at least 800 ppm, at least 825 ppm, at least 850 ppm, at least 875 ppm, at least 900 ppm, at least 925 ppm, at least 950 ppm, at least 975 ppm, at least 1,000 ppm, at least 1,025 ppm, at least 1,050 ppm, at least 1075 ppm, at least 1,100 ppm, at least 1,125 ppm, at least 1,150 ppm, at least 1,175 ppm, at least 1,200 ppm, at least 1,225 ppm, at least 1,250 ppm, at least 1,275 ppm, at least 1,300 ppm, at least 1,325 ppm, at least 1,350 ppm, at least 1,375 ppm, at least 1,400 ppm, at least 1,425 ppm, at least 1,450 ppm, at least 1,475 ppm, at least 1,500 ppm, at least 1,600 ppm, at least 1,700 ppm, at least 1,800 ppm, at least 1,900 ppm, or at least 2,000 ppm. In yet other aspects of this embodiment, a composition disclosed herein comprises a quaternary compound or silicon quaternary compound in an amount of, e.g., at most 0.05 ppm, at most 0.10 ppm, at most 0.20 ppm, at most 0.30 ppm, at most 0.40 ppm, at most 0.50 ppm, at most 0.60 ppm, at most 0.70 ppm, at most 0.80 ppm, at most 0.90 ppm, at most 1 ppm, at most 10 ppm, at most 20 ppm, at most 30 ppm, at most 40 ppm, at most 50 ppm, at most 60 ppm, at most 70 ppm, at most 80 ppm, at most 90 ppm, at most 100 ppm, at most 125 ppm, at most 150 ppm, at most 175 ppm, at most 200 ppm, at most 225 ppm, at most 250 ppm, at most 275 ppm, at most 300 ppm, at most 325 ppm, at most 350 ppm, at most 375 ppm, at most 400 ppm, at most 425 ppm, at most 450 ppm, at most 475 ppm, at most 500 ppm, at most 525 ppm, at most 550 ppm, at most 575 ppm, at most 600 ppm, at most 625 ppm, at most 650 ppm, at most 675 ppm, at most 700 ppm, at most 725 ppm, at most 750 ppm, at most 775 ppm, at most 800 ppm, at most 825 ppm, at most 850 ppm, at most 875 ppm, at most 900 ppm, at most 925 ppm, at most 950 ppm, at most 975 ppm, at most 1,000 ppm, at most 1,025 ppm, at most 1,050 ppm, at most 1075 ppm, at most 1,100 ppm, at most 1,125 ppm, at most 1,150 ppm, at most 1,175 ppm, at most 1,200 ppm, at most 1,225 ppm, at most 1,250 ppm, at most 1,275 ppm, at most 1,300 ppm, at most 1,325 ppm, at most 1,350 ppm, at most 1,375 ppm, at most 1,400 ppm, at most 1,425 ppm, at most 1,450 ppm, at most 1,475 ppm, at most 1,500 ppm, at most 1,600 ppm, at most 1,700 ppm, at most 1,800 ppm, at most 1,900 ppm, or at most 2,000 ppm.

In still other aspects of this embodiment, a composition disclosed herein comprises a quaternary compound or silicon quaternary compound in an amount of from, e.g., about 0.5 ppm to about 20 ppm, about 0.5 ppm to about 25 ppm, about 0.5 ppm to about 30 ppm, about 0.5 ppm to about 35 ppm, about 0.5 ppm to about 40 ppm, about 0.5 ppm to about 45 ppm, about 0.5 ppm to about 50 ppm, about 0.5 ppm to about 55 ppm, about 0.5 ppm to about 60 ppm, about 0.5 ppm to about 65 ppm, about 0.5 ppm to about 70 ppm, about 0.5 ppm to about 75 ppm, about 0.5 ppm to about 80 ppm, about 0.5 ppm to about 85 ppm, about 0.5 ppm to about 90 ppm, about 0.5 ppm to about 95 ppm, about 0.5 ppm to about 100 ppm, about 0.75 ppm to about 20 ppm, about 0.75 ppm to about 25 ppm, about 0.75 ppm to about 30 ppm, about 0.75 ppm to about 35 ppm, about 0.75 ppm to about 40 ppm, about 0.75 ppm to about 45 ppm, about 0.75 ppm to about 50 ppm, about 0.75 ppm to about 55 ppm, about 0.75 ppm to about 60 ppm, about 0.75 ppm to about 65 ppm, about 0.75 ppm to about 70 ppm, about 0.75 ppm to about 75 ppm, about 0.75 ppm to about 80 ppm, about 0.75 ppm to about 85 ppm, about 0.75 ppm to about 90 ppm, about 0.75 ppm to about 95 ppm, about 0.75 ppm to about 100 ppm, about 1 ppm to about 20 ppm, about 1 ppm to about 25 ppm, about 1 ppm to about 30 ppm, about 1 ppm to about 35 ppm, about 1 ppm to about 40 ppm, about 1 ppm to about 45 ppm, about 1 ppm to about 50 ppm, about 1 ppm to about 55 ppm, about 1 ppm to about 60 ppm, about 1 ppm to about 65 ppm, about 1 ppm to about 70 ppm, about 1 ppm to about 75 ppm, about 1 ppm to about 80 ppm, about 1 ppm to about 85 ppm, about 1 ppm to about 90 ppm, about 1 ppm to about 95 ppm, about 1 ppm to about 100 ppm, about 5 ppm to about 20 ppm, about 5 ppm to about 25 ppm, about 5 ppm to about 30 ppm, about 5 ppm to about 35 ppm, about 5 ppm to about 40 ppm, about 5 ppm to about 45 ppm, about 5 ppm to about 50 ppm, about 5 ppm to about 55 ppm, about 5 ppm to about 60 ppm, about 5 ppm to about 65 ppm, about 5 ppm to about 70 ppm, about 5 ppm to about 75 ppm, about 5 ppm to about 80 ppm, about 5 ppm to about 85 ppm, about 5 ppm to about 90 ppm, about 5 ppm to about 95 ppm, about 5 ppm to about 100 ppm, about 10 ppm to about 20 ppm, about 10 ppm to about 25 ppm, about 10 ppm to about 30 ppm, about 10 ppm to about 35 ppm, about 10 ppm to about 40 ppm, about 10 ppm to about 45 ppm, about 10 ppm to about 50 ppm, about 10 ppm to about 55 ppm, about 10 ppm to about 60 ppm, about 10 ppm to about 65 ppm, about 10 ppm to about 70 ppm, about 10 ppm to about 75 ppm, about 10 ppm to about 80 ppm, about 10 ppm to about 85 ppm, about 10 ppm to about 90 ppm, about 10 ppm to about 95 ppm, or about 10 ppm to about 100 ppm.

In other aspects of this embodiment, a composition disclosed herein comprises a quaternary compound or silicon quaternary compound in an amount of from, e.g., about 1 ppm to about 25 ppm, about 1 ppm to about 50 ppm, about 1 ppm to about 75 ppm, about 1 ppm to about 100 ppm, about 1 ppm to about 125 ppm, about 1 ppm to about 150 ppm, about 1 ppm to about 175 ppm, about 1 ppm to about 200 ppm, about 1 ppm to about 225 ppm, about 1 ppm to about 250 ppm, about 1 ppm to about 275 ppm, about 1 ppm to about 300 ppm, about 1 ppm to about 325 ppm, about 1 ppm to about 350 ppm, about 1 ppm to about 375 ppm, about 1 ppm to about 400 ppm, about 10 ppm to about 25 ppm, about 10 ppm to about 50 ppm, about 10 ppm to about 75 ppm, about 10 ppm to about 100 ppm, about 10 ppm to about 125 ppm, about 10 ppm to about 150 ppm, about 10 ppm to about 175 ppm, about 10 ppm to about 200 ppm, about 10 ppm to about 225 ppm, about 10 ppm to about 250 ppm, about 10 ppm to about 275 ppm, about 10 ppm to about 300 ppm, about 10 ppm to about 325 ppm, about 10 ppm to about 350 ppm, about 10 ppm to about 375 ppm, about 10 ppm to about 400 ppm, about 25 ppm to about 50 ppm, about 25 ppm to about 75 ppm, about 25 ppm to about 100 ppm, about 25 ppm to about 125 ppm, about 25 ppm to about 150 ppm, about 25 ppm to about 175 ppm, about 25 ppm to about 200 ppm, about 25 ppm to about 225 ppm, about 25 ppm to about 250 ppm, about 25 ppm to about 275 ppm, about 25 ppm to about 300 ppm, about 25 ppm to about 325 ppm, about 25 ppm to about 350 ppm, about 25 ppm to about 375 ppm, about 25 ppm to about 400 ppm, about 50 ppm to about 75 ppm, about 50 ppm to about 100 ppm, about 50 ppm to about 125 ppm, about 50 ppm to about 150 ppm, about 50 ppm to about 175 ppm, about 50 ppm to about 200 ppm, about 50 ppm to about 225 ppm, about 50 ppm to about 250 ppm, about 50 ppm to about 275 ppm, about 50 ppm to about 300 ppm, about 50 ppm to about 325 ppm, about 50 ppm to about 350 ppm, about 50 ppm to about 375 ppm, about 50 ppm to about 400 ppm, about 75 ppm to about 100 ppm, about 75 ppm to about 125 ppm, about 75 ppm to about 150 ppm, about 75 ppm to about 175 ppm, about 75 ppm to about 200 ppm, about 75 ppm to about 225 ppm, about 75 ppm to about 250 ppm, about 75 ppm to about 275 ppm, about 75 ppm to about 300 ppm, about 75 ppm to about 325 ppm, about 75 ppm to about 350 ppm, about 75 ppm to about 375 ppm, about 75 ppm to about 400 ppm, about 100 ppm to about 125 ppm, about 100 ppm to about 150 ppm, about 100 ppm to about 175 ppm, about 100 ppm to about 200 ppm, about 100 ppm to about 225 ppm, about 100 ppm to about 250 ppm, about 100 ppm to about 275 ppm, about 100 ppm to about 300 ppm, about 100 ppm to about 325 ppm, about 100 ppm to about 350 ppm, about 100 ppm to about 375 ppm, about 100 ppm to about 400 ppm, about 150 ppm to about 175 ppm, about 150 ppm to about 200 ppm, about 150 ppm to about 225 ppm, about 150 ppm to about 250 ppm, about 150 ppm to about 275 ppm, about 150 ppm to about 300 ppm, about 150 ppm to about 325 ppm, about 150 ppm to about 350 ppm, about 150 ppm to about 375 ppm, about 150 ppm to about 400 ppm, about 200 ppm to about 225 ppm, about 200 ppm to about 250 ppm, about 200 ppm to about 275 ppm, about 200 ppm to about 300 ppm, about 200 ppm to about 325 ppm, about 200 ppm to about 350 ppm, about 200 ppm to about 375 ppm, about 200 ppm to about 400 ppm, about 250 ppm to about 275 ppm, about 250 ppm to about 300 ppm, about 250 ppm to about 325 ppm, about 250 ppm to about 350 ppm, about 250 ppm to about 375 ppm, about 250 ppm to about 400 ppm, about 300 ppm to about 325 ppm, about 300 ppm to about 350 ppm, about 300 ppm to about 375 ppm, about 300 ppm to about 400 ppm, about 350 ppm to about 375 ppm, about 350 ppm to about 400 ppm, or about 375 ppm to about 400 ppm.

In other aspects of this embodiment, a composition disclosed herein comprises a quaternary compound or silicon quaternary compound in an amount of, e.g., about 400 ppm to about 500 ppm, about 400 ppm to about 600 ppm, about 400 ppm to about 700 ppm, about 400 ppm to about 800 ppm, about 400 ppm to about 900 ppm, about 400 ppm to about 1,000 ppm, about 400 ppm to about 1,100 ppm, about 400 ppm to about 1,200 ppm, about 400 ppm to about 1,300 ppm, about 400 ppm to about 1,400 ppm, about 400 ppm to about 1,500 ppm, about 400 ppm to about 1,600 ppm, about 400 ppm to about 1,700 ppm, about 400 ppm to about 1,800 ppm, about 400 ppm to about 1,900 ppm, about 400 ppm to about 2,000 ppm, about 500 ppm to about 600 ppm, about 500 ppm to about 700 ppm, about 500 ppm to about 800 ppm, about 500 ppm to about 900 ppm, about 500 ppm to about 1,000 ppm, about 500 ppm to about 1,100 ppm, about 500 ppm to about 1,200 ppm, about 500 ppm to about 1,300 ppm, about 500 ppm to about 1,400 ppm, about 500 ppm to about 1,500 ppm, about 500 ppm to about 1,600 ppm, about 500 ppm to about 1,700 ppm, about 500 ppm to about 1,800 ppm, about 500 ppm to about 1,900 ppm, about 500 ppm to about 2,000 ppm, about 600 ppm to about 700 ppm, about 600 ppm to about 800 ppm, about 600 ppm to about 900 ppm, about 600 ppm to about 1,000 ppm, about 600 ppm to about 1,100 ppm, about 600 ppm to about 1,200 ppm, about 600 ppm to about 1,300 ppm, about 600 ppm to about 1,400 ppm, about 600 ppm to about 1,500 ppm, about 600 ppm to about 1,600 ppm, about 600 ppm to about 1,700 ppm, about 600 ppm to about 1,800 ppm, about 600 ppm to about 1,900 ppm, about 600 ppm to about 2,000 ppm, about 700 ppm to about 800 ppm, about 700 ppm to about 900 ppm, about 700 ppm to about 1,000 ppm, about 700 ppm to about 1,100 ppm, about 700 ppm to about 1,200 ppm, about 700 ppm to about 1,300 ppm, about 700 ppm to about 1,400 ppm, about 700 ppm to about 1,500 ppm, about 700 ppm to about 1,600 ppm, about 700 ppm to about 1,700 ppm, about 700 ppm to about 1,800 ppm, about 700 ppm to about 1,900 ppm, about 700 ppm to about 2,000 ppm, about 800 ppm to about 900 ppm, about 800 ppm to about 1,000 ppm, about 800 ppm to about 1,100 ppm, about 800 ppm to about 1,200 ppm, about 800 ppm to about 1,300 ppm, about 800 ppm to about 1,400 ppm, about 800 ppm to about 1,500 ppm, about 800 ppm to about 1,600 ppm, about 800 ppm to about 1,700 ppm, about 800 ppm to about 1,800 ppm, about 800 ppm to about 1,900 ppm, about 800 ppm to about 2,000 ppm, about 900 ppm to about 1,000 ppm, about 900 ppm to about 1,100 ppm, about 900 ppm to about 1,200 ppm, about 900 ppm to about 1,300 ppm, about 900 ppm to about 1,400 ppm, about 900 ppm to about 1,500 ppm, about 900 ppm to about 1,600 ppm, about 900 ppm to about 1,700 ppm, about 900 ppm to about 1,800 ppm, about 900 ppm to about 1,900 ppm, about 900 ppm to about 2,000 ppm, about 1,000 ppm to about 1,100 ppm, about 1,000 ppm to about 1,200 ppm, about 1,000 ppm to about 1,300 ppm, about 1,000 ppm to about 1,400 ppm, about 1,000 ppm to about 1,500 ppm, about 1,000 ppm to about 1,600 ppm, about 1,000 ppm to about 1,700 ppm, about 1,000 ppm to about 1,800 ppm, about 1,000 ppm to about 1,900 ppm, about 1,000 ppm to about 2,000 ppm, about 1,100 ppm to about 1,200 ppm, about 1,100 ppm to about 1,300 ppm, about 1,100 ppm to about 1,400 ppm, about 1,100 ppm to about 1,500 ppm, about 1,100 ppm to about 1,600 ppm, about 1,100 ppm to about 1,700 ppm, about 1,100 ppm to about 1,800 ppm, about 1,100 ppm to about 1,900 ppm, about 1,100 ppm to about 2,000 ppm, about 1,200 ppm to about 1,300 ppm, about 1,200 ppm to about 1,400 ppm, about 1,200 ppm to about 1,500 ppm, about 1,200 ppm to about 1,600 ppm, about 1,200 ppm to about 1,700 ppm, about 1,200 ppm to about 1,800 ppm, about 1,200 ppm to about 1,900 ppm, about 1,200 ppm to about 2,000 ppm, about 1,300 ppm to about 1,400 ppm, about 1,300 ppm to about 1,500 ppm, about 1,300 ppm to about 1,600 ppm, about 1,300 ppm to about 1,700 ppm, about 1,300 ppm to about 1,800 ppm, about 1,300 ppm to about 1,900 ppm, about 1,300 ppm to about 2,000 ppm, about 1,400 ppm to about 1,500 ppm, about 1,400 ppm to about 1,600 ppm, about 1,400 ppm to about 1,700 ppm, about 1,400 ppm to about 1,800 ppm, about 1,400 ppm to about 1,900 ppm, about 1,400 ppm to about 2,000 ppm, about 1,500 ppm to about 1,600 ppm, about 1,500 ppm to about 1,700 ppm, about 1,500 ppm to about 1,800 ppm, about 1,500 ppm to about 1,900 ppm, about 1,500 ppm to about 2,000 ppm, about 1,600 ppm to about 1,700 ppm, about 1,600 ppm to about 1,800 ppm, about 1,600 ppm to about 1,900 ppm, about 1,600 ppm to about 2,000 ppm, about 1,700 ppm to about 1,800 ppm, about 1,700 ppm to about 1,900 ppm, about 1,700 ppm to about 2,000 ppm, about 1,800 ppm to about 1,900 ppm, about 1,800 ppm to about 2,000 ppm, or about 1,900 ppm to about 2,000 ppm.

In aspects of this embodiment, a composition disclosed herein comprises a quaternary compound or silicon quaternary compound in an amount of, e.g., about 0.10%, about 0.11%, about 0.12%, about 0.13%, about 0.14%, about 0.15%, about 0.16%, about 0.17%, about 0.18%, about 0.19%, about 0.2%, about 0.25%, about 0.3%, about 0.35%, about 0.4%, about 0.45%, or about 0.5% by weight of the composition. In other aspects of this embodiment, a composition disclosed herein comprises a quaternary compound or silicon quaternary compound in an amount of, e.g., at least 0.10%, at least 0.11%, at least 0.12%, at least 0.13%, at least 0.14%, at least 0.15%, at least 0.16%, at least 0.17%, at least 0.18%, at least 0.19%, at least 0.2%, at least 0.25%, at least 0.3%, at least 0.35%, at least 0.4%, at least 0.45%, or at least 0.5% by weight of the composition. In yet other aspects of this embodiment, a composition disclosed herein comprises a quaternary compound or silicon quaternary compound in an amount of, e.g., at most 0.10%, at most 0.11%, at most 0.12%, at most 0.13%, at most 0.14%, at most 0.15%, at most 0.16%, at most 0.17%, at most 0.18%, at most 0.19%, at most 0.2%, at most 0.25%, at most 0.3%, at most 0.35%, at most 0.4%, at most 0.45%, or at most 0.5% by weight of the composition. In still other aspects of this embodiment, a composition disclosed herein comprises a quaternary compound or silicon quaternary compound in an amount of, e.g., about 0.10% to about 0.15%, about 0.10% to about 0.20%, about 0.10% to about 0.25%, about 0.10% to about 0.30%, about 0.10% to about 0.35%, about 0.10% to about 0.40%, about 0.10% to about 0.45%, about 0.10% to about 0.50%, about 0.20% to about 0.25%, about 0.20% to about 0.30%, about 0.20% to about 0.35%, about 0.20% to about 0.40%, about 0.20% to about 0.45%, about 0.20% to about 0.50%, about 0.30% to about 0.35%, about 0.30% to about 0.40%, about 0.30% to about 0.45%, about 0.30% to about 0.50%, about 0.40% to about 0.45%, about 0.40% to about 0.50%, or about 0.40% to about 0.50% by weight of the composition.

In aspects of this embodiment, a composition disclosed herein comprises a quaternary compound or silicon quaternary compound in an amount of, e.g., about 1.0%, about 2.0%, about 3.0%, about 4.0%, about 5.0%, about 6.0%, about 7.0%, about 8.0%, about 9.0%, about 10%, about 11%, about 12%, about 13%, about 14%, or about 15% by weight of the composition. In other aspects of this embodiment, a composition disclosed herein comprises a quaternary compound or silicon quaternary compound in an amount of, e.g., at least 1.0%, at least 2.0%, at least 3.0%, at least 4.0%, at least 5.0%, at least 6.0%, at least 7.0%, at least 8.0%, at least 9.0%, at least 10%, at least 11%, at least 12%, at least 13%, at least 14%, or at least 15% by weight of the composition. In yet other aspects of this embodiment, a composition disclosed herein comprises a quaternary compound or silicon quaternary compound in an amount of, e.g., at most 1.0%, at most 2.0%, at most 3.0%, at most 4.0%, at most 5.0%, at most 6.0%, at most 7.0%, at most 8.0%, at most 9.0%, at most 10%, at most 11%, at most 12%, at most 13%, at most 14%, or at most 15% by weight of the composition. In still other aspects of this embodiment, a composition disclosed herein comprises a quaternary compound or silicon quaternary compound in an amount of, e.g., about 1.0% to about 2.0%, about 1.0% to about 3.0%, about 1.0% to about 4.0%, about 1.0% to about 5.0%, about 1.0% to about 6.0%, about 1.0% to about 7.0%, about 1.0% to about 8.0%, about 1.0% to about 9.0%, about 1.0% to about 10%, about 1.0% to about 11%, about 1.0% to about 12%, about 1.0% to about 13%, about 1.0% to about 14%, about 1.0% to about 15%, about 2.0% to about 3.0%, about 2.0% to about 4.0%, about 2.0% to about 5.0%, about 2.0% to about 6.0%, about 2.0% to about 7.0%, about 2.0% to about 8.0%, about 2.0% to about 9.0%, about 2.0% to about 10%, about 2.0% to about 11%, about 2.0% to about 12%, about 2.0% to about 13%, about 2.0% to about 14%, about 2.0% to about 15%, about 3.0% to about 4.0%, about 3.0% to about 5.0%, about 3.0% to about 6.0%, about 3.0% to about 7.0%, about 3.0% to about 8.0%, about 3.0% to about 9.0%, about 3.0% to about 10%, about 3.0% to about 11%, about 3.0% to about 12%, about 3.0% to about 13%, about 3.0% to about 14%, about 3.0% to about 15%, about 4.0% to about 5.0%, about 4.0% to about 6.0%, about 4.0% to about 7.0%, about 4.0% to about 8.0%, about 4.0% to about 9.0%, about 4.0% to about 10%, about 4.0% to about 11%, about 4.0% to about 12%, about 4.0% to about 13%, about 4.0% to about 14%, about 4.0% to about 15%, about 5.0% to about 6.0%, about 5.0% to about 7.0%, about 5.0% to about 8.0%, about 5.0% to about 9.0%, about 5.0% to about 10%, about 5.0% to about 11%, about 5.0% to about 12%, about 5.0% to about 13%, about 5.0% to about 14%, about 5.0% to about 15%, about 6.0% to about 7.0%, about 6.0% to about 8.0%, about 6.0% to about 9.0%, about 6.0% to about 10%, about 6.0% to about 11%, about 6.0% to about 12%, about 6.0% to about 13%, about 6.0% to about 14%, about 6.0% to about 15%, about 7.0% to about 8.0%, about 7.0% to about 9.0%, about 7.0% to about 10%, about 7.0% to about 11%, about 7.0% to about 12%, about 7.0% to about 13%, about 7.0% to about 14%, about 7.0% to about 15%, about 8.0% to about 9.0%, about 8.0% to about 10%, about 8.0% to about 11%, about 8.0% to about 12%, about 8.0% to about 13%, about 8.0% to about 14%, about 8.0% to about 15%, about 9.0% to about 10%, about 9.0% to about 11%, about 9.0% to about 12%, about 9.0% to about 13%, about 9.0% to about 14%, about 9.0% to about 15%, about 10% to about 11%, about 10% to about 12%, about 10% to about 13%, about 10% to about 14%, about 10% to about 15%, about 11% to about 12%, about 11% to about 13%, about 11% to about 14%, about 11% to about 15%, about 12% to about 13%, about 12% to about 14%, about 12% to about 15%, about 13% to about 14%, about 13% to about 15%, or 14% to about 15% by weight of the composition.

In an embodiment, a composition disclosed herein does not comprise a quaternary compound. In an embodiment, a composition disclosed herein does not comprise a silicon quaternary compound. In an embodiment, a composition disclosed herein does not comprise a quaternary compound or a silicon quaternary compound.

A composition disclosed herein may comprise a compound containing a guanide moiety and/or functional group. Non-limiting examples of a guanide-containing compound include an organic compound containing a biguanide functional group, a biguanidine functional group or a triguanide functional group. In one embodiment, a guanide-containing compound disclosed herein is a biguanide or a biguanide-containing compound. In an aspect of this embodiment, a biguanide-containing compound comprises one, two, three, four or five biguanide functional groups. In an aspect of this embodiment, a biguanide-containing compound comprises formula II,

II

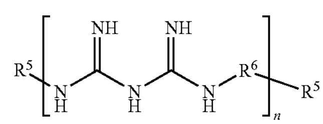

wherein $R^5$ and $R^6$ can each independently be a bond, H, C, NH, $NH^2$, a $C_{1-10}$ alkyl, a $C_{1-10}$ alkane, a $C_{1-10}$ alkyne, a 5 or 6 carbon aromatic ring, optionally substituted with a halogen; and n is 1-5. A halogen is F, Br, Cl, I, and At. Non-limiting examples of a biguanide-containing compound include a polyhexamethylene biguanide (PHMB), a polyaminopropyl biguanide (PAPB), a 1,1'-(1,6-Hexanediyl)bis{2-[N'-(2-ethylhexyl)carbamimidoyl]guanidine} (alexidine), a chlorhexidine and a chlorhexidine gluconate.

In one embodiment, a guanide-containing compound disclosed herein is a biguanidine or a biguanidine-containing compound. In an aspect of this embodiment, a biguanidine-containing compound comprises one, two, three, four or five biguanidine functional groups. In an aspect of this embodiment, a biguanidine-containing compound comprises formula III,

III

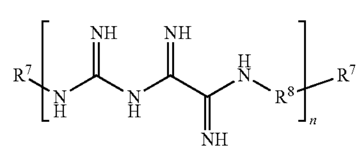

wherein $R^7$ and $R^8$ can each independently be a bond, H, C, NH, $NH^2$, a $C_{1-10}$ alkyl, a $C_{1-10}$ alkane, a $C_{1-10}$ alkyne, a 5 or 6 carbon aromatic ring, optionally substituted with a halogen; and n is 1-5. A halogen is F, Br, Cl, I, and At.

In one embodiment, a guanide-containing compound disclosed herein is a triguanide or a triguanide-containing compound. In an aspect of this embodiment, a triguanide-containing compound comprises one, two, three, four or five triguanide functional groups. In an aspect of this embodiment, a triguanide-containing compound comprises formula IV,

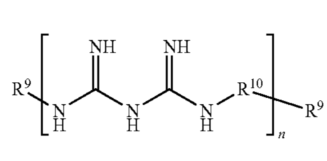

IV wherein $R^9$ and $R^{10}$ can each independently be a bond, H, C, NH, $NH^2$, a $C_{1-10}$ alkyl, a $C_{1-10}$ alkane, a $C_{1-10}$ alkyne, a 5 or 6 carbon aromatic ring, optionally substituted with a halogen; and n is 1-5. A halogen is F, Br, Cl, I, and At.

In one embodiment, a single guanide-containing compound is present in a composition disclosed herein. In another embodiment, a plurality of guanide-containing compounds is present in a composition disclosed herein. In aspects of this embodiment, a composition disclosed herein comprises, e.g., one or more guanide-containing compounds, two or more guanide-containing compounds, three or more guanide-containing compounds, four or more guanide-containing compounds or five or more guanide-containing compounds. In other aspects of this embodiment, a composition disclosed herein comprises, e.g., only one guanide-containing compound, at most two guanide-containing compounds, at most three guanide-containing compounds, at most four guanide-containing compounds, or at most five guanide-containing compounds. In yet other aspects of this embodiment, a composition disclosed herein comprises from, e.g., 1 to 2 guanide-containing compounds, 1 to 3 guanide-containing compounds, 1 to 4 guanide-containing compounds, 1 to 5 guanide-containing compounds, 2 to 3 guanide-containing compounds, 2 to 4 guanide-containing compounds, 2 to 5 guanide-containing compounds, 3 to 4 guanide-containing compounds, 3 to 5 guanide-containing compounds or 4 to 5 guanide-containing compounds.

Any amount of a guanide-containing compound disclosed herein may be used, with the proviso that the amount is useful to practice the methods disclosed herein. In aspects of this embodiment, a composition disclosed herein comprises a guanide-containing compound in an amount of, e.g., about 0.01%, about 0.05%, about 0.075%, about 0.1%, about 0.2%, about 0.3%, about 0.4%, about 0.5%, about 0.6%, about 0.7%, about 0.8%, about 0.9%, about 1.0%, about 1.5%, about 2.0%, about 2.5%, about 3.0%, about 4.0%, about 5.0%, about 6.0%, about 7.0%, about 7.5%, about 8.0%, about 9.0%, about 10.0%, about 11%, about 12%, about 13%, about 14%, about 15%, about 20%, about 25%, or about 30% by weight of the composition. In other aspects of this embodiment, a composition disclosed herein comprises a guanide-containing compound in an amount of, e.g., at least 0.01%, at least 0.05%, at least 0.075%, at least 0.1%, at least 0.25%, at least 0.5%, at least 0.75%, at least 1.0%, at least 1.5%, at least 2.0%, at least 2.5%, at least 3.0%, at least 4.0%, at least 5.0%, at least 6.0%, at least 7.0%, at least 7.5%, at least 8.0%, at least 9.0%, at least 10.0%, at least 11%, at least 12%, at least 13%, at least 14%, at least 15%, at least 20%, at least 25%, or at least 30% by weight of the composition. In yet other aspects of this embodiment, a composition disclosed herein comprises a guanide-containing compound in an amount of, e.g., at most 0.01%, at most 0.05%, at most 0.075%, at most 0.1%, at most 0.25%, at most 0.5%, at most 0.75%, at most 1.0%, at most 1.5%, at most 2.0%, at most 2.5%, at most 3.0%, at most 4.0%, at most 5.0%, at most 6.0%, at most 7.5%, at most 8.0%, at most 9.0%, at most 10.0%, at most 11%, at most 12%, at most 13%, at most 14%, at most 15%, at most 20%, at most 25%, or at most 30% by weight of the composition.

In still other aspects of this embodiment, a composition disclosed herein comprises a guanide-containing compound in an amount of, e.g., about 0.1% to about 0.5%, about 0.1% to about 0.75%, about 0.1% to about 1.0%, about 0.1% to about 1.5%, about 0.1% to about 2.0%, about 0.1% to about 2.5%, about 0.1% to about 3.0%, about 0.1% to about 3.5%, about 0.1% to about 4.0%, about 0.1% to about 4.5%, about 0.1% to about 5.0%, about 0.2% to about 0.5%, about 0.2% to about 0.75%, about 0.2% to about 1.0%, about 0.2% to about 1.5%, about 0.2% to about 2.0%, about 0.2% to about 2.5%, about 0.2% to about 3.0%, about 0.2% to about 3.5%, about 0.2% to about 4.0%, about 0.2% to about 4.5%, about 0.2% to about 5.0%, about 0.5% to about 1.0%, about 0.5% to about 1.5%, about 0.5% to about 2.0%, about 0.5% to about 2.5%, about 0.5% to about 3.0%, about 0.5% to about 4.0%, about 0.5% to about 5.0%, about 0.5% to about 6.0%, about 0.5% to about 7.0%, about 0.5% to about 8.0%, about 0.5% to about 9.0%, about 0.5% to about 10.0%, about 1.0% to about 2.5%, about 1.0% to about 3.0%, about 1.0% to about 4.0%, about 1.0% to about 5.0%, about 1.0% to about 6.0%, about 1.0% to about 7.0%, about 1.0% to about 7.5%, about 1.0% to about 8.0%, about 1.0% to about 9.0%, about 1.0% to about 10.0%, about 1.0% to about 15.0%, about 1.0% to about 20.0%, about 1.0% to about 25.0%, about 1.0% to about 30.0%, about 2.0% to about 2.5%, about 2.0% to about 3.0%, about 2.0% to about 4.0%, about 2.0% to about 5.0%, about 2.0% to about 6.0%, about 2.0% to about 7.0%, about 2.0% to about 7.5%, about 2.0% to about 8.0%, about 2.0% to about 9.0%, about 2.0% to about 10.0%, about 2.0% to about 15.0%, about 2.0% to about 20.0%, about 2.0% to about 25.0%, about 2.0% to about 30.0%, about 5.0% to about 6.0%, about 5.0% to about 7.0%, about 5.0% to about 7.5%, about 5.0% to about 8.0%, about 5.0% to about 9.0%, about 5.0% to about 10.0%, about 5.0% to about 11.0%, about 5.0% to about 12.0%, about 5.0% to about 13.0%, about 5.0% to about 14.0%, about 5.0% to about 15.0%, about 5.0% to about 20.0%, about 5.0% to about 25.0%, about 5.0% to about 30.0%, about 10.0% to about 15.0%, about 10.0% to about 20.0%, about 10.0% to about 25.0%, about 10.0% to about 30.0%, about 15.0% to about 20.0%, about 15.0% to about 25.0%, about 15.0% to about 30.0%, about 20.0% to about 25.0%, about 20.0% to about 30.0%, or about 20.0% to about 30.0%, by weight of the composition.

In another embodiment, a composition disclosed herein does not comprise a guanide-containing compound. In another embodiment, a composition disclosed herein does not comprise biguanide. In another embodiment, a composition disclosed herein does not comprise a biguanide-containing compound. In another embodiment, a composition disclosed herein does not comprise biguanidine. In another embodiment, a composition disclosed herein does not comprise a biguanidine-containing compound. In another embodiment, a composition disclosed herein does not comprise triguanide. In another embodiment, a composition disclosed herein does not comprise a triguanide-containing compound.

A composition disclosed herein may comprise an alcohol. An alcohol is an organic molecule comprising a hydroxyl functional group (—OH) bond to a carbon atom, where the carbon atom is saturated. In aspects of this embodiment, the alcohol may be, e.g., a $C_{2-4}$ alcohol, a $C_{1-4}$ alcohol, a $C_{1-5}$ alcohol, a $C_{1-7}$ alcohol, a $C_{1-10}$ alcohol, a $C_{1-15}$ alcohol, or a $C_{1-20}$ alcohol. In other aspects of this embodiment, an alcohol may be, e.g., a primary alcohol, a secondary alcohol, or a tertiary alcohol. In other aspects of this embodiment, an alcohol may be, e.g., an acyclic alcohol, a monohydric alcohol, a polyhydric alcohol (also known as a polyol or sugar alcohol), an unsaturated aliphatic alcohol, an alicyclic alcohol, or a combination thereof. Examples of a monohydric alcohol include, without limitation, methanol, ethanol, propanol, isopropanol, butanol, pentanol, and 1-hexadecanol. Examples of a polyhydric alcohol include, without limitation, glycol, glycerol, arabitol, erythritol, xylitol, maltitol, sorbitol (gluctiol), mannitol, inositol, lactitol, galactitol (iditol), and isomalt. Examples of an unsaturated aliphatic alcohol include, without limitation, prop-2-ene-1-ol, 3,7-dimethylocta-2,6-dien-1-ol, and prop-2-in-1-ol. Examples of an alicyclic alcohol include, without limitation, cyclohexane-1,2,3,4,5,6-hexol and 2-(2-propyl)-5-methyl-cyclohexane-1-ol.

In one embodiment, a single alcohol is present in a composition disclosed herein. In another embodiment, a plurality of alcohols is present in a composition disclosed herein. In aspects of this embodiment, a composition disclosed herein comprises, e.g., one or more alcohols, two or more alcohols, three or more alcohols, four or more alcohols or five or more alcohols. In other aspects of this embodiment, a composition disclosed herein comprises, e.g., only one alcohol, at most two alcohols, at most three alcohols, at most four alcohols, or at most five alcohols. In yet other aspects of this embodiment, a composition disclosed herein comprises from, e.g., 1 to 2 alcohols, 1 to 3 alcohols, 1 to 4 alcohols, 1 to 5 alcohols, 2 to 3 alcohols, 2 to 4 alcohols, 2 to 5 alcohols, 3 to 4 alcohols, 3 to 5 alcohols or 4 to 5 alcohols.

In aspects of this embodiment, a plurality of alcohols is present in a composition disclosed herein may comprise, e.g., about 99% of a first alcohol and about 1% of a second alcohol, about 98% of a first alcohol and about 2% of a second alcohol, about 97% of a first alcohol and about 3% of a second alcohol, about 96% of a first alcohol and about 4% of a second alcohol, about 95% of a first alcohol and about 5% of a second alcohol, about 90% of a first alcohol and about 10% of a second alcohol, about 80% of a first alcohol and about 20% of a second alcohol, about 70% of a first alcohol and about 30% of a second alcohol, about 60% of a first alcohol and about 40% of a second alcohol, about 50% of a first alcohol and about 50% of a second alcohol, about 40% of a first alcohol and about 60% of a second alcohol, about 30% of a first alcohol and about 70% of a second alcohol, about 20% of a first alcohol and about 80% of a second alcohol, about 10% of a first alcohol and about 90% of a second alcohol, about 5% of a first alcohol and about 95% of a second alcohol. In other aspects of this embodiment, the ratio of a first alcohol to a second alcohol is, e.g., 100:1, 90:1, 80:1, 70:1, 60:1, 50:1, 40:1, 30:1, 20:1, 19:1, 18:1, 17:1, 16:1, 15:1, 14:1, 13:1, 12:1, 11:1, 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, 1:10, 1:11, 1:12, 1:13, 1:14, 1:15, 1:16, 1:17, 1:18, 1:19, 1:20, 1:30, 1:40, 1:50, 1:60, 1:70, 1:80, 1:90, or 1:100. In other aspects, the first alcohol is isopropanol and the second alcohol is ethanol.

Any amount of an alcohol disclosed herein may be used, with the proviso that the amount is useful to practice the methods disclosed herein. In aspects of this embodiment, a composition disclosed herein comprises an alcohol in an amount of, e.g., about 0.5%, about 1%, about 2%, about 3%, about 4%, about 5%, about 6%, about 7%, about 8%, about 9%, about 10%, about 11%, about 12%, about 13%, about 14%, about 15%, about 20%, about 25%, about 30%, about 35%, about 40%, about 45%, about 50%, about 55%, about 60%, about 65%, about 70%, about 75%, about 80%, about 85%, about 90%, about 95%, about 96%, about 97%, about 98%, or about 99%, by weight of the composition. In other aspects of this embodiment, a composition disclosed herein comprises an alcohol in an amount of, e.g., at least 0.5%, at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 96%, at least 97%, at least 98%, or at least 99%, by weight of the composition. In yet other aspects of this embodiment, a composition disclosed herein comprises an alcohol in an amount of, e.g., at most 0.5%, at most 1%, at most 2%, at most 3%, at most 4%, at most 5%, at most 6%, at most 7%, at most 8%, at most 9%, at most 10%, at most 11%, at most 12%, at most 13%, at most 14%, at most 15%, at most 20%, at most 25%, at most 30%, at most 35%, at most 40%, at most 45%, at most 50%, at most 55%, at most 60%, at most 65%, at most 70%, at most 75%, at most 80%, at most 85%, at most 90%, at most 95%, at most 96%, at most 97%, at most 98%, or at most 99%, by weight of the composition.

In still other aspects of this embodiment, a composition disclosed herein comprises an alcohol in an amount of, e.g., about 0.05% to about 0.75%, about 0.05% to about 1.0%, about 0.05% to about 1.5%, about 0.05% to about 2.0%, about 0.05% to about 2.5%, about 0.1% to about 0.5%, about 0.1% to about 0.75%, about 0.1% to about 1.0%, about 0.1% to about 1.5%, about 0.1% to about 2.0%, about 0.1% to about 2.5%, about 0.1% to about 3.0%, about 0.1% to about 4.0%, about 0.1% to about 5.0%, about 0.2% to about 0.5%, about 0.2% to about 0.75%, about 0.2% to about 1.0%, about 0.2% to about 1.5%, about 0.2% to about 2.0%, about 0.2% to about 2.5%, about 0.2% to about 3.0%, about 0.2% to about 4.0%, about 0.2% to about 5.0%, about 0.5% to about 1.0%, about 0.5% to about 1.5%, about 0.5% to about 2.0%, about 0.5% to about 2.5%, about 0.5% to about 3.0%, about 0.5% to about 4.0%, about 0.5% to about 5.0%, about 0.5% to about 6.0%, about 0.5% to about 7.0%, about 0.5% to about 8.0%, about 0.5% to about 9.0%, about 0.5% to about 10.0%, about 1.0% to about 2.5%, about 1.0% to about 3.0%, about 1.0% to about 4.0%, about 1.0% to about 5.0%, about 1.0% to about 6.0%, about 1.0% to about 7.0%, about 1.0% to about 7.5%, about 1.0% to about 8.0%, about 1.0% to about 9.0%, about 1.0% to about 10.0%, about 2.0% to about 2.5%, about 2.0% to about 3.0%, about 2.0% to about 4.0%, about 2.0% to about 5.0%, about 2.0% to about 6.0%, about 2.0% to about 7.0%, about 2.0% to about 7.5%, about 2.0% to about 8.0%, about 2.0% to about 9.0%, about 2.0% to about 10.0%, about 5.0% to about 6.0%, about 5.0% to about 7.0%, about 5.0% to about 7.5%, about 5.0% to about 8.0%, about 5.0% to about 9.0%, about 5.0% to about 10.0%, about 5.0% to about 11.0%, about 5.0% to about 12.0%, about 5.0% to about 13.0%, about 5.0% to about 14.0% or about 5.0% to about 15.0% by weight of the composition, or about 10% to about 20%, about 10% to about 30%, about 10% to about 40%, about 10% to about 50%, about 10% to about 60%, about 10% to about 70%, about 10% to about 80%, about 10% to about 90%, about 10% to about 95%, about 10% to about 97%, about 10% to about 99%, about 20% to about 30%, about 20% to about 40%, about 20% to about 50%, about 20% to about 60%, about 20% to about 70%, about 20% to about 80%, about 20% to about 90%, about 20% to about 95%, about 20% to about 97%, about 20% to about 99%, about 30% to about 40%, about 30% to about 50%, about 30% to about 60%, about 30% to about 70%, about 30% to about 80%, about 30% to about 90%, about 30% to about 95%, about 30% to about 97%, about 30% to about 99%, about 40% to about 50%, about 40% to about 60%, about 40% to about 70%, about 40% to about 80%, about 40% to about 90%, about 40% to about 95%, about 40% to about 97%, about 40% to about 99%, about 50% to about 60%, about 50% to about 70%, about 50% to about 80%, about 50% to about 90%, about 50% to about 95%, about 50% to about 97%, about 50% to about 99%, about 60% to about 70%, about 60% to about 80%, about 60% to about 90%, about 60% to about 95%, about 60% to about 97%, about 60% to about 99%, about 70% to about 80%, about 70% to about 90%, about 70% to about 95%, about 70% to about 97%, about 70% to about 99%, about 80% to about 90%, about 80% to about 95%, about 80% to about 97%, about 80% to about 99%, about 90% to about 95%, about 90% to about 97%, about 90% to about 99%, by weight of the composition.

In aspects of this embodiment, a composition disclosed herein comprises a plurality of alcohols in a total amount of, e.g., about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 96%, about 97%, about 98%, or about 99%, by weight of the composition. In other aspects of this embodiment, a composition disclosed herein comprises a plurality of alcohols in a total amount of, e.g., at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 96%, at least 97%, at least 98%, or at least 99%, by weight of the composition. In yet other aspects of this embodiment, a composition disclosed herein comprises a plurality of alcohols in a total amount of, e.g., at most 10%, at most 15%, at most 20%, at most 25%, at most 30%, at most 35%, at most 40%, at most 40%, at most 45%, at most 50%, at most 55%, at most 60%, at most 65%, at most 70%, at most 75%, at most 80%, at most 85%, at most 90%, at most 95%, at most 96%, at most 97%, at most 98%, or at most 99%, by weight of the composition. In still other aspects of this embodiment, a composition disclosed herein comprises a plurality of alcohols in a total amount of, e.g., about 10% to about 20%, about 10% to about 30%, about 10% to about 40%, about 10% to about 50%, about 10% to about 60%, about 10% to about 70%, about 10% to about 80%, about 10% to about 90%, about 10% to about 95%, about 10% to about 97%, about 10% to about 99%, about 20% to about 30%, about 20% to about 40%, about 20% to about 50%, about 20% to about 60%, about 20% to about 70%, about 20% to about 80%, about 20% to about 90%, about 20% to about 95%, about 20% to about 97%, about 20% to about 99%, about 30% to about 40%, about 30% to about 50%, about 30% to about 60%, about 30% to about 70%, about 30% to about 80%, about 30% to about 90%, about 30% to about 95%, about 30% to about 97%, about 30% to about 99%, about 40% to about 50%, about 40% to about 60%, about 40% to about 70%, about 40% to about 80%, about 40% to about 90%, about 40% to about 95%, about 40% to about 97%, about 40% to about 99%, about 50% to about 60%, about 50% to about 70%, about 50% to about 80%, about 50% to about 90%, about 50% to about 95%, about 50% to about 97%, about 50% to about 99%, about 60% to about 70%, about 60% to about 80%, about 60% to about 90%, about 60% to about 95%, about 60% to about 97%, about 60% to about 99%, about 70% to about 80%, about 70% to about 90%, about 70% to about 95%, about 70% to about 97%, about 70% to about 99%, about 80% to about 90%, about 80% to about 95%, about 80% to about 97%, about 80% to about 99%, about 90% to about 95%, about 90% to about 97%, about 90% to about 99%, by weight of the composition.

In another embodiment, a composition disclosed herein does not comprise an alcohol.

A composition disclosed herein may comprise metallic particles. A metallic particle can be composed of a single element, such as, e.g., copper, iron, silver, titanium or zinc or be a mixed metallic particle composed of various combinations of different elements, such as, e.g., various combinations of two or more of the following: copper, iron, silver, titanium or zinc. Non-limiting examples of a metallic particle includes a copper particle, an iron particle, a potassium particle, a silver particle, a titanium particle, and a zinc particle. Other non-limiting examples of a metallic particle include a metal acetate particle, a metal chloride particle, a metal nitrate particle, or a metal oxide particle. A metal acetate particle includes, without limitation, copper acetate, iron acetate, e.g. iron (II) acetate and iron (III) acetate, silver acetate, titanium acetate, zinc acetate, or any combination thereof. A metal nitrate particle includes, without limitation, copper nitrate, iron nitrate, e.g., iron (II) nitrate, iron (III) nitrate, silver nitrate, titanium nitrate, zinc nitrate, or any combination thereof. A metal chloride particle includes, without limitation, copper chloride, iron chloride, e.g., iron (II) chloride or iron (III) chloride, silver chloride, titanium chloride, zinc chloride, or any combination thereof. A metal oxide particle includes, without limitation, copper oxide, iron oxide, e.g., iron (II) oxide, iron (III) oxide, silver oxide, titanium dioxide, zinc oxide, copper zinc iron oxide, or any combination thereof.

A metallic particle includes nanoparticles and microparticles. A nanoparticle has an average diameter of about 1 nm to about 1,000 nm. A microparticle has an average diameter of about 1 μm to about 1,000 μm.

In an embodiment, a composition disclosed herein comprises an amount of metallic particles that provides a desired beneficial effect to a composition disclosed herein. In aspects of this embodiment, a composition disclosed herein comprises metallic particles in an amount of, e.g., 0.05 ppm, 0.10 ppm, 0.15 ppm, 0.20 ppm, 0.25 ppm, 0.30 ppm, 0.35 ppm, 0.40 ppm, 0.45 ppm, 0.50 ppm, 0.55 ppm, 0.60 ppm, 0.65 ppm, 0.70 ppm, 0.75 ppm, 0.80 ppm, 0.85 ppm, 0.90 ppm, 0.95 ppm, 1 ppm, 5 ppm, 10 ppm, 15 ppm, 20 ppm, 25 ppm, 30 ppm, 35 ppm, 40 ppm, 45 ppm, 50 ppm, 55 ppm, 60 ppm, 65 ppm, 70 ppm, 75 ppm, 80 ppm, 85 ppm, 90 ppm, 95 ppm, 100 ppm, 125 ppm, 150 ppm, 175 ppm, 200 ppm, 225 ppm, 250 ppm, 275 ppm, 300 ppm, 325 ppm, 350 ppm, 375 ppm, 400 ppm, 425 ppm, 450 ppm, 475 ppm, 500 ppm, 525 ppm, 550 ppm, 575 ppm, 600 ppm, 625 ppm, 650 ppm, 675 ppm, 700 ppm, 725 ppm, 750 ppm, 775 ppm, 800 ppm, 825 ppm, 850 ppm, 875 ppm, 900 ppm, 925 ppm, 950 ppm, 975 ppm, 1,000 ppm, 1,025 ppm, 1,050 ppm, 1075 ppm, 1,100 ppm, 1,125 ppm, 1,150 ppm, 1,175 ppm, 1,200 ppm, 1,225 ppm, 1,250 ppm, 1,275 ppm, 1,300 ppm, 1,325 ppm, 1,350 ppm, 1,375 ppm, 1,400 ppm, 1,425 ppm, 1,450 ppm, 1,475 ppm, 1,500 ppm, 1,600 ppm, 1,700 ppm, 1,800 ppm, 1,900 ppm, or 2,000 ppm. In other aspects of this embodiment, a composition disclosed herein comprises metallic particles in an amount of, e.g., at least 0.05 ppm, at least 0.10 ppm, at least 0.20 ppm, at least 0.30 ppm, at least 0.40 ppm, at least 0.50 ppm, at least 0.60 ppm, at least 0.70 ppm, at least 0.80 ppm, at least 0.90 ppm, at least 1 ppm, at least 10 ppm, at least 20 ppm, at least 30 ppm, at least 40 ppm, at least 50 ppm, at least 60 ppm, at least 70 ppm, at least 80 ppm, at least 90 ppm, at least 100 ppm, at least 125 ppm, at least 150 ppm, at least 175 ppm, at least 200 ppm, at least 225 ppm, at least 250 ppm, at least 275 ppm, at least 300 ppm, at least 325 ppm, at least 350 ppm, at least 375 ppm, at least 400 ppm, at least 425 ppm, at least 450 ppm, at least 475 ppm, at least 500 ppm, at least 525 ppm, at least 550 ppm, at least 575 ppm, at least 600 ppm, at least 625 ppm, at least 650 ppm, at least 675 ppm, at least 700 ppm, at least 725 ppm, at least 750 ppm, at least 775 ppm, at least 800 ppm, at least 825 ppm, at least 850 ppm, at least 875 ppm, at least 900 ppm, at least 925 ppm, at least 950 ppm, at least 975 ppm, at least 1,000 ppm, at least 1,025 ppm, at least 1,050 ppm, at least 1075 ppm, at least 1,100 ppm, at least 1,125 ppm, at least 1,150 ppm, at least 1,175 ppm, at least 1,200 ppm, at least 1,225 ppm, at least 1,250 ppm, at least 1,275 ppm, at least 1,300 ppm, at least 1,325 ppm, at least 1,350 ppm, at least 1,375 ppm, at least 1,400 ppm, at least 1,425 ppm, at least 1,450 ppm, at least 1,475 ppm, at least 1,500 ppm, at least 1,600 ppm, at least 1,700 ppm, at least 1,800 ppm, at least 1,900 ppm, or at least 2,000 ppm. In yet other aspects of this embodiment, a composition disclosed herein comprises metallic particles in an amount of, e.g., at most 0.05 ppm, at most 0.10 ppm, at most 0.20 ppm, at most 0.30 ppm, at most 0.40 ppm, at most 0.50 ppm, at most 0.60 ppm, at most 0.70 ppm, at most 0.80 ppm, at most 0.90 ppm, at most 1 ppm, at most 10 ppm, at most 20 ppm, at most 30 ppm, at most 40 ppm, at most 50 ppm, at most 60 ppm, at most 70 ppm, at most 80 ppm, at most 90 ppm, at most 100 ppm, at most 125 ppm, at most 150 ppm, at most 175 ppm, at most 200 ppm, at most 225 ppm, at most 250 ppm, at most 275 ppm, at most 300 ppm, at most 325 ppm, at most 350 ppm, at most 375 ppm, at most 400 ppm, at most 425 ppm, at most 450 ppm, at most 475 ppm, at most 500 ppm, at most 525 ppm, at most 550 ppm, at most 575 ppm, at most 600 ppm, at most 625 ppm, at most 650 ppm, at most 675 ppm, at most 700 ppm, at most 725 ppm, at most 750 ppm, at most 775 ppm, at most 800 ppm, at most 825 ppm, at most 850 ppm, at most 875 ppm, at most 900 ppm, at most 925 ppm, at most 950 ppm, at most 975 ppm, at most 1,000 ppm, at most 1,025 ppm, at most 1,050 ppm, at most 1075 ppm, at most 1,100 ppm, at most 1,125 ppm, at most 1,150 ppm, at most 1,175 ppm, at most 1,200 ppm, at most 1,225 ppm, at most 1,250 ppm, at most 1,275 ppm, at most 1,300 ppm, at most 1,325 ppm, at most 1,350 ppm, at most 1,375 ppm, at most 1,400 ppm, at most 1,425 ppm, at most 1,450 ppm, at most 1,475 ppm, at most 1,500 ppm, at most 1,600 ppm, at most 1,700 ppm, at most 1,800 ppm, at most 1,900 ppm, or at most 2,000 ppm.

In still other aspects of this embodiment, a composition disclosed herein comprises metallic particles in an amount of from, e.g., about 0.5 ppm to about 20 ppm, about 0.5 ppm to about 25 ppm, about 0.5 ppm to about 30 ppm, about 0.5 ppm to about 35 ppm, about 0.5 ppm to about 40 ppm, about 0.5 ppm to about 45 ppm, about 0.5 ppm to about 50 ppm, about 0.5 ppm to about 55 ppm, about 0.5 ppm to about 60 ppm, about 0.5 ppm to about 65 ppm, about 0.5 ppm to about 70 ppm, about 0.5 ppm to about 75 ppm, about 0.5 ppm to about 80 ppm, about 0.5 ppm to about 85 ppm, about 0.5 ppm to about 90 ppm, about 0.5 ppm to about 95 ppm, about 0.5 ppm to about 100 ppm, about 0.75 ppm to about 20 ppm, about 0.75 ppm to about 25 ppm, about 0.75 ppm to about 30 ppm, about 0.75 ppm to about 35 ppm, about 0.75 ppm to about 40 ppm, about 0.75 ppm to about 45 ppm, about 0.75 ppm to about 50 ppm, about 0.75 ppm to about 55 ppm, about 0.75 ppm to about 60 ppm, about 0.75 ppm to about 65 ppm, about 0.75 ppm to about 70 ppm, about 0.75 ppm to about 75 ppm, about 0.75 ppm to about 80 ppm, about 0.75 ppm to about 85 ppm, about 0.75 ppm to about 90 ppm, about 0.75 ppm to about 95 ppm, about 0.75 ppm to about 100 ppm, about 1 ppm to about 20 ppm, about 1 ppm to about 25 ppm, about 1 ppm to about 30 ppm, about 1 ppm to about 35 ppm, about 1 ppm to about 40 ppm, about 1 ppm to about 45 ppm, about 1 ppm to about 50 ppm, about 1 ppm to about 55 ppm, about 1 ppm to about 60 ppm, about 1 ppm to about 65 ppm, about 1 ppm to about 70 ppm, about 1 ppm to about 75 ppm, about 1 ppm to about 80 ppm, about 1 ppm to about 85 ppm, about 1 ppm to about 90 ppm, about 1 ppm to about 95 ppm, about 1 ppm to about 100 ppm, about 5 ppm to about 20 ppm, about 5 ppm to about 25 ppm, about 5 ppm to about 30 ppm, about 5 ppm to about 35 ppm, about 5 ppm to about 40 ppm, about 5 ppm to about 45 ppm, about 5 ppm to about 50 ppm, about 5 ppm to about 55 ppm, about 5 ppm to about 60 ppm, about 5 ppm to about 65 ppm, about 5 ppm to about 70 ppm, about 5 ppm to about 75 ppm, about 5 ppm to about 80 ppm, about 5 ppm to about 85 ppm, about 5 ppm to about 90 ppm, about 5 ppm to about 95 ppm, about 5 ppm to about 100 ppm, about 10 ppm to about 20 ppm, about 10 ppm to about 25 ppm, about 10 ppm to about 30 ppm, about 10 ppm to about 35 ppm, about 10 ppm to about 40 ppm, about 10 ppm to about 45 ppm, about 10 ppm to about 50 ppm, about 10 ppm to about 55 ppm, about 10 ppm to about 60 ppm, about 10 ppm to about 65 ppm, about 10 ppm to about 70 ppm, about 10 ppm to about 75 ppm, about 10 ppm to about 80 ppm, about 10 ppm to about 85 ppm, about 10 ppm to about 90 ppm, about 10 ppm to about 95 ppm, or about 10 ppm to about 100 ppm.

In other aspects of this embodiment, a composition disclosed herein comprises metallic particles in an amount of from, e.g., about 1 ppm to about 25 ppm, about 1 ppm to about 50 ppm, about 1 ppm to about 75 ppm, about 1 ppm to about 100 ppm, about 1 ppm to about 125 ppm, about 1 ppm to about 150 ppm, about 1 ppm to about 175 ppm, about 1 ppm to about 200 ppm, about 1 ppm to about 225 ppm, about 1 ppm to about 250 ppm, about 1 ppm to about 275 ppm, about 1 ppm to about 300 ppm, about 1 ppm to about 325 ppm, about 1 ppm to about 350 ppm, about 1 ppm to about 375 ppm, about 1 ppm to about 400 ppm, about 10 ppm to about 25 ppm, about 10 ppm to about 50 ppm, about 10 ppm to about 75 ppm, about 10 ppm to about 100 ppm, about 10 ppm to about 125 ppm, about 10 ppm to about 150 ppm, about 10 ppm to about 175 ppm, about 10 ppm to about 200 ppm, about 10 ppm to about 225 ppm, about 10 ppm to about 250 ppm, about 10 ppm to about 275 ppm, about 10 ppm to about 300 ppm, about 10 ppm to about 325 ppm, about 10 ppm to about 350 ppm, about 10 ppm to about 375 ppm, about 10 ppm to about 400 ppm, about 25 ppm to about 50 ppm, about 25 ppm to about 75 ppm, about 25 ppm to about 100 ppm, about 25 ppm to about 125 ppm, about 25 ppm to about 150 ppm, about 25 ppm to about 175 ppm, about 25 ppm to about 200 ppm, about 25 ppm to about 225 ppm, about 25 ppm to about 250 ppm, about 25 ppm to about 275 ppm, about 25 ppm to about 300 ppm, about 25 ppm to about 325 ppm, about 25 ppm to about 350 ppm, about 25 ppm to about 375 ppm, about 25 ppm to about 400 ppm, about 50 ppm to about 75 ppm, about 50 ppm to about 100 ppm, about 50 ppm to about 125 ppm, about 50 ppm to about 150 ppm, about 50 ppm to about 175 ppm, about 50 ppm to about 200 ppm, about 50 ppm to about 225 ppm, about 50 ppm to about 250 ppm, about 50 ppm to about 275 ppm, about 50 ppm to about 300 ppm, about 50 ppm to about 325 ppm, about 50 ppm to about 350 ppm, about 50 ppm to about 375 ppm, about 50 ppm to about 400 ppm, about 75 ppm to about 100 ppm, about 75 ppm to about 125 ppm, about 75 ppm to about 150 ppm, about 75 ppm to about 175 ppm, about 75 ppm to about 200 ppm, about 75 ppm to about 225 ppm, about 75 ppm to about 250 ppm, about 75 ppm to about 275 ppm, about 75 ppm to about 300 ppm, about 75 ppm to about 325 ppm, about 75 ppm to about 350 ppm, about 75 ppm to about 375 ppm, about 75 ppm to about 400 ppm, about 100 ppm to about 125 ppm, about 100 ppm to about 150 ppm, about 100 ppm to about 175 ppm, about 100 ppm to about 200 ppm, about 100 ppm to about 225 ppm, about 100 ppm to about 250 ppm, about 100 ppm to about 275 ppm, about 100 ppm to about 300 ppm, about 100 ppm to about 325 ppm, about 100 ppm to about 350 ppm, about 100 ppm to about 375 ppm, about 100 ppm to about 400 ppm, about 150 ppm to about 175 ppm, about 150 ppm to about 200 ppm, about 150 ppm to about 225 ppm, about 150 ppm to about 250 ppm, about 150 ppm to about 275 ppm, about 150 ppm to about 300 ppm, about 150 ppm to about 325 ppm, about 150 ppm to about 350 ppm, about 150 ppm to about 375 ppm, about 150 ppm to about 400 ppm, about 200 ppm to about 225 ppm, about 200 ppm to about 250 ppm, about 200 ppm to about 275 ppm, about 200 ppm to about 300 ppm, about 200 ppm to about 325 ppm, about 200 ppm to about 350 ppm, about 200 ppm to about 375 ppm, about 200 ppm to about 400 ppm, about 250 ppm to about 275 ppm, about 250 ppm to about 300 ppm, about 250 ppm to about 325 ppm, about 250 ppm to about 350 ppm, about 250 ppm to about 375 ppm, about 250 ppm to about 400 ppm, about 300 ppm to about 325 ppm, about 300 ppm to about 350 ppm, about 300 ppm to about 375 ppm, about 300 ppm to about 400 ppm, about 350 ppm to about 375 ppm, about 350 ppm to about 400 ppm, or about 375 ppm to about 400 ppm.

In other aspects of this embodiment, a composition disclosed herein comprises metallic particles in an amount of, e.g., about 400 ppm to about 500 ppm, about 400 ppm to about 600 ppm, about 400 ppm to about 700 ppm, about 400 ppm to about 800 ppm, about 400 ppm to about 900 ppm, about 400 ppm to about 1,000 ppm, about 400 ppm to about 1,100 ppm, about 400 ppm to about 1,200 ppm, about 400 ppm to about 1,300 ppm, about 400 ppm to about 1,400 ppm, about 400 ppm to about 1,500 ppm, about 400 ppm to about 1,600 ppm, about 400 ppm to about 1,700 ppm, about 400 ppm to about 1,800 ppm, about 400 ppm to about 1,900 ppm, about 400 ppm to about 2,000 ppm, about 500 ppm to about 600 ppm, about 500 ppm to about 700 ppm, about 500 ppm to about 800 ppm, about 500 ppm to about 900 ppm, about 500 ppm to about 1,000 ppm, about 500 ppm to about 1,100 ppm, about 500 ppm to about 1,200 ppm, about 500 ppm to about 1,300 ppm, about 500 ppm to about 1,400 ppm, about 500 ppm to about 1,500 ppm, about 500 ppm to about 1,600 ppm, about 500 ppm to about 1,700 ppm, about 500 ppm to about 1,800 ppm, about 500 ppm to about 1,900 ppm, about 500 ppm to about 2,000 ppm, about 600 ppm to about 700 ppm, about 600 ppm to about 800 ppm, about 600 ppm to about 900 ppm, about 600 ppm to about 1,000 ppm, about 600 ppm to about 1,100 ppm, about 600 ppm to about 1,200 ppm, about 600 ppm to about 1,300 ppm, about 600 ppm to about 1,400 ppm, about 600 ppm to about 1,500 ppm, about 600 ppm to about 1,600 ppm, about 600 ppm to about 1,700 ppm, about 600 ppm to about 1,800 ppm, about 600 ppm to about 1,900 ppm, about 600 ppm to about 2,000 ppm, about 700 ppm to about 800 ppm, about 700 ppm to about 900 ppm, about 700 ppm to about 1,000 ppm, about 700 ppm to about 1,100 ppm, about 700 ppm to about 1,200 ppm, about 700 ppm to about 1,300 ppm, about 700 ppm to about 1,400 ppm, about 700 ppm to about 1,500 ppm, about 700 ppm to about 1,600 ppm, about 700 ppm to about 1,700 ppm, about 700 ppm to about 1,800 ppm, about 700 ppm to about 1,900 ppm, about 700 ppm to about 2,000 ppm, about 800 ppm to about 900 ppm, about 800 ppm to about 1,000 ppm, about 800 ppm to about 1,100 ppm, about 800 ppm to about 1,200 ppm, about 800 ppm to about 1,300 ppm, about 800 ppm to about 1,400 ppm, about 800 ppm to about 1,500 ppm, about 800 ppm to about 1,600 ppm, about 800 ppm to about 1,700 ppm, about 800 ppm to about 1,800 ppm, about 800 ppm to about 1,900 ppm, about 800 ppm to about 2,000 ppm, about 900 ppm to about 1,000 ppm, about 900 ppm to about 1,100 ppm, about 900 ppm to about 1,200 ppm, about 900 ppm to about 1,300 ppm, about 900 ppm to about 1,400 ppm, about 900 ppm to about 1,500 ppm, about 900 ppm to about 1,600 ppm, about 900 ppm to about 1,700 ppm, about 900 ppm to about 1,800 ppm, about 900 ppm to about 1,900 ppm, about 900 ppm to about 2,000 ppm, about 1,000 ppm to about 1,100 ppm, about 1,000 ppm to about 1,200 ppm, about 1,000 ppm to about 1,300 ppm, about 1,000 ppm to about 1,400 ppm, about 1,000 ppm to about 1,500 ppm, about 1,000 ppm to about 1,600 ppm, about 1,000 ppm to about 1,700 ppm, about 1,000 ppm to about 1,800 ppm, about 1,000 ppm to about 1,900 ppm, about 1,000 ppm to about 2,000 ppm, about 1,100 ppm to about 1,200 ppm, about 1,100 ppm to about 1,300 ppm, about 1,100 ppm to about 1,400 ppm, about 1,100 ppm to about 1,500 ppm, about 1,100 ppm to about 1,600 ppm, about 1,100 ppm to about 1,700 ppm, about 1,100 ppm to about 1,800 ppm, about 1,100 ppm to about 1,900 ppm, about 1,100 ppm to about 2,000 ppm, about 1,200 ppm to about 1,300 ppm, about 1,200 ppm to about 1,400 ppm, about 1,200 ppm to about 1,500 ppm, about 1,200 ppm to about 1,600 ppm, about 1,200 ppm to about 1,700 ppm, about 1,200 ppm to about 1,800 ppm, about 1,200 ppm to about 1,900 ppm, about 1,200 ppm to about 2,000 ppm, about 1,300 ppm to about 1,400 ppm, about 1,300 ppm to about 1,500 ppm, about 1,300 ppm to about 1,600 ppm, about 1,300 ppm to about 1,700 ppm, about 1,300 ppm to about 1,800 ppm, about 1,300 ppm to about 1,900 ppm, about 1,300 ppm to about 2,000 ppm, about 1,400 ppm to about 1,500 ppm, about 1,400 ppm to about 1,600 ppm, about 1,400 ppm to about 1,700 ppm, about 1,400 ppm to about 1,800 ppm, about 1,400 ppm to about 1,900 ppm, about 1,400 ppm to about 2,000 ppm, about 1,500 ppm to about 1,600 ppm, about 1,500 ppm to about 1,700 ppm, about 1,500 ppm to about 1,800 ppm, about 1,500 ppm to about 1,900 ppm, about 1,500 ppm to about 2,000 ppm, about 1,600 ppm to about 1,700 ppm, about 1,600 ppm to about 1,800 ppm, about 1,600 ppm to about 1,900 ppm, about 1,600 ppm to about 2,000 ppm, about 1,700 ppm to about 1,800 ppm, about 1,700 ppm to about 1,900 ppm, about 1,700 ppm to about 2,000 ppm, about 1,800 ppm to about 1,900 ppm, about 1,800 ppm to about 2,000 ppm, or about 1,900 ppm to about 2,000 ppm.

In aspects of this embodiment, a composition disclosed herein comprises metallic particles in an amount of, e.g., 0.05 mg/L, 0.10 mg/L, 0.15 mg/L, 0.20 mg/L, 0.25 mg/L, 0.30 mg/L, 0.35 mg/L, 0.40 mg/L, 0.45 mg/L, 0.50 mg/L, 0.55 mg/L, 0.60 mg/L, 0.65 mg/L, 0.70 mg/L, 0.75 mg/L, 0.80 mg/L, 0.85 mg/L, 0.90 mg/L, 0.95 mg/L, 1 mg/L, 5 mg/L, 10 mg/L, 15 mg/L, 20 mg/L, 25 mg/L, 30 mg/L, 35 mg/L, 40 mg/L, 45 mg/L, 50 mg/L, 55 mg/L, 60 mg/L, 65 mg/L, 70 mg/L, 75 mg/L, 80 mg/L, 85 mg/L, 90 mg/L, 95 mg/L, 100 mg/L, 125 mg/L, 150 mg/L, 175 mg/L, 200 mg/L, 225 mg/L, 250 mg/L, 275 mg/L, 300 mg/L, 325 mg/L, 350 mg/L, 375 mg/L, 400 mg/L, 425 mg/L, 450 mg/L, 475 mg/L, 500 mg/L, 525 mg/L, 550 mg/L, 575 mg/L, 600 mg/L, 625 mg/L, 650 mg/L, 675 mg/L, 700 mg/L, 725 mg/L, 750 mg/L, 775 mg/L, 800 mg/L, 825 mg/L, 850 mg/L, 875 mg/L, 900 mg/L, 925 mg/L, 950 mg/L, 975 mg/L, 1,000 mg/L, 1,025 mg/L, 1,050 mg/L, 1075 mg/L, 1,100 mg/L, 1,125 mg/L, 1,150 mg/L, 1,175 mg/L, 1,200 mg/L, 1,225 mg/L, 1,250 mg/L, 1,275 mg/L, 1,300 mg/L, 1,325 mg/L, 1,350 mg/L, 1,375 mg/L, 1,400 mg/L, 1,425 mg/L, 1,450 mg/L, 1,475 mg/L, 1,500 mg/L, 1,600 mg/L, 1,700 mg/L, 1,800 mg/L, 1,900 mg/L, or 2,000 mg/L. In other aspects of this embodiment, a composition disclosed herein comprises metallic particles in an amount of, e.g., at least 0.05 mg/L, at least 0.10 mg/L, at least 0.20 mg/L, at least 0.30 mg/L, at least 0.40 mg/L, at least 0.50 mg/L, at least 0.60 mg/L, at least 0.70 mg/L, at least 0.80 mg/L, at least 0.90 mg/L, at least 1 mg/L, at least 10 mg/L, at least 20 mg/L, at least 30 mg/L, at least 40 mg/L, at least 50 mg/L, at least 60 mg/L, at least 70 mg/L, at least 80 mg/L, at least 90 mg/L, at least 100 mg/L, at least 125 mg/L, at least 150 mg/L, at least 175 mg/L, at least 200 mg/L, at least 225 mg/L, at least 250 mg/L, at least 275 mg/L, at least 300 mg/L, at least 325 mg/L, at least 350 mg/L, at least 375 mg/L, at least 400 mg/L, at least 425 mg/L, at least 450 mg/L, at least 475 mg/L, at least 500 mg/L, at least 525 mg/L, at least 550 mg/L, at least 575 mg/L, at least 600 mg/L, at least 625 mg/L, at least 650 mg/L, at least 675 mg/L, at least 700 mg/L, at least 725 mg/L, at least 750 mg/L, at least 775 mg/L, at least 800 mg/L, at least 825 mg/L, at least 850 mg/L, at least 875 mg/L, at least 900 mg/L, at least 925 mg/L, at least 950 mg/L, at least 975 mg/L, at least 1,000 mg/L, at least 1,025 mg/L, at least 1,050 mg/L, at least 1075 mg/L, at least 1,100 mg/L, at least 1,125 mg/L, at least 1,150 mg/L, at least 1,175 mg/L, at least 1,200 mg/L, at least 1,225 mg/L, at least 1,250 mg/L, at least 1,275 mg/L, at least 1,300 mg/L, at least 1,325 mg/L, at least 1,350 mg/L, at least 1,375 mg/L, at least 1,400 mg/L, at least 1,425 mg/L, at least 1,450 mg/L, at least 1,475 mg/L, at least 1,500 mg/L, at least 1,600 mg/L, at least 1,700 mg/L, at least 1,800 mg/L, at least 1,900 mg/L, or at least 2,000 mg/L. In yet other aspects of this embodiment, a composition disclosed herein comprises metallic particles in an amount of, e.g., at most 0.05 mg/L, at most 0.10 mg/L, at most 0.20 mg/L, at most 0.30 mg/L, at most 0.40 mg/L, at most 0.50 mg/L, at most 0.60 mg/L, at most 0.70 mg/L, at most 0.80 mg/L, at most 0.90 mg/L, at most 1 mg/L, at most 10 mg/L, at most 20 mg/L, at most 30 mg/L, at most 40 mg/L, at most 50 mg/L, at most 60 mg/L, at most 70 mg/L, at most 80 mg/L, at most 90 mg/L, at most 100 mg/L, at most 125 mg/L, at most 150 mg/L, at most 175 mg/L, at most 200 mg/L, at most 225 mg/L, at most 250 mg/L, at most 275 mg/L, at most 300 mg/L, at most 325 mg/L, at most 350 mg/L, at most 375 mg/L, at most 400 mg/L, at most 425 mg/L, at most 450 mg/L, at most 475 mg/L, at most 500 mg/L, at most 525 mg/L, at most 550 mg/L, at most 575 mg/L, at most 600 mg/L, at most 625 mg/L, at most 650 mg/L, at most 675 mg/L, at most 700 mg/L, at most 725 mg/L, at most 750 mg/L, at most 775 mg/L, at most 800 mg/L, at most 825 mg/L, at most 850 mg/L, at most 875 mg/L, at most 900 mg/L, at most 925 mg/L, at most 950 mg/L, at most 975 mg/L, at most 1,000 mg/L, at most 1,025 mg/L, at most 1,050 mg/L, at most 1075 mg/L, at most 1,100 mg/L, at most 1,125 mg/L, at most 1,150 mg/L, at most 1,175 mg/L, at most 1,200 mg/L, at most 1,225 mg/L, at most 1,250 mg/L, at most 1,275 mg/L, at most 1,300 mg/L, at most 1,325 mg/L, at most 1,350 mg/L, at most 1,375 mg/L, at most 1,400 mg/L, at most 1,425 mg/L, at most 1,450 mg/L, at most 1,475 mg/L, at most 1,500 mg/L, at most 1,600 mg/L, at most 1,700 mg/L, at most 1,800 mg/L, at most 1,900 mg/L, or at most 2,000 mg/L.

In still other aspects of this embodiment, a composition disclosed herein comprises metallic particles in an amount of from, e.g., about 0.5 mg/L to about 20 mg/L, about 0.5 mg/L to about 25 mg/L, about 0.5 mg/L to about 30 mg/L, about 0.5 mg/L to about 35 mg/L, about 0.5 mg/L to about 40 mg/L, about 0.5 mg/L to about 45 mg/L, about 0.5 mg/L to about 50 mg/L, about 0.5 mg/L to about 55 mg/L, about 0.5 mg/L to about 60 mg/L, about 0.5 mg/L to about 65 mg/L, about 0.5 mg/L to about 70 mg/L, about 0.5 mg/L to about 75 mg/L, about 0.5 mg/L to about 80 mg/L, about 0.5 mg/L to about 85 mg/L, about 0.5 mg/L to about 90 mg/L, about 0.5 mg/L to about 95 mg/L, about 0.5 mg/L to about 100 mg/L, about 0.75 mg/L to about 20 mg/L, about 0.75 mg/L to about 25 mg/L, about 0.75 mg/L to about 30 mg/L, about 0.75 mg/L to about 35 mg/L, about 0.75 mg/L to about 40 mg/L, about 0.75 mg/L to about 45 mg/L, about 0.75 mg/L to about 50 mg/L, about 0.75 mg/L to about 55 mg/L, about 0.75 mg/L to about 60 mg/L, about 0.75 mg/L to about 65 mg/L, about 0.75 mg/L to about 70 mg/L, about 0.75 mg/L to about 75 mg/L, about 0.75 mg/L to about 80 mg/L, about 0.75 mg/L to about 85 mg/L, about 0.75 mg/L to about 90 mg/L, about 0.75 mg/L to about 95 mg/L, about 0.75 mg/L to about 100 mg/L, about 1 mg/L to about 20 mg/L, about 1 mg/L to about 25 mg/L, about 1 mg/L to about 30 mg/L, about 1 mg/L to about 35 mg/L, about 1 mg/L to about 40 mg/L, about 1 mg/L to about 45 mg/L, about 1 mg/L to about 50 mg/L, about 1 mg/L to about 55 mg/L, about 1 mg/L to about 60 mg/L, about 1 mg/L to about 65 mg/L, about 1 mg/L to about 70 mg/L, about 1 mg/L to about 75 mg/L, about 1 mg/L to about 80 mg/L, about 1 mg/L to about 85 mg/L, about 1 mg/L to about 90 mg/L, about 1 mg/L to about 95 mg/L, about 1 mg/L to about 100 mg/L, about 5 mg/L to about 20 mg/L, about 5 mg/L to about 25 mg/L, about 5 mg/L to about 30 mg/L, about 5 mg/L to about 35 mg/L, about 5 mg/L to about 40 mg/L, about 5 mg/L to about 45 mg/L, about 5 mg/L to about 50 mg/L, about 5 mg/L to about 55 mg/L, about 5 mg/L to about 60 mg/L, about 5 mg/L to about 65 mg/L, about 5 mg/L to about 70 mg/L, about 5 mg/L to about 75 mg/L, about 5 mg/L to about 80 mg/L, about 5 mg/L to about 85 mg/L, about 5 mg/L to about 90 mg/L, about 5 mg/L to about 95 mg/L, about 5 mg/L to about 100 mg/L, about 10 mg/L to about 20 mg/L, about 10 mg/L to about 25 mg/L, about 10 mg/L to about 30 mg/L, about 10 mg/L to about 35 mg/L, about 10 mg/L to about 40 mg/L, about 10 mg/L to about 45 mg/L, about 10 mg/L to about 50 mg/L, about 10 mg/L to about 55 mg/L, about 10 mg/L to about 60 mg/L, about 10 mg/L to about 65 mg/L, about 10 mg/L to about 70 mg/L, about 10 mg/L to about 75 mg/L, about 10 mg/L to about 80 mg/L, about 10 mg/L to about 85 mg/L, about 10 mg/L to about 90 mg/L, about 10 mg/L to about 95 mg/L, or about 10 mg/L to about 100 mg/L.

In other aspects of this embodiment, a composition disclosed herein comprises metallic particles in an amount of from, e.g., about 1 mg/L to about 25 mg/L, about 1 mg/L to about 50 mg/L, about 1 mg/L to about 75 mg/L, about 1 mg/L to about 100 mg/L, about 1 mg/L to about 125 mg/L, about 1 mg/L to about 150 mg/L, about 1 mg/L to about 175 mg/L, about 1 mg/L to about 200 mg/L, about 1 mg/L to about 225 mg/L, about 1 mg/L to about 250 mg/L, about 1 mg/L to about 275 mg/L, about 1 mg/L to about 300 mg/L, about 1 mg/L to about 325 mg/L, about 1 mg/L to about 350 mg/L, about 1 mg/L to about 375 mg/L, about 1 mg/L to about 400 mg/L, about 10 mg/L to about 25 mg/L, about 10 mg/L to about 50 mg/L, about 10 mg/L to about 75 mg/L, about 10 mg/L to about 100 mg/L, about 10 mg/L to about 125 mg/L, about 10 mg/L to about 150 mg/L, about 10 mg/L to about 175 mg/L, about 10 mg/L to about 200 mg/L, about 10 mg/L to about 225 mg/L, about 10 mg/L to about 250 mg/L, about 10 mg/L to about 275 mg/L, about 10 mg/L to about 300 mg/L, about 10 mg/L to about 325 mg/L, about 10 mg/L to about 350 mg/L, about 10 mg/L to about 375 mg/L, about 10 mg/L to about 400 mg/L, about 25 mg/L to about 50 mg/L, about 25 mg/L to about 75 mg/L, about 25 mg/L to about 100 mg/L, about 25 mg/L to about 125 mg/L, about 25 mg/L to about 150 mg/L, about 25 mg/L to about 175 mg/L, about 25 mg/L to about 200 mg/L, about 25 mg/L to about 225 mg/L, about 25 mg/L to about 250 mg/L, about 25 mg/L to about 275 mg/L, about 25 mg/L to about 300 mg/L, about 25 mg/L to about 325 mg/L, about 25 mg/L to about 350 mg/L, about 25 mg/L to about 375 mg/L, about 25 mg/L to about 400 mg/L, about 50 mg/L to about 75 mg/L, about 50 mg/L to about 100 mg/L, about 50 mg/L to about 125 mg/L, about 50 mg/L to about 150 mg/L, about 50 mg/L to about 175 mg/L, about 50 mg/L to about 200 mg/L, about 50 mg/L to about 225 mg/L, about 50 mg/L to about 250 mg/L, about 50 mg/L to about 275 mg/L, about 50 mg/L to about 300 mg/L, about 50 mg/L to about 325 mg/L, about 50 mg/L to about 350 mg/L, about 50 mg/L to about 375 mg/L, about 50 mg/L to about 400 mg/L, about 75 mg/L to about 100 mg/L, about 75 mg/L to about 125 mg/L, about 75 mg/L to about 150 mg/L, about 75 mg/L to about 175 mg/L, about 75 mg/L to about 200 mg/L, about 75 mg/L to about 225 mg/L, about 75 mg/L to about 250 mg/L, about 75 mg/L to about 275 mg/L, about 75 mg/L to about 300 mg/L, about 75 mg/L to about 325 mg/L, about 75 mg/L to about 350 mg/L, about 75 mg/L to about 375 mg/L, about 75 mg/L to about 400 mg/L, about 100 mg/L to about 125 mg/L, about 100 mg/L to about 150 mg/L, about 100 mg/L to about 175 mg/L, about 100 mg/L to about 200 mg/L, about 100 mg/L to about 225 mg/L, about 100 mg/L to about 250 mg/L, about 100 mg/L to about 275 mg/L, about 100 mg/L to about 300 mg/L, about 100 mg/L to about 325 mg/L, about 100 mg/L to about 350 mg/L, about 100 mg/L to about 375 mg/L, about 100 mg/L to about 400 mg/L, about 150 mg/L to about 175 mg/L, about 150 mg/L to about 200 mg/L, about 150 mg/L to about 225 mg/L, about 150 mg/L to about 250 mg/L, about 150 mg/L to about 275 mg/L, about 150 mg/L to about 300 mg/L, about 150 mg/L to about 325 mg/L, about 150 mg/L to about 350 mg/L, about 150 mg/L to about 375 mg/L, about 150 mg/L to about 400 mg/L, about 200 mg/L to about 225 mg/L, about 200 mg/L to about 250 mg/L, about 200 mg/L to about 275 mg/L, about 200 mg/L to about 300 mg/L, about 200 mg/L to about 325 mg/L, about 200 mg/L to about 350 mg/L, about 200 mg/L to about 375 mg/L, about 200 mg/L to about 400 mg/L, about 250 mg/L to about 275 mg/L, about 250 mg/L to about 300 mg/L, about 250 mg/L to about 325 mg/L, about 250 mg/L to about 350 mg/L, about 250 mg/L to about 375 mg/L, about 250 mg/L to about 400 mg/L, about 300 mg/L to about 325 mg/L, about 300 mg/L to about 350 mg/L, about 300 mg/L to about 375 mg/L, about 300 mg/L to about 400 mg/L, about 350 mg/L to about 375 mg/L, about 350 mg/L to about 400 mg/L, or about 375 mg/L to about 400 mg/L.

In other aspects of this embodiment, a composition disclosed herein comprises metallic particles in an amount of, e.g., about 400 mg/L to about 500 mg/L, about 400 mg/L to about 600 mg/L, about 400 mg/L to about 700 mg/L, about 400 mg/L to about 800 mg/L, about 400 mg/L to about 900 mg/L, about 400 mg/L to about 1,000 mg/L, about 400 mg/L to about 1,100 mg/L, about 400 mg/L to about 1,200 mg/L, about 400 mg/L to about 1,300 mg/L, about 400 mg/L to about 1,400 mg/L, about 400 mg/L to about 1,500 mg/L, about 400 mg/L to about 1,600 mg/L, about 400 mg/L to about 1,700 mg/L, about 400 mg/L to about 1,800 mg/L, about 400 mg/L to about 1,900 mg/L, about 400 mg/L to about 2,000 mg/L, about 500 mg/L to about 600 mg/L, about 500 mg/L to about 700 mg/L, about 500 mg/L to about 800 mg/L, about 500 mg/L to about 900 mg/L, about 500 mg/L to about 1,000 mg/L, about 500 mg/L to about 1,100 mg/L, about 500 mg/L to about 1,200 mg/L, about 500 mg/L to about 1,300 mg/L, about 500 mg/L to about 1,400 mg/L, about 500 mg/L to about 1,500 mg/L, about 500 mg/L to about 1,600 mg/L, about 500 mg/L to about 1,700 mg/L, about 500 mg/L to about 1,800 mg/L, about 500 mg/L to about 1,900 mg/L, about 500 mg/L to about 2,000 mg/L, about 600 mg/L to about 700 mg/L, about 600 mg/L to about 800 mg/L, about 600 mg/L to about 900 mg/L, about 600 mg/L to about 1,000 mg/L, about 600 mg/L to about 1,100 mg/L, about 600 mg/L to about 1,200 mg/L, about 600 mg/L to about 1,300 mg/L, about 600 mg/L to about 1,400 mg/L, about 600 mg/L to about 1,500 mg/L, about 600 mg/L to about 1,600 mg/L, about 600 mg/L to about 1,700 mg/L, about 600 mg/L to about 1,800 mg/L, about 600 mg/L to about 1,900 mg/L, about 600 mg/L to about 2,000 mg/L, about 700 mg/L to about 800 mg/L, about 700 mg/L to about 900 mg/L, about 700 mg/L to about 1,000 mg/L, about 700 mg/L to about 1,100 mg/L, about 700 mg/L to about 1,200 mg/L, about 700 mg/L to about 1,300 mg/L, about 700 mg/L to about 1,400 mg/L, about 700 mg/L to about 1,500 mg/L, about 700 mg/L to about 1,600 mg/L, about 700 mg/L to about 1,700 mg/L, about 700 mg/L to about 1,800 mg/L, about 700 mg/L to about 1,900 mg/L, about 700 mg/L to about 2,000 mg/L, about 800 mg/L to about 900 mg/L, about 800 mg/L to about 1,000 mg/L, about 800 mg/L to about 1,100 mg/L, about 800 mg/L to about 1,200 mg/L, about 800 mg/L to about 1,300 mg/L, about 800 mg/L to about 1,400 mg/L, about 800 mg/L to about 1,500 mg/L, about 800 mg/L to about 1,600 mg/L, about 800 mg/L to about 1,700 mg/L, about 800 mg/L to about 1,800 mg/L, about 800 mg/L to about 1,900 mg/L, about 800 mg/L to about 2,000 mg/L, about 900 mg/L to about 1,000 mg/L, about 900 mg/L to about 1,100 mg/L, about 900 mg/L to about 1,200 mg/L, about 900 mg/L to about 1,300 mg/L, about 900 mg/L to about 1,400 mg/L, about 900 mg/L to about 1,500 mg/L, about 900 mg/L to about 1,600 mg/L, about 900 mg/L to about 1,700 mg/L, about 900 mg/L to about 1,800 mg/L, about 900 mg/L to about 1,900 mg/L, about 900 mg/L to about 2,000 mg/L, about 1,000 mg/L to about 1,100 mg/L, about 1,000 mg/L to about 1,200 mg/L, about 1,000 mg/L to about 1,300 mg/L, about 1,000 mg/L to about 1,400 mg/L, about 1,000 mg/L to about 1,500 mg/L, about 1,000 mg/L to about 1,600 mg/L, about 1,000 mg/L to about 1,700 mg/L, about 1,000 mg/L to about 1,800 mg/L, about 1,000 mg/L to about 1,900 mg/L, about 1,000 mg/L to about 2,000 mg/L, about 1,100 mg/L to about 1,200 mg/L, about 1,100 mg/L to about 1,300 mg/L, about 1,100 mg/L to about 1,400 mg/L, about 1,100 mg/L to about 1,500 mg/L, about 1,100 mg/L to about 1,600 mg/L, about 1,100 mg/L to about 1,700 mg/L, about 1,100 mg/L to about 1,800 mg/L, about 1,100 mg/L to about 1,900 mg/L, about 1,100 mg/L to about 2,000 mg/L, about 1,200 mg/L to about 1,300 mg/L, about 1,200 mg/L to about 1,400 mg/L, about 1,200 mg/L to about 1,500 mg/L, about 1,200 mg/L to about 1,600 mg/L, about 1,200 mg/L to about 1,700 mg/L, about 1,200 mg/L to about 1,800 mg/L, about 1,200 mg/L to about 1,900 mg/L, about 1,200 mg/L to about 2,000 mg/L, about 1,300 mg/L to about 1,400 mg/L, about 1,300 mg/L to about 1,500 mg/L, about 1,300 mg/L to about 1,600 mg/L, about 1,300 mg/L to about 1,700 mg/L, about 1,300 mg/L to about 1,800 mg/L, about 1,300 mg/L to about 1,900 mg/L, about 1,300 mg/L to about 2,000 mg/L, about 1,400 mg/L to about 1,500 mg/L, about 1,400 mg/L to about 1,600 mg/L, about 1,400 mg/L to about 1,700 mg/L, about 1,400 mg/L to about 1,800 mg/L, about 1,400 mg/L to about 1,900 mg/L, about 1,400 mg/L to about 2,000 mg/L, about 1,500 mg/L to about 1,600 mg/L, about 1,500 mg/L to about 1,700 mg/L, about 1,500 mg/L to about 1,800 mg/L, about 1,500 mg/L to about 1,900 mg/L, about 1,500 mg/L to about 2,000 mg/L, about 1,600 mg/L to about 1,700 mg/L, about 1,600 mg/L to about 1,800 mg/L, about 1,600 mg/L to about 1,900 mg/L, about 1,600 mg/L to about 2,000 mg/L, about 1,700 mg/L to about 1,800 mg/L, about 1,700 mg/L to about 1,900 mg/L, about 1,700 mg/L to about 2,000 mg/L, about 1,800 mg/L to about 1,900 mg/L, about 1,800 mg/L to about 2,000 mg/L, or about 1,900 mg/L to about 2,000 mg/L.

In aspects of this embodiment, a composition disclosed herein comprises metallic particles in an amount of, e.g., about 0.10%, about 0.11%, about 0.12%, about 0.13%, about 0.14%, about 0.15%, about 0.16%, about 0.17%, about 0.18%, about 0.19%, about 0.2%, about 0.25%, about 0.3%, about 0.35%, about 0.4%, about 0.45%, or about 0.5% by weight of the composition. In other aspects of this embodiment, a composition disclosed herein comprises metallic particles in an amount of, e.g., at least 0.10%, at least 0.11%, at least 0.12%, at least 0.13%, at least 0.14%, at least 0.15%, at least 0.16%, at least 0.17%, at least 0.18%, at least 0.19%, at least 0.2%, at least 0.25%, at least 0.3%, at least 0.35%, at least 0.4%, at least 0.45%, or at least 0.5% by weight of the composition. In yet other aspects of this embodiment, a composition disclosed herein comprises metallic particles in an amount of, e.g., at most 0.10%, at most 0.11%, at most 0.12%, at most 0.13%, at most 0.14%, at most 0.15%, at most 0.16%, at most 0.17%, at most 0.18%, at most 0.19%, at most 0.2%, at most 0.25%, at most 0.3%, at most 0.35%, at most 0.4%, at most 0.45%, or at most 0.5% by weight of the composition. In still other aspects of this embodiment, a composition disclosed herein comprises metallic particles in an amount of, e.g., about 0.10% to about 0.15%, about 0.10% to about 0.20%, about 0.10% to about 0.25%, about 0.10% to about 0.30%, about 0.10% to about 0.35%, about 0.10% to about 0.40%, about 0.10% to about 0.45%, about 0.10% to about 0.50%, about 0.20% to about 0.25%, about 0.20% to about 0.30%, about 0.20% to about 0.35%, about 0.20% to about 0.40%, about 0.20% to about 0.45%, about 0.20% to about 0.50%, about 0.30% to about 0.35%, about 0.30% to about 0.40%, about 0.30% to about 0.45%, about 0.30% to about 0.50%, about 0.40% to about 0.45%, about 0.40% to about 0.50%, or about 0.40% to about 0.50% by weight of the composition.

In an embodiment, metallic particles can be of any size that provides a desired beneficial effect to a composition disclosed herein. In aspects of this embodiment, metallic particles disclosed herein have a mean diameter of, e.g., about 10 nm, about 20 nm, about 30 nm, about 40 nm, about 50 nm, about 60 nm, about 70 nm, about 80 nm, about 90 nm, about 100 nm. In other aspects of this embodiment, metallic particles disclosed herein have a mean diameter of, e.g., at least 10 nm, at least 20 nm, at least 30 nm, at least 40 nm, at least 50 nm, at least 60 nm, at least 70 nm, at least 80 nm, at least 90 nm, at least 100 nm. In yet other aspects of this embodiment, metallic particles disclosed herein have a mean diameter of, e.g., at most 10 nm, at most 20 nm, at most 30 nm, at most 40 nm, at most 50 nm, at most 60 nm, at most 70 nm, at most 80 nm, at most 90 nm, at most 100 nm. In yet other aspects of this embodiment, metallic particles disclosed herein have a mean diameter of, e.g., about 10 nm to about 20 nm, about 10 nm to about 30 nm, about 10 nm to about 40 nm, about 10 nm to about 50 nm, about 10 nm to about 60 nm, about 10 nm to about 70 nm, about 10 nm to about 80 nm, about 10 nm to about 90 nm, about 10 nm to about 100 nm, about 20 nm to about 30 nm, about 20 nm to about 40 nm, about 20 nm to about 50 nm, about 20 nm to about 60 nm, about 20 nm to about 70 nm, about 20 nm to about 80 nm, about 20 nm to about 90 nm, about 20 nm to about 100 nm, about 30 nm to about 40 nm, about 30 nm to about 50 nm, about 30 nm to about 60 nm, about 30 nm to about 70 nm, about 30 nm to about 80 nm, about 30 nm to about 90 nm, about 30 nm to about 100 nm, about 40 nm to about 50 nm, about 40 nm to about 60 nm, about 40 nm to about 70 nm, about 40 nm to about 80 nm, about 40 nm to about 90 nm, about 40 nm to about 100 nm, about 50 nm to about 60 nm, about 50 nm to about 70 nm, about 50 nm to about 80 nm, about 50 nm to about 90 nm, about 50 nm to about 100 nm, about 60 nm to about 70 nm, about 60 nm to about 80 nm, about 60 nm to about 90 nm, about 60 nm to about 100 nm, about 70 nm to about 80 nm, about 70 nm to about 90 nm, about 70 nm to about 100 nm, about 80 nm to about 90 nm, about 80 nm to about 100 nm, or about 90 nm to about 100 nm.

In an embodiment, a composition disclosed herein does not comprise metallic particles.

A composition disclosed herein may comprise a metal salt. Non-limiting examples of a metal salt includes a copper salt, iron salt, a potassium salt, silver salt, titanium salt, and zinc salt. Other non-limiting examples of a metal salt includes a metal acetate, a metal chloride, a metal nitrate, and a metal sulfate. A metal acetate includes, without limitation, copper acetate, iron acetate, e.g., iron (II) acetate and iron (III) acetate, potassium acetate, silver acetate, titanium acetate, and zinc acetate. A metal chloride includes, without limitation, copper chloride, iron chloride, e.g., iron (II) chloride or iron (III) chloride, potassium chloride, silver chloride, titanium chloride, and zinc chloride. A metal nitrate includes, without limitation, copper nitrate, iron nitrate, e.g., iron (II) nitrate, iron (III) nitrate, potassium nitrate, silver nitrate, titanium nitrate, and zinc nitrate. A metal sulfate includes, without limitation, copper sulfate, iron sulfate, e.g., iron (II) sulfate, iron (III) sulfate, potassium sulfate, silver sulfate, titanium sulfate, and zinc sulfate.

In an embodiment, a composition disclosed herein comprises an amount of a metal salt that provides a desired beneficial effect to a composition disclosed herein. In aspects of this embodiment, a composition disclosed herein comprises a metal salt in an amount of, e.g., 0.05 ppm, 0.10 ppm, 0.15 ppm, 0.20 ppm, 0.25 ppm, 0.30 ppm, 0.35 ppm, 0.40 ppm, 0.45 ppm, 0.50 ppm, 0.55 ppm, 0.60 ppm, 0.65 ppm, 0.70 ppm, 0.75 ppm, 0.80 ppm, 0.85 ppm, 0.90 ppm, 0.95 ppm, 1 ppm, 5 ppm, 10 ppm, 15 ppm, 20 ppm, 25 ppm, 30 ppm, 35 ppm, 40 ppm, 45 ppm, 50 ppm, 55 ppm, 60 ppm, 65 ppm, 70 ppm, 75 ppm, 80 ppm, 85 ppm, 90 ppm, 95 ppm, 100 ppm, 125 ppm, 150 ppm, 175 ppm, 200 ppm, 225 ppm, 250 ppm, 275 ppm, 300 ppm, 325 ppm, 350 ppm, 375 ppm, 400 ppm, 425 ppm, 450 ppm, 475 ppm, 500 ppm, 525 ppm, 550 ppm, 575 ppm, 600 ppm, 625 ppm, 650 ppm, 675 ppm, 700 ppm, 725 ppm, 750 ppm, 775 ppm, 800 ppm, 825 ppm, 850 ppm, 875 ppm, 900 ppm, 925 ppm, 950 ppm, 975 ppm, 1,000 ppm, 1,025 ppm, 1,050 ppm, 1075 ppm, 1,100 ppm, 1,125 ppm, 1,150 ppm, 1,175 ppm, 1,200 ppm, 1,225 ppm, 1,250 ppm, 1,275 ppm, 1,300 ppm, 1,325 ppm, 1,350 ppm, 1,375 ppm, 1,400 ppm, 1,425 ppm, 1,450 ppm, 1,475 ppm, 1,500 ppm, 1,600 ppm, 1,700 ppm, 1,800 ppm, 1,900 ppm, or 2,000 ppm. In other aspects of this embodiment, a composition disclosed herein comprises a metal salt in an amount of, e.g., at least 0.05 ppm, at least 0.10 ppm, at least 0.20 ppm, at least 0.30 ppm, at least 0.40 ppm, at least 0.50 ppm, at least 0.60 ppm, at least 0.70 ppm, at least 0.80 ppm, at least 0.90 ppm, at least 1 ppm, at least 10 ppm, at least 20 ppm, at least 30 ppm, at least 40 ppm, at least 50 ppm, at least 60 ppm, at least 70 ppm, at least 80 ppm, at least 90 ppm, at least 100 ppm, at least 125 ppm, at least 150 ppm, at least 175 ppm, at least 200 ppm, at least 225 ppm, at least 250 ppm, at least 275 ppm, at least 300 ppm, at least 325 ppm, at least 350 ppm, at least 375 ppm, at least 400 ppm, at least 425 ppm, at least 450 ppm, at least 475 ppm, at least 500 ppm, at least 525 ppm, at least 550 ppm, at least 575 ppm, at least 600 ppm, at least 625 ppm, at least 650 ppm, at least 675 ppm, at least 700 ppm, at least 725 ppm, at least 750 ppm, at least 775 ppm, at least 800 ppm, at least 825 ppm, at least 850 ppm, at least 875 ppm, at least 900 ppm, at least 925 ppm, at least 950 ppm, at least 975 ppm, at least 1,000 ppm, at least 1,025 ppm, at least 1,050 ppm, at least 1075 ppm, at least 1,100 ppm, at least 1,125 ppm, at least 1,150 ppm, at least 1,175 ppm, at least 1,200 ppm, at least 1,225 ppm, at least 1,250 ppm, at least 1,275 ppm, at least 1,300 ppm, at least 1,325 ppm, at least 1,350 ppm, at least 1,375 ppm, at least 1,400 ppm, at least 1,425 ppm, at least 1,450 ppm, at least 1,475 ppm, at least 1,500 ppm, at least 1,600 ppm, at least 1,700 ppm, at least 1,800 ppm, at least 1,900 ppm, or at least 2,000 ppm. In yet other aspects of this embodiment, a composition disclosed herein comprises a metal salt in an amount of, e.g., at most 0.05 ppm, at most 0.10 ppm, at most 0.20 ppm, at most 0.30 ppm, at most 0.40 ppm, at most 0.50 ppm, at most 0.60 ppm, at most 0.70 ppm, at most 0.80 ppm, at most 0.90 ppm, at most 1 ppm, at most 10 ppm, at most 20 ppm, at most 30 ppm, at most 40 ppm, at most 50 ppm, at most 60 ppm, at most 70 ppm, at most 80 ppm, at most 90 ppm, at most 100 ppm, at most 125 ppm, at most 150 ppm, at most 175 ppm, at most 200 ppm, at most 225 ppm, at most 250 ppm, at most 275 ppm, at most 300 ppm, at most 325 ppm, at most 350 ppm, at most 375 ppm, at most 400 ppm, at most 425 ppm, at most 450 ppm, at most 475 ppm, at most 500 ppm, at most 525 ppm, at most 550 ppm, at most 575 ppm, at most 600 ppm, at most 625 ppm, at most 650 ppm, at most 675 ppm, at most 700 ppm, at most 725 ppm, at most 750 ppm, at most 775 ppm, at most 800 ppm, at most 825 ppm, at most 850 ppm, at most 875 ppm, at most 900 ppm, at most 925 ppm, at most 950 ppm, at most 975 ppm, at most 1,000 ppm, at most 1,025 ppm, at most 1,050 ppm, at most 1075 ppm, at most 1,100 ppm, at most 1,125 ppm, at most 1,150 ppm, at most 1,175 ppm, at most 1,200 ppm, at most 1,225 ppm, at most 1,250 ppm, at most 1,275 ppm, at most 1,300 ppm, at most 1,325 ppm, at most 1,350 ppm, at most 1,375 ppm, at most 1,400 ppm, at most 1,425 ppm, at most 1,450 ppm, at most 1,475 ppm, at most 1,500 ppm, at most 1,600 ppm, at most 1,700 ppm, at most 1,800 ppm, at most 1,900 ppm, or at most 2,000 ppm.

In still other aspects of this embodiment, a composition disclosed herein comprises a metal salt in an amount of from, e.g., about 0.5 ppm to about 20 ppm, about 0.5 ppm to about 25 ppm, about 0.5 ppm to about 30 ppm, about 0.5 ppm to about 35 ppm, about 0.5 ppm to about 40 ppm, about 0.5 ppm to about 45 ppm, about 0.5 ppm to about 50 ppm, about 0.5 ppm to about 55 ppm, about 0.5 ppm to about 60 ppm, about 0.5 ppm to about 65 ppm, about 0.5 ppm to about 70 ppm, about 0.5 ppm to about 75 ppm, about 0.5 ppm to about 80 ppm, about 0.5 ppm to about 85 ppm, about 0.5 ppm to about 90 ppm, about 0.5 ppm to about 95 ppm, about 0.5 ppm to about 100 ppm, about 0.75 ppm to about 20 ppm, about 0.75 ppm to about 25 ppm, about 0.75 ppm to about 30 ppm, about 0.75 ppm to about 35 ppm, about 0.75 ppm to about 40 ppm, about 0.75 ppm to about 45 ppm, about 0.75 ppm to about 50 ppm, about 0.75 ppm to about 55 ppm, about 0.75 ppm to about 60 ppm, about 0.75 ppm to about 65 ppm, about 0.75 ppm to about 70 ppm, about 0.75 ppm to about 75 ppm, about 0.75 ppm to about 80 ppm, about 0.75 ppm to about 85 ppm, about 0.75 ppm to about 90 ppm, about 0.75 ppm to about 95 ppm, about 0.75 ppm to about 100 ppm, about 1 ppm to about 20 ppm, about 1 ppm to about 25 ppm, about 1 ppm to about 30 ppm, about 1 ppm to about 35 ppm, about 1 ppm to about 40 ppm, about 1 ppm to about 45 ppm, about 1 ppm to about 50 ppm, about 1 ppm to about 55 ppm, about 1 ppm to about 60 ppm, about 1 ppm to about 65 ppm, about 1 ppm to about 70 ppm, about 1 ppm to about 75 ppm, about 1 ppm to about 80 ppm, about 1 ppm to about 85 ppm, about 1 ppm to about 90 ppm, about 1 ppm to about 95 ppm, about 1 ppm to about 100 ppm, about 5 ppm to about 20 ppm, about 5 ppm to about 25 ppm, about 5 ppm to about 30 ppm, about 5 ppm to about 35 ppm, about 5 ppm to about 40 ppm, about 5 ppm to about 45 ppm, about 5 ppm to about 50 ppm, about 5 ppm to about 55 ppm, about 5 ppm to about 60 ppm, about 5 ppm to about 65 ppm, about 5 ppm to about 70 ppm, about 5 ppm to about 75 ppm, about 5 ppm to about 80 ppm, about 5 ppm to about 85 ppm, about 5 ppm to about 90 ppm, about 5 ppm to about 95 ppm, about 5 ppm to about 100 ppm, about 10 ppm to about 20 ppm, about 10 ppm to about 25 ppm, about 10 ppm to about 30 ppm, about 10 ppm to about 35 ppm, about 10 ppm to about 40 ppm, about 10 ppm to about 45 ppm, about 10 ppm to about 50 ppm, about 10 ppm to about 55 ppm, about 10 ppm to about 60 ppm, about 10 ppm to about 65 ppm, about 10 ppm to about 70 ppm, about 10 ppm to about 75 ppm, about 10 ppm to about 80 ppm, about 10 ppm to about 85 ppm, about 10 ppm to about 90 ppm, about 10 ppm to about 95 ppm, or about 10 ppm to about 100 ppm.

In other aspects of this embodiment, a composition disclosed herein comprises a metal salt in an amount of from, e.g., about 1 ppm to about 25 ppm, about 1 ppm to about 50 ppm, about 1 ppm to about 75 ppm, about 1 ppm to about 100 ppm, about 1 ppm to about 125 ppm, about 1 ppm to about 150 ppm, about 1 ppm to about 175 ppm, about 1 ppm to about 200 ppm, about 1 ppm to about 225 ppm, about 1 ppm to about 250 ppm, about 1 ppm to about 275 ppm, about 1 ppm to about 300 ppm, about 1 ppm to about 325 ppm, about 1 ppm to about 350 ppm, about 1 ppm to about 375 ppm, about 1 ppm to about 400 ppm, about 10 ppm to about 25 ppm, about 10 ppm to about 50 ppm, about 10 ppm to about 75 ppm, about 10 ppm to about 100 ppm, about 10 ppm to about 125 ppm, about 10 ppm to about 150 ppm, about 10 ppm to about 175 ppm, about 10 ppm to about 200 ppm, about 10 ppm to about 225 ppm, about 10 ppm to about 250 ppm, about 10 ppm to about 275 ppm, about 10 ppm to about 300 ppm, about 10 ppm to about 325 ppm, about 10 ppm to about 350 ppm, about 10 ppm to about 375 ppm, about 10 ppm to about 400 ppm, about 25 ppm to about 50 ppm, about 25 ppm to about 75 ppm, about 25 ppm to about 100 ppm, about 25 ppm to about 125 ppm, about 25 ppm to about 150 ppm, about 25 ppm to about 175 ppm, about 25 ppm to about 200 ppm, about 25 ppm to about 225 ppm, about 25 ppm to about 250 ppm, about 25 ppm to about 275 ppm, about 25 ppm to about 300 ppm, about 25 ppm to about 325 ppm, about 25 ppm to about 350 ppm, about 25 ppm to about 375 ppm, about 25 ppm to about 400 ppm, about 50 ppm to about 75 ppm, about 50 ppm to about 100 ppm, about 50 ppm to about 125 ppm, about 50 ppm to about 150 ppm, about 50 ppm to about 175 ppm, about 50 ppm to about 200 ppm, about 50 ppm to about 225 ppm, about 50 ppm to about 250 ppm, about 50 ppm to about 275 ppm, about 50 ppm to about 300 ppm, about 50 ppm to about 325 ppm, about 50 ppm to about 350 ppm, about 50 ppm to about 375 ppm, about 50 ppm to about 400 ppm, about 75 ppm to about 100 ppm, about 75 ppm to about 125 ppm, about 75 ppm to about 150 ppm, about 75 ppm to about 175 ppm, about 75 ppm to about 200 ppm, about 75 ppm to about 225 ppm, about 75 ppm to about 250 ppm, about 75 ppm to about 275 ppm, about 75 ppm to about 300 ppm, about 75 ppm to about 325 ppm, about 75 ppm to about 350 ppm, about 75 ppm to about 375 ppm, about 75 ppm to about 400 ppm, about 100 ppm to about 125 ppm, about 100 ppm to about 150 ppm, about 100 ppm to about 175 ppm, about 100 ppm to about 200 ppm, about 100 ppm to about 225 ppm, about 100 ppm to about 250 ppm, about 100 ppm to about 275 ppm, about 100 ppm to about 300 ppm, about 100 ppm to about 325 ppm, about 100 ppm to about 350 ppm, about 100 ppm to about 375 ppm, about 100 ppm to about 400 ppm, about 150 ppm to about 175 ppm, about 150 ppm to about 200 ppm, about 150 ppm to about 225 ppm, about 150 ppm to about 250 ppm, about 150 ppm to about 275 ppm, about 150 ppm to about 300 ppm, about 150 ppm to about 325 ppm, about 150 ppm to about 350 ppm, about 150 ppm to about 375 ppm, about 150 ppm to about 400 ppm, about 200 ppm to about 225 ppm, about 200 ppm to about 250 ppm, about 200 ppm to about 275 ppm, about 200 ppm to about 300 ppm, about 200 ppm to about 325 ppm, about 200 ppm to about 350 ppm, about 200 ppm to about 375 ppm, about 200 ppm to about 400 ppm, about 250 ppm to about 275 ppm, about 250 ppm to about 300 ppm, about 250 ppm to about 325 ppm, about 250 ppm to about 350 ppm, about 250 ppm to about 375 ppm, about 250 ppm to about 400 ppm, about 300 ppm to about 325 ppm, about 300 ppm to about 350 ppm, about 300 ppm to about 375 ppm, about 300 ppm to about 400 ppm, about 350 ppm to about 375 ppm, about 350 ppm to about 400 ppm, or about 375 ppm to about 400 ppm.

In other aspects of this embodiment, a composition disclosed herein comprises a metal salt in an amount of, e.g., about 400 ppm to about 500 ppm, about 400 ppm to about 600 ppm, about 400 ppm to about 700 ppm, about 400 ppm to about 800 ppm, about 400 ppm to about 900 ppm, about 400 ppm to about 1,000 ppm, about 400 ppm to about 1,100 ppm, about 400 ppm to about 1,200 ppm, about 400 ppm to about 1,300 ppm, about 400 ppm to about 1,400 ppm, about 400 ppm to about 1,500 ppm, about 400 ppm to about 1,600 ppm, about 400 ppm to about 1,700 ppm, about 400 ppm to about 1,800 ppm, about 400 ppm to about 1,900 ppm, about 400 ppm to about 2,000 ppm, about 500 ppm to about 600 ppm, about 500 ppm to about 700 ppm, about 500 ppm to about 800 ppm, about 500 ppm to about 900 ppm, about 500 ppm to about 1,000 ppm, about 500 ppm to about 1,100 ppm, about 500 ppm to about 1,200 ppm, about 500 ppm to about 1,300 ppm, about 500 ppm to about 1,400 ppm, about 500 ppm to about 1,500 ppm, about 500 ppm to about 1,600 ppm, about 500 ppm to about 1,700 ppm, about 500 ppm to about 1,800 ppm, about 500 ppm to about 1,900 ppm, about 500 ppm to about 2,000 ppm, about 600 ppm to about 700 ppm, about 600 ppm to about 800 ppm, about 600 ppm to about 900 ppm, about 600 ppm to about 1,000 ppm, about 600 ppm to about 1,100 ppm, about 600 ppm to about 1,200 ppm, about 600 ppm to about 1,300 ppm, about 600 ppm to about 1,400 ppm, about 600 ppm to about 1,500 ppm, about 600 ppm to about 1,600 ppm, about 600 ppm to about 1,700 ppm, about 600 ppm to about 1,800 ppm, about 600 ppm to about 1,900 ppm, about 600 ppm to about 2,000 ppm, about 700 ppm to about 800 ppm, about 700 ppm to about 900 ppm, about 700 ppm to about 1,000 ppm, about 700 ppm to about 1,100 ppm, about 700 ppm to about 1,200 ppm, about 700 ppm to about 1,300 ppm, about 700 ppm to about 1,400 ppm, about 700 ppm to about 1,500 ppm, about 700 ppm to about 1,600 ppm, about 700 ppm to about 1,700 ppm, about 700 ppm to about 1,800 ppm, about 700 ppm to about 1,900 ppm, about 700 ppm to about 2,000 ppm, about 800 ppm to about 900 ppm, about 800 ppm to about 1,000 ppm, about 800 ppm to about 1,100 ppm, about 800 ppm to about 1,200 ppm, about 800 ppm to about 1,300 ppm, about 800 ppm to about 1,400 ppm, about 800 ppm to about 1,500 ppm, about 800 ppm to about 1,600 ppm, about 800 ppm to about 1,700 ppm, about 800 ppm to about 1,800 ppm, about 800 ppm to about 1,900 ppm, about 800 ppm to about 2,000 ppm, about 900 ppm to about 1,000 ppm, about 900 ppm to about 1,100 ppm, about 900 ppm to about 1,200 ppm, about 900 ppm to about 1,300 ppm, about 900 ppm to about 1,400 ppm, about 900 ppm to about 1,500 ppm, about 900 ppm to about 1,600 ppm, about 900 ppm to about 1,700 ppm, about 900 ppm to about 1,800 ppm, about 900 ppm to about 1,900 ppm, about 900 ppm to about 2,000 ppm, about 1,000 ppm to about 1,100 ppm, about 1,000 ppm to about 1,200 ppm, about 1,000 ppm to about 1,300 ppm, about 1,000 ppm to about 1,400 ppm, about 1,000 ppm to about 1,500 ppm, about 1,000 ppm to about 1,600 ppm, about 1,000 ppm to about 1,700 ppm, about 1,000 ppm to about 1,800 ppm, about 1,000 ppm to about 1,900 ppm, about 1,000 ppm to about 2,000 ppm, about 1,100 ppm to about 1,200 ppm, about 1,100 ppm to about 1,300 ppm, about 1,100 ppm to about 1,400 ppm, about 1,100 ppm to about 1,500 ppm, about 1,100 ppm to about 1,600 ppm, about 1,100 ppm to about 1,700 ppm, about 1,100 ppm to about 1,800 ppm, about 1,100 ppm to about 1,900 ppm, about 1,100 ppm to about 2,000 ppm, about 1,200 ppm to about 1,300 ppm, about 1,200 ppm to about 1,400 ppm, about 1,200 ppm to about 1,500 ppm, about 1,200 ppm to about 1,600 ppm, about 1,200 ppm to about 1,700 ppm, about 1,200 ppm to about 1,800 ppm, about 1,200 ppm to about 1,900 ppm, about 1,200 ppm to about 2,000 ppm, about 1,300 ppm to about 1,400 ppm, about 1,300 ppm to about 1,500 ppm, about 1,300 ppm to about 1,600 ppm, about 1,300 ppm to about 1,700 ppm, about 1,300 ppm to about 1,800 ppm, about 1,300 ppm to about 1,900 ppm, about 1,300 ppm to about 2,000 ppm, about 1,400 ppm to about 1,500 ppm, about 1,400 ppm to about 1,600 ppm, about 1,400 ppm to about 1,700 ppm, about 1,400 ppm to about 1,800 ppm, about 1,400 ppm to about 1,900 ppm, about 1,400 ppm to about 2,000 ppm, about 1,500 ppm to about 1,600 ppm, about 1,500 ppm to about 1,700 ppm, about 1,500 ppm to about 1,800 ppm, about 1,500 ppm to about 1,900 ppm, about 1,500 ppm to about 2,000 ppm, about 1,600 ppm to about 1,700 ppm, about 1,600 ppm to about 1,800 ppm, about 1,600 ppm to about 1,900 ppm, about 1,600 ppm to about 2,000 ppm, about 1,700 ppm to about 1,800 ppm, about 1,700 ppm to about 1,900 ppm, about 1,700 ppm to about 2,000 ppm, about 1,800 ppm to about 1,900 ppm, about 1,800 ppm to about 2,000 ppm, or about 1,900 ppm to about 2,000 ppm.

In aspects of this embodiment, a composition disclosed herein comprises a metal salt in an amount of, e.g., about 0.10%, about 0.11%, about 0.12%, about 0.13%, about 0.14%, about 0.15%, about 0.16%, about 0.17%, about 0.18%, about 0.19%, about 0.2%, about 0.25%, about 0.3%, about 0.35%, about 0.4%, about 0.45%, or about 0.5% by weight of the composition. In other aspects of this embodiment, a composition disclosed herein comprises a metal salt in an amount of, e.g., at least 0.10%, at least 0.11%, at least 0.12%, at least 0.13%, at least 0.14%, at least 0.15%, at least 0.16%, at least 0.17%, at least 0.18%, at least 0.19%, at least 0.2%, at least 0.25%, at least 0.3%, at least 0.35%, at least 0.4%, at least 0.45%, or at least 0.5% by weight of the composition. In yet other aspects of this embodiment, a composition disclosed herein comprises a metal salt in an amount of, e.g., at most 0.10%, at most 0.11%, at most 0.12%, at most 0.13%, at most 0.14%, at most 0.15%, at most 0.16%, at most 0.17%, at most 0.18%, at most 0.19%, at most 0.2%, at most 0.25%, at most 0.3%, at most 0.35%, at most 0.4%, at most 0.45%, or at most 0.5% by weight of the composition. In still other aspects of this embodiment, a composition disclosed herein comprises a metal salt in an amount of, e.g., about 0.10% to about 0.15%, about 0.10% to about 0.20%, about 0.10% to about 0.25%, about 0.10% to about 0.30%, about 0.10% to about 0.35%, about 0.10% to about 0.40%, about 0.10% to about 0.45%, about 0.10% to about 0.50%, about 0.20% to about 0.25%, about 0.20% to about 0.30%, about 0.20% to about 0.35%, about 0.20% to about 0.40%, about 0.20% to about 0.45%, about 0.20% to about 0.50%, about 0.30% to about 0.35%, about 0.30% to about 0.40%, about 0.30% to about 0.45%, about 0.30% to about 0.50%, about 0.40% to about 0.45%, about 0.40% to about 0.50%, or about 0.40% to about 0.50% by weight of the composition.

In an embodiment, a composition disclosed herein does not comprise metal salts.

A composition disclosed herein may comprise a carrier. A carrier, also known as a vehicle, can be any material typically known in the skin care, cosmetic and medical arts that is used as a base to formulate a composition disclosed herein. A carrier may be an aqueous carrier, a semi-solid carrier or a solid carrier. A carrier can also provide a skin care benefit as disclosed herein. A carrier includes, without limitation, water, a vegetable oil, a mineral oil, an ester oil, an ether, an alcohol, a fatty alcohol, an isoparaffin, a hydrocarbon oil, a polyol, and a wax. Non-limiting examples of an ester oil include octal palmitate, isopropyl myristate and isopropyl palmitate. Non-limiting examples of an ether includes dicapryl ether and dimethyl isosorbide. Non-limiting examples of an alcohol includes ethanol and isopropanol. Non-limiting examples of a fatty alcohol include cetyl alcohol, cetearyl alcohol, stearyl alcohol and behenyl alcohol. Non-limiting examples of an isoparaffin include isooctane, isododecane (IDD) and isohexadecane. Non-limiting examples of a hydrocarbon oil include mineral oil, petrolatum, isoeicosane and a polyolefin, including (hydrogenated) polyisobutene. Non-limiting examples of a polyol include propylene glycol, glycerin, butylene glycol, pentylene glycol, hexylene glycol, caprylyl glycol. Non-limiting examples of a wax include beeswax, carnauba, ozokerite, microcrystalline wax, polyethylene wax, and a botanical wax.

In one embodiment, a single carrier is present in a composition disclosed herein. In another embodiment, a plurality of carriers is present in a composition disclosed herein. In aspects of this embodiment, a composition disclosed herein comprises, e.g., one or more carriers, two or more carriers, three or more carriers, four or more carriers or five or more carriers. In other aspects of this embodiment, a composition disclosed herein comprises, e.g., only one carrier, at most two carriers, at most three carriers, at most four carriers, or at most five carriers. In yet other aspects of this embodiment, a composition disclosed herein comprises from, e.g., 1 to 2 carriers, 1 to 3 carriers, 1 to 4 carriers, 1 to 5 carriers, 2 to 3 carriers, 2 to 4 carriers, 2 to 5 carriers, 3 to 4 carriers, 3 to 5 carriers or 4 to 5 carriers.

In another embodiment, a composition disclosed herein comprises an amount of carrier that provides a desired formulative or beneficial effect to a composition disclosed herein. In aspects of this embodiment, a composition disclosed herein comprises a carrier in an amount of, e.g., at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 96%, at least 97%, at least 98% or at least 99% by weight of the composition. In other aspects of this embodiment, a composition disclosed herein comprises a carrier in an amount of, e.g., at most 5%, at most 10%, at most 15%, at most 20%, at most 25%, at most 30%, at most 35%, at most 40%, at most 45%, at most 50%, at most 55%, at most 60%, at most 65%, at most 70%, at most 75%, at most 80%, at most 85%, at most 90%, at most 95%, at most 96%, at most 97%, at most 98% or at most 99% by weight of the composition. In yet other aspects of this embodiment, a composition disclosed herein comprises a carrier in an amount of from, e.g., about 5% to about 25%, about 5% to about 50%, about 5% to about 75%, about 5% to about 90%, about 5% to about 95%, about 5% to about 96%, about 5% to about 97%, about 5% to about 98%, about 5% to about 99%, about 25% to about 50%, about 25% to about 75%, about 25% to about 90%, about 25% to about 95%, about 25% to about 96%, about 25% to about 97%, about 25% to about 98%, about 25% to about 99%, about 50% to about 75%, about 50% to about 90%, about 50% to about 95%, about 50% to about 96%, about 50% to about 97%, about 50% to about 98%, about 50% to about 99%, about 75% to about 80%, about 75% to about 85%, about 75% to about 90%, about 75% to about 95%, about 75% to about 96%, about 75% to about 97%, about 75% to about 98%, about 75% to about 99%, about 80% to about 85%, about 80% to about 90%, about 80% to about 95%, about 80% to about 96%, about 80% to about 97%, about 80% to about 98%, about 80% to about 99%, about 85% to about 90%, about 85% to about 95%, about 85% to about 96%, about 85% to about 97%, about 85% to about 98%, about 85% to about 99%, about 90% to about 95%, about 90% to about 96%, about 90% to about 97%, about 90% to about 98%, about 90% to about 99%, or about 95% to about 99%, by weight of the composition.

In another embodiment, a composition disclosed herein comprises a carrier which is not an alcohol. In aspects of this embodiment, when a composition disclosed herein comprises hypochlorous acid or free available chlorine, then the composition may comprise a carrier where the carrier is not an alcohol.

A composition disclosed herein may further optionally include additional ingredients. An additional ingredient is one known to be useful in finishing a composition disclosed herein. An additional ingredient includes, without limitation, a hydrophilic clay, a disinfectant, an antiseptic, a surfactant, a preservative, or a chelating agent. An additional ingredient disclosed herein is known in the art.

A hydrophilic clay is a synthetic or naturally-occurring smectic clay that forms three-dimensional collodal structures when hydrated leading to increased viscosity and improved suspension control components in a composition. A hydrophilic clay includes hydrous phyllosilicate clays. A hydrophilic clay can have thixotrophic properties. Non-limiting examples of a hydrophilic clay include a bentonite clay, a hectorite clay, a kaolinite clay, and a silicate clay. A bentonite clay is a phyllosilicate clay and includes, without limitation, a potassium bentonite clay, a sodium bentonite clay, a calcium bentonite clay, and an aluminum bentonite clay. A hectorite clay is a phyllosilicate clay and includes those commercially sold as the BENTONE® product line, including hectorite clay (BENTONE® EW), hectorite clay (BENTONE® MA), and hectorite clay and hydroxy ethyl cellulose (BENTONE® LT). A kaolinite clay is a phyllosilicate clay. A silicate clay is a synthetic layered silicate clay and includes those commercially sold as the LAPONITE® product line, including lithium magnesium sodium silicate (LAPONITE® XLG), lithium magnesium sodium silicate and tetrasodium pyrophosphate (LAPONITE® XLS), sodium magnesium fluorosilicate (LAPONITE® XL), and sodium magnesium fluorosilicate (LAPONITE® XL21).

In one embodiment, a single hydrophilic clay is present in a composition disclosed herein. In another embodiment, a plurality of hydrophilic clays is present in a composition disclosed herein. In aspects of this embodiment, a composition disclosed herein comprises, e.g., one or more hydrophilic clays, two or more hydrophilic clays, three or more hydrophilic clays, four or more hydrophilic clays or five or more hydrophilic clays. In other aspects of this embodiment, a composition disclosed herein comprises, e.g., only one hydrophilic clay, at most two hydrophilic clays, at most three hydrophilic clays, at most four hydrophilic clays, or at most five hydrophilic clays. In yet other aspects of this embodiment, a composition disclosed herein comprises from, e.g., 1 to 2 hydrophilic clays, 1 to 3 hydrophilic clays, 1 to 4 hydrophilic clays, 1 to 5 hydrophilic clays, 2 to 3 hydrophilic clays, 2 to 4 hydrophilic clays, 2 to 5 hydrophilic clays, 3 to 4 hydrophilic clays, 3 to 5 hydrophilic clays or 4 to 5 hydrophilic clays.

In another embodiment, a composition disclosed herein comprises an amount of a hydrophilic clay that provides a desired beneficial effect to a composition disclosed herein. In aspects of this embodiment, a composition disclosed herein comprises a hydrophilic clay in an amount of, e.g., 0.01%, 0.025%, 0.05%, 0.075%, 0.1%, 0.2%, 0.25%, 0.3%, 0.4%, 0.5%, 0.6%, 0.7%, 0.75%, 0.8%, 0.9%, 1%, 2%, 3%, 4%, 5%, 6%, 7%, 8%. 9%, or 10% by weight of the composition. In other aspects of this embodiment, a composition disclosed herein comprises a hydrophilic clay in an amount of, e.g., at least 0.01%, at least 0.025%, at least 0.05%, at least 0.075%, at least 0.1%, at least 0.25%, at least 0.5%, at least 0.75%, at least 1%, at least 2%, at least 3%, at least 4%, at least 5%, at least 6%, at least 7%, at least 8%, at least 9%, or at least 10% by weight of the composition. In yet other aspects of this embodiment, a composition disclosed herein comprises a hydrophilic clay in an amount of, e.g., at most 0.01%, at most 0.025%, at most 0.05%, at most 0.075%, at most 0.1%, at most 0.25%, at most 0.5%, at most 0.75%, at most 1%, at most 2%, at most 3%, at most 4%, at most 5%, at most 6%, at most 7%, at most 8%, at most 9%, or at most 10% by weight of the composition.

In still other aspects of this embodiment, a composition disclosed herein comprises a hydrophilic clay in an amount of from, e.g., about 0.01% to about 0.05%, 0.01% to about 0.075%, about 0.01% to about 0.1%, about 0.1% to about 0.5%, about 0.1% to about 0.75%, about 0.1% to about 1%, about 0.1% to about 2%, about 0.1% to about 3%, about 0.1% to about 4%, about 0.1% to about 5%, about 0.1% to about 6%, about 0.1% to about 7%, about 0.1% to about 8%, about 0.1% to about 9%, about 0.1% to about 10%, about 0.25% to about 0.5%, about 0.25% to about 0.75%, about 0.25% to about 1%, about 0.25% to about 2%, about 0.25% to about 3%, about 0.25% to about 4%, about 0.25% to about 5%, about 0.25% to about 6%, about 0.25% to about 7%, about 0.25% to about 8%, about 0.25% to about 9%, about 0.25% to about 10%, about 0.5% to about 0.75%, about 0.5% to about 1%, about 0.5% to about 2%, about 0.5% to about 3%, about 0.5% to about 4%, about 0.5% to about 5%, about 0.5% to about 6%, about 0.5% to about 7%, about 0.5% to about 8%, about 0.5% to about 9%, about 0.5% to about 10%, about 0.75% to about 1%, about 0.75% to about 2%, about 0.75% to about 3%, about 0.75% to about 4%, about 0.75% to about 5%, about 0.75% to about 6%, about 0.75% to about 7%, about 0.75% to about 8%, about 0.75% to about 9%, about 0.75% to about 10%, about 1% to about 2%, about 1% to about 3%, about 1% to about 4%, about 1% to about 5%, about 1% to about 6%, about 1% to about 7%, about 1% to about 8%, about 1% to about 9%, about 1% to about 10%, about 2% to about 3%, about 2% to about 4%, about 2% to about 5%, about 2% to about 6%, about 2% to about 7%, about 2% to about 8%, about 2% to about 9%, about 2% to about 10%, about 3% to about 4%, about 3% to about 5%, about 3% to about 6%, about 3% to about 7%, about 3% to about 8%, about 3% to about 9%, about 3% to about 10%, about 4% to about 5%, about 4% to about 6%, about 4% to about 7%, about 4% to about 8%, about 4% to about 9%, about 4% to about 10%, about 5% to about 6%, about 5% to about 7%, about 5% to about 8%, about 5% to about 9%, about 5% to about 10%, about 6% to about 7%, about 6% to about 8%, about 6% to about 9%, about 6% to about 10%, about 7% to about 8%, about 7% to about 9%, about 7% to about 10%, about 8% to about 9%, about 8% to about 10% or about 9% to about 10% by weight of the composition.

In another embodiment, a composition disclosed herein comprises an amount of a silicate clay that provides a desired beneficial effect to a composition disclosed herein. In aspects of this embodiment, a composition disclosed herein comprises a silicate clay in an amount of, e.g., 0.001%, 0.0025%, 0.005%, 0.0075%, 0.01%, 0.025%, 0.05%, 0.075%, 0.1%, 0.2%, 0.25%, 0.3%, 0.4%, 0.5%, 0.6%, 0.7%, 0.75%, 0.8%, 0.9%, 1%, 2%, 3%, 4%, 5%, 6%, 7%, 8%. 9%, or 10% by weight of the composition. In other aspects of this embodiment, a composition disclosed herein comprises a silicate clay in an amount of, e.g., at least 0.001%, at least 0.0025%, at least 0.005%, at least 0.0075%, at least 0.01%, at least 0.025%, at least 0.05%, at least 0.075%, at least 0.1%, at least 0.25%, at least 0.5%, at least 0.75%, at least 1%, at least 2%, at least 3%, at least 4%, at least 5%, at least 6%, at least 7%, at least 8%, at least 9%, or at least 10% by weight of the composition. In yet other aspects of this embodiment, a composition disclosed herein comprises a silicate clay in an amount of, e.g., at most 0.001%, at most 0.0025%, at most 0.005%, at most 0.0075%, at most 0.01%, at most 0.025%, at most 0.05%, at most 0.075%, at most 0.1%, at most 0.25%, at most 0.5%, at most 0.75%, at most 1%, at most 2%, at most 3%, at most 4%, at most 5%, at most 6%, at most 7%, at most 8%, at most 9%, or at most 10% by weight of the composition.

In still other aspects of this embodiment, a composition disclosed herein comprises a silicate clay in an amount of from, e.g., about 0.001% to about 0.005%, 0.001% to about 0.0075%, about 0.001% to about 0.01%, about 0.001% to about 0.05%, about 0.001% to about 0.075%, about 0.001% to about 0.1%, about 0.001% to about 0.25%, about 0.001% to about 0.5%, about 0.001% to about 0.75%, about 0.005% to about 0.0075%, about 0.005% to about 0.01%, about 0.005% to about 0.05%, about 0.005% to about 0.075%, about 0.005% to about 0.1%, about 0.005% to about 0.25%, about 0.005% to about 0.5%, about 0.005% to about 0.75%, about 0.01% to about 0.05%, 0.01% to about 0.075%, about 0.01% to about 0.1%, about 0.1% to about 0.5%, about 0.1% to about 0.75%, about 0.1% to about 1%, about 0.1% to about 2%, about 0.1% to about 3%, about 0.1% to about 4%, about 0.1% to about 5%, about 0.1% to about 6%, about 0.1% to about 7%, about 0.1% to about 8%, about 0.1% to about 9%, about 0.1% to about 10%, about 0.25% to about 0.5%, about 0.25% to about 0.75%, about 0.25% to about 1%, about 0.25% to about 2%, about 0.25% to about 3%, about 0.25% to about 4%, about 0.25% to about 5%, about 0.25% to about 6%, about 0.25% to about 7%, about 0.25% to about 8%, about 0.25% to about 9%, about 0.25% to about 10%, about 0.5% to about 0.75%, about 0.5% to about 1%, about 0.5% to about 2%, about 0.5% to about 3%, about 0.5% to about 4%, about 0.5% to about 5%, about 0.5% to about 6%, about 0.5% to about 7%, about 0.5% to about 8%, about 0.5% to about 9%, about 0.5% to about 10%, about 0.75% to about 1%, about 0.75% to about 2%, about 0.75% to about 3%, about 0.75% to about 4%, about 0.75% to about 5%, about 0.75% to about 6%, about 0.75% to about 7%, about 0.75% to about 8%, about 0.75% to about 9%, about 0.75% to about 10%, about 1% to about 2%, about 1% to about 3%, about 1% to about 4%, about 1% to about 5%, about 1% to about 6%, about 1% to about 7%, about 1% to about 8%, about 1% to about 9%, about 1% to about 10%, about 2% to about 3%, about 2% to about 4%, about 2% to about 5%, about 2% to about 6%, about 2% to about 7%, about 2% to about 8%, about 2% to about 9%, about 2% to about 10%, about 3% to about 4%, about 3% to about 5%, about 3% to about 6%, about 3% to about 7%, about 3% to about 8%, about 3% to about 9%, about 3% to about 10%, about 4% to about 5%, about 4% to about 6%, about 4% to about 7%, about 4% to about 8%, about 4% to about 9%, about 4% to about 10%, about 5% to about 6%, about 5% to about 7%, about 5% to about 8%, about 5% to about 9%, about 5% to about 10%, about 6% to about 7%, about 6% to about 8%, about 6% to about 9%, about 6% to about 10%, about 7% to about 8%, about 7% to about 9%, about 7% to about 10%, about 8% to about 9%, about 8% to about 10% or about 9% to about 10% by weight of the composition.

A preservative preserves the stability of a composition disclosed herein. A preservative can also prevent the growth of microbial organisms in a composition disclosed herein. Non-limiting examples of a preservative include methylparaben, phenoxyethanol, capryl glycol, glyceryl caprylate, benzoic acid, sorbic acid, gallic acid, and propylparaben.

A composition disclosed herein may be adjusted to any pH that enables a composition disclosed herein to achieve a desired beneficial effect. In aspects of this embodiment, the pH of a composition disclosed herein is, e.g., at least 2, at least 3, at least 4, at least 5, at least 6, at least 7, at least 8, at least 9, at least 10, or at least 11. In other aspects of this embodiment, the pH of a composition disclosed herein is, e.g., at most 2, at most 3, at most 4, at most 5, at most 6, at most 7, at most 8, at most 9, at most 10, or at most 11.

In yet other aspects of this embodiment, the pH of a composition disclosed herein is between, e.g., about 2 to about 5, about 2 to about 5.5, about 2 to about 6, about 2 to about 6.5, about 2 to about 7, about 2 to about 7.5, about 2 to about 8, about 2 to about 8.5, about 2 to about 9, about 2.5 to about 5, about 2.5 to about 5.5, about 2.5 to about 6, about 2.5 to about 6.5, about 2.5 to about 7, about 2.5 to about 7.5, about 2.5 to about 8, about 2.5 to about 8.5, about 2.5 to about 9, about 3 to about 5, about 3 to about 5.5, about 3 to about 6, about 3 to about 6.5, about 3 to about 7, about 3 to about 7.5, about 3 to about 8, about 3 to about 8.5, about 3 to about 9, about 3.5 to about 5, about 3.5 to about 5.5, about 3.5 to about 6, about 3.5 to about 6.5, about 3.5 to about 7, about 3.5 to about 7.5, about 3.5 to about 8, about 3.5 to about 8.5, about 3.5 to about 9, about 4 to about 5, about 4 to about 5.5, about 4 to about 6, about 4 to about 6.5, about 4 to about 7, about 4 to about 7.5, about 4 to about 8, about 4 to about 8.5, about 4 to about 9, about 4.5 to about 5, about 4.5 to about 5.5, about 4.5 to about 6, about 4.5 to about 6.5, about 4.5 to about 7, about 4.5 to about 7.5, about 4.5 to about 8, about 4.5 to about 8.5, about 4.5 to about 9, about 5 to about 5.5, about 5 to about 6, about 5 to about 6.5, about 5 to about 7, about 5 to about 7.5, about 5 to about 8, about 5 to about 8.5, about 5 to about 9, about 5.5 to about 6, about 5.5 to about 6.5, about 5.5 to about 7, about 5.5 to about 7.5, about 5.5 to about 8, about 5.5 to about 8.5, about 5.5 to about 9, about 6 to about 6.5, about 6 to about 7, about 6 to about 7.5, about 6 to about 8, about 6 to about 8.5, about 6 to about 9, about 6.5 to about 7, about 6.5 to about 7.5, about 6.5 to about 8, about 6.5 to about 8.5, about 6.5 to about 9, about 7 to about 7.5, about 7 to about 8, about 7 to about 8.5, about 7 to about 9, about 7.5 to about 8, about 7.5 to about 8.5, about 7.5 to about 9, about 8 to about 8.5, about 8 to about 9, or about 8.5 to about 9.

A composition disclosed herein is resistant to inactivation when exposed to a bodily fluid. A bodily fluid is one containing charged molecules and includes, without limitation, blood, and a blood byproduct like plasma and serum. In one embodiment, a composition disclosed herein is resistant to inactivation when it shows, e.g., at most 1% inactivation, at most 2% inactivation, at most 3% inactivation, at most 4% inactivation, at most 5% inactivation, at most 6% inactivation, at most 7% inactivation, at most 8% inactivation, at most 9% inactivation, or at most 10% inactivation upon exposure to a bodily fluid. In another embodiment, a composition disclosed herein is resistant to inactivation when it shows, e.g., at most 10% inactivation, at most 15% inactivation, at most 20% inactivation, at most 25% inactivation, at most 30% inactivation, at most 35% inactivation, at most 40% inactivation, at most 45% inactivation, at most 50% inactivation upon exposure to a bodily fluid. In another embodiment, a composition disclosed herein is resistant to inactivation when it shows, e.g., about 1% to about 10% inactivation, about 1% to about 20% inactivation, about 1% to about 30% inactivation, about 1% to about 40% inactivation, about 1% to about 50% inactivation, about 5% to about 10% inactivation, about 5% to about 20% inactivation, about 5% to about 30% inactivation, about 5% to about 40% inactivation, about 5% to about 50% inactivation, about 10% to about 20% inactivation, about 10% to about 30% inactivation, about 10% to about 40% inactivation, about 10% to about 50% inactivation, 20% to about 30% inactivation, about 20% to about 40% inactivation, about 20% to about 50% inactivation, about 30% to about 40% inactivation, about 30% to about 50% inactivation, or about 40% to about 50% inactivation upon exposure to a bodily fluid.

In one embodiment, a composition disclosed herein is resistant to inactivation when it shows, e.g., at most 1% degradation, at most 2% degradation, at most 3% degradation, at most 4% degradation, at most 5% degradation, at most 6% degradation, at most 7% degradation, at most 8% degradation, at most 9% degradation, or at most 10% degradation of hypochlorous acid upon exposure to a bodily fluid. In another embodiment, a composition disclosed herein is resistant to inactivation when it shows, e.g., at most 10% degradation, at most 15% degradation, at most 20% degradation, at most 25% degradation, at most 30% degradation, at most 35% degradation, at most 40% degradation, at most 45% degradation, at most 50% degradation of hypochlorous acid upon exposure to a bodily fluid. In another embodiment, a composition disclosed herein is resistant to inactivation when it shows, e.g., about 1% to about 10% degradation, about 1% to about 20% degradation, about 1% to about 30% degradation, about 1% to about 40% degradation, about 1% to about 50% degradation, about 5% to about 10% degradation, about 5% to about 20% degradation, about 5% to about 30% degradation, about 5% to about 40% degradation, about 5% to about 50% degradation, about 10% to about 20% degradation, about 10% to about 30% degradation, about 10% to about 40% degradation, about 10% to about 50% degradation, 20% to about 30% degradation, about 20% to about 40% degradation, about 20% to about 50% degradation, about 30% to about 40% degradation, about 30% to about 50% degradation, or about 40% to about 50% degradation of hypochlorous acid upon exposure to a bodily fluid.

A composition disclosed herein is stable. In one embodiment, a composition disclosed herein is stable when it shows, e.g., at most 1% degradation, at most 2% degradation, at most 3% degradation, at most 4% degradation, at most 5% degradation, at most 6% degradation, at most 7% degradation, at most 8% degradation, at most 9% degradation, or at most 10% degradation of hypochlorous acid. In another embodiment, a composition disclosed herein is stable when it shows, e.g., at most 10% degradation, at most 15% degradation, at most 20% degradation, at most 25% degradation, at most 30% degradation, at most 35% degradation, at most 40% degradation, at most 45% degradation, at most 50% degradation, at most 55% degradation, at most 60% degradation, at most 65% degradation, at most 70% degradation, at most 75% degradation, at most 80% degradation, at most 85% degradation, at most 90% degradation, or at most 95% degradation of hypochlorous acid. In another embodiment, a composition disclosed herein is stable when it shows, e.g., about 1% to about 10% degradation, about 1% to about 20% degradation, about 1% to about 30% degradation, about 1% to about 40% degradation, about 1% to about 50% degradation, about 1% to about 60% degradation, about 1% to about 70% degradation, about 1% to about 80% degradation, about 1% to about 90% degradation, about 1% to about 95% degradation, about 5% to about 10% degradation, about 5% to about 20% degradation, about 5% to about 30% degradation, about 5% to about 40% degradation, about 5% to about 50% degradation, about 5% to about 60% degradation, about 5% to about 70% degradation, about 5% to about 80% degradation, about 5% to about 90% degradation, about 5% to about 95% degradation, about 10% to about 20% degradation, about 10% to about 30% degradation, about 10% to about 40% degradation, about 10% to about 50% degradation, about 10% to about 60% degradation, about 10% to about 70% degradation, about 10% to about 80% degradation, about 10% to about 90% degradation, about 10% to about 95% degradation, 20% to about 30% degradation, about 20% to about 40% degradation, about 20% to about 50% degradation, about 20% to about 60% degradation, about 20% to about 70% degradation, about 20% to about 80% degradation, about 20% to about 90% degradation, about 20% to about 95% degradation, about 30% to about 40% degradation, about 30% to about 50% degradation, about 30% to about 60% degradation, about 30% to about 70% degradation, about 30% to about 80% degradation, about 30% to about 90% degradation, about 30% to about 95% degradation, about 40% to about 50% degradation, about 40% to about 60% degradation, about 40% to about 70% degradation, about 40% to about 80% degradation, about 40% to about 90% degradation, about 40% to about 95% degradation, about 50% to about 60% degradation, about 50% to about 70% degradation, about 50% to about 80% degradation, about 50% to about 90% degradation, about 50% to about 95% degradation, about 60% to about 70% degradation, about 60% to about 80% degradation, about 60% to about 90% degradation, about 60% to about 95% degradation, about 70% to about 80% degradation, about 70% to about 90% degradation, about 70% to about 95% degradation, about 80% to about 90% degradation, about 80% to about 95% degradation, or about 90% to about 95% degradation of hypochlorous acid.

In one embodiment, a composition disclosed herein is stable when it shows, e.g., at most 1% degradation, at most 2% degradation, at most 3% degradation, at most 4% degradation, at most 5% degradation, at most 6% degradation, at most 7% degradation, at most 8% degradation, at most 9% degradation, or at most 10% degradation of free available chlorine. In another embodiment, a composition disclosed herein is stable when it shows, e.g., at most 10% degradation, at most 15% degradation, at most 20% degradation, at most 25% degradation, at most 30% degradation, at most 35% degradation, at most 40% degradation, at most 45% degradation, at most 50% degradation, at most 55% degradation, at most 60% degradation, at most 65% degradation, at most 70% degradation, at most 75% degradation, at most 80% degradation, at most 85% degradation, at most 90% degradation, or at most 95% degradation of free available chlorine. In another embodiment, a composition disclosed herein is stable when it shows, e.g., about 1% to about 10% degradation, about 1% to about 20% degradation, about 1% to about 30% degradation, about 1% to about 40% degradation, about 1% to about 50% degradation, about 1% to about 60% degradation, about 1% to about 70% degradation, about 1% to about 80% degradation, about 1% to about 90% degradation, about 1% to about 95% degradation, about 5% to about 10% degradation, about 5% to about 20% degradation, about 5% to about 30% degradation, about 5% to about 40% degradation, about 5% to about 50% degradation, about 5% to about 60% degradation, about 5% to about 70% degradation, about 5% to about 80% degradation, about 5% to about 90% degradation, about 5% to about 95% degradation, about 10% to about 20% degradation, about 10% to about 30% degradation, about 10% to about 40% degradation, about 10% to about 50% degradation, about 10% to about 60% degradation, about 10% to about 70% degradation, about 10% to about 80% degradation, about 10% to about 90% degradation, about 10% to about 95% degradation, 20% to about 30% degradation, about 20% to about 40% degradation, about 20% to about 50% degradation, about 20% to about 60% degradation, about 20% to about 70% degradation, about 20% to about 80% degradation, about 20% to about 90% degradation, about 20% to about 95% degradation, about 30% to about 40% degradation, about 30% to about 50% degradation, about 30% to about 60% degradation, about 30% to about 70% degradation, about 30% to about 80% degradation, about 30% to about 90% degradation, about 30% to about 95% degradation, about 40% to about 50% degradation, about 40% to about 60% degradation, about 40% to about 70% degradation, about 40% to about 80% degradation, about 40% to about 90% degradation, about 40% to about 95% degradation, about 50% to about 60% degradation, about 50% to about 70% degradation, about 50% to about 80% degradation, about 50% to about 90% degradation, about 50% to about 95% degradation, about 60% to about 70% degradation, about 60% to about 80% degradation, about 60% to about 90% degradation, about 60% to about 95% degradation, about 70% to about 80% degradation, about 70% to about 90% degradation, about 70% to about 95% degradation, about 80% to about 90% degradation, about 80% to about 95% degradation, or about 90% to about 95% degradation of free available chlorine.

In aspects of this embodiment, a composition disclosed herein is stable for, e.g., about 1 day, about 2 days, 3 days, 4 days, 5 days, 6, days, 7 days, 8 days, 9 days, 10 days, 11 days, 12 days, 13 days, 14 days or 15 days. In other aspects of this embodiment, a composition disclosed herein is stable for, e.g., at least 1 day, at least 2 days, at least 3 days, at least 4 days, at least 5 days, at least 6, days, at least 7 days, at least 8 days, at least 9 days, at least 10 days, at least 11 days, at least 12 days, at least 13 days, at least 14 days or at least 15 days. In yet other aspects of this embodiment, a composition disclosed herein is stable for, e.g., at most 1 day, at most 2 days, at most 3 days, at most 4 days, at most 5 days, at most 6, days, at most 7 days, at most 8 days, at most 9 days, at most 10 days, at most 11 days, at most 12 days, at most 13 days, at most 14 days or at most 15 days.

In still aspects of this embodiment, a composition disclosed herein is stable for, e.g., about 1 day to about 2 days, about 1 day to about 3 days, about 1 day to about 4 days, about 1 day to about 5 days, about 1 day to about 6 days, about 1 day to about 7 days, about 1 day to about 8 days, about 1 day to about 9 days, about 1 day to about 10 days, about 1 day to about 11 days, about 1 day to about 12 days, about 1 day to about 13 days, about 1 day to about 14 days, about 1 day to about 15 days, about 2 days to about 3 days, about 2 days to about 4 days, about 2 days to about 5 days, about 2 days to about 6 days, about 2 days to about 7 days, about 2 days to about 8 days, about 2 days to about 9 days, about 2 days to about 10 days, about 2 days to about 11 days, about 2 days to about 12 days, about 2 days to about 13 days, about 2 days to about 14 days, about 2 days to about 15 days, about 3 days to about 4 days, about 3 days to about 5 days, about 3 days to about 6 days, about 3 days to about 7 days, about 3 days to about 8 days, about 3 days to about 9 days, about 3 days to about 10 days, about 3 days to about 11 days, about 3 days to about 12 days, about 3 days to about 13 days, about 3 days to about 14 days, about 3 days to about 15 days, about 4 days to about 5 days, about 4 days to about 6 days, about 4 days to about 7 days, about 4 days to about 8 days, about 4 days to about 9 days, about 4 days to about 10 days, about 4 days to about 11 days, about 4 days to about 12 days, about 4 days to about 13 days, about 4 days to about 14 days, about 4 days to about 15 days, about 5 days to about 6 days, about 5 days to about 7 days, about 5 days to about 8 days, about 5 days to about 9 days, about 5 days to about 10 days, about 5 days to about 11 days, about 5 days to about 12 days, about 5 days to about 13 days, about 5 days to about 14 days, about 5 days to about 15 days, about 6 days to about 7 days, about 6 days to about 8 days, about 6 days to about 9 days, about 6 days to about 10 days, about 6 days to about 11 days, about 6 days to about 12 days, about 6 days to about 13 days, about 6 days to about 14 days, about 6 days to about 15 days, about 7 days to about 8 days, about 7 days to about 9 days, about 7 days to about 10 days, about 7 days to about 11 days, about 7 days to about 12 days, about 7 days to about 13 days, about 7 days to about 14 days, about 7 days to about 15 days, about 8 days to about 9 days, about 8 days to about 10 days, about 8 days to about 11 days, about 8 days to about 12 days, about 8 days to about 13 days, about 8 days to about 14 days, about 8 days to about 15 days, about 9 days to about 10 days, about 9 days to about 11 days, about 9 days to about 12 days, about 9 days to about 13 days, about 9 days to about 14 days, about 9 days to about 15 days, about 10 days to about 11 days, about 10 days to about 12 days, about 10 days to about 13 days, about 10 days to about 14 days, about 10 days to about 15 days, about 11 days to about 12 days, about 11 days to about 13 days, about 11 days to about 14 days, about 11 days to about 15 days, about 12 days to about 13 days, about 12 days to about 14 days, about 12 days to about 15 days, about 13 days to about 14 days, about 13 days to about 15 days, or about 14 days to about 15 days.

In other aspects of this embodiment, a composition disclosed herein is stable for, e.g., about 1 week, about 2 weeks, 3 weeks, 4 weeks, 5 weeks, 6, weeks, 7 weeks, 8 weeks, 9 weeks, 10 weeks, 11 weeks, 12 weeks, 13 weeks, 14 weeks or 15 weeks. In yet other aspects of this embodiment, a composition disclosed herein is stable for, e.g., at least 1 week, at least 2 weeks, at least 3 weeks, at least 4 weeks, at least 5 weeks, at least 6, weeks, at least 7 weeks, at least 8 weeks, at least 9 weeks, at least 10 weeks, at least 11 weeks, at least 12 weeks, at least 13 weeks, at least 14 weeks or at least 15 weeks. In still other aspects of this embodiment, a composition disclosed herein is stable for, e.g., at most 1 week, at most 2 weeks, at most 3 weeks, at most 4 weeks, at most 5 weeks, at most 6, weeks, at most 7 weeks, at most 8 weeks, at most 9 weeks, at most 10 weeks, at most 11 weeks, at most 12 weeks, at most 13 weeks, at most 14 weeks or at most 15 weeks.

In aspects of this embodiment, a composition disclosed herein is stable for, e.g., about 1 week to about 2 weeks, about 1 week to about 3 weeks, about 1 week to about 4 weeks, about 1 week to about 5 weeks, about 1 week to about 6 weeks, about 1 week to about 7 weeks, about 1 week to about 8 weeks, about 1 week to about 9 weeks, about 1 week to about 10 weeks, about 1 week to about 11 weeks, about 1 week to about 12 weeks, about 1 week to about 13 weeks, about 1 week to about 14 weeks, about 1 week to about 15 weeks, about 2 weeks to about 3 weeks, about 2 weeks to about 4 weeks, about 2 weeks to about 5 weeks, about 2 weeks to about 6 weeks, about 2 weeks to about 7 weeks, about 2 weeks to about 8 weeks, about 2 weeks to about 9 weeks, about 2 weeks to about 10 weeks, about 2 weeks to about 11 weeks, about 2 weeks to about 12 weeks, about 2 weeks to about 13 weeks, about 2 weeks to about 14 weeks, about 2 weeks to about 15 weeks, about 3 weeks to about 4 weeks, about 3 weeks to about 5 weeks, about 3 weeks to about 6 weeks, about 3 weeks to about 7 weeks, about 3 weeks to about 8 weeks, about 3 weeks to about 9 weeks, about 3 weeks to about 10 weeks, about 3 weeks to about 11 weeks, about 3 weeks to about 12 weeks, about 3 weeks to about 13 weeks, about 3 weeks to about 14 weeks, about 3 weeks to about 15 weeks, about 4 weeks to about 5 weeks, about 4 weeks to about 6 weeks, about 4 weeks to about 7 weeks, about 4 weeks to about 8 weeks, about 4 weeks to about 9 weeks, about 4 weeks to about 10 weeks, about 4 weeks to about 11 weeks, about 4 weeks to about 12 weeks, about 4 weeks to about 13 weeks, about 4 weeks to about 14 weeks, about 4 weeks to about 15 weeks, about 5 weeks to about 6 weeks, about 5 weeks to about 7 weeks, about 5 weeks to about 8 weeks, about 5 weeks to about 9 weeks, about 5 weeks to about 10 weeks, about 5 weeks to about 11 weeks, about 5 weeks to about 12 weeks, about 5 weeks to about 13 weeks, about 5 weeks to about 14 weeks, about 5 weeks to about 15 weeks, about 6 weeks to about 7 weeks, about 6 weeks to about 8 weeks, about 6 weeks to about 9 weeks, about 6 weeks to about 10 weeks, about 6 weeks to about 11 weeks, about 6 weeks to about 12 weeks, about 6 weeks to about 13 weeks, about 6 weeks to about 14 weeks, about 6 weeks to about 15 weeks, about 7 weeks to about 8 weeks, about 7 weeks to about 9 weeks, about 7 weeks to about 10 weeks, about 7 weeks to about 11 weeks, about 7 weeks to about 12 weeks, about 7 weeks to about 13 weeks, about 7 weeks to about 14 weeks, about 7 weeks to about 15 weeks, about 8 weeks to about 9 weeks, about 8 weeks to about 10 weeks, about 8 weeks to about 11 weeks, about 8 weeks to about 12 weeks, about 8 weeks to about 13 weeks, about 8 weeks to about 14 weeks, about 8 weeks to about 15 weeks, about 9 weeks to about 10 weeks, about 9 weeks to about 11 weeks, about 9 weeks to about 12 weeks, about 9 weeks to about 13 weeks, about 9 weeks to about 14 weeks, about 9 weeks to about 15 weeks, about 10 weeks to about 11 weeks, about 10 weeks to about 12 weeks, about 10 weeks to about 13 weeks, about 10 weeks to about 14 weeks, about 10 weeks to about 15 weeks, about 11 weeks to about 12 weeks, about 11 weeks to about 13 weeks, about 11 weeks to about 14 weeks, about 11 weeks to about 15 weeks, about 12 weeks to about 13 weeks, about 12 weeks to about 14 weeks, about 12 weeks to about 15 weeks, about 13 weeks to about 14 weeks, about 13 weeks to about 15 weeks, or about 14 weeks to about 15 weeks.

In other aspects of this embodiment, a composition disclosed herein is stable for, e.g., about 1 month, about 2 months, 3 months, 4 months, 5 months, 6, months, 7 months, 8 months, 9 months, 10 months, 11 months, 12 months, 13 months, 14 months, 15 months, 16 months, 17 months, or 18 months. In yet other aspects of this embodiment, a composition disclosed herein is stable for, e.g., at least 1 month, at least 2 months, at least 3 months, at least 4 months, at least 5 months, at least 6, months, at least 7 months, at least 8 months, at least 9 months, at least 10 months, at least 11 months, at least 12 months, at least 13 months, at least 14 months, at least 15 months, at least 16 months, at least 17 months, or at least 18 months. In still other aspects of this embodiment, a composition disclosed herein is stable for, e.g., at most 1 month, at most 2 months, at most 3 months, at most 4 months, at most 5 months, at most 6, months, at most 7 months, at most 8 months, at most 9 months, at most 10 months, at most 11 months, at most 12 months, at most 13 months, at most 14 months, at most 15 months, at most 16 months, at most 17 months, or at most 18 months.

In aspects of this embodiment, a composition disclosed herein is stable for, e.g., about 1 month to about 2 months, about 1 month to about 3 months, about 1 month to about 4 months, about 1 month to about 5 months, about 1 month to about 6 months, about 1 month to about 7 months, about 1 month to about 8 months, about 1 month to about 9 months, about 1 month to about 10 months, about 1 month to about 11 months, about 1 month to about 12 months, about 1 month to about 13 months, about 1 month to about 14 months, about 1 month to about 15 months, about 1 month to about 16 months, about 1 month to about 17 months, about 1 month to about 18 months, about 2 months to about 3 months, about 2 months to about 4 months, about 2 months to about 5 months, about 2 months to about 6 months, about 2 months to about 7 months, about 2 months to about 8 months, about 2 months to about 9 months, about 2 months to about 10 months, about 2 months to about 11 months, about 2 months to about 12 months, about 2 months to about 13 months, about 2 months to about 14 months, about 2 months to about 15 months, about 2 months to about 16 months, about 2 months to about 17 months, about 2 months to about 18 months, about 3 months to about 4 months, about 3 months to about 5 months, about 3 months to about 6 months, about 3 months to about 7 months, about 3 months to about 8 months, about 3 months to about 9 months, about 3 months to about 10 months, about 3 months to about 11 months, about 3 months to about 12 months, about 3 months to about 13 months, about 3 months to about 14 months, about 3 months to about 15 months, about 3 months to about 16 months, about 3 months to about 17 months, about 3 months to about 18 months, about 4 months to about 5 months, about 4 months to about 6 months, about 4 months to about 7 months, about 4 months to about 8 months, about 4 months to about 9 months, about 4 months to about 10 months, about 4 months to about 11 months, about 4 months to about 12 months, about 4 months to about 13 months, about 4 months to about 14 months, about 4 months to about 15 months, about 4 months to about 16 months, about 4 months to about 17 months, about 4 months to about 18 months, about 5 months to about 6 months, about 5 months to about 7 months, about 5 months to about 8 months, about 5 months to about 9 months, about 5 months to about 10 months, about 5 months to about 11 months, about 5 months to about 12 months, about 5 months to about 13 months, about 5 months to about 14 months, about 5 months to about 15 months, about 5 months to about 16 months, about 5 months to about 17 months, about 5 months to about 18 months, about 6 months to about 7 months, about 6 months to about 8 months, about 6 months to about 9 months, about 6 months to about 10 months, about 6 months to about 11 months, about 6 months to about 12 months, about 6 months to about 13 months, about 6 months to about 14 months, about 6 months to about 15 months, about 6 months to about 16 months, about 6 months to about 17 months, about 6 months to about 18 months, about 7 months to about 8 months, about 7 months to about 9 months, about 7 months to about 10 months, about 7 months to about 11 months, about 7 months to about 12 months, about 7 months to about 13 months, about 7 months to about 14 months, about 7 months to about 15 months, about 7 months to about 16 months, about 7 months to about 17 months, about 7 months to about 18 months, about 8 months to about 9 months, about 8 months to about 10 months, about 8 months to about 11 months, about 8 months to about 12 months, about 8 months to about 13 months, about 8 months to about 14 months, about 8 months to about 15 months, about 8 months to about 16 months, about 8 months to about 17 months, about 8 months to about 18 months, about 9 months to about 10 months, about 9 months to about 11 months, about 9 months to about 12 months, about 9 months to about 13 months, about 9 months to about 14 months, about 9 months to about 15 months, about 9 months to about 16 months, about 9 months to about 17 months, about 9 months to about 18 months, about 10 months to about 11 months, about 10 months to about 12 months, about 10 months to about 13 months, about 10 months to about 14 months, about 10 months to about 15 months, about 10 months to about 16 months, about 10 months to about 17 months, about 10 months to about 18 months, about 11 months to about 12 months, about 11 months to about 13 months, about 11 months to about 14 months, about 11 months to about 15 months, about 11 months to about 16 months, about 11 months to about 17 months, about 1 months to about 18 months, about 12 months to about 13 months, about 12 months to about 14 months, about 12 months to about 15 months, about 12 months to about 16 months, about 12 months to about 17 months, about 12 months to about 18 months, about 13 months to about 14 months, about 13 months to about 15 months, about 13 months to about 16 months, about 13 months to about 17 months, about 13 months to about 18 months, about 14 months to about 15 months, about 14 months to about 16 months, about 14 months to about 17 months, about 14 months to about 18 months, about 15 months to about 16 months, about 15 months to about 17 months, about 15 months to about 18 months, about 16 months to about 17 months, about 16 months to about 18 months, or about 17 months to about 18 months.

In other aspects of this embodiment, a composition disclosed herein is stable for, e.g., about 1 year, about 2 years, about 3 years, about 4 years, or about 5 years. In yet other aspects of this embodiment, a composition disclosed herein is stable for, e.g., at least 1 year, at least 2 years, at least 3 years, at least 4 years, or at least 5 years. In still other aspects of this embodiment, a composition disclosed herein is stable for, e.g., at most 1 year, at most 2 years, at most 3 years, at most 4 years, or at most 5 years. In other aspects of this embodiment, a composition disclosed herein is stable for, e.g., about 1 year to about 2 years, about 1 year to about 3 years, about 1 year to about 4 years, about 1 year to about 5 years, about 2 years to about 3 years, about 2 years to about 4 years, about 2 years to about 5 years, about 3 years to about 4 years, about 3 years to about 5 years, or about 4 years to about 5 years.

A composition disclosed herein can be formulated into any form that enables application of a composition disclosed herein in a manner that achieves a desired beneficial effect. In one embodiment, a composition disclosed herein can be formulated into, e.g., a single-phase formulation or a biphasic formulation comprising a medium phase and a dispersed phase. In another embodiment, a composition disclosed herein can be formulated into, e.g., a liquid composition, a colloidal composition, a semi-solid composition, or a solid composition. In another embodiment, a composition disclosed herein can be formulated into, e.g., a liquid aerosol, a foam, an emulsion, a gel, a sol, or a solid sol. In another embodiment, a composition disclosed herein can be formulated into, e.g., a spray, a liquid aerosol, a soap, or a suspension.

In an embodiment, a composition disclosed herein comprises hypochlorous acid or free available chlorine and one or more quaternary compounds or silicone quaternary compounds. In an aspect of this embodiment, a composition disclosed herein comprises hypochlorous acid or free available chlorine and one or more dialkyl quaternary compounds or silicone dialkyl quaternary compounds. In an aspect of this embodiment, a composition disclosed herein comprises hypochlorous acid or free available chlorine and dimethyloctadecyl[3-(trimethoxysilyl)propyl]ammonium chloride or tetradecyldimethyl-(3-trimethoxysilyl)propyl ammonium chloride.

In an aspect of this embodiment, a composition disclosed herein comprises 100 ppm to 1,000 ppm hypochlorous acid or free available chlorine and 250 ppm to 1,500 ppm one or more quaternary compounds or silicone quaternary compounds. In an aspect of this embodiment, a composition disclosed herein comprises 100 ppm to 1,000 ppm hypochlorous acid or free available chlorine and 250 ppm to 1,500 ppm one or more dialkyl quaternary compounds or silicone dialkyl quaternary compounds. In an aspect of this embodiment, a composition disclosed herein comprises 100 ppm to 1,000 ppm hypochlorous acid or free available chlorine and 250 ppm to 1,500 ppm dimethyloctadecyl[3-(trimethoxysilyl)propyl]ammonium chloride or tetradecyldimethyl-(3-trimethoxysilyl)propyl ammonium chloride.

In an aspect of this embodiment, a composition disclosed herein comprises 100 ppm to 1,000 ppm hypochlorous acid or free available chlorine and 500 ppm to 1,500 ppm one or more quaternary compounds or silicone quaternary compounds. In an aspect of this embodiment, a composition disclosed herein comprises 100 ppm to 1,000 ppm hypochlorous acid or free available chlorine and 500 ppm to 1,500 ppm one or more dialkyl quaternary compounds or silicone dialkyl quaternary compounds. In an aspect of this embodiment, a composition disclosed herein comprises 100 ppm to 1,000 ppm hypochlorous acid or free available chlorine and 500 ppm to 1,500 ppm dimethyloctadecyl[3-(trimethoxysilyl)propyl]ammonium chloride or tetradecyldimethyl-(3-trimethoxysilyl)propyl ammonium chloride.

In an aspect of this embodiment, a composition disclosed herein comprises 200 ppm to 800 ppm hypochlorous acid or free available chlorine and 500 ppm to 1,500 ppm one or more quaternary compounds or silicone quaternary compounds. In an aspect of this embodiment, a composition disclosed herein comprises 200 ppm to 800 ppm hypochlorous acid or free available chlorine and 500 ppm to 1,500 ppm one or more dialkyl quaternary compounds or silicone dialkyl quaternary compounds. In an aspect of this embodiment, a composition disclosed herein comprises 200 ppm to 800 ppm hypochlorous acid or free available chlorine and 500 ppm to 1,500 ppm dimethyloctadecyl[3-(trimethoxysilyl)propyl]ammonium chloride or tetradecyldimethyl-(3-trimethoxysilyl)propyl ammonium chloride.

In an aspect of this embodiment, a composition disclosed herein comprises 200 ppm to 800 ppm hypochlorous acid or free available chlorine and 500 ppm to 1,200 ppm one or more quaternary compounds or silicone quaternary compounds. In an aspect of this embodiment, a composition disclosed herein comprises 200 ppm to 800 ppm hypochlorous acid or free available chlorine and 500 ppm to 1,200 ppm one or more dialkyl quaternary compounds or silicone dialkyl quaternary compounds. In an aspect of this embodiment, a composition disclosed herein comprises 200 ppm to 800 ppm hypochlorous acid or free available chlorine and 500 ppm to 1,200 ppm dimethyloctadecyl[3-(trimethoxysilyl)propyl]ammonium chloride or tetradecyldimethyl-(3-trimethoxysilyl)propyl ammonium chloride.

In an aspect of this embodiment, a composition disclosed herein comprises 170 ppm to 370 ppm hypochlorous acid or free available chlorine and 100 ppm to 200 ppm dimethyloctadecyl[3-(trimethoxysilyl)propyl]ammonium chloride. In an aspect of this embodiment, a composition disclosed herein comprises 190 ppm to 350 ppm hypochlorous acid or free available chlorine and 120 ppm to 280 ppm dimethyloctadecyl[3-(trimethoxysilyl)propyl]ammonium chloride. In an aspect of this embodiment, a composition disclosed herein comprises 210 ppm to 330 ppm hypochlorous acid or free available chlorine and 140 ppm to 260 ppm dimethyloctadecyl[3-(trimethoxysilyl)propyl]ammonium chloride. In an aspect of this embodiment, a composition disclosed herein comprises 230 ppm to 310 ppm hypochlorous acid or free available chlorine and 160 ppm to 240 ppm dimethyloctadecyl[3-(trimethoxysilyl)propyl]ammonium chloride. In an aspect of this embodiment, a composition disclosed herein comprises 250 ppm to 290 ppm hypochlorous acid or free available chlorine and 180 ppm to 220 ppm dimethyloctadecyl[3-(trimethoxysilyl)propyl]ammonium chloride. In an aspect of this embodiment, a composition disclosed herein comprises 273 ppm hypochlorous acid or free available chlorine and 200 ppm dimethyloctadecyl[3-(trimethoxysilyl)propyl]ammonium chloride.

In an aspect of this embodiment, a composition disclosed herein comprises 170 ppm to 370 ppm hypochlorous acid or free available chlorine and 200 ppm to 400 ppm dimethyloctadecyl[3-(trimethoxysilyl)propyl]ammonium chloride. In an aspect of this embodiment, a composition disclosed herein comprises 190 ppm to 350 ppm hypochlorous acid or free available chlorine and 220 ppm to 380 ppm dimethyloctadecyl[3-(trimethoxysilyl)propyl]ammonium chloride. In an aspect of this embodiment, a composition disclosed herein comprises 210 ppm to 330 ppm hypochlorous acid or free available chlorine and 240 ppm to 360 ppm dimethyloctadecyl[3-(trimethoxysilyl)propyl]ammonium chloride. In an aspect of this embodiment, a composition disclosed herein comprises 230 ppm to 310 ppm hypochlorous acid or free available chlorine and 260 ppm to 340 ppm dimethyloctadecyl[3-(trimethoxysilyl)propyl]ammonium chloride. In an aspect of this embodiment, a composition disclosed herein comprises 250 ppm to 290 ppm hypochlorous acid or free available chlorine and 280 ppm to 320 ppm dimethyloctadecyl[3-(trimethoxysilyl)propyl]ammonium chloride. In an aspect of this embodiment, a composition disclosed herein comprises 273 ppm hypochlorous acid or free available chlorine and 300 ppm dimethyloctadecyl[3-(trimethoxysilyl)propyl]ammonium chloride.

In an aspect of this embodiment, a composition disclosed herein comprises 400 ppm to 600 ppm hypochlorous acid or free available chlorine and 400 ppm to 600 ppm dimethyloctadecyl[3-(trimethoxysilyl)propyl]ammonium chloride. In an aspect of this embodiment, a composition disclosed herein comprises 420 ppm to 580 ppm hypochlorous acid or free available chlorine and 420 ppm to 580 ppm dimethyloctadecyl[3-(trimethoxysilyl)propyl]ammonium chloride. In an aspect of this embodiment, a composition disclosed herein comprises 440 ppm to 560 ppm hypochlorous acid or free available chlorine and 440 ppm to 560 ppm dimethyloctadecyl[3-(trimethoxysilyl)propyl]ammonium chloride. In an aspect of this embodiment, a composition disclosed herein comprises 460 ppm to 540 ppm hypochlorous acid or free available chlorine and 460 ppm to 540 ppm dimethyloctadecyl[3-(trimethoxysilyl)propyl]ammonium chloride. In an aspect of this embodiment, a composition disclosed herein comprises 480 ppm to 520 ppm hypochlorous acid or free available chlorine and 480 ppm to 520 ppm dimethyloctadecyl[3-(trimethoxysilyl)propyl]ammonium chloride. In an aspect of this embodiment, a composition disclosed herein comprises 500 ppm hypochlorous acid or free available chlorine and 500 ppm dimethyloctadecyl[3-(trimethoxysilyl)propyl]ammonium chloride.

In an aspect of this embodiment, a composition disclosed herein comprises 400 ppm to 600 ppm hypochlorous acid or free available chlorine and 1 ppm to 400 ppm dimethyloctadecyl[3-(trimethoxysilyl)propyl]ammonium chloride. In another aspect of this embodiment, a composition disclosed herein comprises 400 ppm to 600 ppm hypochlorous acid or free available chlorine and 25 ppm to 300 ppm dimethyloctadecyl[3-(trimethoxysilyl)propyl]ammonium chloride.

In an aspect of this embodiment, a composition disclosed herein comprises 400 ppm to 600 ppm hypochlorous acid or free available chlorine and 250 ppm to 350 ppm dimethyloctadecyl[3-(trimethoxysilyl)propyl]ammonium chloride. In an aspect of this embodiment, a composition disclosed herein comprises 420 ppm to 580 ppm hypochlorous acid or free available chlorine and 260 ppm to 340 ppm dimethyloctadecyl[3-(trimethoxysilyl)propyl]ammonium chloride. In an aspect of this embodiment, a composition disclosed herein comprises 440 ppm to 560 ppm hypochlorous acid or free available chlorine and 270 ppm to 330 ppm dimethyloctadecyl[3-(trimethoxysilyl)propyl]ammonium chloride. In an aspect of this embodiment, a composition disclosed herein comprises 460 ppm to 540 ppm hypochlorous acid or free available chlorine and 280 ppm to 320 ppm dimethyloctadecyl[3-(trimethoxysilyl)propyl]ammonium chloride. In an aspect of this embodiment, a composition disclosed herein comprises 480 ppm to 520 ppm hypochlorous acid or free available chlorine and 290 ppm to 310 ppm dimethyloctadecyl[3-(trimethoxysilyl)propyl]ammonium chloride. In an aspect of this embodiment, a composition disclosed herein comprises 500 ppm hypochlorous acid or free available chlorine and 300 ppm dimethyloctadecyl[3-(trimethoxysilyl)propyl]ammonium chloride.

In an aspect of this embodiment, a composition disclosed herein comprises 400 ppm to 600 ppm hypochlorous acid or free available chlorine and 200 ppm to 300 ppm dimethyloctadecyl[3-(trimethoxysilyl)propyl]ammonium chloride. In an aspect of this embodiment, a composition disclosed herein comprises 420 ppm to 580 ppm hypochlorous acid or free available chlorine and 210 ppm to 290 ppm dimethyloctadecyl[3-(trimethoxysilyl)propyl]ammonium chloride. In an aspect of this embodiment, a composition disclosed herein comprises 440 ppm to 560 ppm hypochlorous acid or free available chlorine and 220 ppm to 280 ppm dimethyloctadecyl[3-(trimethoxysilyl)propyl]ammonium chloride. In an aspect of this embodiment, a composition disclosed herein comprises 460 ppm to 540 ppm hypochlorous acid or free available chlorine and 230 ppm to 270 ppm dimethyloctadecyl[3-(trimethoxysilyl)propyl]ammonium chloride. In an aspect of this embodiment, a composition disclosed herein comprises 480 ppm to 520 ppm hypochlorous acid or free available chlorine and 240 ppm to 260 ppm dimethyloctadecyl[3-(trimethoxysilyl)propyl]ammonium chloride. In an aspect of this embodiment, a composition disclosed herein comprises 500 ppm hypochlorous acid or free available chlorine and 250 ppm dimethyloctadecyl[3-(trimethoxysilyl)propyl]ammonium chloride.

In an aspect of this embodiment, a composition disclosed herein comprises 400 ppm to 600 ppm hypochlorous acid or free available chlorine and 150 ppm to 250 ppm dimethyloctadecyl[3-(trimethoxysilyl)propyl]ammonium chloride. In an aspect of this embodiment, a composition disclosed herein comprises 420 ppm to 580 ppm hypochlorous acid or free available chlorine and 160 ppm to 240 ppm dimethyloctadecyl[3-(trimethoxysilyl)propyl]ammonium chloride. In an aspect of this embodiment, a composition disclosed herein comprises 440 ppm to 560 ppm hypochlorous acid or free available chlorine and 170 ppm to 230 ppm dimethyloctadecyl[3-(trimethoxysilyl)propyl]ammonium chloride. In an aspect of this embodiment, a composition disclosed herein comprises 460 ppm to 540 ppm hypochlorous acid or free available chlorine and 180 ppm to 220 ppm dimethyloctadecyl[3-(trimethoxysilyl)propyl]ammonium chloride. In an aspect of this embodiment, a composition disclosed herein comprises 480 ppm to 520 ppm hypochlorous acid or free available chlorine and 190 ppm to 210 ppm dimethyloctadecyl[3-(trimethoxysilyl)propyl]ammonium chloride. In an aspect of this embodiment, a composition disclosed herein comprises 500 ppm hypochlorous acid or free available chlorine and 200 ppm dimethyloctadecyl[3-(trimethoxysilyl)propyl]ammonium chloride.

In an aspect of this embodiment, a composition disclosed herein comprises 400 ppm to 600 ppm hypochlorous acid or free available chlorine and 100 ppm to 200 ppm dimethyloctadecyl[3-(trimethoxysilyl)propyl]ammonium chloride. In an aspect of this embodiment, a composition disclosed herein comprises 420 ppm to 580 ppm hypochlorous acid or free available chlorine and 110 ppm to 190 ppm dimethyloctadecyl[3-(trimethoxysilyl)propyl]ammonium chloride. In an aspect of this embodiment, a composition disclosed herein comprises 440 ppm to 560 ppm hypochlorous acid or free available chlorine and 120 ppm to 180 ppm dimethyloctadecyl[3-(trimethoxysilyl)propyl]ammonium chloride. In an aspect of this embodiment, a composition disclosed herein comprises 460 ppm to 540 ppm hypochlorous acid or free available chlorine and 130 ppm to 170 ppm dimethyloctadecyl[3-(trimethoxysilyl)propyl]ammonium chloride. In an aspect of this embodiment, a composition disclosed herein comprises 480 ppm to 520 ppm hypochlorous acid or free available chlorine and 140 ppm to 160 ppm dimethyloctadecyl[3-(trimethoxysilyl)propyl]ammonium chloride. In an aspect of this embodiment, a composition disclosed herein comprises 500 ppm hypochlorous acid or free available chlorine and 150 ppm dimethyloctadecyl[3-(trimethoxysilyl)propyl]ammonium chloride. In an aspect of this embodiment, a composition disclosed herein comprises 500 ppm hypochlorous acid or free available chlorine and 125 ppm dimethyloctadecyl[3-(trimethoxysilyl)propyl]ammonium chloride.

In an aspect of this embodiment, a composition disclosed herein comprises 400 ppm to 600 ppm hypochlorous acid or free available chlorine and 50 ppm to 150 ppm dimethyloctadecyl[3-(trimethoxysilyl)propyl]ammonium chloride. In an aspect of this embodiment, a composition disclosed herein comprises 420 ppm to 580 ppm hypochlorous acid or free available chlorine and 60 ppm to 140 ppm dimethyloctadecyl[3-(trimethoxysilyl)propyl]ammonium chloride. In an aspect of this embodiment, a composition disclosed herein comprises 440 ppm to 560 ppm hypochlorous acid or free available chlorine and 70 ppm to 130 ppm dimethyloctadecyl[3-(trimethoxysilyl)propyl]ammonium chloride. In an aspect of this embodiment, a composition disclosed herein comprises 460 ppm to 540 ppm hypochlorous acid or free available chlorine and 80 ppm to 120 ppm dimethyloctadecyl[3-(trimethoxysilyl)propyl]ammonium chloride. In an aspect of this embodiment, a composition disclosed herein comprises 480 ppm to 520 ppm hypochlorous acid or free available chlorine and 90 ppm to 110 ppm dimethyloctadecyl[3-(trimethoxysilyl)propyl]ammonium chloride. In an aspect of this embodiment, a composition disclosed herein comprises 500 ppm hypochlorous acid or free available chlorine and 100 ppm dimethyloctadecyl[3-(trimethoxysilyl)propyl]ammonium chloride. In an aspect of this embodiment, a composition disclosed herein comprises 500 ppm hypochlorous acid or free available chlorine and 125 ppm dimethyloctadecyl[3-(trimethoxysilyl)propyl]ammonium chloride.

In an aspect of this embodiment, a composition disclosed herein comprises 400 ppm to 600 ppm hypochlorous acid or free available chlorine and 1 ppm to 100 ppm dimethyloctadecyl[3-(trimethoxysilyl)propyl]ammonium chloride. In an aspect of this embodiment, a composition disclosed herein comprises 420 ppm to 580 ppm hypochlorous acid or free available chlorine and 10 ppm to 90 ppm dimethyloctadecyl[3-(trimethoxysilyl)propyl]ammonium chloride. In an aspect of this embodiment, a composition disclosed herein comprises 440 ppm to 560 ppm hypochlorous acid or free available chlorine and 20 ppm to 80 ppm dimethyloctadecyl[3-(trimethoxysilyl)propyl]ammonium chloride. In an aspect of this embodiment, a composition disclosed herein comprises 460 ppm to 540 ppm hypochlorous acid or free available chlorine and 30 ppm to 70 ppm dimethyloctadecyl[3-(trimethoxysilyl)propyl]ammonium chloride. In an aspect of this embodiment, a composition disclosed herein comprises 480 ppm to 520 ppm hypochlorous acid or free available chlorine and 40 ppm to 60 ppm dimethyloctadecyl[3-(trimethoxysilyl)propyl]ammonium chloride. In an aspect of this embodiment, a composition disclosed herein comprises 500 ppm hypochlorous acid or free available chlorine and 50 ppm dimethyloctadecyl[3-(trimethoxysilyl)propyl]ammonium chloride.

In an aspect of this embodiment, a composition disclosed herein comprises 400 ppm to 600 ppm hypochlorous acid or free available chlorine, and 1 ppm to 50 ppm dimethyloctadecyl[3-(trimethoxysilyl)propyl]ammonium chloride. In an aspect of this embodiment, a composition disclosed herein comprises 420 ppm to 580 ppm hypochlorous acid or free available chlorine, and 5 ppm to 45 ppm dimethyloctadecyl[3-(trimethoxysilyl)propyl]ammonium chloride. In an aspect of this embodiment, a composition disclosed herein comprises 440 ppm to 560 ppm hypochlorous acid or free available chlorine, and 10 ppm to 40 ppm dimethyloctadecyl[3-(trimethoxysilyl)propyl]ammonium chloride. In an aspect of this embodiment, a composition disclosed herein comprises 460 ppm to 540 ppm hypochlorous acid or free available chlorine, and 15 ppm to 35 ppm dimethyloctadecyl[3-(trimethoxysilyl)propyl]ammonium chloride. In an aspect of this embodiment, a composition disclosed herein comprises 480 ppm to 520 ppm hypochlorous acid or free available chlorine, and 20 ppm to 30 ppm dimethyloctadecyl[3-(trimethoxysilyl)propyl]ammonium chloride. In an aspect of this embodiment, a composition disclosed herein comprises 500 ppm hypochlorous acid or free available chlorine, and 25 ppm dimethyloctadecyl[3-(trimethoxysilyl)propyl]ammonium chloride.

In an aspect of this embodiment, a composition disclosed herein comprises 430 ppm to 630 ppm hypochlorous acid or free available chlorine and 400 ppm to 600 ppm dimethyloctadecyl[3-(trimethoxysilyl)propyl]ammonium chloride. In an aspect of this embodiment, a composition disclosed herein comprises 450 ppm to 610 ppm hypochlorous acid or free available chlorine and 420 ppm to 580 ppm dimethyloctadecyl[3-(trimethoxysilyl)propyl]ammonium chloride. In an aspect of this embodiment, a composition disclosed herein comprises 470 ppm to 590 ppm hypochlorous acid or free available chlorine and 440 ppm to 560 ppm dimethyloctadecyl[3-(trimethoxysilyl)propyl]ammonium chloride. In an aspect of this embodiment, a composition disclosed herein comprises 490 ppm to 570 ppm hypochlorous acid or free available chlorine and 460 ppm to 540 ppm dimethyloctadecyl[3-(trimethoxysilyl)propyl]ammonium chloride. In an aspect of this embodiment, a composition disclosed herein comprises 510 ppm to 550 ppm hypochlorous acid or free available chlorine and 480 ppm to 520 ppm dimethyloctadecyl[3-(trimethoxysilyl)propyl]ammonium chloride. In an aspect of this embodiment, a composition disclosed herein comprises 530 ppm hypochlorous acid or free available chlorine and 500 ppm dimethyloctadecyl[3-(trimethoxysilyl)propyl]ammonium chloride.

In an aspect of this embodiment, a composition disclosed herein comprises 430 ppm to 630 ppm hypochlorous acid or free available chlorine and 500 ppm to 700 ppm of a quaternary compound or silicone quaternary compound. In an aspect of this embodiment, a composition disclosed herein comprises 450 ppm to 610 ppm hypochlorous acid or free available chlorine and 520 ppm to 680 ppm of a quaternary compound or silicone quaternary compound. In an aspect of this embodiment, a composition disclosed herein comprises 470 ppm to 590 ppm hypochlorous acid or free available chlorine and 540 ppm to 660 ppm of a quaternary compound or silicone quaternary compound. In an aspect of this embodiment, a composition disclosed herein comprises 490 ppm to 570 ppm hypochlorous acid or free available chlorine and 560 ppm to 640 ppm of a quaternary compound or silicone quaternary compound. In an aspect of this embodiment, a composition disclosed herein comprises 510 ppm to 550 ppm hypochlorous acid or free available chlorine and 580 ppm to 620 ppm of a quaternary compound or silicone quaternary compound. In an aspect of this embodiment, a composition disclosed herein comprises 530 ppm hypochlorous acid or free available chlorine and 600 ppm of a quaternary compound or silicone quaternary compound.

In an aspect of this embodiment, a composition disclosed herein comprises 430 ppm to 630 ppm hypochlorous acid or free available chlorine and 500 ppm to 700 ppm of a dialkyl quaternary compound or silicone dialkyl quaternary compound. In an aspect of this embodiment, a composition disclosed herein comprises 450 ppm to 610 ppm hypochlorous acid or free available chlorine and 520 ppm to 680 ppm of a dialkyl quaternary compound or silicone dialkyl quaternary compound. In an aspect of this embodiment, a composition disclosed herein comprises 470 ppm to 590 ppm hypochlorous acid or free available chlorine and 540 ppm to 660 ppm of a dialkyl quaternary compound or silicone dialkyl quaternary compound. In an aspect of this embodiment, a composition disclosed herein comprises 490 ppm to 570 ppm hypochlorous acid or free available chlorine and 560 ppm to 640 ppm of a dialkyl quaternary compound or silicone dialkyl quaternary compound. In an aspect of this embodiment, a composition disclosed herein comprises 510 ppm to 550 ppm hypochlorous acid or free available chlorine and 580 ppm to 620 ppm of a dialkyl quaternary compound or silicone dialkyl quaternary compound. In an aspect of this embodiment, a composition disclosed herein comprises 530 ppm hypochlorous acid or free available chlorine and 600 ppm of a dialkyl quaternary compound or silicone dialkyl quaternary compound.

In an aspect of this embodiment, a composition disclosed herein comprises 430 ppm to 630 ppm hypochlorous acid or free available chlorine and 500 ppm to 700 ppm dimethyloctadecyl[3-(trimethoxysilyl)propyl]ammonium chloride. In an aspect of this embodiment, a composition disclosed herein comprises 450 ppm to 610 ppm hypochlorous acid or free available chlorine and 520 ppm to 680 ppm dimethyloctadecyl[3-(trimethoxysilyl)propyl]ammonium chloride. In an aspect of this embodiment, a composition disclosed herein comprises 470 ppm to 590 ppm hypochlorous acid or free available chlorine and 540 ppm to 660 ppm dimethyloctadecyl[3-(trimethoxysilyl)propyl]ammonium chloride. In an aspect of this embodiment, a composition disclosed herein comprises 490 ppm to 570 ppm hypochlorous acid or free available chlorine and 560 ppm to 640 ppm dimethyloctadecyl[3-(trimethoxysilyl)propyl]ammonium chloride. In an aspect of this embodiment, a composition disclosed herein comprises 510 ppm to 550 ppm hypochlorous acid or free available chlorine and 580 ppm to 620 ppm dimethyloctadecyl[3-(trimethoxysilyl)propyl]ammonium chloride. In an aspect of this embodiment, a composition disclosed herein comprises 530 ppm hypochlorous acid or free available chlorine and 600 ppm dimethyloctadecyl[3-(trimethoxysilyl)propyl]ammonium chloride.

In an aspect of this embodiment, a composition disclosed herein comprises 430 ppm to 630 ppm hypochlorous acid or free available chlorine and 600 ppm to 800 ppm of a quaternary compound or silicone quaternary compound. In an aspect of this embodiment, a composition disclosed herein comprises 450 ppm to 610 ppm hypochlorous acid or free available chlorine and 620 ppm to 780 ppm of a quaternary compound or silicone quaternary compound. In an aspect of this embodiment, a composition disclosed herein comprises 470 ppm to 590 ppm hypochlorous acid or free available chlorine and 640 ppm to 760 ppm of a quaternary compound or silicone quaternary compound. In an aspect of this embodiment, a composition disclosed herein comprises 490 ppm to 570 ppm hypochlorous acid or free available chlorine and 660 ppm to 740 ppm of a quaternary compound or silicone quaternary compound. In an aspect of this embodiment, a composition disclosed herein comprises 510 ppm to 550 ppm hypochlorous acid or free available chlorine and 680 ppm to 720 ppm of a quaternary compound or silicone quaternary compound. In an aspect of this embodiment, a composition disclosed herein comprises 530 ppm hypochlorous acid or free available chlorine and 700 ppm of a quaternary compound or silicone quaternary compound.

In an aspect of this embodiment, a composition disclosed herein comprises 430 ppm to 630 ppm hypochlorous acid or free available chlorine and 600 ppm to 800 ppm of a dialkyl quaternary compound or silicone dialkyl quaternary compound. In an aspect of this embodiment, a composition disclosed herein comprises 450 ppm to 610 ppm hypochlorous acid or free available chlorine and 620 ppm to 780 ppm of a dialkyl quaternary compound or silicone dialkyl quaternary compound. In an aspect of this embodiment, a composition disclosed herein comprises 470 ppm to 590 ppm hypochlorous acid or free available chlorine and 640 ppm to 760 ppm of a dialkyl quaternary compound or silicone dialkyl quaternary compound. In an aspect of this embodiment, a composition disclosed herein comprises 490 ppm to 570 ppm hypochlorous acid or free available chlorine and 660 ppm to 740 ppm of a dialkyl quaternary compound or silicone dialkyl quaternary compound. In an aspect of this embodiment, a composition disclosed herein comprises 510 ppm to 550 ppm hypochlorous acid or free available chlorine and 680 ppm to 720 ppm of a dialkyl quaternary compound or silicone dialkyl quaternary compound. In an aspect of this embodiment, a composition disclosed herein comprises 530 ppm hypochlorous acid or free available chlorine and 700 ppm of a dialkyl quaternary compound or silicone dialkyl quaternary compound.

In an aspect of this embodiment, a composition disclosed herein comprises 430 ppm to 630 ppm hypochlorous acid or free available chlorine and 600 ppm to 800 ppm dimethyloctadecyl[3-(trimethoxysilyl)propyl]ammonium chloride. In an aspect of this embodiment, a composition disclosed herein comprises 450 ppm to 610 ppm hypochlorous acid or free available chlorine and 620 ppm to 780 ppm dimethyloctadecyl[3-(trimethoxysilyl)propyl]ammonium chloride. In an aspect of this embodiment, a composition disclosed herein comprises 470 ppm to 590 ppm hypochlorous acid or free available chlorine and 640 ppm to 760 ppm dimethyloctadecyl[3-(trimethoxysilyl)propyl]ammonium chloride. In an aspect of this embodiment, a composition disclosed herein comprises 490 ppm to 570 ppm hypochlorous acid or free available chlorine and 660 ppm to 740 ppm dimethyloctadecyl[3-(trimethoxysilyl)propyl]ammonium chloride. In an aspect of this embodiment, a composition disclosed herein comprises 510 ppm to 550 ppm hypochlorous acid or free available chlorine and 680 ppm to 720 ppm dimethyloctadecyl[3-(trimethoxysilyl)propyl]ammonium chloride. In an aspect of this embodiment, a composition disclosed herein comprises 530 ppm hypochlorous acid or free available chlorine and 700 ppm dimethyloctadecyl[3-(trimethoxysilyl)propyl]ammonium chloride.

In an aspect of this embodiment, a composition disclosed herein comprises 430 ppm to 630 ppm hypochlorous acid or free available chlorine and 700 ppm to 900 ppm of a quaternary compound or silicone quaternary compound. In an aspect of this embodiment, a composition disclosed herein comprises 450 ppm to 610 ppm hypochlorous acid or free available chlorine and 720 ppm to 880 ppm of a quaternary compound or silicone quaternary compound. In an aspect of this embodiment, a composition disclosed herein comprises 470 ppm to 590 ppm hypochlorous acid or free available chlorine and 740 ppm to 860 ppm of a quaternary compound or silicone quaternary compound. In an aspect of this embodiment, a composition disclosed herein comprises 490 ppm to 570 ppm hypochlorous acid or free available chlorine and 760 ppm to 840 ppm of a quaternary compound or silicone quaternary compound. In an aspect of this embodiment, a composition disclosed herein comprises 510 ppm to 550 ppm hypochlorous acid or free available chlorine and 780 ppm to 820 ppm of a quaternary compound or silicone quaternary compound. In an aspect of this embodiment, a composition disclosed herein comprises 530 ppm hypochlorous acid or free available chlorine and 800 ppm of a quaternary compound or silicone quaternary compound.

In an aspect of this embodiment, a composition disclosed herein comprises 430 ppm to 630 ppm hypochlorous acid or free available chlorine and 700 ppm to 900 ppm of a dialkyl quaternary compound or silicone dialkyl quaternary compound. In an aspect of this embodiment, a composition disclosed herein comprises 450 ppm to 610 ppm hypochlorous acid or free available chlorine and 720 ppm to 880 ppm of a dialkyl quaternary compound or silicone dialkyl quaternary compound. In an aspect of this embodiment, a composition disclosed herein comprises 470 ppm to 590 ppm hypochlorous acid or free available chlorine and 740 ppm to 860 ppm of a dialkyl quaternary compound or silicone dialkyl quaternary compound. In an aspect of this embodiment, a composition disclosed herein comprises 490 ppm to 570 ppm hypochlorous acid or free available chlorine and 760 ppm to 840 ppm of a dialkyl quaternary compound or silicone dialkyl quaternary compound. In an aspect of this embodiment, a composition disclosed herein comprises 510 ppm to 550 ppm hypochlorous acid or free available chlorine and 780 ppm to 820 ppm of a dialkyl quaternary compound or silicone dialkyl quaternary compound. In an aspect of this embodiment, a composition disclosed herein comprises 530 ppm hypochlorous acid or free available chlorine and 800 ppm of a dialkyl quaternary compound or silicone dialkyl quaternary compound.

In an aspect of this embodiment, a composition disclosed herein comprises 430 ppm to 630 ppm hypochlorous acid or free available chlorine and 700 ppm to 900 ppm dimethyloctadecyl[3-(trimethoxysilyl)propyl]ammonium chloride. In an aspect of this embodiment, a composition disclosed herein comprises 450 ppm to 610 ppm hypochlorous acid or free available chlorine and 720 ppm to 880 ppm dimethyloctadecyl[3-(trimethoxysilyl)propyl]ammonium chloride. In an aspect of this embodiment, a composition disclosed herein comprises 470 ppm to 590 ppm hypochlorous acid or free available chlorine and 740 ppm to 860 ppm dimethyloctadecyl[3-(trimethoxysilyl)propyl]ammonium chloride. In an aspect of this embodiment, a composition disclosed herein comprises 490 ppm to 570 ppm hypochlorous acid or free available chlorine and 760 ppm to 840 ppm dimethyloctadecyl[3-(trimethoxysilyl)propyl]ammonium chloride. In an aspect of this embodiment, a composition disclosed herein comprises 510 ppm to 550 ppm hypochlorous acid or free available chlorine and 780 ppm to 820 ppm dimethyloctadecyl[3-(trimethoxysilyl)propyl]ammonium chloride. In an aspect of this embodiment, a composition disclosed herein comprises 530 ppm hypochlorous acid or free available chlorine and 800 ppm dimethyloctadecyl[3-(trimethoxysilyl)propyl]ammonium chloride.

In an aspect of this embodiment, a composition disclosed herein comprises 430 ppm to 630 ppm hypochlorous acid or free available chlorine and 800 ppm to 1,000 ppm of a quaternary compound or silicone quaternary compound. In an aspect of this embodiment, a composition disclosed herein comprises 450 ppm to 610 ppm hypochlorous acid or free available chlorine and 820 ppm to 980 ppm of a quaternary compound or silicone quaternary compound. In an aspect of this embodiment, a composition disclosed herein comprises 470 ppm to 590 ppm hypochlorous acid or free available chlorine and 840 ppm to 960 ppm of a quaternary compound or silicone quaternary compound. In an aspect of this embodiment, a composition disclosed herein comprises 490 ppm to 570 ppm hypochlorous acid or free available chlorine and 860 ppm to 940 ppm of a quaternary compound or silicone quaternary compound. In an aspect of this embodiment, a composition disclosed herein comprises 510 ppm to 550 ppm hypochlorous acid or free available chlorine and 880 ppm to 920 ppm of a quaternary compound or silicone quaternary compound. In an aspect of this embodiment, a composition disclosed herein comprises 530 ppm hypochlorous acid or free available chlorine and 900 ppm of a quaternary compound or silicone quaternary compound.

In an aspect of this embodiment, a composition disclosed herein comprises 430 ppm to 630 ppm hypochlorous acid or free available chlorine and 800 ppm to 1,000 ppm of a dialkyl quaternary compound or silicone dialkyl quaternary compound. In an aspect of this embodiment, a composition disclosed herein comprises 450 ppm to 610 ppm hypochlorous acid or free available chlorine and 820 ppm to 980 ppm of a dialkyl quaternary compound or silicone dialkyl quaternary compound. In an aspect of this embodiment, a composition disclosed herein comprises 470 ppm to 590 ppm hypochlorous acid or free available chlorine and 840 ppm to 960 ppm of a dialkyl quaternary compound or silicone dialkyl quaternary compound. In an aspect of this embodiment, a composition disclosed herein comprises 490 ppm to 570 ppm hypochlorous acid or free available chlorine and 860 ppm to 940 ppm of a dialkyl quaternary compound or silicone dialkyl quaternary compound. In an aspect of this embodiment, a composition disclosed herein comprises 510 ppm to 550 ppm hypochlorous acid or free available chlorine and 880 ppm to 920 ppm of a dialkyl quaternary compound or silicone dialkyl quaternary compound. In an aspect of this embodiment, a composition disclosed herein comprises 530 ppm hypochlorous acid or free available chlorine and 900 ppm of a dialkyl quaternary compound or silicone dialkyl quaternary compound.

In an aspect of this embodiment, a composition disclosed herein comprises 430 ppm to 630 ppm hypochlorous acid or free available chlorine and 800 ppm to 1,000 ppm dimethyloctadecyl[3-(trimethoxysilyl)propyl]ammonium chloride. In an aspect of this embodiment, a composition disclosed herein comprises 450 ppm to 610 ppm hypochlorous acid or free available chlorine and 820 ppm to 980 ppm dimethyloctadecyl[3-(trimethoxysilyl)propyl]ammonium chloride. In an aspect of this embodiment, a composition disclosed herein comprises 470 ppm to 590 ppm hypochlorous acid or free available chlorine and 840 ppm to 960 ppm dimethyloctadecyl[3-(trimethoxysilyl)propyl]ammonium chloride. In an aspect of this embodiment, a composition disclosed herein comprises 490 ppm to 570 ppm hypochlorous acid or free available chlorine and 860 ppm to 940 ppm dimethyloctadecyl[3-(trimethoxysilyl)propyl]ammonium chloride. In an aspect of this embodiment, a composition disclosed herein comprises 510 ppm to 550 ppm hypochlorous acid or free available chlorine and 880 ppm to 920 ppm dimethyloctadecyl[3-(trimethoxysilyl)propyl]ammonium chloride. In an aspect of this embodiment, a composition disclosed herein comprises 530 ppm hypochlorous acid or free available chlorine and 900 ppm dimethyloctadecyl[3-(trimethoxysilyl)propyl]ammonium chloride.

In an aspect of this embodiment, a composition disclosed herein comprises 430 ppm to 630 ppm hypochlorous acid or free available chlorine and 900 ppm to 1,100 ppm of a quaternary compound or silicone quaternary compound. In an aspect of this embodiment, a composition disclosed herein comprises 450 ppm to 610 ppm hypochlorous acid or free available chlorine and 920 ppm to 1,080 ppm of a quaternary compound or silicone quaternary compound. In an aspect of this embodiment, a composition disclosed herein comprises 470 ppm to 590 ppm hypochlorous acid or free available chlorine and 940 ppm to 1,060 ppm of a quaternary compound or silicone quaternary compound. In an aspect of this embodiment, a composition disclosed herein comprises 490 ppm to 570 ppm hypochlorous acid or free available chlorine and 960 ppm to 1,040 ppm of a quaternary compound or silicone quaternary compound. In an aspect of this embodiment, a composition disclosed herein comprises 510 ppm to 550 ppm hypochlorous acid or free available chlorine and 980 ppm to 1,020 ppm of a quaternary compound or silicone quaternary compound. In an aspect of this embodiment, a composition disclosed herein comprises 530 ppm hypochlorous acid or free available chlorine and 1,000 ppm of a quaternary compound or silicone quaternary compound.

In an aspect of this embodiment, a composition disclosed herein comprises 430 ppm to 630 ppm hypochlorous acid or free available chlorine and 900 ppm to 1,100 ppm of a dialkyl quaternary compound or silicone dialkyl quaternary compound. In an aspect of this embodiment, a composition disclosed herein comprises 450 ppm to 610 ppm hypochlorous acid or free available chlorine and 920 ppm to 1,080 ppm of a dialkyl quaternary compound or silicone dialkyl quaternary compound. In an aspect of this embodiment, a composition disclosed herein comprises 470 ppm to 590 ppm hypochlorous acid or free available chlorine and 940 ppm to 1,060 ppm of a dialkyl quaternary compound or silicone dialkyl quaternary compound. In an aspect of this embodiment, a composition disclosed herein comprises 490 ppm to 570 ppm hypochlorous acid or free available chlorine and 960 ppm to 1,040 ppm of a dialkyl quaternary compound or silicone dialkyl quaternary compound. In an aspect of this embodiment, a composition disclosed herein comprises 510 ppm to 550 ppm hypochlorous acid or free available chlorine and 980 ppm to 1,020 ppm of a dialkyl quaternary compound or silicone dialkyl quaternary compound. In an aspect of this embodiment, a composition disclosed herein comprises 530 ppm hypochlorous acid or free available chlorine and 1,000 ppm of a dialkyl quaternary compound or silicone dialkyl quaternary compound.

In an aspect of this embodiment, a composition disclosed herein comprises 430 ppm to 630 ppm hypochlorous acid or free available chlorine and 900 ppm to 1,100 ppm dimethyloctadecyl[3-(trimethoxysilyl)propyl]ammonium chloride. In an aspect of this embodiment, a composition disclosed herein comprises 450 ppm to 610 ppm hypochlorous acid or free available chlorine and 920 ppm to 1,080 ppm dimethyloctadecyl[3-(trimethoxysilyl)propyl]ammonium chloride. In an aspect of this embodiment, a composition disclosed herein comprises 470 ppm to 590 ppm hypochlorous acid or free available chlorine and 940 ppm to 1,060 ppm dimethyloctadecyl[3-(trimethoxysilyl)propyl]ammonium chloride. In an aspect of this embodiment, a composition disclosed herein comprises 490 ppm to 570 ppm hypochlorous acid or free available chlorine and 960 ppm to 1,040 ppm dimethyloctadecyl[3-(trimethoxysilyl)propyl]ammonium chloride. In an aspect of this embodiment, a composition disclosed herein comprises 510 ppm to 550 ppm hypochlorous acid or free available chlorine and 980 ppm to 1,020 ppm dimethyloctadecyl[3-(trimethoxysilyl)propyl]ammonium chloride. In an aspect of this embodiment, a composition disclosed herein comprises 530 ppm hypochlorous acid or free available chlorine and 1,000 ppm dimethyloctadecyl[3-(trimethoxysilyl)propyl]ammonium chloride.

In an aspect of this embodiment, a composition disclosed herein comprises 430 ppm to 630 ppm hypochlorous acid or free available chlorine and 1,000 ppm to 1,200 ppm of a quaternary compound or silicone quaternary compound. In an aspect of this embodiment, a composition disclosed herein comprises 450 ppm to 610 ppm hypochlorous acid or free available chlorine and 1,020 ppm to 1,180 ppm of a quaternary compound or silicone quaternary compound. In an aspect of this embodiment, a composition disclosed herein comprises 470 ppm to 590 ppm hypochlorous acid or free available chlorine and 1,040 ppm to 1,160 ppm of a quaternary compound or silicone quaternary compound. In an aspect of this embodiment, a composition disclosed herein comprises 490 ppm to 570 ppm hypochlorous acid or free available chlorine and 1,060 ppm to 1,140 ppm of a quaternary compound or silicone quaternary compound. In an aspect of this embodiment, a composition disclosed herein comprises 510 ppm to 550 ppm hypochlorous acid or free available chlorine and 1,080 ppm to 1,120 ppm of a quaternary compound or silicone quaternary compound. In an aspect of this embodiment, a composition disclosed herein comprises 530 ppm hypochlorous acid or free available chlorine and 1,100 ppm of a quaternary compound or silicone quaternary compound.

In an aspect of this embodiment, a composition disclosed herein comprises 430 ppm to 630 ppm hypochlorous acid or free available chlorine and 1,000 ppm to 1,200 ppm of a dialkyl quaternary compound or silicone dialkyl quaternary compound. In an aspect of this embodiment, a composition disclosed herein comprises 450 ppm to 610 ppm hypochlorous acid or free available chlorine and 1,020 ppm to 1,180 ppm of a dialkyl quaternary compound or silicone dialkyl quaternary compound. In an aspect of this embodiment, a composition disclosed herein comprises 470 ppm to 590 ppm hypochlorous acid or free available chlorine and 1,040 ppm to 1,160 ppm of a dialkyl quaternary compound or silicone dialkyl quaternary compound. In an aspect of this embodiment, a composition disclosed herein comprises 490 ppm to 570 ppm hypochlorous acid or free available chlorine and 1,060 ppm to 1,140 ppm of a dialkyl quaternary compound or silicone dialkyl quaternary compound. In an aspect of this embodiment, a composition disclosed herein comprises 510 ppm to 550 ppm hypochlorous acid or free available chlorine and 1,080 ppm to 1,120 ppm of a dialkyl quaternary compound or silicone dialkyl quaternary compound. In an aspect of this embodiment, a composition disclosed herein comprises 530 ppm hypochlorous acid or free available chlorine and 1,100 ppm of a dialkyl quaternary compound or silicone dialkyl quaternary compound.

In an aspect of this embodiment, a composition disclosed herein comprises 430 ppm to 630 ppm hypochlorous acid or free available chlorine and 1,000 ppm to 1,200 ppm dimethyloctadecyl[3-(trimethoxysilyl)propyl]ammonium chloride. In an aspect of this embodiment, a composition disclosed herein comprises 450 ppm to 610 ppm hypochlorous acid or free available chlorine and 1,020 ppm to 1,180 ppm dimethyloctadecyl[3-(trimethoxysilyl)propyl]ammonium chloride. In an aspect of this embodiment, a composition disclosed herein comprises 470 ppm to 590 ppm hypochlorous acid or free available chlorine and 1,040 ppm to 1,160 ppm dimethyloctadecyl[3-(trimethoxysilyl)propyl]ammonium chloride. In an aspect of this embodiment, a composition disclosed herein comprises 490 ppm to 570 ppm hypochlorous acid or free available chlorine and 1,060 ppm to 1,140 ppm dimethyloctadecyl[3-(trimethoxysilyl)propyl] ammonium chloride. In an aspect of this embodiment, a composition disclosed herein comprises 510 ppm to 550 ppm hypochlorous acid or free available chlorine and 1,080 ppm to 1,120 ppm dimethyloctadecyl[3-(trimethoxysilyl) propyl]ammonium chloride. In an aspect of this embodiment, a composition disclosed herein comprises 530 ppm hypochlorous acid or free available chlorine and 1,100 ppm dimethyloctadecyl[3-(trimethoxysilyl)propyl]ammonium chloride.

In an embodiment, a composition disclosed herein comprises one or more alcohols and one or more quaternary compounds or silicone quaternary compounds. In an aspect of this embodiment, a composition disclosed herein comprises one or more alcohols and one or more dialkyl quaternary compounds or silicone dialkyl quaternary compounds. In an aspect of this embodiment, a composition disclosed herein comprises one or more alcohols and dimethyloctadecyl[3-(trimethoxysilyl)propyl]ammonium chloride or tetradecyldimethyl-(3-trimethoxysilyl)propyl ammonium chloride.

In an embodiment, a composition disclosed herein comprises 10% to 90% one or more alcohols and 1% to 15% one or more quaternary compounds or silicone quaternary compounds. In an aspect of this embodiment, a composition disclosed herein comprises 10% to 90% one or more alcohols and 1% to 15% one or more dialkyl quaternary compounds or silicone dialkyl quaternary compounds. In an aspect of this embodiment, a composition disclosed herein comprises 10% to 90% one or more alcohols and 1% to 15% dimethyloctadecyl[3-(trimethoxysilyl)propyl]ammonium chloride or tetradecyldimethyl-(3-trimethoxysilyl)propyl ammonium chloride.

In an embodiment, a composition disclosed herein comprises 25% to 75% one or more alcohols and 1% to 10% one or more quaternary compounds or silicone quaternary compounds. In an aspect of this embodiment, a composition disclosed herein comprises 25% to 75% one or more alcohols and 1% to 10% one or more dialkyl quaternary compounds or silicone dialkyl quaternary compounds. In an aspect of this embodiment, a composition disclosed herein comprises 25% to 75% one or more alcohols and 1% to 10% dimethyloctadecyl[3-(trimethoxysilyl)propyl]ammonium chloride or tetradecyldimethyl-(3-trimethoxysilyl)propyl ammonium chloride.

In an embodiment, a composition disclosed herein comprises isopropanol, methanol and one or more quaternary compounds or silicone quaternary compounds. In an aspect of this embodiment, a composition disclosed herein comprises isopropanol, methanol and one or more dialkyl quaternary compounds or silicone dialkyl quaternary compounds. In an aspect of this embodiment, a composition disclosed herein comprises isopropanol, methanol and dimethyloctadecyl[3-(trimethoxysilyl)propyl]ammonium chloride or tetradecyldimethyl-(3-trimethoxysilyl)propyl ammonium chloride.

In an embodiment, a composition disclosed herein comprises 10% to 90% of an isopropanol and methanol mixture and 1% to 15% one or more quaternary compounds or silicone quaternary compounds. In an aspect of this embodiment, a composition disclosed herein comprises 10% to 90% an isopropanol and methanol mixture and 1% to 15% one or more dialkyl quaternary compounds or silicone dialkyl quaternary compounds. In an aspect of this embodiment, a composition disclosed herein comprises 10% to 90% an isopropanol and methanol mixture and 1% to 15% dimethyloctadecyl[3-(trimethoxysilyl)propyl]ammonium chloride or tetradecyldimethyl-(3-trimethoxysilyl)propyl ammonium chloride.

In an embodiment, a composition disclosed herein comprises 25% to 75% an isopropanol and methanol mixture and 1% to 10% one or more quaternary compounds or silicone quaternary compounds. In an aspect of this embodiment, a composition disclosed herein comprises 25% to 75% an isopropanol and methanol mixture and 1% to 10% one or more dialkyl quaternary compounds or silicone dialkyl quaternary compounds. In an aspect of this embodiment, a composition disclosed herein comprises 25% to 75% an isopropanol and methanol mixture and 1% to 10% dimethyloctadecyl[3-(trimethoxysilyl)propyl]ammonium chloride or tetradecyldimethyl-(3-trimethoxysilyl)propyl ammonium chloride.

In an aspect of this embodiment, a composition disclosed herein comprises 30% to 70% isopropanol, 0.1% to 4.0% methanol and 1% to 9% dimethyloctadecyl[3-(trimethoxysilyl)propyl]ammonium chloride. In an aspect of this embodiment, a composition disclosed herein comprises 35% to 65% isopropanol, 0.5% to 3.5% methanol and 2% to 8% dimethyloctadecyl[3-(trimethoxysilyl)propyl]ammonium chloride. In an aspect of this embodiment, a composition disclosed herein comprises 40% to 60% isopropanol, 1.0% to 3.0% methanol and 3% to 7% dimethyloctadecyl[3-(trimethoxysilyl)propyl]ammonium chloride. In an aspect of this embodiment, a composition disclosed herein comprises 45% to 55% isopropanol, 1.5% to 2.5% methanol and 4% to 6% dimethyloctadecyl[3-(trimethoxysilyl)propyl]ammonium chloride. In an aspect of this embodiment, a composition disclosed herein comprises 50% isopropanol, 2% methanol and 5% dimethyloctadecyl[3-(trimethoxysilyl) propyl]ammonium chloride.

In an aspect of this embodiment, a composition disclosed herein comprises 30% to 70% isopropanol, 2% to 10% methanol and 1% to 9% dimethyloctadecyl[3-(trimethoxysilyl)propyl]ammonium chloride. In an aspect of this embodiment, a composition disclosed herein comprises 35% to 65% isopropanol, 3% to 9% methanol and 2% to 8% dimethyloctadecyl[3-(trimethoxysilyl)propyl]ammonium chloride. In an aspect of this embodiment, a composition disclosed herein comprises 40% to 60% isopropanol, 4% to 8% methanol and 3% to 7% dimethyloctadecyl[3-(trimethoxysilyl)propyl]ammonium chloride. In an aspect of this embodiment, a composition disclosed herein comprises 45% to 55% isopropanol, 5% to 7% methanol and 4% to 6% dimethyloctadecyl[3-(trimethoxysilyl)propyl]ammonium chloride. In an aspect of this embodiment, a composition disclosed herein comprises 50% isopropanol, 6% methanol and 5% dimethyloctadecyl[3-(trimethoxysilyl)propyl]ammonium chloride.

In an aspect of this embodiment, a composition disclosed herein comprises 94% to 99% isopropanol, 0.1% to 2.0% methanol and 0.1% to 2.0% dimethyloctadecyl[3-(trimethoxysilyl)propyl]ammonium chloride. In an aspect of this embodiment, a composition disclosed herein comprises 95% to 99% isopropanol, 0.25% to 1.75% methanol and 0.25% to 1.75% dimethyloctadecyl[3-(trimethoxysilyl)propyl]ammonium chloride. In an aspect of this embodiment, a composition disclosed herein comprises 96% to 99% isopropanol, 0.5% to 1.5% methanol and 0.5% to 1.5% dimethyloctadecyl[3-(trimethoxysilyl)propyl]ammonium chloride. In an aspect of this embodiment, a composition disclosed herein comprises 97% to 99% isopropanol, 0.75% to 1.25% methanol and 0.75% to 1.25% dimethyloctadecyl [3-(trimethoxysilyl)propyl]ammonium chloride. In an aspect of this embodiment, a composition disclosed herein comprises 98% isopropanol, 1% methanol and 1% dimethyloctadecyl[3-(trimethoxysilyl)propyl]ammonium chloride.

In an aspect of this embodiment, a composition disclosed herein comprises 70% to 99% isopropanol, 1% to 10% methanol and 1% to 10% dimethyloctadecyl[3-(trimethoxysilyl)propyl]ammonium chloride. In an aspect of this embodiment, a composition disclosed herein comprises 75% to 97% isopropanol, 4% to 9% methanol and 2% to 8% dimethyloctadecyl[3-(trimethoxysilyl)propyl]ammonium chloride. In an aspect of this embodiment, a composition disclosed herein comprises 80% to 95% isopropanol, 5% to 8% methanol and 3% to 7% dimethyloctadecyl[3-(trimethoxysilyl)propyl]ammonium chloride. In an aspect of this embodiment, a composition disclosed herein comprises 85% to 90% isopropanol, 6% to 7% methanol and 4% to 6% dimethyloctadecyl[3-(trimethoxysilyl)propyl]ammonium chloride. In an aspect of this embodiment, a composition disclosed herein comprises 88.4% isopropanol, 6.6% methanol and 5% dimethyloctadecyl[3-(trimethoxysilyl)propyl] ammonium chloride.

In an embodiment, a composition disclosed herein comprises isopropanol and didodecyldimethyl ammonium chloride. In an aspect of this embodiment, a composition disclosed herein comprises 30% to 70% isopropanol and 1.0% to 20.0% didodecyldimethyl ammonium chloride. In an aspect of this embodiment, a composition disclosed herein comprises 35% to 65% isopropanol and 2.5% to 17.5% didodecyldimethyl ammonium chloride. In an aspect of this embodiment, a composition disclosed herein comprises 40% to 60% isopropanol and 5.0% to 15.0% didodecyldimethyl ammonium chloride. In an aspect of this embodiment, a composition disclosed herein comprises 45% to 55% isopropanol and 7.5% to 12.5% didodecyldimethyl ammonium chloride. In an aspect of this embodiment, a composition disclosed herein comprises 50% isopropanol and 10% didodecyldimethyl ammonium chloride.

In an embodiment, a composition disclosed herein comprises hypochlorous acid or free available chlorine and didodecyldimethyl ammonium chloride. In an aspect of this embodiment, a composition disclosed herein comprises 430 ppm to 630 ppm hypochlorous acid or free available chlorine and 200 ppm to 400 ppm didodecyldimethyl ammonium chloride. In an aspect of this embodiment, a composition disclosed herein comprises 450 ppm to 610 ppm hypochlorous acid or free available chlorine and 220 ppm to 380 ppm didodecyldimethyl ammonium chloride. In an aspect of this embodiment, a composition disclosed herein comprises 470 ppm to 590 ppm hypochlorous acid or free available chlorine and 240 ppm to 360 ppm didodecyldimethyl ammonium chloride. In an aspect of this embodiment, a composition disclosed herein comprises 490 ppm to 570 ppm hypochlorous acid or free available chlorine and 260 ppm to 340 ppm didodecyldimethyl ammonium chloride. In an aspect of this embodiment, a composition disclosed herein comprises 510 ppm to 550 ppm hypochlorous acid or free available chlorine and 280 ppm to 320 ppm didodecyldimethyl ammonium chloride. In an aspect of this embodiment, a composition disclosed herein comprises 530 ppm hypochlorous acid or free available chlorine and 300 ppm didodecyldimethyl ammonium chloride.

In an embodiment, a composition disclosed herein comprises one or more alcohols and one or more guanide-containing compounds. In an aspect of this embodiment, a composition disclosed herein comprises one or more alcohols and one or more biguanide-containing compounds or silicone dialkyl quaternary compounds. In an aspect of this embodiment, a composition disclosed herein comprises one or more alcohols and polyhexamethylene biguanide.

In an embodiment, a composition disclosed herein comprises 10% to 90% one or more alcohols and 0.1% to 5% one or more guanide-containing compounds. In an aspect of this embodiment, a composition disclosed herein comprises 10% to 90% one or more alcohols and 0.1% to 5% one or more biguanide-containing compounds. In an aspect of this embodiment, a composition disclosed herein comprises 10% to 90% one or more alcohols and 0.1% to 5% polyhexamethylene biguanide.

In an embodiment, a composition disclosed herein comprises 25% to 75% one or more alcohols and 0.5% to 2.5% one or more guanide-containing compounds. In an aspect of this embodiment, a composition disclosed herein comprises 25% to 75% one or more alcohols and 0.5% to 2.5% one or more biguanide-containing compounds. In an aspect of this embodiment, a composition disclosed herein comprises 25% to 75% one or more alcohols and 0.5% to 2.5% polyhexamethylene biguanide.

In an embodiment, a composition disclosed herein comprises isopropanol and one or more guanide-containing compounds. In an aspect of this embodiment, a composition disclosed herein comprises isopropanol and one or more biguanide-containing compounds or silicone dialkyl quaternary compounds. In an aspect of this embodiment, a composition disclosed herein comprises isopropanol and polyhexamethylene biguanide.

In an embodiment, a composition disclosed herein comprises 10% to 90% isopropanol and 0.1% to 5% one or more guanide-containing compounds. In an aspect of this embodiment, a composition disclosed herein comprises 10% to 90% isopropanol and 0.1% to 5% one or more biguanide-containing compounds. In an aspect of this embodiment, a composition disclosed herein comprises 10% to 90% isopropanol and 0.1% to 5% polyhexamethylene biguanide.

In an embodiment, a composition disclosed herein comprises 25% to 75% isopropanol and 0.5% to 2.5% one or more guanide-containing compounds. In an aspect of this embodiment, a composition disclosed herein comprises 25% to 75% isopropanol and 0.5% to 2.5% one or more biguanide-containing compounds. In an aspect of this embodiment, a composition disclosed herein comprises 25% to 75% isopropanol and 0.5% to 2.5% polyhexamethylene biguanide.

In an aspect of this embodiment, a composition disclosed herein comprises 30% to 70% isopropanol and 0.1% to 2.0% polyhexamethylene biguanide. In an aspect of this embodiment, a composition disclosed herein comprises 35% to 65% isopropanol and 0.25% to 1.75% polyhexamethylene biguanide. In an aspect of this embodiment, a composition disclosed herein comprises 40% to 60% isopropanol and 0.5% to 1.5% polyhexamethylene biguanide. In an aspect of this embodiment, a composition disclosed herein comprises 45% to 55% isopropanol and 0.75% to 1.25% polyhexamethylene biguanide. In an aspect of this embodiment, a composition disclosed herein comprises 50% isopropanol and 1% polyhexamethylene biguanide.

In an embodiment, a composition disclosed herein comprises hypochlorous acid or free available chlorine, and metal particles and/or metal salts. In an embodiment, a composition disclosed herein comprises 200 ppm to 1,000 ppm hypochlorous acid or free available chlorine, and 50 ppm to 500 ppm metal particles and/or metal salts.

In an embodiment, a composition disclosed herein comprises hypochlorous acid or free available chlorine, and silver nitrate. In aspects of this embodiment, a composition disclosed herein comprises 200 ppm to 1,000 ppm hypochlorous acid or free available chlorine, and 50 ppm to 500 ppm silver nitrate. In an aspect of this embodiment, a composition disclosed herein comprises 300 ppm to 900 ppm hypochlorous acid or free available chlorine, and 100 ppm to 400 ppm silver nitrate. In an aspect of this embodiment, a composition disclosed herein comprises 400 ppm to 800 ppm hypochlorous acid or free available chlorine, and 150 ppm to 350 ppm silver nitrate.

In an aspect of this embodiment, a composition disclosed herein comprises 430 ppm to 630 ppm hypochlorous acid or free available chlorine, and 200 ppm to 400 ppm silver nitrate. In an aspect of this embodiment, a composition disclosed herein comprises 450 ppm to 610 ppm hypochlorous acid or free available chlorine and 220 ppm to 380 ppm silver nitrate. In an aspect of this embodiment, a composition disclosed herein comprises 470 ppm to 590 ppm hypochlorous acid or free available chlorine and 240 ppm to 360 ppm silver nitrate. In an aspect of this embodiment, a composition disclosed herein comprises 490 ppm to 570 ppm hypochlorous acid or free available chlorine and 260 ppm to 340 ppm silver nitrate. In an aspect of this embodiment, a composition disclosed herein comprises 510 ppm to 550 ppm hypochlorous acid or free available chlorine and 280 ppm to 320 ppm silver nitrate. In an embodiment, a composition disclosed herein comprises 530 ppm hypochlorous acid or free available chlorine and 300 ppm silver nitrate.

In an embodiment, a composition disclosed herein comprises hypochlorous acid or free available chlorine, silver nitrate and titanium dioxide particles. In aspects of this embodiment, a composition disclosed herein comprises 200 ppm to 1,000 ppm hypochlorous acid or free available chlorine, 50 ppm to 500 ppm silver nitrate and 10 ppm to 400 ppm titanium dioxide particles. In an aspect of this embodiment, a composition disclosed herein comprises 300 ppm to 900 ppm hypochlorous acid or free available chlorine, 100 ppm to 400 ppm silver nitrate and 25 ppm to 350 ppm titanium dioxide particles. In an aspect of this embodiment, a composition disclosed herein comprises 400 ppm to 800 ppm hypochlorous acid or free available chlorine, 150 ppm to 350 ppm silver nitrate and 50 ppm to 250 ppm titanium dioxide particles.

In aspects of this embodiment, a composition disclosed herein comprises 1 ppm to 200 ppm hypochlorous acid or free available chlorine, 50 ppm to 500 ppm silver nitrate and 10 ppm to 400 ppm titanium dioxide particles. In an aspect of this embodiment, a composition disclosed herein comprises 5 ppm to 175 ppm hypochlorous acid or free available chlorine, 100 ppm to 400 ppm silver nitrate and 25 ppm to 350 ppm titanium dioxide particles. In an aspect of this embodiment, a composition disclosed herein comprises 10 ppm to 150 ppm hypochlorous acid or free available chlorine, 150 ppm to 350 ppm silver nitrate and 50 ppm to 250 ppm titanium dioxide particles.

In an aspect of this embodiment, a composition disclosed herein comprises 430 ppm to 630 ppm hypochlorous acid or free available chlorine, 100 ppm to 300 ppm silver nitrate and 50 ppm to 150 ppm titanium dioxide particles. In an aspect of this embodiment, a composition disclosed herein comprises 450 ppm to 610 ppm hypochlorous acid or free available chlorine, 120 ppm to 280 ppm silver nitrate and 60 ppm to 140 ppm titanium dioxide particles. In an aspect of this embodiment, a composition disclosed herein comprises 470 ppm to 590 ppm hypochlorous acid or free available chlorine, 140 ppm to 260 ppm silver nitrate and 70 ppm to 130 ppm titanium dioxide particles. In an aspect of this embodiment, a composition disclosed herein comprises 490 ppm to 570 ppm hypochlorous acid or free available chlorine, 160 ppm to 240 ppm silver nitrate and 80 ppm to 120 ppm titanium dioxide particles. In an aspect of this embodiment, a composition disclosed herein comprises 510 ppm to 550 ppm hypochlorous acid or free available chlorine, 180 ppm to 220 ppm silver nitrate and 90 ppm to 110 ppm titanium dioxide particles. In an aspect of this embodiment, a composition disclosed herein comprises 530 ppm hypochlorous acid or free available chlorine, 200 ppm silver nitrate and 100 ppm titanium dioxide particles.

In an embodiment, a composition disclosed herein comprises hypochlorous acid or free available chlorine, a quaternary compound or silicone quaternary compound, and metal particles and/or metal salts. In aspects of this embodiment, a composition disclosed herein comprises hypochlorous acid or free available chlorine, a dialkyl quaternary compound or silicone dialkyl quaternary compound, and metal particles and/or metal salts. In aspects of this embodiment, a composition disclosed herein comprises hypochlorous acid or free available chlorine, dimethyloctadecyl[3-(trimethoxysilyl)propyl]ammonium chloride or tetradecyldimethyl-(3-trimethoxysilyl)propyl ammonium chloride, silver nitrate and titanium dioxide particles In aspects of this embodiment, a composition disclosed herein comprises 200 ppm to 1,000 ppm hypochlorous acid or free available chlorine, 200 ppm to 1,000 ppm dimethyloctadecyl[3-(trimethoxysilyl)propyl]ammonium chloride, 50 ppm to 500 ppm silver nitrate and 10 ppm to 400 ppm titanium dioxide particles. In an aspect of this embodiment, a composition disclosed herein comprises 300 ppm to 900 ppm hypochlorous acid or free available chlorine, 300 ppm to 900 ppm dimethyloctadecyl[3-(trimethoxysilyl)propyl] ammonium chloride, 100 ppm to 400 ppm silver nitrate and 25 ppm to 350 ppm titanium dioxide particles. In an aspect of this embodiment, a composition disclosed herein comprises 400 ppm to 800 ppm hypochlorous acid or free available chlorine, 400 ppm to 800 ppm dimethyloctadecyl [3-(trimethoxysilyl)propyl]ammonium chloride, 150 ppm to 350 ppm silver nitrate and 50 ppm to 250 ppm titanium dioxide particles.

In an aspect of this embodiment, a composition disclosed herein comprises 180 ppm to 380 ppm hypochlorous acid or free available chlorine, 200 ppm to 400 ppm dimethyloctadecyl[3-(trimethoxysilyl)propyl]ammonium chloride, 100 ppm to 300 ppm silver nitrate and 50 ppm to 150 ppm titanium dioxide particles. In an aspect of this embodiment, a composition disclosed herein comprises 200 ppm to 360 ppm hypochlorous acid or free available chlorine, 220 ppm to 380 ppm dimethyloctadecyl[3-(trimethoxysilyl)propyl] ammonium chloride, 120 ppm to 280 ppm silver nitrate and 60 ppm to 140 ppm titanium dioxide particles. In an aspect of this embodiment, a composition disclosed herein comprises 220 ppm to 340 ppm hypochlorous acid or free available chlorine, 240 ppm to 360 ppm dimethyloctadecyl [3-(trimethoxysilyl)propyl]ammonium chloride, 140 ppm to 260 ppm silver nitrate and 70 ppm to 130 ppm titanium dioxide particles. In an aspect of this embodiment, a composition disclosed herein comprises 240 ppm to 320 ppm hypochlorous acid or free available chlorine, 260 ppm to 340 ppm dimethyloctadecyl[3-(trimethoxysilyl)propyl]ammonium chloride, 160 ppm to 240 ppm silver nitrate and 80 ppm to 120 ppm titanium dioxide particles. In an aspect of this embodiment, a composition disclosed herein comprises 260 ppm to 300 ppm hypochlorous acid or free available chlorine, 280 ppm to 320 ppm dimethyloctadecyl[3-(trimethoxysilyl)propyl]ammonium chloride, 180 ppm to 220 ppm silver nitrate and 90 ppm to 110 ppm titanium dioxide particles. In an aspect of this embodiment, a composition disclosed herein comprises 281 ppm hypochlorous acid or free available chlorine, 300 ppm dimethyloctadecyl [3-(trimethoxysilyl)propyl]ammonium chloride, 200 ppm silver nitrate and 100 ppm titanium dioxide particles.

In an aspect of this embodiment, a composition disclosed herein comprises 430 ppm to 630 ppm hypochlorous acid or free available chlorine, 400 ppm to 600 ppm dimethyloctadecyl[3-(trimethoxysilyl)propyl]ammonium chloride, 200 ppm to 400 ppm silver nitrate and 50 ppm to 150 ppm titanium dioxide particles. In an aspect of this embodiment, a composition disclosed herein comprises 450 ppm to 610 ppm hypochlorous acid or free available chlorine, 420 ppm to 580 ppm dimethyloctadecyl[3-(trimethoxysilyl)propyl] ammonium chloride, 220 ppm to 380 ppm silver nitrate and 60 ppm to 140 ppm titanium dioxide particles. In an aspect of this embodiment, a composition disclosed herein comprises 470 ppm to 590 ppm hypochlorous acid or free available chlorine, 440 ppm to 560 ppm dimethyloctadecyl [3-(trimethoxysilyl)propyl]ammonium chloride, 240 ppm to 360 ppm silver nitrate and 70 ppm to 130 ppm titanium dioxide particles. In an aspect of this embodiment, a composition disclosed herein comprises 490 ppm to 570 ppm hypochlorous acid or free available chlorine, 460 ppm to 540 ppm dimethyloctadecyl[3-(trimethoxysilyl)propyl]ammonium chloride, 260 ppm to 340 ppm silver nitrate and 80 ppm to 120 ppm titanium dioxide particles. In an aspect of this embodiment, a composition disclosed herein comprises 510 ppm to 550 ppm hypochlorous acid or free available chlorine, 480 ppm to 520 ppm dimethyloctadecyl[3-(trimethoxysilyl)propyl]ammonium chloride, 280 ppm to 320 ppm silver nitrate and 90 ppm to 110 ppm titanium dioxide particles. In an aspect of this embodiment, a composition disclosed herein comprises 530 ppm hypochlorous acid or free available chlorine, 500 ppm dimethyloctadecyl [3-(trimethoxysilyl)propyl]ammonium chloride, 300 ppm silver nitrate and 100 ppm titanium dioxide particles.

In an embodiment, a composition disclosed herein comprises hypochlorous acid or free available chlorine, and a copper particle, a zinc particle, an iron particle or any combination thereof. In an aspect of this embodiment, a composition disclosed herein comprises hypochlorous acid or free available chlorine, and a copper oxide particle, a zinc oxide particle, an iron oxide particle, or any combination thereof. In an aspect of this embodiment, a composition disclosed herein comprises hypochlorous acid or free available chlorine, and a copper-zinc-iron oxide particle.

In an aspect of this embodiment, a composition disclosed herein comprises 200 ppm to 1,000 ppm hypochlorous acid or free available chlorine, and 50 ppm to 500 ppm of a copper particle, 50 ppm to 500 ppm of a zinc particle, 50 ppm to 500 ppm of an iron particle or any combination thereof. In an aspect of this embodiment, a composition disclosed herein comprises 200 ppm to 1,000 ppm hypochlorous acid or free available chlorine, and 50 ppm to 500 ppm of a copper oxide particle, 50 ppm to 500 ppm of a zinc oxide particle, 50 ppm to 500 ppm of an iron oxide particle, or any combination thereof. In an aspect of this embodiment, a composition disclosed herein comprises 200 ppm to 1,000 ppm hypochlorous acid or free available chlorine, and 50 ppm to 500 ppm of a copper-zinc-iron oxide particle.

In an aspect of this embodiment, a composition disclosed herein comprises 5 ppm to 200 ppm hypochlorous acid or free available chlorine, and 50 ppm to 500 ppm of a copper particle, 50 ppm to 500 ppm of a zinc particle, 50 ppm to 500 ppm of an iron particle or any combination thereof. In an aspect of this embodiment, a composition disclosed herein comprises 5 ppm to 200 ppm hypochlorous acid or free available chlorine, and 50 ppm to 500 ppm of a copper oxide particle, 50 ppm to 500 ppm of a zinc oxide particle, 50 ppm to 500 ppm of an iron oxide particle, or any combination thereof. In an aspect of this embodiment, a composition disclosed herein comprises 5 ppm to 200 ppm hypochlorous acid or free available chlorine, and 50 ppm to 500 ppm of a copper-zinc-iron oxide particle.

In an aspect of this embodiment, a composition disclosed herein comprises 400 ppm to 600 ppm hypochlorous acid or free available chlorine and 1 ppm to 400 ppm copper zinc iron oxide particles. In another aspect of this embodiment, a composition disclosed herein comprises 400 ppm to 600 ppm hypochlorous acid or free available chlorine and 25 ppm to 300 ppm copper zinc iron oxide particles.

In an aspect of this embodiment, a composition disclosed herein comprises 400 ppm to 600 ppm hypochlorous acid or free available chlorine, and 1 ppm to 50 ppm copper zinc iron oxide particles. In an aspect of this embodiment, a composition disclosed herein comprises 420 ppm to 580 ppm hypochlorous acid or free available chlorine, and 5 ppm to 45 ppm copper zinc iron oxide particles. In an aspect of this embodiment, a composition disclosed herein comprises 440 ppm to 560 ppm hypochlorous acid or free available chlorine, and 10 ppm to 40 ppm copper zinc iron oxide particles. In an aspect of this embodiment, a composition disclosed herein comprises 460 ppm to 540 ppm hypochlorous acid or free available chlorine, and 15 ppm to 35 ppm copper zinc iron oxide particles. In an aspect of this embodiment, a composition disclosed herein comprises 480 ppm to 520 ppm hypochlorous acid or free available chlorine, and 20 ppm to 30 ppm copper zinc iron oxide particles. In an aspect of this embodiment, a composition disclosed herein comprises 500 ppm hypochlorous acid or free available chlorine, and 25 ppm copper zinc iron oxide particles.

In an aspect of this embodiment, a composition disclosed herein comprises 400 ppm to 600 ppm hypochlorous acid or free available chlorine, and 1 ppm to 100 ppm copper zinc iron oxide particles. In an aspect of this embodiment, a composition disclosed herein comprises 420 ppm to 580 ppm hypochlorous acid or free available chlorine, and 10 ppm to 90 ppm copper zinc iron oxide particles. In an aspect of this embodiment, a composition disclosed herein comprises 440 ppm to 560 ppm hypochlorous acid or free available chlorine, and 20 ppm to 80 ppm copper zinc iron oxide particles. In an aspect of this embodiment, a composition disclosed herein comprises 460 ppm to 540 ppm hypochlorous acid or free available chlorine, and 30 ppm to 70 ppm copper zinc iron oxide particles. In an aspect of this embodiment, a composition disclosed herein comprises 480 ppm to 520 ppm hypochlorous acid or free available chlorine, and 40 ppm to 60 ppm copper zinc iron oxide particles. In an aspect of this embodiment, a composition disclosed herein comprises 500 ppm hypochlorous acid or free available chlorine, and 50 ppm copper zinc iron oxide particles.

In an aspect of this embodiment, a composition disclosed herein comprises 400 ppm to 600 ppm hypochlorous acid or free available chlorine, and 50 ppm to 150 ppm copper zinc iron oxide particles. In an aspect of this embodiment, a composition disclosed herein comprises 420 ppm to 580 ppm hypochlorous acid or free available chlorine, and 60 ppm to 140 ppm copper zinc iron oxide particles. In an aspect of this embodiment, a composition disclosed herein comprises 440 ppm to 560 ppm hypochlorous acid or free available chlorine, and 70 ppm to 130 ppm copper zinc iron oxide particles. In an aspect of this embodiment, a composition disclosed herein comprises 460 ppm to 540 ppm hypochlorous acid or free available chlorine, and 80 ppm to 120 ppm copper zinc iron oxide particles. In an aspect of this embodiment, a composition disclosed herein comprises 480 ppm to 520 ppm hypochlorous acid or free available chlorine, and 90 ppm to 110 ppm copper zinc iron oxide particles. In an aspect of this embodiment, a composition disclosed herein comprises 500 ppm hypochlorous acid or free available chlorine, and 100 ppm copper zinc iron oxide particles.

In an aspect of this embodiment, a composition disclosed herein comprises 400 ppm to 600 ppm hypochlorous acid or free available chlorine, and 100 ppm to 200 ppm copper zinc iron oxide particles. In an aspect of this embodiment, a composition disclosed herein comprises 420 ppm to 580 ppm hypochlorous acid or free available chlorine, and 110 ppm to 190 ppm copper zinc iron oxide particles. In an aspect of this embodiment, a composition disclosed herein comprises 440 ppm to 560 ppm hypochlorous acid or free available chlorine, and 120 ppm to 180 ppm copper zinc iron oxide particles. In an aspect of this embodiment, a composition disclosed herein comprises 460 ppm to 540 ppm hypochlorous acid or free available chlorine, and 130 ppm to 170 ppm copper zinc iron oxide particles. In an aspect of this embodiment, a composition disclosed herein comprises 480 ppm to 520 ppm hypochlorous acid or free available chlorine, and 140 ppm to 160 ppm copper zinc iron oxide particles. In an aspect of this embodiment, a composition disclosed herein comprises 500 ppm hypochlorous acid or free available chlorine, and 150 ppm copper zinc iron oxide particles.

In an aspect of this embodiment, a composition disclosed herein comprises 400 ppm to 600 ppm hypochlorous acid or free available chlorine, and 150 ppm to 250 ppm copper zinc iron oxide particles. In an aspect of this embodiment, a composition disclosed herein comprises 420 ppm to 580 ppm hypochlorous acid or free available chlorine, and 160 ppm to 240 ppm copper zinc iron oxide particles. In an aspect of this embodiment, a composition disclosed herein comprises 440 ppm to 560 ppm hypochlorous acid or free available chlorine, and 170 ppm to 230 ppm copper zinc iron oxide particles. In an aspect of this embodiment, a composition disclosed herein comprises 460 ppm to 540 ppm hypochlorous acid or free available chlorine, and 180 ppm to 220 ppm copper zinc iron oxide particles. In an aspect of this embodiment, a composition disclosed herein comprises 480 ppm to 520 ppm hypochlorous acid or free available chlorine, and 190 ppm to 210 ppm copper zinc iron oxide particles. In an aspect of this embodiment, a composition disclosed herein comprises 500 ppm hypochlorous acid or free available chlorine, and 200 ppm copper zinc iron oxide particles.

In an aspect of this embodiment, a composition disclosed herein comprises 400 ppm to 600 ppm hypochlorous acid or free available chlorine, and 200 ppm to 300 ppm copper zinc iron oxide particles. In an aspect of this embodiment, a composition disclosed herein comprises 420 ppm to 580 ppm hypochlorous acid or free available chlorine, and 210 ppm to 290 ppm copper zinc iron oxide particles. In an aspect of this embodiment, a composition disclosed herein comprises 440 ppm to 560 ppm hypochlorous acid or free available chlorine, and 220 ppm to 280 ppm copper zinc iron oxide particles. In an aspect of this embodiment, a composition disclosed herein comprises 460 ppm to 540 ppm hypochlorous acid or free available chlorine, and 230 ppm to 270 ppm copper zinc iron oxide particles. In an aspect of this embodiment, a composition disclosed herein comprises 480 ppm to 520 ppm hypochlorous acid or free available chlorine, and 240 ppm to 260 ppm copper zinc iron oxide particles. In an aspect of this embodiment, a composition disclosed herein comprises 500 ppm hypochlorous acid or free available chlorine, and 250 ppm copper zinc iron oxide particles.

In an aspect of this embodiment, a composition disclosed herein comprises 400 ppm to 600 ppm hypochlorous acid or free available chlorine, and 250 ppm to 350 ppm copper zinc iron oxide particles. In an aspect of this embodiment, a composition disclosed herein comprises 420 ppm to 580 ppm hypochlorous acid or free available chlorine, and 260 ppm to 340 ppm copper zinc iron oxide particles. In an aspect of this embodiment, a composition disclosed herein comprises 440 ppm to 560 ppm hypochlorous acid or free available chlorine, and 270 ppm to 330 ppm copper zinc iron oxide particles. In an aspect of this embodiment, a composition disclosed herein comprises 460 ppm to 540 ppm hypochlorous acid or free available chlorine, and 280 ppm to 320 ppm copper zinc iron oxide particles. In an aspect of this embodiment, a composition disclosed herein comprises 480 ppm to 520 ppm hypochlorous acid or free available chlorine, and 290 ppm to 310 ppm copper zinc iron oxide particles. In an aspect of this embodiment, a composition disclosed herein comprises 500 ppm hypochlorous acid or free available chlorine, and 300 ppm copper zinc iron oxide particles.

In an aspect of this embodiment, a composition disclosed herein comprises 5 ppm to 200 ppm hypochlorous acid or free available chlorine and 1 ppm to 400 ppm copper zinc iron oxide particles. In another aspect of this embodiment, a composition disclosed herein comprises 5 ppm to 200 ppm hypochlorous acid or free available chlorine and 25 ppm to 300 ppm copper zinc iron oxide particles.

In an aspect of this embodiment, a composition disclosed herein comprises 5 ppm to 150 ppm hypochlorous acid or free available chlorine and 1 ppm to 400 ppm copper zinc iron oxide particles. In another aspect of this embodiment, a composition disclosed herein comprises 5 ppm to 150 ppm hypochlorous acid or free available chlorine and 25 ppm to 300 ppm copper zinc iron oxide particles.

In an aspect of this embodiment, a composition disclosed herein comprises 5 ppm to 100 ppm hypochlorous acid or free available chlorine and 1 ppm to 400 ppm copper zinc iron oxide particles. In another aspect of this embodiment, a composition disclosed herein comprises 5 ppm to 100 ppm hypochlorous acid or free available chlorine and 25 ppm to 300 ppm copper zinc iron oxide particles.

In an aspect of this embodiment, a composition disclosed herein comprises 5 ppm to 75 ppm hypochlorous acid or free available chlorine and 1 ppm to 400 ppm copper zinc iron oxide particles. In another aspect of this embodiment, a composition disclosed herein comprises 5 ppm to 75 ppm hypochlorous acid or free available chlorine and 25 ppm to 300 ppm copper zinc iron oxide particles.

In an aspect of this embodiment, a composition disclosed herein comprises 5 ppm to 50 ppm hypochlorous acid or free available chlorine and 1 ppm to 400 ppm copper zinc iron oxide particles. In another aspect of this embodiment, a composition disclosed herein comprises 5 ppm to 50 ppm hypochlorous acid or free available chlorine and 25 ppm to 300 ppm copper zinc iron oxide particles.

In an aspect of this embodiment, a composition disclosed herein comprises 1 ppm to 50 ppm hypochlorous acid or free available chlorine, and 1 ppm to 50 ppm copper zinc iron oxide particles. In an aspect of this embodiment, a composition disclosed herein comprises 5 ppm to 45 ppm hypochlorous acid or free available chlorine, and 5 ppm to 45 ppm copper zinc iron oxide particles. In an aspect of this embodiment, a composition disclosed herein comprises 10 ppm to 40 ppm hypochlorous acid or free available chlorine, and 10 ppm to 40 ppm copper zinc iron oxide particles. In an aspect of this embodiment, a composition disclosed herein comprises 15 ppm to 35 ppm hypochlorous acid or free available chlorine, and 15 ppm to 35 ppm copper zinc iron oxide particles. In an aspect of this embodiment, a composition disclosed herein comprises 20 ppm to 30 ppm hypochlorous acid or free available chlorine, and 20 ppm to 30 ppm copper zinc iron oxide particles. In an aspect of this embodiment, a composition disclosed herein comprises 25 ppm hypochlorous acid or free available chlorine, and 25 ppm copper zinc iron oxide particles.

In an aspect of this embodiment, a composition disclosed herein comprises 1 ppm to 50 ppm hypochlorous acid or free available chlorine, and 1 ppm to 100 ppm copper zinc iron oxide particles. In an aspect of this embodiment, a composition disclosed herein comprises 5 ppm to 45 ppm hypochlorous acid or free available chlorine, and 10 ppm to 90 ppm copper zinc iron oxide particles. In an aspect of this embodiment, a composition disclosed herein comprises 10 ppm to 40 ppm hypochlorous acid or free available chlorine, and 20 ppm to 80 ppm copper zinc iron oxide particles. In an aspect of this embodiment, a composition disclosed herein comprises 15 ppm to 35 ppm hypochlorous acid or free available chlorine, and 30 ppm to 70 ppm copper zinc iron oxide particles. In an aspect of this embodiment, a composition disclosed herein comprises 20 ppm to 30 ppm hypochlorous acid or free available chlorine, and 40 ppm to 60 ppm copper zinc iron oxide particles. In an aspect of this embodiment, a composition disclosed herein comprises 25 ppm hypochlorous acid or free available chlorine, and 50 ppm copper zinc iron oxide particles.

In an aspect of this embodiment, a composition disclosed herein comprises 1 ppm to 50 ppm hypochlorous acid or free available chlorine, and 50 ppm to 150 ppm copper zinc iron oxide particles. In an aspect of this embodiment, a composition disclosed herein comprises 5 ppm to 45 ppm hypochlorous acid or free available chlorine, and 60 ppm to 140 ppm copper zinc iron oxide particles. In an aspect of this embodiment, a composition disclosed herein comprises 10 ppm to 40 ppm hypochlorous acid or free available chlorine, and 70 ppm to 130 ppm copper zinc iron oxide particles. In an aspect of this embodiment, a composition disclosed herein comprises 15 ppm to 35 ppm hypochlorous acid or free available chlorine, and 80 ppm to 120 ppm copper zinc iron oxide particles. In an aspect of this embodiment, a composition disclosed herein comprises 20 ppm to 30 ppm hypochlorous acid or free available chlorine, and 90 ppm to 110 ppm copper zinc iron oxide particles. In an aspect of this embodiment, a composition disclosed herein comprises 25 ppm hypochlorous acid or free available chlorine, and 100 ppm copper zinc iron oxide particles.

In an aspect of this embodiment, a composition disclosed herein comprises 1 ppm to 50 ppm hypochlorous acid or free available chlorine, and 100 ppm to 200 ppm copper zinc iron oxide particles. In an aspect of this embodiment, a composition disclosed herein comprises 5 ppm to 45 ppm hypochlorous acid or free available chlorine, and 110 ppm to 190 ppm copper zinc iron oxide particles. In an aspect of this embodiment, a composition disclosed herein comprises 10 ppm to 40 ppm hypochlorous acid or free available chlorine, and 120 ppm to 180 ppm copper zinc iron oxide particles. In an aspect of this embodiment, a composition disclosed herein comprises 15 ppm to 35 ppm hypochlorous acid or free available chlorine, and 130 ppm to 170 ppm copper zinc iron oxide particles. In an aspect of this embodiment, a composition disclosed herein comprises 20 ppm to 30 ppm hypochlorous acid or free available chlorine, and 140 ppm to 160 ppm copper zinc iron oxide particles. In an aspect of this embodiment, a composition disclosed herein comprises 25 ppm hypochlorous acid or free available chlorine, and 150 ppm copper zinc iron oxide particles.

In an aspect of this embodiment, a composition disclosed herein comprises 1 ppm to 50 ppm hypochlorous acid or free available chlorine, and 150 ppm to 250 ppm copper zinc iron oxide particles. In an aspect of this embodiment, a composition disclosed herein comprises 5 ppm to 45 ppm hypochlorous acid or free available chlorine, and 160 ppm to 240 ppm copper zinc iron oxide particles. In an aspect of this embodiment, a composition disclosed herein comprises 10 ppm to 40 ppm hypochlorous acid or free available chlorine, and 170 ppm to 230 ppm copper zinc iron oxide particles. In an aspect of this embodiment, a composition disclosed herein comprises 15 ppm to 35 ppm hypochlorous acid or free available chlorine, and 180 ppm to 220 ppm copper zinc iron oxide particles. In an aspect of this embodiment, a composition disclosed herein comprises 20 ppm to 30 ppm hypochlorous acid or free available chlorine, and 190 ppm to 210 ppm copper zinc iron oxide particles. In an aspect of this embodiment, a composition disclosed herein comprises 25 ppm hypochlorous acid or free available chlorine, and 200 ppm copper zinc iron oxide particles.

In an aspect of this embodiment, a composition disclosed herein comprises 1 ppm to 50 ppm hypochlorous acid or free available chlorine, and 200 ppm to 300 ppm copper zinc iron oxide particles. In an aspect of this embodiment, a composition disclosed herein comprises 5 ppm to 45 ppm hypochlorous acid or free available chlorine, and 210 ppm to 290 ppm copper zinc iron oxide particles. In an aspect of this embodiment, a composition disclosed herein comprises 10 ppm to 40 ppm hypochlorous acid or free available chlorine, and 220 ppm to 280 ppm copper zinc iron oxide particles. In an aspect of this embodiment, a composition disclosed herein comprises 15 ppm to 35 ppm hypochlorous acid or free available chlorine, and 230 ppm to 270 ppm copper zinc iron oxide particles. In an aspect of this embodiment, a composition disclosed herein comprises 20 ppm to 30 ppm hypochlorous acid or free available chlorine, and 240 ppm to 260 ppm copper zinc iron oxide particles. In an aspect of this embodiment, a composition disclosed herein comprises 25 ppm hypochlorous acid or free available chlorine, and 250 ppm copper zinc iron oxide particles.

In an aspect of this embodiment, a composition disclosed herein comprises 1 ppm to 50 ppm hypochlorous acid or free available chlorine, and 250 ppm to 350 ppm copper zinc iron oxide particles. In an aspect of this embodiment, a composition disclosed herein comprises 5 ppm to 45 ppm hypochlorous acid or free available chlorine, and 260 ppm to 340 ppm copper zinc iron oxide particles. In an aspect of this embodiment, a composition disclosed herein comprises 10 ppm to 40 ppm hypochlorous acid or free available chlorine, and 270 ppm to 330 ppm copper zinc iron oxide particles. In an aspect of this embodiment, a composition disclosed herein comprises 15 ppm to 35 ppm hypochlorous acid or free available chlorine, and 280 ppm to 320 ppm copper zinc iron oxide particles. In an aspect of this embodiment, a composition disclosed herein comprises 20 ppm to 30 ppm hypochlorous acid or free available chlorine, and 290 ppm to 310 ppm copper zinc iron oxide particles. In an aspect of this embodiment, a composition disclosed herein comprises 25 ppm hypochlorous acid or free available chlorine, and 300 ppm copper zinc iron oxide particles.

In aspects of this embodiment, a composition disclosed herein comprises hypochlorous acid or free available chlorine, and one or more metal salts. In an aspect of this embodiment, a composition disclosed herein comprises hypochlorous acid or free available chlorine, and a copper salt, a zinc salt, an iron salt or any combination thereof. In an aspect of this embodiment, a composition disclosed herein comprises hypochlorous acid or free available chlorine, and a copper salt, a zinc salt and an iron salt. In an aspect of this embodiment, a composition disclosed herein comprises hypochlorous acid or free available chlorine, and a copper chloride, a zinc chloride, an iron chloride or any combination thereof. In an aspect of this embodiment, a composition disclosed herein comprises hypochlorous acid or free available chlorine, and a copper chloride, a zinc chloride and an iron chloride. The iron chloride can be iron (II) chloride or iron (III) chloride.

In an embodiment, a composition disclosed herein comprises 200 ppm to 1,000 ppm hypochlorous acid or free available chlorine, and 50 ppm to 500 ppm one or more metal salts. In an aspect of this embodiment, a composition disclosed herein comprises 200 ppm to 1,000 ppm hypochlorous acid or free available chlorine, and 50 ppm to 500 ppm of a copper salt, 50 ppm to 500 ppm of a zinc salt, 50 ppm to 500 ppm of an iron salt, or any combination thereof. In an aspect of this embodiment, a composition disclosed herein comprises 200 ppm to 1,000 ppm hypochlorous acid or free available chlorine, and 50 ppm to 500 ppm of a copper salt, 50 ppm to 500 ppm of a zinc salt and 50 ppm to 500 ppm of an iron salt. In an aspect of this embodiment, a composition disclosed herein comprises 200 ppm to 1,000 ppm hypochlorous acid or free available chlorine, and 50 ppm to 500 ppm of a copper chloride, 50 ppm to 500 ppm of a zinc chloride, 50 ppm to 500 ppm of an iron chloride, or any combination thereof. In an aspect of this embodiment, a composition disclosed herein comprises 200 ppm to 1,000 ppm hypochlorous acid or free available chlorine, and 50 ppm to 500 ppm of a copper chloride, 50 ppm to 500 ppm of a zinc chloride and 50 ppm to 500 ppm of an iron chloride. The iron chloride can be iron (II) chloride or iron (III) chloride.

In an embodiment, a composition disclosed herein comprises 50 ppm to 500 ppm hypochlorous acid or free available chlorine, and 10 ppm to 250 ppm one or more metal salts. In an aspect of this embodiment, a composition disclosed herein comprises 50 ppm to 500 ppm hypochlorous acid or free available chlorine, and 10 ppm to 250 ppm of a copper salt, 10 ppm to 250 ppm of zinc salt, 10 ppm to 250 ppm of an iron salt, or any combination thereof. In an aspect of this embodiment, a composition disclosed herein comprises 50 ppm to 500 ppm hypochlorous acid or free available chlorine, and 10 ppm to 250 ppm of a copper salt, 10 ppm to 250 ppm of zinc salt and 10 ppm to 250 ppm of an iron salt. In an aspect of this embodiment, a composition disclosed herein comprises 50 ppm to 500 ppm hypochlorous acid or free available chlorine, and 10 ppm to 250 ppm of a copper chloride, 10 ppm to 250 ppm of a zinc chloride, 10 ppm to 250 ppm of an iron chloride, or any combination thereof. In an aspect of this embodiment, a composition disclosed herein comprises 50 ppm to 500 ppm hypochlorous acid or free available chlorine, and 10 ppm to 250 ppm of a copper chloride, 10 ppm to 250 ppm of a zinc chloride and 10 ppm to 250 ppm of an iron chloride. The iron chloride can be iron (II) chloride or iron (III) chloride.

In an embodiment, a composition disclosed herein comprises 75 ppm to 400 ppm hypochlorous acid or free available chlorine, and 20 ppm to 200 ppm one or more metal salts. In an aspect of this embodiment, a composition disclosed herein comprises 75 ppm to 400 ppm hypochlorous acid or free available chlorine, and 20 ppm to 200 ppm of a copper salt, 20 ppm to 200 ppm of zinc salt, 20 ppm to 200 ppm of an iron salt, or any combination thereof. In an aspect of this embodiment, a composition disclosed herein comprises 75 ppm to 400 ppm hypochlorous acid or free available chlorine, and 20 ppm to 200 ppm of a copper salt, 20 ppm to 200 ppm of zinc salt and 20 ppm to 200 ppm of an iron salt. In an aspect of this embodiment, a composition disclosed herein comprises 75 ppm to 400 ppm hypochlorous acid or free available chlorine, and 20 ppm to 200 ppm of a copper chloride, 20 ppm to 200 ppm of a zinc chloride, 20 ppm to 200 ppm of an iron chloride, or any combination thereof. In an aspect of this embodiment, a composition disclosed herein comprises 75 ppm to 400 ppm hypochlorous acid or free available chlorine, and 20 ppm to 200 ppm of a copper chloride, 20 ppm to 200 ppm of a zinc chloride and 20 ppm to 200 ppm of an iron chloride. The iron chloride can be iron (II) chloride or iron (III) chloride.

In an embodiment, a composition disclosed herein comprises 100 ppm to 350 ppm hypochlorous acid or free available chlorine, and 40 ppm to 140 ppm one or more metal salts. In an aspect of this embodiment, a composition disclosed herein comprises 100 ppm to 350 ppm hypochlorous acid or free available chlorine, and 40 ppm to 140 ppm of a copper salt, 40 ppm to 140 ppm of zinc salt, 40 ppm to 140 ppm of an iron salt, or any combination thereof. In an aspect of this embodiment, a composition disclosed herein comprises 100 ppm to 350 ppm hypochlorous acid or free available chlorine, and 40 ppm to 140 ppm of a copper salt, 40 ppm to 140 ppm of zinc salt and 40 ppm to 140 ppm of an iron salt. In an aspect of this embodiment, a composition disclosed herein comprises 100 ppm to 350 ppm hypochlorous acid or free available chlorine, and 40 ppm to 140 ppm of a copper chloride, 40 ppm to 140 ppm of a zinc chloride, 40 ppm to 140 ppm of an iron chloride, or any combination thereof. In an aspect of this embodiment, a composition disclosed herein comprises 100 ppm to 350 ppm hypochlorous acid or free available chlorine, and 40 ppm to 140 ppm of a copper chloride, 40 ppm to 140 ppm of a zinc chloride and 40 ppm to 140 ppm of an iron chloride. The iron chloride can be iron (II) chloride or iron (III) chloride.

In an embodiment, a composition disclosed herein comprises 5 ppm to 200 ppm hypochlorous acid or free available chlorine, and 50 ppm to 500 ppm one or more metal salts. In an aspect of this embodiment, a composition disclosed herein comprises 5 ppm to 200 ppm hypochlorous acid or free available chlorine, and 50 ppm to 500 ppm of a copper salt, 50 ppm to 500 ppm of zinc salt, 50 ppm to 500 ppm of an iron salt, or any combination thereof. In an aspect of this embodiment, a composition disclosed herein comprises 5 ppm to 200 ppm hypochlorous acid or free available chlorine, and 50 ppm to 500 ppm of a copper salt, 50 ppm to 500 ppm of zinc salt and 50 ppm to 500 ppm of an iron salt. In an aspect of this embodiment, a composition disclosed herein comprises 5 ppm to 200 ppm hypochlorous acid or free available chlorine, and 50 ppm to 500 ppm of a copper chloride, 50 ppm to 500 ppm of a zinc chloride, 50 ppm to 500 ppm of an iron chloride, or any combination thereof. In an aspect of this embodiment, a composition disclosed herein comprises 5 ppm to 200 ppm hypochlorous acid or free available chlorine, and 50 ppm to 500 ppm of a copper chloride, 50 ppm to 500 ppm of a zinc chloride and 50 ppm to 500 ppm of an iron chloride. The iron chloride can be iron (II) chloride or iron (III) chloride.

In an embodiment, a composition disclosed herein comprises 5 ppm to 150 ppm hypochlorous acid or free available chlorine, and 50 ppm to 500 ppm one or more metal salts. In an aspect of this embodiment, a composition disclosed herein comprises 5 ppm to 150 ppm hypochlorous acid or free available chlorine, and 50 ppm to 500 ppm of a copper salt, 50 ppm to 500 ppm of zinc salt, 50 ppm to 500 ppm of an iron salt, or any combination thereof. In an aspect of this embodiment, a composition disclosed herein comprises 5 ppm to 150 ppm hypochlorous acid or free available chlorine, and 50 ppm to 500 ppm of a copper salt, 50 ppm to 500 ppm of zinc salt and 50 ppm to 500 ppm of an iron salt. In an aspect of this embodiment, a composition disclosed herein comprises 5 ppm to 150 ppm hypochlorous acid or free available chlorine, and 50 ppm to 500 ppm of a copper chloride, 50 ppm to 500 ppm of a zinc chloride, 50 ppm to 500 ppm of an iron chloride, or any combination thereof. In an aspect of this embodiment, a composition disclosed herein comprises 5 ppm to 150 ppm hypochlorous acid or free available chlorine, and 50 ppm to 500 ppm of a copper chloride, 50 ppm to 500 ppm of a zinc chloride and 50 ppm to 500 ppm of an iron chloride. The iron chloride can be iron (II) chloride or iron (III) chloride.

In an embodiment, a composition disclosed herein comprises 5 ppm to 100 ppm hypochlorous acid or free available chlorine, and 50 ppm to 500 ppm one or more metal salts. In an aspect of this embodiment, a composition disclosed herein comprises 5 ppm to 100 ppm hypochlorous acid or free available chlorine, and 50 ppm to 500 ppm of a copper salt, 50 ppm to 500 ppm of a zinc salt, 50 ppm to 500 ppm of an iron salt, or any combination thereof. In an aspect of this embodiment, a composition disclosed herein comprises 5 ppm to 100 ppm hypochlorous acid or free available chlorine, and 50 ppm to 500 ppm of a copper salt, 50 ppm to 500 ppm of a zinc salt and 50 ppm to 500 ppm of an iron salt. In an aspect of this embodiment, a composition disclosed herein comprises 5 ppm to 100 ppm hypochlorous acid or free available chlorine, and 50 ppm to 500 ppm of a copper chloride, 50 ppm to 500 ppm of a zinc chloride, 50 ppm to 500 ppm of an iron chloride, or any combination thereof. In an aspect of this embodiment, a composition disclosed herein comprises 5 ppm to 100 ppm hypochlorous acid or free available chlorine, and 50 ppm to 500 ppm of a copper chloride, 50 ppm to 500 ppm of a zinc chloride and 50 ppm to 500 ppm of an iron chloride. The iron chloride can be iron (II) chloride or iron (III) chloride.

In an embodiment, a composition disclosed herein comprises 5 ppm to 75 ppm hypochlorous acid or free available chlorine, and 50 ppm to 500 ppm one or more metal salts. In an aspect of this embodiment, a composition disclosed herein comprises 5 ppm to 75 ppm hypochlorous acid or free available chlorine, and 50 ppm to 500 ppm of a copper salt, 50 ppm to 500 ppm of a zinc salt, 50 ppm to 500 ppm of an iron salt, or any combination thereof. In an aspect of this embodiment, a composition disclosed herein comprises 5 ppm to 75 ppm hypochlorous acid or free available chlorine, and 50 ppm to 500 ppm of a copper salt, 50 ppm to 500 ppm of a zinc salt and 50 ppm to 500 ppm of an iron salt. In an aspect of this embodiment, a composition disclosed herein comprises 5 ppm to 75 ppm hypochlorous acid or free available chlorine, and 50 ppm to 500 ppm of a copper chloride, 50 ppm to 500 ppm of a zinc chloride, 50 ppm to 500 ppm of an iron chloride, or any combination thereof. In an aspect of this embodiment, a composition disclosed herein comprises 5 ppm to 75 ppm hypochlorous acid or free available chlorine, and 50 ppm to 500 ppm of a copper chloride, 50 ppm to 500 ppm of a zinc chloride and 50 ppm to 500 ppm of an iron chloride. The iron chloride can be iron (II) chloride or iron (III) chloride.

In an embodiment, a composition disclosed herein comprises 5 ppm to 50 ppm hypochlorous acid or free available chlorine, and 50 ppm to 500 ppm one or more metal salts. In an aspect of this embodiment, a composition disclosed herein comprises 5 ppm to 50 ppm hypochlorous acid or free available chlorine, and 50 ppm to 500 ppm of a copper salt, 50 ppm to 500 ppm of a zinc salt, 50 ppm to 500 ppm of an iron salt, or any combination thereof. In an aspect of this embodiment, a composition disclosed herein comprises 5 ppm to 50 ppm hypochlorous acid or free available chlorine, and 50 ppm to 500 ppm of a copper salt, 50 ppm to 500 ppm of a zinc salt and 50 ppm to 500 ppm of an iron salt. In an aspect of this embodiment, a composition disclosed herein comprises 5 ppm to 50 ppm hypochlorous acid or free available chlorine, and 50 ppm to 500 ppm of a copper chloride, 50 ppm to 500 ppm of a zinc chloride, 50 ppm to 500 ppm of an iron chloride, or any combination thereof. In an aspect of this embodiment, a composition disclosed herein comprises 5 ppm to 50 ppm hypochlorous acid or free available chlorine, and 50 ppm to 500 ppm of a copper chloride, 50 ppm to 500 ppm of a zinc chloride and 50 ppm to 500 ppm of an iron chloride. The iron chloride can be iron (II) chloride or iron (III) chloride.

In an aspect of this embodiment, a composition disclosed herein comprises 400 ppm to 600 ppm hypochlorous acid or free available chlorine, 50 ppm to 150 ppm copper salt, 50 ppm to 150 ppm zinc salt and 50 ppm to 150 ppm iron salt. In an aspect of this embodiment, a composition disclosed herein comprises 420 ppm to 580 ppm hypochlorous acid or free available chlorine, 60 ppm to 140 ppm copper salt, 60 ppm to 140 ppm zinc salt, and 60 ppm to 140 ppm iron salt. In an aspect of this embodiment, a composition disclosed herein comprises 440 ppm to 560 ppm hypochlorous acid or free available chlorine, 70 ppm to 130 ppm copper salt, 70 ppm to 130 ppm zinc salt, and 70 ppm to 130 ppm iron salt. In an aspect of this embodiment, a composition disclosed herein comprises 460 ppm to 540 ppm hypochlorous acid or free available chlorine, 80 ppm to 120 ppm copper salt, 80 ppm to 120 ppm zinc salt, and 80 ppm to 120 ppm iron salt. In an aspect of this embodiment, a composition disclosed herein comprises 480 ppm to 520 ppm hypochlorous acid or free available chlorine, 90 ppm to 110 ppm copper salt, 90 ppm to 110 ppm, zinc salt, and 90 ppm to 110 ppm iron salt. In an aspect of this embodiment, a composition disclosed herein comprises 500 ppm hypochlorous acid or free available chlorine, 100 ppm copper salt, 100 ppm zinc salt, and 100 ppm iron salt.

In an aspect of this embodiment, a composition disclosed herein comprises 400 ppm to 600 ppm hypochlorous acid or free available chlorine, 50 ppm to 150 ppm copper chloride, 50 ppm to 150 ppm zinc chloride and 50 ppm to 150 ppm iron chloride. In an aspect of this embodiment, a composition disclosed herein comprises 420 ppm to 580 ppm hypochlorous acid or free available chlorine, 60 ppm to 140 ppm copper chloride, 60 ppm to 140 ppm zinc chloride, and 60 ppm to 140 ppm iron chloride. In an aspect of this embodiment, a composition disclosed herein comprises 440 ppm to 560 ppm hypochlorous acid or free available chlorine, 70 ppm to 130 ppm copper chloride, 70 ppm to 130 ppm zinc chloride, and 70 ppm to 130 ppm iron chloride. In an aspect of this embodiment, a composition disclosed herein comprises 460 ppm to 540 ppm hypochlorous acid or free available chlorine, 80 ppm to 120 ppm copper chloride, 80 ppm to 120 ppm zinc chloride, and 80 ppm to 120 ppm iron chloride. In an aspect of this embodiment, a composition disclosed herein comprises 480 ppm to 520 ppm hypochlorous acid or free available chlorine, 90 ppm to 110 ppm copper chloride, 90 ppm to 110 ppm zinc chloride, and 90 ppm to 110 ppm iron chloride. In an aspect of this embodiment, a composition disclosed herein comprises 500 ppm hypochlorous acid or free available chlorine, 100 ppm copper chloride, 100 ppm zinc chloride, and 100 ppm iron chloride. The iron chloride can be iron (II) chloride or iron (III) chloride.

In an aspect of this embodiment, a composition disclosed herein comprises 400 ppm to 600 ppm hypochlorous acid or free available chlorine, 100 ppm to 200 ppm copper salt, 100 ppm to 200 ppm zinc salt, and 100 ppm to 200 ppm iron salt. In an aspect of this embodiment, a composition disclosed herein comprises 420 ppm to 580 ppm hypochlorous acid or free available chlorine, 110 ppm to 190 ppm copper salt, 110 ppm to 190 ppm zinc salt, and 110 ppm to 190 ppm iron salt. In an aspect of this embodiment, a composition disclosed herein comprises 440 ppm to 560 ppm hypochlorous acid or free available chlorine, 120 ppm to 180 ppm copper salt, 120 ppm to 180 ppm zinc salt, and 120 ppm to 180 ppm iron salt. In an aspect of this embodiment, a composition disclosed herein comprises 460 ppm to 540 ppm hypochlorous acid or free available chlorine, 130 ppm to 170 ppm copper salt, 130 ppm to 170 ppm zinc salt, and 130 ppm to 170 ppm iron salt. In an aspect of this embodiment, a composition disclosed herein comprises 480 ppm to 520 ppm hypochlorous acid or free available chlorine, 140 ppm to 160 ppm copper salt, 140 ppm to 160 ppm zinc salt, and 140 ppm to 160 ppm iron salt. In an aspect of this embodiment, a composition disclosed herein comprises 500 ppm hypochlorous acid or free available chlorine, 150 ppm copper salt, 150 ppm zinc salt, and 150 ppm iron salt.

In an aspect of this embodiment, a composition disclosed herein comprises 400 ppm to 600 ppm hypochlorous acid or free available chlorine, 100 ppm to 200 ppm copper chloride, 100 ppm to 200 ppm zinc chloride, and 100 ppm to 200 ppm iron chloride. In an aspect of this embodiment, a composition disclosed herein comprises 420 ppm to 580 ppm hypochlorous acid or free available chlorine, 110 ppm to 190 ppm copper chloride, 110 ppm to 190 ppm zinc chloride, and 110 ppm to 190 ppm iron chloride. In an aspect of this embodiment, a composition disclosed herein comprises 440 ppm to 560 ppm hypochlorous acid or free available chlorine, 120 ppm to 180 ppm copper chloride, 120 ppm to 180 ppm zinc chloride, and 120 ppm to 180 ppm iron chloride. In an aspect of this embodiment, a composition disclosed herein comprises 460 ppm to 540 ppm hypochlorous acid or free available chlorine, 130 ppm to 170 ppm copper chloride, 130 ppm to 170 ppm zinc chloride, and 130 ppm to 170 ppm iron chloride. In an aspect of this embodiment, a composition disclosed herein comprises 480 ppm to 520 ppm hypochlorous acid or free available chlorine, 140 ppm to 160 ppm copper chloride, 140 ppm to 160 ppm zinc chloride, and 140 ppm to 160 ppm iron chloride. In an aspect of this embodiment, a composition disclosed herein comprises 500 ppm hypochlorous acid or free available chlorine, 150 ppm copper chloride, 150 ppm zinc chloride, and 150 ppm iron chloride. The iron chloride can be iron (II) chloride or iron (III) chloride.

In an aspect of this embodiment, a composition disclosed herein comprises 400 ppm to 600 ppm hypochlorous acid or free available chlorine, 150 ppm to 250 ppm copper salt, 150 ppm to 250 ppm zinc salt, and 150 ppm to 250 ppm iron salt. In an aspect of this embodiment, a composition disclosed herein comprises 420 ppm to 580 ppm hypochlorous acid or free available chlorine, 160 ppm to 240 ppm copper salt, 160 ppm to 240 ppm zinc salt, and 160 ppm to 240 ppm iron salt. In an aspect of this embodiment, a composition disclosed herein comprises 440 ppm to 560 ppm hypochlorous acid or free available chlorine, 170 ppm to 230 ppm copper salt, 170 ppm to 230 ppm zinc salt, and 170 ppm to 230 ppm iron salt. In an aspect of this embodiment, a composition disclosed herein comprises 460 ppm to 540 ppm hypochlorous acid or free available chlorine, 180 ppm to 220 ppm copper salt, 180 ppm to 220 ppm zinc salt, and 180 ppm to 220 ppm iron salt. In an aspect of this embodiment, a composition disclosed herein comprises 480 ppm to 520 ppm hypochlorous acid or free available chlorine, 190 ppm to 210 ppm copper salt, 190 ppm to 210 ppm zinc salt, and 190 ppm to 210 ppm iron salt. In an aspect of this embodiment, a composition disclosed herein comprises 500 ppm hypochlorous acid or free available chlorine, 200 ppm copper salt, 200 ppm zinc salt, and 200 ppm iron salt.

In an aspect of this embodiment, a composition disclosed herein comprises 400 ppm to 600 ppm hypochlorous acid or free available chlorine, 150 ppm to 250 ppm copper chloride, 150 ppm to 250 ppm zinc chloride and 150 ppm to 250 ppm iron chloride. In an aspect of this embodiment, a composition disclosed herein comprises 420 ppm to 580 ppm hypochlorous acid or free available chlorine, 160 ppm to 240 ppm copper chloride, 160 ppm to 240 ppm zinc chloride, and 160 ppm to 240 ppm iron chloride. In an aspect of this embodiment, a composition disclosed herein comprises 440 ppm to 560 ppm hypochlorous acid or free available chlorine, 170 ppm to 230 ppm copper chloride, 170 ppm to 230 ppm zinc chloride, and 170 ppm to 230 ppm iron chloride. In an aspect of this embodiment, a composition disclosed herein comprises 460 ppm to 540 ppm hypochlorous acid or free available chlorine, 180 ppm to 220 ppm copper chloride, 180 ppm to 220 ppm zinc chloride, and 180 ppm to 220 ppm iron chloride. In an aspect of this embodiment, a composition disclosed herein comprises 480 ppm to 520 ppm hypochlorous acid or free available chlorine, 190 ppm to 210 ppm copper chloride, 190 ppm to 210 ppm zinc chloride, and 190 ppm to 210 ppm iron chloride. In an aspect of this embodiment, a composition disclosed herein comprises 500 ppm hypochlorous acid or free available chlorine, 200 ppm copper chloride, 200 ppm zinc chloride, and 200 ppm iron chloride. The iron chloride can be iron (II) chloride or iron (III) chloride.

In an aspect of this embodiment, a composition disclosed herein comprises 400 ppm to 600 ppm hypochlorous acid or free available chlorine, 200 ppm to 300 ppm copper salt, 200 ppm to 300 ppm zinc salt, and 200 ppm to 300 ppm iron salt. In an aspect of this embodiment, a composition disclosed herein comprises 420 ppm to 580 ppm hypochlorous acid or free available chlorine, 210 ppm to 290 ppm copper salt, 210 ppm to 290 ppm zinc salt, and 210 ppm to 290 ppm iron salt. In an aspect of this embodiment, a composition disclosed herein comprises 440 ppm to 560 ppm hypochlorous acid or free available chlorine, 220 ppm to 280 ppm copper salt, 220 ppm to 280 ppm zinc salt, and 220 ppm to 280 ppm iron salt. In an aspect of this embodiment, a composition disclosed herein comprises 460 ppm to 540 ppm hypochlorous acid or free available chlorine, 230 ppm to 270 ppm copper salt, 230 ppm to 270 ppm zinc salt, and 230 ppm to 270 ppm iron salt. In an aspect of this embodiment, a composition disclosed herein comprises 480 ppm to 520 ppm hypochlorous acid or free available chlorine, 240 ppm to 260 ppm copper salt, 240 ppm to 260 ppm zinc salt, and 240 ppm to 260 ppm iron salt. In an aspect of this embodiment, a composition disclosed herein comprises 500 ppm hypochlorous acid or free available chlorine, 250 ppm copper salt, 250 ppm zinc salt, and 250 ppm iron salt.

In an aspect of this embodiment, a composition disclosed herein comprises 400 ppm to 600 ppm hypochlorous acid or free available chlorine, 200 ppm to 300 ppm copper chloride, 200 ppm to 300 ppm zinc chloride, and 200 ppm to 300 ppm iron chloride. In an aspect of this embodiment, a composition disclosed herein comprises 420 ppm to 580 ppm hypochlorous acid or free available chlorine, 210 ppm to 290 ppm copper chloride, 210 ppm to 290 ppm zinc chloride, and 210 ppm to 290 ppm iron chloride. In an aspect of this embodiment, a composition disclosed herein comprises 440 ppm to 560 ppm hypochlorous acid or free available chlorine, 220 ppm to 280 ppm copper chloride, 220 ppm to 280 ppm zinc chloride, and 220 ppm to 280 ppm iron chloride. In an aspect of this embodiment, a composition disclosed herein comprises 460 ppm to 540 ppm hypochlorous acid or free available chlorine, 230 ppm to 270 ppm copper chloride, 230 ppm to 270 ppm zinc chloride, and 230 ppm to 270 ppm iron chloride. In an aspect of this embodiment, a composition disclosed herein comprises 480 ppm to 520 ppm hypochlorous acid or free available chlorine, 240 ppm to 260 ppm copper chloride, 240 ppm to 260 ppm zinc chloride, and 240 ppm to 260 ppm iron chloride. In an aspect of this embodiment, a composition disclosed herein comprises 500 ppm hypochlorous acid or free available chlorine, 250 ppm copper chloride, 250 ppm zinc chloride, and 250 ppm iron chloride. The iron chloride can be iron (II) chloride or iron (III) chloride.

In an aspect of this embodiment, a composition disclosed herein comprises 400 ppm to 600 ppm hypochlorous acid or free available chlorine, 250 ppm to 350 ppm copper salt, 250 ppm to 350 ppm zinc salt, and 250 ppm to 350 ppm iron salt. In an aspect of this embodiment, a composition disclosed herein comprises 420 ppm to 580 ppm hypochlorous acid or free available chlorine, 260 ppm to 340 ppm copper salt, 260 ppm to 340 ppm zinc salt, and 260 ppm to 340 ppm iron salt. In an aspect of this embodiment, a composition disclosed herein comprises 440 ppm to 560 ppm hypochlorous acid or free available chlorine, 270 ppm to 330 ppm copper salt, 270 ppm to 330 ppm zinc salt, and 270 ppm to 330 ppm iron salt. In an aspect of this embodiment, a composition disclosed herein comprises 460 ppm to 540 ppm hypochlorous acid or free available chlorine, 280 ppm to 320 ppm copper salt, 280 ppm to 320 ppm zinc salt, and 280 ppm to 320 ppm iron salt. In an aspect of this embodiment, a composition disclosed herein comprises 480 ppm to 520 ppm hypochlorous acid or free available chlorine, 290 ppm to 310 ppm copper salt, 290 ppm to 310 ppm zinc salt, and 290 ppm to 310 ppm iron salt. In an aspect of this embodiment, a composition disclosed herein comprises 500 ppm hypochlorous acid or free available chlorine, 300 ppm copper salt, 300 ppm zinc salt, and 300 ppm iron salt.

In an aspect of this embodiment, a composition disclosed herein comprises 400 ppm to 600 ppm hypochlorous acid or free available chlorine, 250 ppm to 350 ppm copper chloride, 250 ppm to 350 ppm zinc chloride, and 250 ppm to 350 ppm iron chloride. In an aspect of this embodiment, a composition disclosed herein comprises 420 ppm to 580 ppm hypochlorous acid or free available chlorine, 260 ppm to 340 ppm copper chloride, 260 ppm to 340 ppm zinc chloride, and 260 ppm to 340 ppm iron chloride. In an aspect of this embodiment, a composition disclosed herein comprises 440 ppm to 560 ppm hypochlorous acid or free available chlorine, 270 ppm to 330 ppm copper chloride, 270 ppm to 330 ppm zinc chloride, and 270 ppm to 330 ppm iron chloride. In an aspect of this embodiment, a composition disclosed herein comprises 460 ppm to 540 ppm hypochlorous acid or free available chlorine, 280 ppm to 320 ppm copper chloride, 280 ppm to 320 ppm zinc chloride, and 280 ppm to 320 ppm iron chloride. In an aspect of this embodiment, a composition disclosed herein comprises 480 ppm to 520 ppm hypochlorous acid or free available chlorine, 290 ppm to 310 ppm copper chloride, 290 ppm to 310 ppm zinc chloride, and 290 ppm to 310 ppm iron chloride. In an aspect of this embodiment, a composition disclosed herein comprises 500 ppm hypochlorous acid or free available chlorine, 300 ppm copper chloride, 300 ppm zinc chloride, and 300 ppm iron chloride. The iron chloride can be iron (II) chloride or iron (III) chloride.

In an aspect of this embodiment, a composition disclosed herein comprises 1 ppm to 50 ppm hypochlorous acid or free available chlorine, 50 ppm to 150 ppm copper salt, 50 ppm to 150 ppm zinc salt and 50 ppm to 150 ppm iron salt. In an aspect of this embodiment, a composition disclosed herein comprises 5 ppm to 45 ppm hypochlorous acid or free available chlorine, 60 ppm to 140 ppm copper salt, 60 ppm to 140 ppm zinc salt, and 60 ppm to 140 ppm iron salt. In an aspect of this embodiment, a composition disclosed herein comprises 10 ppm to 40 ppm hypochlorous acid or free available chlorine, 70 ppm to 130 ppm copper salt, 70 ppm to 130 ppm zinc salt, and 70 ppm to 130 ppm iron salt. In an aspect of this embodiment, a composition disclosed herein comprises 15 ppm to 35 ppm hypochlorous acid or free available chlorine, 80 ppm to 120 ppm copper salt, 80 ppm to 120 ppm zinc salt, and 80 ppm to 120 ppm iron salt. In an aspect of this embodiment, a composition disclosed herein comprises 20 ppm to 30 ppm hypochlorous acid or free available chlorine, 90 ppm to 110 ppm copper salt, 90 ppm to 110 ppm, zinc salt, and 90 ppm to 110 ppm iron salt. In an aspect of this embodiment, a composition disclosed herein comprises 25 ppm hypochlorous acid or free available chlorine, 100 ppm copper salt, 100 ppm zinc salt, and 100 ppm iron salt.

In an aspect of this embodiment, a composition disclosed herein comprises 1 ppm to 50 ppm hypochlorous acid or free available chlorine, 50 ppm to 150 ppm copper chloride, 50 ppm to 150 ppm zinc chloride and 50 ppm to 150 ppm iron chloride. In an aspect of this embodiment, a composition disclosed herein comprises 5 ppm to 45 ppm hypochlorous acid or free available chlorine, 60 ppm to 140 ppm copper chloride, 60 ppm to 140 ppm zinc chloride, and 60 ppm to 140 ppm iron chloride. In an aspect of this embodiment, a composition disclosed herein comprises 10 ppm to 40 ppm hypochlorous acid or free available chlorine, 70 ppm to 130 ppm copper chloride, 70 ppm to 130 ppm zinc chloride, and 70 ppm to 130 ppm iron chloride. In an aspect of this embodiment, a composition disclosed herein comprises 15 ppm to 35 ppm hypochlorous acid or free available chlorine, 80 ppm to 120 ppm copper chloride, 80 ppm to 120 ppm zinc chloride, and 80 ppm to 120 ppm iron chloride. In an aspect of this embodiment, a composition disclosed herein comprises 20 ppm to 30 ppm hypochlorous acid or free available chlorine, 90 ppm to 110 ppm copper chloride, 90 ppm to 110 ppm zinc chloride, and 90 ppm to 110 ppm iron chloride. In an aspect of this embodiment, a composition disclosed herein comprises 25 ppm hypochlorous acid or free available chlorine, 100 ppm copper chloride, 100 ppm zinc chloride, and 100 ppm iron chloride. The iron chloride can be iron (II) chloride or iron (III) chloride.

In an aspect of this embodiment, a composition disclosed herein comprises 1 ppm to 50 ppm hypochlorous acid or free available chlorine, 100 ppm to 200 ppm copper salt, 100 ppm to 200 ppm zinc salt, and 100 ppm to 200 ppm iron salt. In an aspect of this embodiment, a composition disclosed herein comprises 5 ppm to 45 ppm hypochlorous acid or free available chlorine, 110 ppm to 190 ppm copper salt, 110 ppm to 190 ppm zinc salt, and 110 ppm to 190 ppm iron salt. In an aspect of this embodiment, a composition disclosed herein comprises 10 ppm to 40 ppm hypochlorous acid or free available chlorine, 120 ppm to 180 ppm copper salt, 120 ppm to 180 ppm zinc salt, and 120 ppm to 180 ppm iron salt. In an aspect of this embodiment, a composition disclosed herein comprises 15 ppm to 35 ppm hypochlorous acid or free available chlorine, 130 ppm to 170 ppm copper salt, 130 ppm to 170 ppm zinc salt, and 130 ppm to 170 ppm iron salt. In an aspect of this embodiment, a composition disclosed herein comprises 20 ppm to 30 ppm hypochlorous acid or free available chlorine, 140 ppm to 160 ppm copper salt, 140 ppm to 160 ppm zinc salt, and 140 ppm to 160 ppm iron salt. In an aspect of this embodiment, a composition disclosed herein comprises 25 ppm hypochlorous acid or free available chlorine, 150 ppm copper salt, 150 ppm zinc salt, and 150 ppm iron salt.

In an aspect of this embodiment, a composition disclosed herein comprises 1 ppm to 50 ppm hypochlorous acid or free available chlorine, 100 ppm to 200 ppm copper chloride, 100 ppm to 200 ppm zinc chloride, and 100 ppm to 200 ppm iron chloride. In an aspect of this embodiment, a composition disclosed herein comprises 5 ppm to 45 ppm hypochlorous acid or free available chlorine, 110 ppm to 190 ppm copper chloride, 110 ppm to 190 ppm zinc chloride, and 110 ppm to 190 ppm iron chloride. In an aspect of this embodiment, a composition disclosed herein comprises 10 ppm to 40 ppm hypochlorous acid or free available chlorine, 120 ppm to 180 ppm copper chloride, 120 ppm to 180 ppm zinc chloride, and 120 ppm to 180 ppm iron chloride. In an aspect of this embodiment, a composition disclosed herein comprises 15 ppm to 35 ppm hypochlorous acid or free available chlorine, 130 ppm to 170 ppm copper chloride, 130 ppm to 170 ppm zinc chloride, and 130 ppm to 170 ppm iron chloride. In an aspect of this embodiment, a composition disclosed herein comprises 20 ppm to 30 ppm hypochlorous acid or free available chlorine, 140 ppm to 160 ppm copper chloride, 140 ppm to 160 ppm zinc chloride, and 140 ppm to 160 ppm iron chloride. In an aspect of this embodiment, a composition disclosed herein comprises 25 ppm hypochlorous acid or free available chlorine, 150 ppm copper chloride, 150 ppm zinc chloride, and 150 ppm iron chloride. The iron chloride can be iron (II) chloride or iron (III) chloride.

In an aspect of this embodiment, a composition disclosed herein comprises 1 ppm to 50 ppm hypochlorous acid or free available chlorine, 150 ppm to 250 ppm copper salt, 150 ppm to 250 ppm zinc salt, and 150 ppm to 250 ppm iron salt. In an aspect of this embodiment, a composition disclosed herein comprises 5 ppm to 45 ppm hypochlorous acid or free available chlorine, 160 ppm to 240 ppm copper salt, 160 ppm to 240 ppm zinc salt, and 160 ppm to 240 ppm iron salt. In an aspect of this embodiment, a composition disclosed herein comprises 10 ppm to 40 ppm hypochlorous acid or free available chlorine, 170 ppm to 230 ppm copper salt, 170 ppm to 230 ppm zinc salt, and 170 ppm to 230 ppm iron salt. In an aspect of this embodiment, a composition disclosed herein comprises 15 ppm to 35 ppm hypochlorous acid or free available chlorine, 180 ppm to 220 ppm copper salt, 180 ppm to 220 ppm zinc salt, and 180 ppm to 220 ppm iron salt. In an aspect of this embodiment, a composition disclosed herein comprises 20 ppm to 30 ppm hypochlorous acid or free available chlorine, 190 ppm to 210 ppm copper salt, 190 ppm to 210 ppm zinc salt, and 190 ppm to 210 ppm iron salt. In an aspect of this embodiment, a composition disclosed herein comprises 25 ppm hypochlorous acid or free available chlorine, 200 ppm copper salt, 200 ppm zinc salt, and 200 ppm iron salt.

In an aspect of this embodiment, a composition disclosed herein comprises 1 ppm to 50 ppm hypochlorous acid or free available chlorine, 150 ppm to 250 ppm copper chloride, 150 ppm to 250 ppm zinc chloride and 150 ppm to 250 ppm iron chloride. In an aspect of this embodiment, a composition disclosed herein comprises 5 ppm to 45 ppm hypochlorous acid or free available chlorine, 160 ppm to 240 ppm copper chloride, 160 ppm to 240 ppm zinc chloride, and 160 ppm to 240 ppm iron chloride. In an aspect of this embodiment, a composition disclosed herein comprises 10 ppm to 40 ppm hypochlorous acid or free available chlorine, 170 ppm to 230 ppm copper chloride, 170 ppm to 230 ppm zinc chloride, and 170 ppm to 230 ppm iron chloride. In an aspect of this embodiment, a composition disclosed herein comprises 15 ppm to 35 ppm hypochlorous acid or free available chlorine, 180 ppm to 220 ppm copper chloride, 180 ppm to 220 ppm zinc chloride, and 180 ppm to 220 ppm iron chloride. In an aspect of this embodiment, a composition disclosed herein comprises 20 ppm to 30 ppm hypochlorous acid or free available chlorine, 190 ppm to 210 ppm copper chloride, 190 ppm to 210 ppm zinc chloride, and 190 ppm to 210 ppm iron chloride. In an aspect of this embodiment, a composition disclosed herein comprises 25 ppm hypochlorous acid or free available chlorine, 200 ppm copper chloride, 200 ppm zinc chloride, and 200 ppm iron chloride. The iron chloride can be iron (II) chloride or iron (III) chloride.

In an aspect of this embodiment, a composition disclosed herein comprises 1 ppm to 50 ppm hypochlorous acid or free available chlorine, 200 ppm to 300 ppm copper salt, 200 ppm to 300 ppm zinc salt, and 200 ppm to 300 ppm iron salt. In an aspect of this embodiment, a composition disclosed herein comprises 5 ppm to 45 ppm hypochlorous acid or free available chlorine, 210 ppm to 290 ppm copper salt, 210 ppm to 290 ppm zinc salt, and 210 ppm to 290 ppm iron salt. In an aspect of this embodiment, a composition disclosed herein comprises 10 ppm to 40 ppm hypochlorous acid or free available chlorine, 220 ppm to 280 ppm copper salt, 220 ppm to 280 ppm zinc salt, and 220 ppm to 280 ppm iron salt. In an aspect of this embodiment, a composition disclosed herein comprises 15 ppm to 35 ppm hypochlorous acid or free available chlorine, 230 ppm to 270 ppm copper salt, 230 ppm to 270 ppm zinc salt, and 230 ppm to 270 ppm iron salt. In an aspect of this embodiment, a composition disclosed herein comprises 20 ppm to 30 ppm hypochlorous acid or free available chlorine, 240 ppm to 260 ppm copper salt, 240 ppm to 260 ppm zinc salt, and 240 ppm to 260 ppm iron salt. In an aspect of this embodiment, a composition disclosed herein comprises 25 ppm hypochlorous acid or free available chlorine, 250 ppm copper salt, 250 ppm zinc salt, and 250 ppm iron salt.

In an aspect of this embodiment, a composition disclosed herein comprises 1 ppm to 50 ppm hypochlorous acid or free available chlorine, 200 ppm to 300 ppm copper chloride, 200 ppm to 300 ppm zinc chloride, and 200 ppm to 300 ppm iron chloride. In an aspect of this embodiment, a composition disclosed herein comprises 5 ppm to 45 ppm hypochlorous acid or free available chlorine, 210 ppm to 290 ppm copper chloride, 210 ppm to 290 ppm zinc chloride, and 210 ppm to 290 ppm iron chloride. In an aspect of this embodiment, a composition disclosed herein comprises 10 ppm to 40 ppm hypochlorous acid or free available chlorine, 220 ppm to 280 ppm copper chloride, 220 ppm to 280 ppm zinc chloride, and 220 ppm to 280 ppm iron chloride. In an aspect of this embodiment, a composition disclosed herein comprises 15 ppm to 35 ppm hypochlorous acid or free available chlorine, 230 ppm to 270 ppm copper chloride, 230 ppm to 270 ppm zinc chloride, and 230 ppm to 270 ppm iron chloride. In an aspect of this embodiment, a composition disclosed herein comprises 20 ppm to 30 ppm hypochlorous acid or free available chlorine, 240 ppm to 260 ppm copper chloride, 240 ppm to 260 ppm zinc chloride, and 240 ppm to 260 ppm iron chloride. In an aspect of this embodiment, a composition disclosed herein comprises 25 ppm hypochlorous acid or free available chlorine, 250 ppm copper chloride, 250 ppm zinc chloride, and 250 ppm iron chloride. The iron chloride can be iron (II) chloride or iron (III) chloride.

In an aspect of this embodiment, a composition disclosed herein comprises 1 ppm to 50 ppm hypochlorous acid or free available chlorine, 250 ppm to 350 ppm copper salt, 250 ppm to 350 ppm zinc salt, and 250 ppm to 350 ppm iron salt. In an aspect of this embodiment, a composition disclosed herein comprises 5 ppm to 45 ppm hypochlorous acid or free available chlorine, 260 ppm to 340 ppm copper salt, 260 ppm to 340 ppm zinc salt, and 260 ppm to 340 ppm iron salt. In an aspect of this embodiment, a composition disclosed herein comprises 10 ppm to 40 ppm hypochlorous acid or free available chlorine, 270 ppm to 330 ppm copper salt, 270 ppm to 330 ppm zinc salt, and 270 ppm to 330 ppm iron salt. In an aspect of this embodiment, a composition disclosed herein comprises 15 ppm to 35 ppm hypochlorous acid or free available chlorine, 280 ppm to 320 ppm copper salt, 280 ppm to 320 ppm zinc salt, and 280 ppm to 320 ppm iron salt. In an aspect of this embodiment, a composition disclosed herein comprises 20 ppm to 30 ppm hypochlorous acid or free available chlorine, 290 ppm to 310 ppm copper salt, 290 ppm to 310 ppm zinc salt, and 290 ppm to 310 ppm iron salt. In an aspect of this embodiment, a composition disclosed herein comprises 25 ppm hypochlorous acid or free available chlorine, 300 ppm copper salt, 300 ppm zinc salt, and 300 ppm iron salt.

In an aspect of this embodiment, a composition disclosed herein comprises 1 ppm to 50 ppm hypochlorous acid or free available chlorine, 250 ppm to 350 ppm copper chloride, 250 ppm to 350 ppm zinc chloride, and 250 ppm to 350 ppm iron chloride. In an aspect of this embodiment, a composition disclosed herein comprises 5 ppm to 45 ppm hypochlorous acid or free available chlorine, 260 ppm to 340 ppm copper chloride, 260 ppm to 340 ppm zinc chloride, and 260 ppm to 340 ppm iron chloride. In an aspect of this embodiment, a composition disclosed herein comprises 10 ppm to 40 ppm hypochlorous acid or free available chlorine, 270 ppm to 330 ppm copper chloride, 270 ppm to 330 ppm zinc chloride, and 270 ppm to 330 ppm iron chloride. In an aspect of this embodiment, a composition disclosed herein comprises 15 ppm to 35 ppm hypochlorous acid or free available chlorine, 280 ppm to 320 ppm copper chloride, 280 ppm to 320 ppm zinc chloride, and 280 ppm to 320 ppm iron chloride. In an aspect of this embodiment, a composition disclosed herein comprises 20 ppm to 30 ppm hypochlorous acid or free available chlorine, 290 ppm to 310 ppm copper chloride, 290 ppm to 310 ppm zinc chloride, and 290 ppm to 310 ppm iron chloride. In an aspect of this embodiment, a composition disclosed herein comprises 25 ppm hypochlorous acid or free available chlorine, 300 ppm copper chloride, 300 ppm zinc chloride, and 300 ppm iron chloride. The iron chloride can be iron (II) chloride or iron (III) chloride.

Aspects of the present specification disclose a kit. In one embodiment, the kit can comprise a container including a composition disclosed herein. In another embodiment, a kit can comprise one or more containers, each container including an individual component or more than one individual component disclosed herein in combination. For example, a kit can comprise one container including hypochlorous acid or free available chlorine and a second container including one or more metallic particles. As another example, a kit can comprise one container including hypochlorous acid or free available chlorine and a second container including copper zinc iron oxide particles. As yet another example, a kit can comprise one container including one or more alcohols and a second container including one or more guanide-containing compounds. As still another example, a kit can comprise one container including isopropanol and a second container including polyhexamethylene biguanide. As a further example, a kit can comprise one container including hypochlorous acid or free available chlorine and a second container including one or more quaternary compounds or silicon quaternary compounds. As another example, a kit can comprise one container including hypochlorous acid or free available chlorine and a second container including dimethyloctadecyl[3-(trimethoxysilyl)propyl]ammonium chloride. The remainder of the components of a composition disclosed herein may be included in either the first or second container, or may be separately including in at least a third container. For example, a third container including a rinse solution disclosed herein can be included in the kit. Packaging of individual components into separate container can assist in prolonging the stability of the individual components, and thus shelf life of the product.

In another example, a kit can comprise one container including hypochlorous acid and/or free available chlorine, a second container including one or more metallic particles, and a third container including a rinse solution. As another example, a kit can comprise one container including hypochlorous acid and/or free available chlorine, a second container including copper zinc iron oxide particles, and a third container including a rinse solution. As yet another example, a kit can comprise one container including one or more alcohols, a second container including one or more guanide-containing compounds, and a third container including a rinse solution. As still another example, a kit can comprise one container including isopropanol, a second container including polyhexamethylene biguanide, and a third container including a rinse solution. As a further example, a kit can comprise one container including hypochlorous acid or free available chlorine, a second container including one or more quaternary compounds or silicon quaternary compounds, and a third container including a rinse solution. As another example, a kit can comprise one container including hypochlorous acid or free available chlorine, a second container including dimethyloctadecyl[3-(trimethoxysilyl) propyl]ammonium chloride, and a third container including a rinse solution. As another example, a kit can comprise one container including isopropanol, a second container including polyhexamethylene biguanide, a third container including one or more cationic surfactants, and a fourth container including a rinse solution.

In another embodiment, a kit can comprise one container including a composition disclosed herein and a second container including a rinse solution disclosed herein. For example, a kit can comprise one container including hypochlorous acid and/or free available chlorine and one or more metallic particles and a second container including a rinse solution. As another example, a kit can comprise one container including hypochlorous acid and/or free available chlorine and copper zinc iron oxide particles and a second container including a rinse solution. As yet another example, a kit can comprise one container including one or more alcohols and one or more guanide-containing compounds and a second container including a rinse solution. As still another example, a kit can comprise one container including isopropanol and polyhexamethylene biguanide and a second container including a rinse solution. As a further example, a kit can comprise one container including hypochlorous acid and/or free available chlorine and one or more quaternary compounds or silicon quaternary compounds and a second container including a rinse solution. As another example, a kit can comprise one container including hypochlorous acid and/or free available chlorine and dimethyloctadecyl[3-(trimethoxysilyl)propyl]ammonium chloride and a second container including a rinse solution. The remainder of the components of a composition disclosed herein may be included in either the first container or may be separately including in at least a third container. Packaging of individual components into separate container can assist in prolonging the stability of the individual components, and thus shelf life of the product.

A kit disclosed herein can comprise a delivery or application system. The delivery or application system of the kit are useful for applying a composition disclosed herein, and/or individual components disclosed herein to a site of interest, such as, e.g., a surface of a device disclosed herein. A delivery or application system disclosed herein, includes, without limitation, one or more of an applicator brush, porous foam swab or pad, hollow tube, dipstick, or a combination thereof. In an embodiment, a kit comprises a single delivery or application system. In another embodiment, a kit comprises a plurality delivery or application systems. For example, in a 30-day supply kit, there can be 30 delivery or application systems, such that there is one delivery or application system per day for 30 days. Alternately, there can be 2, 10, 20, 30, 40, 50, 60, 90, 120, etc. delivery or application systems per kit. Within the kit, the delivery or application system may be packaged individually, or in sets of 2 or more. The delivery or application system can be packaged such that it remains sterile until use. In certain embodiments, a delivery or application system disclosed herein can be packaged in plastic sheaths. Further, to prevent contamination, delivery or application system disclosed herein is preferably single-use, disposable delivery or application system.

The kit can also comprise a set of instructions. The instructions may include information useful to the end user such as how to use a delivery or application system to apply a composition and/or individual components disclosed herein, and/or how often to apply a composition and/or individual components disclosed herein. In addition, such instructions may include information regarding how to mix the individual components disclosed herein to form a composition disclosed herein. Such instructions can indicate that mixing should be done at a certain time before application, such as, e.g., just prior to use. Instructions disclosed herein may also include information regarding how to apply the individual components disclosed herein directly to a site of interest, such as, e.g., a surface of a device disclosed herein, and in what order the individual components should be applied to such sites of interest.

The contents of the kit, including the container including a composition or component disclosed herein, the delivery or application system, and instructions, are enclosed in an outer casing. The outer casing can be a box, a sealed bag, a foil pouch, etc. In certain embodiments, the delivery system, container and instructions are enclosed in a box. In other embodiments of the kit, the container and instructions are contained in a first box, the delivery system is contained in a second box, and the first and second box are contained together in a third box.

The presently disclosed compositions are useful in any application involving the cleansing, disinfecting or sterilizing. In one embodiment, a composition disclosed herein is used to clean, disinfect or sterilize a device. In one embodiment, a composition disclosed herein is used to clean, disinfect or sterilize an endoscope. In one embodiment, a composition disclosed herein is used to clean, disinfect or sterilize a hard surface. In one embodiment, a composition disclosed herein is useful in any application were hypochlorous acid is applied or administered.

Aspects of the present specification disclose a method to clean, disinfect and/or sterilize a device. In one embodiment, a method disclosed herein comprises applying a composition disclosed herein to a device for a specified amount of time, wherein application results in the cleaning, disinfecting and/or sterilization of the device. In another aspect of this embodiment, a method disclosed herein further comprises rinsing the cleaned, disinfected and/or sterilized device with a rinse solution disclosed herein. Other aspects of the present specification disclose a composition disclosed herein for use to clean, disinfect and/or sterilize a device, including a medical device. Yet other aspects of the present specification disclose a use of a disclosed composition to clean, disinfect and/or sterilize a device, including a medical device.

Aspects of the present specification disclose a method to clean, disinfect and/or sterilize an endoscope. In an aspect of this embodiment, a method disclosed herein comprises applying a composition disclosed herein to an endoscope for a specified amount of time, wherein application results in the cleaning, disinfecting and/or sterilization of the endoscope. In another aspect of this embodiment, a method disclosed herein further comprises rinsing the cleaned, disinfected and/or sterilized endoscope with a rinse solution disclosed herein. Other aspects of the present specification disclose a composition disclosed herein for use to clean, disinfect and/or sterilize an endoscope. Yet other aspects of the present specification disclose a use of a disclosed composition to clean, disinfect and/or sterilize an endoscope.

A device, including a medical device is cleaned by removal of visible soil, such as, e.g., organic and inorganic material, from objects and surfaces and normally is accomplished manually or mechanically. Thorough cleaning is essential before disinfection and sterilization because inorganic and organic materials that remain on the surfaces of a medical device interferes with the effectiveness of these processes.

A device, including a medical device is disinfected by eliminating many or all pathogenic microorganisms, except bacterial spores. Disinfection is less lethal than sterilization because it destroys most recognized pathogenic microorganisms but not necessarily all microbial forms (e.g., bacterial spores). A medical device is sterilized by destroying or eliminating all forms of microorganisms. Decontamination of a medical device removes pathogenic microorganisms from a medical device so that it is safe to handle, use, or discard.

A medical device is an instrument, apparatus, material, or other article, whether used alone or in combination, including software necessary for its application, intended by the manufacturer to be used for human beings for diagnosis, prevention, monitoring treatment, or alleviation of disease; diagnosis, monitoring, treatment, or alleviation of or compensation for an injury or handicap; investigation, replacement, or modification of the anatomy or of a physiologic process; or control of conception, and that does not achieve its primary intended action in or on the human body by pharmacologic, immunologic, or metabolic means but might be assisted in its function by such means. A medical device includes, without limitation, a surgical instrument, a respiratory therapy instrument, an anesthesia instrument, a catheter, an implant, a probe, an endoscope, an arthroscope, a laparoscope, a blade, a cystoscope, a spirometer, a CPAP mask and tubing, dialysis instrument and accessories, a heart-lung machine and accessories, a heart-lung bypass machine and accessories, and a diaphragm fitting ring. Non-limiting examples of a probe includes an ultrasound probe and an esophageal manometry probe. Non-limiting examples of a catheter includes a cardiac catheter, an urinary catheter, an anorectal manometry catheter. Non-limiting examples of an endoscope includes a gastrointestinal endoscope, a bronchoscope, and a nasopharyngoscope. Non-limiting examples of a blade includes a laryngoscope blade.

Aspects of the present specification disclose a method to clean, disinfect and/or sterilize a hard surface area. In an aspect of this embodiment, a method disclosed herein comprises applying a composition disclosed herein to a hard surface area for a specified amount of time, wherein application results in the cleaning, disinfecting and/or sterilization of the hard surface area. In another aspect of this embodiment, a method disclosed herein further comprises rinsing the cleaned, disinfected and/or sterilized surface with a rinse solution disclosed herein. Other aspects of the present specification disclose a composition disclosed herein for use to clean, disinfect and/or sterilize a hard surface area. Yet other aspects of the present specification disclose a use of a disclosed composition to clean, disinfect and/or sterilize a hard surface area. A hard surface area can be a porous surface area or a non-porous surface area.

In another aspect of this embodiment, a method disclosed herein comprises applying one or more individual components disclosed herein to a hard surface area for a specified amount of time, wherein application results in the cleaning, disinfecting and/or sterilization of the hard surface area. In an aspect of this embodiment, the one or more individual components include a first component including hypochlorous acid or free available chlorine and a second component including one or more disinfectants. In another aspect, application of the one or more individual components occur in a specific order, such as. e.g., first applying a first component including hypochlorous acid or free available chlorine and then applying a second component including one or more disinfectants. A hard surface area can be a porous surface area or a non-porous surface area.

A hard surface area can include any items present in a residence or a commercial, industrial and/or agricultural facility, such as, e.g., a hospital, a laboratory, a restaurant, an educational center, a food-processing facility, a dairy-processing facility, an airport, an oil field system, a sport facility, a shipping dock, a freight transport center, or any other commercial or industrial setting. A surface area can include any type of transportation carrier, such as, e.g., a water vessel like a boat, barge or ship, an aircraft like an airplane or helicopter, a ground vehicle like a motorcycle, car, truck or train, A surface area may be made of any material including brass, copper, aluminum, stainless steel, carbon steel, rubber, plastic, glass, wood, painted surface, or any combination thereof. A surface area includes, without limitation, a table top, counter top, floor, wall, ceiling, window, bed, gurney, door, door handle, shower, bath, sink, faucet, toilet, toilet seat, drain, equipment, machinery, personal protective gear, personal biohazard gear, and the like. A surface area may comprise a medical, dental, pharmaceutical, veterinary or mortuary device. A surface area may comprise human skin.

A composition or component disclosed herein can be applied to a hard surface area according to a method disclosed herein as often as needed and/or desired. A composition disclosed herein can be applied to a hard surface area daily, every other day, every third of day, once a week, multiple times per week, once a month, multiple times per month, once a year or multiple times per year, as desired. A composition disclosed herein can be applied to a hard surface area multiple times per day, e.g., twice a day, three times a day, four time a day, five times a day, six times a day or as often as desired.

The presently disclosed compositions are useful in any application involving treating an individual. The presently disclosed compositions are useful in any application involving medical use, veterinarian use, or both. In one embodiment, a composition disclosed herein is useful in any application were hypochlorous acid is applied or administered.

In one embodiment, the presently disclosed compositions are useful in any application involving treating a tissue in an individual. For example, the compositions disclosed herein can be used to treat a wound by enhancing angiogenesis in an area in and around a wound, or promoting rapid healing of a wound.

In one embodiment, the presently disclosed compositions are useful in any application involving treating a wound in an individual. For example, the compositions disclosed herein can be used to treat a wound by enhancing angiogenesis in an area in and around a wound, or promoting rapid healing of a wound. A wound can be an open wound, a closed wound or a burn. Non-limiting examples, of an open wound include a laceration, an abrasion, an incision, a puncture, an avulsion, an ulcer, and a tear. Non-limiting examples, of a closed wound includes a bruise, a contusion and a hematoma.

Aspects of the present specification disclose a method of cleaning, disinfecting and/or sterilizing a wound in an individual. In an aspect of this embodiment, a method disclosed herein comprises applying a composition disclosed herein to a wound for a specified amount of time, wherein application results in the cleaning, disinfecting and/or sterilization of the wound. In another aspect of this embodiment, a method disclosed herein further comprises rinsing the cleaned, disinfected and/or sterilized wound with a rinse solution disclosed herein. Other aspects of the present specification disclose a composition disclosed herein for use to clean, disinfect and/or sterilize a wound. Yet other aspects of the present specification disclose a use of a disclosed composition to clean, disinfect and/or sterilize a wound.

Aspects of the present specification disclose a method of treating a wound in an individual. In an aspect of this embodiment, a method disclosed herein comprises applying a composition disclosed herein to a wound for a specified amount of time, wherein application promotes healing of the wound. In another aspect of this embodiment, a method disclosed herein further comprises rinsing the treated wound with a rinse solution disclosed herein. Other aspects of the present specification disclose a composition disclosed herein for use to treat a wound. Yet other aspects of the present specification disclose a use of a disclosed composition to treat a wound. A wound can be an external wound on, e.g., a surface area of an individual or an internal wound located in the body or body cavity of an individual.

In one embodiment, the presently disclosed compositions are useful in any application involving a microbial infection in an individual. A microbial infection includes a viral infection, a bacterial infection and a fungal infection. A microbial infection can be an external infection on, e.g., a surface area of an individual or an internal infection, e.g., a mercer infection or sepsis, located in the body or body cavity of an individual.

Aspects of the present specification disclose a method of cleaning, disinfecting and/or sterilizing a microbial infection in an individual. In an aspect of this embodiment, a method disclosed herein comprises applying a composition disclosed herein to a microbial infection for a specified amount of time, wherein application results in a cleaning, disinfecting and/or sterilization of the microbial infection. In another aspect of this embodiment, a method disclosed herein further comprises rinsing the cleaned, disinfected and/or sterilized microbial infection with a rinse solution disclosed herein. Other aspects of the present specification disclose a composition disclosed herein for use to clean, disinfect and/or sterilize a microbial infection. Yet other aspects of the present specification disclose a use of a disclosed composition to clean, disinfect and/or sterilize a microbial infection.

In one embodiment, a composition disclosed herein is used to clean, disinfect or sterilize a body part of an individual. Non-limiting examples of uses for a composition disclosed herein include cleaning/disinfecting tissue in wound care, pre-operative preparation, and surgery or other invasive procedure, cleaning/disinfecting a skin region in dermatological applications, and cleaning/disinfecting the eye in ophthalmological applications.

Aspects of the present specification disclose a method of treating a microbial infection in an individual. In an aspect of this embodiment, a method disclosed herein comprises applying a composition disclosed herein to a microbial infection for a specified amount of time, wherein application results in a reduction, elimination and/or killing microbes causing the microbial infection. In another aspect of this embodiment, a method disclosed herein further comprises rinsing the treated microbial infection with a rinse solution disclosed herein. Other aspects of the present specification disclose a composition disclosed herein for use to treat a microbial infection. Yet other aspects of the present specification disclose a use of a disclosed composition to treat a microbial infection.

A dermatological application refers to cleaning/disinfecting a skin region of an individual of a microbial infection, such as, e.g., a viral, bacterial or fungal infection. Non-limiting examples of a microbial infection of a skin region include urinary tract infection, eye lid wash, cataract treatment, warts, cutaneous leishmaniasis, candidal vulvovagitis, dermatophytosis, bromhidrosis, *pityriasis versicolor*, acne vulgarish, rosasea, hydradenitis suppurativa, psoriasis, eczema, alopecia areata, oral lichen planus, xeroderma pigmentosum, actinic keratoses, melasma, keloids, and anti-aging.

An ophthalmological application refers to cleaning/disinfecting an eye of an individual of a microbial infection, such as, e.g., a viral, bacterial or fungal infection. Non-limiting examples of a microbial infection of an eye include a bacterial conjunctivitis, a viral conjunctivitis, an epidemic keratoconjunctivitis, a pharyngoconjunctival fever, a stye, a blephartis, an episcleritis, a keratitis, a trachoma, and a corneal ulcer.

The presently disclosed compositions are useful in any application involving treating and/or providing relief of an inflammation, an ache and/or a pain in an individual.

Aspects of the present specification disclose a method of treating an inflammation, an ache and/or a pain in an individual. In an aspect of this embodiment, a method disclosed herein comprises applying a composition disclosed herein to an area of inflammation, an ache and/or a pain for a specified amount of time, wherein application results in a reduction and/or elimination of the pain. In another aspect of this embodiment, a method disclosed herein further comprises rinsing the treated area with a rinse solution disclosed herein. Other aspects of the present specification disclose a composition disclosed herein for use to treat an inflammation, an ache and/or a pain. Yet other aspects of the present specification disclose a use of a disclosed composition to treat an inflammation, an ache and/or a pain.

The presently disclosed compositions are useful in enteral and parenteral applications, including oral, injectable and topical applications. For example, the compositions disclosed herein can be used to clean, disinfect or sterilize a body region injured by a wound or infected with a microbe.

In an aspect of this embodiment, a method disclosed herein comprises applying a composition disclosed herein to an individual for a specified amount of time, wherein application results in the cleaning, disinfecting and/or sterilization of a microbial infection in the individual. Other aspects of the present specification disclose a composition disclosed herein for use to clean, disinfect and/or sterilize a microbial infection in an individual. Yet other aspects of the present specification disclose a use of a disclosed composition to clean, disinfect and/or sterilize a microbial infection in an individual. Still other aspects of the present specification disclose a composition disclosed herein for the manufacture of a medicament to clean, disinfect and/or sterilize a microbial infection in an individual.

A method and/or use disclosed herein applies a composition disclosed herein to an individual. An individual refers to any animal including, without limitation, a fish, an amphibian, a bird and a mammal. A mammal includes a human, a horse, a cow, a sheep, a dog and a cat. As such, a method disclosed herein is for human use as well as veterinarian use.

In applications to an individual, a composition disclosed herein can be applied to a skin surface or can be internally administered. In one embodiment, a composition disclosed herein is applied topically to a skin region of an individual in order to clean, disinfect and/or sterilize the skin region. A skin region, includes, without limitation, the face, forehead, lips, scalp, neck, shoulder, arms, hands, thighs, legs, knees, feet, chest, breast, back, groin, buttocks, and the like.

In one embodiment, a composition disclosed herein is internally administered to an individual. Such routes of administration include enteral routes of administration and parenteral routes of administration.

A composition disclosed herein can be applied according to a method disclosed herein to a skin region. Application of a composition disclosed herein can be by rubbing, pouring, sprinkling, or spraying on, or otherwise applied to the human body. A composition disclosed herein can be applied by introducing the composition into or onto a solid support such as, e.g., a wipe, a towelette, a towel, a mitt, a glove, or a mask and then applying the composition to a skin region. A composition disclosed herein can be applied by using a delivery device, such as, e.g., an aerosol dispenser, a pump spray, a trigger spray, a squeeze bottle, a topical patch, a transdermal patch, or a dermal implant to apply the composition to a skin region.

A composition disclosed herein can be applied to an individual according to a method disclosed herein as often as needed and/or desired. A composition disclosed herein can be applied to an individual daily, every other day, every third of day, once a week, multiple times per week, once a month, multiple times per month, once a year or multiple times per year, as desired. A composition disclosed herein can be applied to an individual multiple times per day, e.g., twice a day, three times a day, four time a day, five times a day, six times a day or as often as desired.

The presently disclosed compositions are useful in food product, poultry, meat, vegetable production. For example, the compositions disclosed herein can be used to clean, disinfect or sterilize machinery, instruments, tables, rooms, including floors, ceilings and walls and any other hard surface from microbial contamination.

The presently disclosed compositions are useful in formulations on plants as a preservative or pesticide. For example, the compositions disclosed herein can be used to clean, disinfect or sterilize a plant injured by a wound or infected with a microbe.

The presently disclosed compositions are useful in formulations on cut flowers to prolong freshness and health. For example, the compositions disclosed herein can be used to clean, disinfect or sterilize a cut flower at a wound or to prevent microbial infection.

A disclosed method and/or use applies a composition disclosed herein for specified amount of time. In one embodiment, a specified amount of time is a time sufficient to clean a medical device, a surface, or an individual. In another embodiment, a specified amount of time is a time sufficient to disinfect a medical device, a surface, or an individual. In yet another embodiment, a specified amount of time is a time sufficient to sterilize a medical device, a surface, or an individual.

In aspects of this embodiment, a composition disclosed herein is applied to a device, like a medical device, a surface, or an individual for, e.g., about 1 minute, about 5 minutes, about 10 minutes, about 15 minutes, about 20 minutes, about 25 minutes, about 30 minutes, about 35 minutes, about 40 minutes, about 45 minutes, about 50 minutes, about 55 minutes, about 60 minutes, about 70 minutes, about 80 minutes, about 90 minutes, about 100 minutes, about 110 minutes, or about 120 minutes. In other aspects of this embodiment, a composition disclosed herein is applied to a device, like a medical device, a surface, or an individual for, e.g., at least 1 minute, at least 5 minutes, at least 10 minutes, at least 15 minutes, at least 20 minutes, at least 25 minutes, at least 30 minutes, at least 35 minutes, at least 40 minutes, at least 45 minutes, at least 50 minutes, at least 55 minutes, at least 60 minutes, at least 70 minutes, at least 80 minutes, at least 90 minutes, at least 100 minutes, at least 110 minutes, or at least 120 minutes. In yet other aspects of this embodiment, a composition disclosed herein is applied to device, like a medical device, a surface, or an individual for, e.g., at most 1 minute, at most 5 minutes, at most 10 minutes, at most 15 minutes, at most 20 minutes, at most 25 minutes, at most 30 minutes, at most 35 minutes, at most 40 minutes, at most 45 minutes, at most 50 minutes, at most 55 minutes, at most 60 minutes, at most 70 minutes, at most 80 minutes, at most 90 minutes, at most 100 minutes, at most 110 minutes, or at most 120 minutes.

In still other aspects of this embodiment, a composition disclosed herein is applied to a device, like a medical device, a surface, or an individual for, e.g., about 1 minute to about 5 minutes, about 1 minute to about 10 minutes, about 1 minute to about 15 minutes, about 1 minute to about 20 minutes, about 1 minute to about 25 minutes, about 1 minute to about 30 minutes, about 1 minute to about 35 minutes, about 1 minute to about 40 minutes, about 1 minute to about 45 minutes, about 1 minute to about 50 minutes, about 1 minute to about 55 minutes, about 1 minute to about 60 minutes, about 5 minutes to about 10 minutes, about 5 minutes to about 15 minutes, about 5 minutes to about 20 minutes, about 5 minutes to about 25 minutes, about 5 minutes to about 30 minutes, about 5 minutes to about 35 minutes, about 5 minutes to about 40 minutes, about 5 minutes to about 45 minutes, about 5 minutes to about 50 minutes, about 5 minutes to about 55 minutes, about 5 minutes to about 60 minutes, about 5 minutes to about 70 minutes, about 5 minutes to about 80 minutes, about 5 minutes to about 90 minutes, about 5 minutes to about 100 minutes, about 5 minutes to about 110 minutes, about 5 minutes to about 120 minutes, about 10 minutes to about 15 minutes, about 10 minutes to about 20 minutes, about 10 minutes to about 25 minutes, about 10 minutes to about 30 minutes, about 10 minutes to about 35 minutes, about 10 minutes to about 40 minutes, about 10 minutes to about 45 minutes, about 10 minutes to about 50 minutes, about 10 minutes to about 55 minutes, about 10 minutes to about 60 minutes, about 10 minutes to about 70 minutes, about 10 minutes to about 80 minutes, about 10 minutes to about 90 minutes, about 10 minutes to about 100 minutes, about 10 minutes to about 110 minutes, about 10 minutes to about 120 minutes, about 15 minutes to about 20 minutes, about 15 minutes to about 25 minutes, about 15 minutes to about 30 minutes, about 15 minutes to about 35 minutes, about 15 minutes to about 40 minutes, about 15 minutes to about 45 minutes, about 15 minutes to about 50 minutes, about 15 minutes to about 55 minutes, about 15 minutes to about 60 minutes, about 15 minutes to about 70 minutes, about 15 minutes to about 80 minutes, about 15 minutes to about 90 minutes, about 15 minutes to about 100 minutes, about 15 minutes to about 110 minutes, about 15 minutes to about 120 minutes, about 20 minutes to about 25 minutes, about 20 minutes to about 30 minutes, about 20 minutes to about 35 minutes, about 20 minutes to about 40 minutes, about 20 minutes to about 45 minutes, about 20 minutes to about 50 minutes, about 20 minutes to about 55 minutes, about 20 minutes to about 60 minutes, about 20 minutes to about 70 minutes, about 20 minutes to about 80 minutes, about 20 minutes to about 90 minutes, about 20 minutes to about 100 minutes, about 20 minutes to about 110 minutes, about 20 minutes to about 120 minutes, about 25 minutes to about 30 minutes, about 25 minutes to about 35 minutes, about 25 minutes to about 40 minutes, about 25 minutes to about 45 minutes, about 25 minutes to about 50 minutes, about 25 minutes to about 55 minutes, about 25 minutes to about 60 minutes, about 25 minutes to about 70 minutes, about 25 minutes to about 80 minutes, about 25 minutes to about 90 minutes, about 25 minutes to about 100 minutes, about 25 minutes to about 110 minutes, about 25 minutes to about 120 minutes, about 30 minutes to about 35 minutes, about 30 minutes to about 40 minutes, about 30 minutes to about 45 minutes, about 30 minutes to about 50 minutes, about 30 minutes to about 55 minutes, about 30 minutes to about 60 minutes, about 30 minutes to about 70 minutes, about 30 minutes to about 80 minutes, about 30 minutes to about 90 minutes, about 30 minutes to about 100 minutes, about 30 minutes to about 110 minutes, about 30 minutes to about 120 minutes, about 35 minutes to about 40 minutes, about 35 minutes to about 45 minutes, about 35 minutes to about 50 minutes, about 35 minutes to about 55 minutes, about 35 minutes to about 60 minutes, about 35 minutes to about 70 minutes, about 35 minutes to about 80 minutes, about 35 minutes to about 90 minutes, about 35 minutes to about 100 minutes, about 35 minutes to about 110 minutes, about 35 minutes to about 120 minutes, about 40 minutes to about 45 minutes, about 40 minutes to about 50 minutes, about 40 minutes to about 55 minutes, about 40 minutes to about 60 minutes, about 40 minutes to about 70 minutes, about 40 minutes to about 80 minutes, about 40 minutes to about 90 minutes, about 40 minutes to about 100 minutes, about 40 minutes to about 110 minutes, about 40 minutes to about 120 minutes, about 45 minutes to about 50 minutes, about 45 minutes to about 55 minutes, about 45 minutes to about 60 minutes, about 45 minutes to about 70 minutes, about 45 minutes to about 80 minutes, about 45 minutes to about 90 minutes, about 45 minutes to about 100 minutes, about 45 minutes to about 110 minutes, about 45 minutes to about 120 minutes, about 50 minutes to about 55 minutes, about 50 minutes to about 60 minutes, about 50 minutes to about 70 minutes, about 50 minutes to about 80 minutes, about 50 minutes to about 90 minutes, about 50 minutes to about 100 minutes, about 50 minutes to about 110 minutes, about 50 minutes to about 120 minutes, about 55 minutes to about 60 minutes, about 55 minutes to about 70 minutes, about 55 minutes to about 80 minutes, about 55 minutes to about 90 minutes, about 55 minutes to about 100 minutes, about 55 minutes to about 110 minutes, about 55 minutes to about 120 minutes, about 60 minutes to about 70 minutes, about 60 minutes to about 80 minutes, about 60 minutes to about 90 minutes, about 60 minutes to about 100 minutes, about 60 minutes to about 110 minutes, about 60 minutes to about 120 minutes, about 70 minutes to about 80 minutes, about 70 minutes to about 90 minutes, about 70 minutes to about 100 minutes, about 70 minutes to about 110 minutes, about 70 minutes to about 120 minutes, about 80 minutes to about 90 minutes, about 80 minutes to about 100 minutes, about 80 minutes to about 110 minutes, about 80 minutes to about 120 minutes, about 90 minutes to about 100 minutes, about 90 minutes to about 110 minutes, about 90 minutes to about 120 minutes, about 100 minutes to about 110 minutes, about 100 minutes to about 120 minutes, or about 110 minutes to about 120 minutes.

A disclosed composition, method and/or use are less harsh on a medical device resulting in a longer lifetime use of a medical device. In aspects of this embodiment, a medical device can be cleaned, disinfected and/or sterilized, e.g., about 50 times, about 60 times, about 70 times, about 80 times, about 90 times, about 100 times, about 110 times, about 120 times, about 130 times, about 140 times, about 150 times, about 160 times, about 170 times, about 180 times, about 190 times, about 200 times, about 210 times, about 220 times, about 230 times, about 240 times, about 250 times, about 260 times, about 270 times, about 280 times, about 290 times, or about 300 times. In other aspects of this embodiment, a medical device can be cleaned, disinfected and/or sterilized, e.g., at least 50 times, at least 60 times, at least 70 times, at least 80 times, at least 90 times, at least 100 times, at least 110 times, at least 120 times, at least 130 times, at least 140 times, at least 150 times, at least 160 times, at least 170 times, at least 180 times, at least 190 times, at least 200 times, at least 210 times, at least 220 times, at least 230 times, at least 240 times, at least 250 times, at least 260 times, at least 270 times, at least 280 times, at least 290 times, or at least 300 times. In yet other aspects of this embodiment, a medical device can be cleaned, disinfected and/or sterilized, e.g., at most 50 times, at most 60 times, at most 70 times, at most 80 times, at most 90 times, at most 100 times, at most 110 times, at most 120 times, at most 130 times, at most 140 times, at most 150 times, at most 160 times, at most 170 times, at most 180 times, at most 190 times, at most 200 times, at most 210 times, at most 220 times, at most 230 times, at most 240 times, at most 250 times, at most 260 times, at most 270 times, at most 280 times, at most 290 times, or at most 300 times.

In still other aspects of this embodiment, a medical device can be cleaned, disinfected and/or sterilized, e.g., about 50 times to about 60 times, about 50 times to about 70 times, about 50 times to about 80 times, about 50 times to about 90 times, about 50 times to about 100 times, about 50 times to about 110 times, about 50 times to about 120 times, about 50 times to about 130 times, about 50 times to about 140 times, about 50 times to about 150 times, about 50 times to about 175 times, about 50 times to about 200 times, about 50 times to about 225 times, about 50 times to about 250 times, about 50 times to about 275 times, about 50 times to about 300 times, about 75 times to about 90 times, about 75 times to about 100 times, about 75 times to about 110 times, about 75 times to about 120 times, about 75 times to about 130 times, about 75 times to about 140 times, about 75 times to about 150 times, about 75 times to about 175 times, about 75 times to about 200 times, about 75 times to about 225 times, about 75 times to about 250 times, about 75 times to about 275 times, about 75 times to about 300 times, about 100 times to about 110 times, about 100 times to about 120 times, about 100 times to about 130 times, about 100 times to about 140 times, about 100 times to about 150 times, about 100 times to about 175 times, about 100 times to about 200 times, about 100 times to about 225 times, about 100 times to about 250 times, about 100 times to about 275 times, about 100 times to about 300 times, about 125 times to about 150 times, about 125 times to about 175 times, about 125 times to about 200 times, about 125 times to about 225 times, about 125 times to about 250 times, about 125 times to about 275 times, about 125 times to about 300 times, about 150 times to about 175 times, about 150 times to about 200 times, about 150 times to about 225 times, about 150 times to about 250 times, about 150 times to about 275 times, about 150 times to about 300 times, about 175 times to about 200 times, about 175 times to about 225 times, about 175 times to about 250 times, about 175 times to about 275 times, about 175 times to about 300 times, about 200 times to about 225 times, about 200 times to about 250 times, about 200 times to about 275 times, about 200 times to about 300 times, about 225 times to about 250 times, about 225 times to about 275 times, about 225 times to about 300 times, about 250 times to about 275 times, about 250 times to about 300 times, or about 275 times to about 300 times.

A method disclosed herein may further comprises a rinsing step using a rinse solution. Typically, the rinse solution is used to rinse a cleaned, disinfected and/or sterilized medical device or surface. The rinse solution is preferably a sterile solution. In one embodiment, a rinse solution disclosed herein comprises water. In another embodiment, a rinse solution disclosed herein comprises hypochlorous acid or free available chlorine and water. In another embodiment, a rinse solution disclosed herein does not comprises hypochlorous acid and/or free available chlorine. When present in a kit disclosed herein, the rinse solution is present in a separate container.

The amount of hypochlorous acid or free available chlorine present in a rinse solution disclosed herein is any amount that provides an antimicrobial effect, with the proviso that the total amount of hypochlorous acid or free available chlorine present is an amount below the threshold level that results in oxidation of a medical device of surface as disclosed herein. In aspects of this embodiment, the amount of hypochlorous acid or free available chlorine present in a rinse solution may be, e.g., about 5 ppm, about 10 ppm, about 20 ppm, about 30 ppm, about 40 ppm, about 50 ppm, about 60 ppm, about 70 ppm, about 80 ppm, about 90 ppm, about 100 ppm, about 110 ppm, or about 120 ppm. In other aspects of this embodiment, the amount of hypochlorous acid or free available chlorine present in a rinse solution may be, e.g., at most 5 ppm, at most 10 ppm, at most 20 ppm, at most 30 ppm, at most 40 ppm, at most 50 ppm, at most 60 ppm, at most 70 ppm, at most 80 ppm, at most 90 ppm, at most 100 ppm, at most 110 ppm, or at most 120 ppm. In yet other aspects of this embodiment, the amount of hypochlorous acid or free available chlorine present in a rinse solution may be, e.g., about 5 ppm to about 10 ppm, about 5 ppm to about 20 ppm, about 5 ppm to about 30 ppm, about 5 ppm to about 40 ppm, about 5 ppm to about 50 ppm, about 5 ppm to about 60 ppm, about 5 ppm to about 70 ppm, about 5 ppm to about 80 ppm, about 5 ppm to about 90 ppm, about 5 ppm to about 100 ppm, about 5 ppm to about 110 ppm, about 5 ppm to about 120 ppm, about 10 ppm to about 20 ppm, about 10 ppm to about 30 ppm, about 10 ppm to about 40 ppm, about 10 ppm to about 50 ppm, about 10 ppm to about 60 ppm, about 10 ppm to about 70 ppm, about 10 ppm to about 80 ppm, about 10 ppm to about 90 ppm, about 10 ppm to about 100 ppm, about 10 ppm to about 110 ppm, about 10 ppm to about 120 ppm, about 20 ppm to about 30 ppm, about 20 ppm to about 40 ppm, about 20 ppm to about 50 ppm, about 20 ppm to about 60 ppm, about 20 ppm to about 70 ppm, about 20 ppm to about 80 ppm, about 20 ppm to about 90 ppm, about 20 ppm to about 100 ppm, about 20 ppm to about 110 ppm, about 20 ppm to about 120 ppm, about 30 ppm to about 40 ppm, about 30 ppm to about 50 ppm, about 30 ppm to about 60 ppm, about 30 ppm to about 70 ppm, about 30 ppm to about 80 ppm, about 30 ppm to about 90 ppm, about 30 ppm to about 100 ppm, about 30 ppm to about 110 ppm, about 30 ppm to about 120 ppm, about 40 ppm to about 50 ppm, about 40 ppm to about 60 ppm, about 40 ppm to about 70 ppm, about 40 ppm to about 80 ppm, about 40 ppm to about 90 ppm, about 40 ppm to about 100 ppm, about 40 ppm to about 110 ppm, about 40 ppm to about 120 ppm, about 50 ppm to about 60 ppm, about 50 ppm to about 70 ppm, about 50 ppm to about 80 ppm, about 50 ppm to about 90 ppm, about 50 ppm to about 100 ppm, about 50 ppm to about 110 ppm, about 50 ppm to about 120 ppm, about 60 ppm to about 70 ppm, about 60 ppm to about 80 ppm, about 60 ppm to about 90 ppm, about 60 ppm to about 100 ppm, about 60 ppm to about 110 ppm, about 60 ppm to about 120 ppm, about 70 ppm to about 80 ppm, about 70 ppm to about 90 ppm, about 70 ppm to about 100 ppm, about 70 ppm to about 110 ppm, about 70 ppm to about 120 ppm, about 80 ppm to about 90 ppm, about 80 ppm to about 100 ppm, about 80 ppm to about 110 ppm, about 80 ppm to about 120 ppm, about 90 ppm to about 100 ppm, about 90 ppm to about 110 ppm, about 90 ppm to about 120 ppm, about 100 ppm to about 110 ppm, about 100 ppm to about 120 ppm, or about 110 ppm to about 120 ppm.

Aspects of the present specification can also be described as follows:

1. A composition comprising, consisting essentially of, or consisting of hypochlorous acid or free available chlorine and one or more quaternary compounds or silicon quaternary compounds.

2. A composition comprising, consisting essentially of, or consisting of hypochlorous acid or free available chlorine and one or more guanide-containing compounds.

3. A composition comprising, consisting essentially of, or consisting of hypochlorous acid or free available chlorine, one or more quaternary compounds or silicon quaternary compounds, and one or more guanide-containing compounds.

4. A composition comprising, consisting essentially of, or consisting of hypochlorous acid or free available chlorine and one or more alcohols.

5. A composition comprising, consisting essentially of, or consisting of one or more alcohols and one or more quaternary compounds or silicon quaternary compounds.

6. A composition comprising, consisting essentially of, or consisting of one or more alcohols and one or more guanide-containing compounds.

7. The composition according to any one of embodiments 1-6 further comprising, consisting essentially of, or consisting of one or more metallic particles.

8. The composition according to any one of embodiments 1-7 further comprising, consisting essentially of, or consisting of one or more metal salts.

9. A composition comprising, consisting essentially of, or consisting of hypochlorous acid or free available chlorine and one or more metallic particles.

10. A composition comprising, consisting essentially of, or consisting of hypochlorous acid or free available chlorine and one or more metal salts.

11. A composition comprising, consisting essentially of, or consisting of hypochlorous acid or free available chlorine, one or more metallic particles and one or more metal salts.

12. The composition according to embodiments 1-4 and 9-11, wherein the hypochlorous acid or free available chlorine is in an amount of 0.05 ppm, 0.10 ppm, 0.15 ppm, 0.20 ppm, 0.25 ppm, 0.30 ppm, 0.35 ppm, 0.40 ppm, 0.45 ppm, 0.50 ppm, 0.55 ppm, 0.60 ppm, 0.65 ppm, 0.70 ppm, 0.75 ppm, 0.80 ppm, 0.85 ppm, 0.90 ppm, 0.95 ppm, 1 ppm, 5 ppm, 10 ppm, 15 ppm, 20 ppm, 25 ppm, 30 ppm, 35 ppm, 40 ppm, 45 ppm, 50 ppm, 55 ppm, 60 ppm, 65 ppm, 70 ppm, 75 ppm, 80 ppm, 85 ppm, 90 ppm, 95 ppm, 100 ppm, 125 ppm, 150 ppm, 175 ppm, 200 ppm, 225 ppm, 250 ppm, 275 ppm, 300 ppm, 325 ppm, 350 ppm, 375 ppm, 400 ppm, 425 ppm, 450 ppm, 475 ppm, 500 ppm, 525 ppm, 550 ppm, 575 ppm, 600 ppm, 625 ppm, 650 ppm, 675 ppm, 700 ppm, 725 ppm, 750 ppm, 775 ppm, 800 ppm, 825 ppm, 850 ppm, 875 ppm, 900 ppm, 925 ppm, 950 ppm, 975 ppm, 1,000 ppm, 1,025 ppm, 1,050 ppm, 1075 ppm, 1,100 ppm, 1,125 ppm, 1,150 ppm, 1,175 ppm, 1,200 ppm, 1,225 ppm, 1,250 ppm, 1,275 ppm, 1,300 ppm, 1,325 ppm, 1,350 ppm, 1,375 ppm, 1,400 ppm, 1,425 ppm, 1,450 ppm, 1,475 ppm, 1,500 ppm, 1,600 ppm, 1,700 ppm, 1,800 ppm, 1,900 ppm, or 2,000 ppm or at least 0.05 ppm, at least 0.10 ppm, at least 0.20 ppm, at least 0.30 ppm, at least 0.40 ppm, at least 0.50 ppm, at least 0.60 ppm, at least 0.70 ppm, at least 0.80 ppm, at least 0.90 ppm, at least 1 ppm, at least 10 ppm, at least 20 ppm, at least 30 ppm, at least 40 ppm, at least 50 ppm, at least 60 ppm, at least 70 ppm, at least 80 ppm, at least 90 ppm, at least 100 ppm, at least 125 ppm, at least 150 ppm, at least 175 ppm, at least 200 ppm, at least 225 ppm, at least 250 ppm, at least 275 ppm, at least 300 ppm, at least 325 ppm, at least 350 ppm, at least 375 ppm, at least 400 ppm, at least 425 ppm, at least 450 ppm, at least 475 ppm, at least 500 ppm, at least 525 ppm, at least 550 ppm, at least 575 ppm, at least 600 ppm, at least 625 ppm, at least 650 ppm, at least 675 ppm, at least 700 ppm, at least 725 ppm, at least 750 ppm, at least 775 ppm, at least 800 ppm, at least 825 ppm, at least 850 ppm, at least 875 ppm, at least 900 ppm, at least 925 ppm, at least 950 ppm, at least 975 ppm, at least 1,000 ppm, at least 1,025 ppm, at least 1,050 ppm, at least 1075 ppm, at least 1,100 ppm, at least 1,125 ppm, at least 1,150 ppm, at least 1,175 ppm, at least 1,200 ppm, at least 1,225 ppm, at least 1,250 ppm, at least 1,275 ppm, at least 1,300 ppm, at least 1,325 ppm, at least 1,350 ppm, at least 1,375 ppm, at least 1,400 ppm, at least 1,425 ppm, at least 1,450 ppm, at least 1,475 ppm, at least 1,500 ppm, at least 1,600 ppm, at least 1,700 ppm, at least 1,800 ppm, at least 1,900 ppm, or at least 2,000 ppm or at most 0.05 ppm, at most 0.10 ppm, at most 0.20 ppm, at most 0.30 ppm, at most 0.40 ppm, at most 0.50 ppm, at most 0.60 ppm, at most 0.70 ppm, at most 0.80 ppm, at most 0.90 ppm, at most 1 ppm, at most 10 ppm, at most 20 ppm, at most 30 ppm, at most 40 ppm, at most 50 ppm, at most 60 ppm, at most 70 ppm, at most 80 ppm, at most 90 ppm, at most 100 ppm, at most 125 ppm, at most 150 ppm, at most 175 ppm, at most 200 ppm, at most 225 ppm, at most 250 ppm, at most 275 ppm, at most 300 ppm, at most 325 ppm, at most 350 ppm, at most 375 ppm, at most 400 ppm, at most 425 ppm, at most 450 ppm, at most 475 ppm, at most 500 ppm, at most 525 ppm, at most 550 ppm, at most 575 ppm, at most 600 ppm, at most 625 ppm, at most 650 ppm, at most 675 ppm, at most 700 ppm, at most 725 ppm, at most 750 ppm, at most 775 ppm, at most 800 ppm, at most 825 ppm, at most 850 ppm, at most 875 ppm, at most 900 ppm, at most 925 ppm, at most 950 ppm, at most 975 ppm, at most 1,000 ppm, at most 1,025 ppm, at most 1,050 ppm, at most 1075 ppm, at most 1,100 ppm, at most 1,125 ppm, at most 1,150 ppm, at most 1,175 ppm, at most 1,200 ppm, at most 1,225 ppm, at most 1,250 ppm, at most 1,275 ppm, at most 1,300 ppm, at most 1,325 ppm, at most 1,350 ppm, at most 1,375 ppm, at most 1,400 ppm, at most 1,425 ppm, at most 1,450 ppm, at most 1,475 ppm, at most 1,500 ppm, at most 1,600 ppm, at most 1,700 ppm, at most 1,800 ppm, at most 1,900 ppm, or at most 2,000 ppm or about 0.5 ppm to about 20 ppm, about 0.5 ppm to about 25 ppm, about 0.5 ppm to about 30 ppm, about 0.5 ppm to about 35 ppm, about 0.5 ppm to about 40 ppm, about 0.5 ppm to about 45 ppm, about 0.5 ppm to about 50 ppm, about 0.5 ppm to about 55 ppm, about 0.5 ppm to about 60 ppm, about 0.5 ppm to about 65 ppm, about 0.5 ppm to about 70 ppm, about 0.5 ppm to about 75 ppm, about 0.5 ppm to about 80 ppm, about 0.5 ppm to about 85 ppm, about 0.5 ppm to about 90 ppm, about 0.5 ppm to about 95 ppm, about 0.5 ppm to about 100 ppm, about 0.75 ppm to about 20 ppm, about 0.75 ppm to about 25 ppm, about 0.75 ppm to about 30 ppm, about 0.75 ppm to about 35 ppm, about 0.75 ppm to about 40 ppm, about 0.75 ppm to about 45 ppm, about 0.75 ppm to about 50 ppm, about 0.75 ppm to about 55 ppm, about 0.75 ppm to about 60 ppm, about 0.75 ppm to about 65 ppm, about 0.75 ppm to about 70 ppm, about 0.75 ppm to about 75 ppm, about 0.75 ppm to about 80 ppm, about 0.75 ppm to about 85 ppm, about 0.75 ppm to about 90 ppm, about 0.75 ppm to about 95 ppm, about 0.75 ppm to about 100 ppm, about 1 ppm to about 20 ppm, about 1 ppm to about 25 ppm, about 1 ppm to about 30 ppm, about 1 ppm to about 35 ppm, about 1 ppm to about 40 ppm, about 1 ppm to about 45 ppm, about 1 ppm to about 50 ppm, about 1 ppm to about 55 ppm, about 1 ppm to about 60 ppm, about 1 ppm to about 65 ppm, about 1 ppm to about 70 ppm, about 1 ppm to about 75 ppm, about 1 ppm to about 80 ppm, about 1 ppm to about 85 ppm, about 1 ppm to about 90 ppm, about 1 ppm to about 95 ppm, about 1 ppm to about 100 ppm, about 5 ppm to about 20 ppm, about 5 ppm to about 25 ppm, about 5 ppm to about 30 ppm, about 5 ppm to about 35 ppm, about 5 ppm to about 40 ppm, about 5 ppm to about 45 ppm, about 5 ppm to about 50 ppm, about 5 ppm to about 55 ppm, about 5 ppm to about 60 ppm, about 5 ppm to about 65 ppm, about 5 ppm to about 70 ppm, about 5 ppm to about 75 ppm, about 5 ppm to about 80 ppm, about 5 ppm to about 85 ppm, about 5 ppm to about 90 ppm, about 5 ppm to about 95 ppm, about 5 ppm to about 100 ppm, about 10 ppm to about 20 ppm, about 10 ppm to about 25 ppm, about 10 ppm to about 30 ppm, about 10 ppm to about 35 ppm, about 10 ppm to about 40 ppm, about 10 ppm to about 45 ppm, about 10 ppm to about 50 ppm, about 10 ppm to about 55 ppm, about 10 ppm to about 60 ppm, about 10 ppm to about 65 ppm, about 10 ppm to about 70 ppm, about 10 ppm to about 75 ppm, about 10 ppm to about 80 ppm, about 10 ppm to about 85 ppm, about 10 ppm to about 90 ppm, about 10 ppm to about 95 ppm, or about 10 ppm to about 100 ppm, about 1 ppm to about 25 ppm, about 1 ppm to about 50 ppm, about 1 ppm to about 75 ppm, about 1 ppm to about 100 ppm, about 1 ppm to about 125 ppm, about 1 ppm to about 150 ppm, about 1 ppm to about 175 ppm, about 1 ppm to about 200 ppm, about 1 ppm to about 225 ppm, about 1 ppm to about 250 ppm, about 1 ppm to about 275 ppm, about 1 ppm to about 300 ppm, about 1 ppm to about 325 ppm, about 1 ppm to about 350 ppm, about 1 ppm to about 375 ppm, about 1 ppm to about 400 ppm, about 10 ppm to about 25 ppm, about 10 ppm to about 50 ppm, about 10 ppm to about 75 ppm, about 10 ppm to about 100 ppm, about 10 ppm to about 125 ppm, about 10 ppm to about 150 ppm, about 10 ppm to about 175 ppm, about 10 ppm to about 200 ppm, about 10 ppm to about 225 ppm, about 10 ppm to about 250 ppm, about 10 ppm to about 275 ppm, about 10 ppm to about 300 ppm, about 10 ppm to about 325 ppm, about 10 ppm to about 350 ppm, about 10 ppm to about 375 ppm, about 10 ppm to about 400 ppm, about 25 ppm to about 50 ppm, about 25 ppm to about 75 ppm, about 25 ppm to about 100 ppm, about 25 ppm to about 125 ppm, about 25 ppm to about 150 ppm, about 25 ppm to about 175 ppm, about 25 ppm to about 200 ppm, about 25 ppm to about 225 ppm, about 25 ppm to about 250 ppm, about 25 ppm to about 275 ppm, about 25 ppm to about 300 ppm, about 25 ppm to about 325 ppm, about 25 ppm to about 350 ppm, about 25 ppm to about 375 ppm, about 25 ppm to about 400 ppm, about 50 ppm to about 75 ppm, about 50 ppm to about 100 ppm, about 50 ppm to about 125 ppm, about 50 ppm to about 150 ppm, about 50 ppm to about 175 ppm, about 50 ppm to about 200 ppm, about 50 ppm to about 225 ppm, about 50 ppm to about 250 ppm, about 50 ppm to about 275 ppm, about 50 ppm to about 300 ppm, about 50 ppm to about 325 ppm, about 50 ppm to about 350 ppm, about 50 ppm to about 375 ppm, about 50 ppm to about 400 ppm, about 75 ppm to about 100 ppm, about 75 ppm to about 125 ppm, about 75 ppm to about 150 ppm, about 75 ppm to about 175 ppm, about 75 ppm to about 200 ppm, about 75 ppm to about 225 ppm, about 75 ppm to about 250 ppm, about 75 ppm to about 275 ppm, about 75 ppm to about 300 ppm, about 75 ppm to about 325 ppm, about 75 ppm to about 350 ppm, about 75 ppm to about 375 ppm, about 75 ppm to about 400 ppm, about 100 ppm to about 125 ppm, about 100 ppm to about 150 ppm, about 100 ppm to about 175 ppm, about 100 ppm to about 200 ppm, about 100 ppm to about 225 ppm, about 100 ppm to about 250 ppm, about 100 ppm to about 275 ppm, about 100 ppm to about 300 ppm, about 100 ppm to about 325 ppm, about 100 ppm to about 350 ppm, about 100 ppm to about 375 ppm, about 100 ppm to about 400 ppm, about 150 ppm to about 175 ppm, about 150 ppm to about 200 ppm, about 150 ppm to about 225 ppm, about 150 ppm to about 250 ppm, about 150 ppm to about 275 ppm, about 150 ppm to about 300 ppm, about 150 ppm to about 325 ppm, about 150 ppm to about 350 ppm, about 150 ppm to about 375 ppm, about 150 ppm to about 400 ppm, about 200 ppm to about 225 ppm, about 200 ppm to about 250 ppm, about 200 ppm to about 275 ppm, about 200 ppm to about 300 ppm, about 200 ppm to about 325 ppm, about 200 ppm to about 350 ppm, about 200 ppm to about 375 ppm, about 200 ppm to about 400 ppm, about 200 ppm to about 425 ppm, about 200 ppm to about 450 ppm, about 200 ppm to about 475 ppm, about 200 ppm to about 500 ppm, about 200 ppm to about 525 ppm, about 200 ppm to about 550 ppm, about 200 ppm to about 575 ppm, about 200 ppm to about 600 ppm, about 250 ppm to about 275 ppm, about 250 ppm to about 300 ppm, about 250 ppm to about 325 ppm, about 250 ppm to about 350 ppm, about 250 ppm to about 375 ppm, about 250 ppm to about 400 ppm, about 250 ppm to about 425 ppm, about 250 ppm to about 450 ppm, about 250 ppm to about 475 ppm, about 250 ppm to about 500 ppm, about 250 ppm to about 525 ppm, about 250 ppm to about 550 ppm, about 250 ppm to about 575 ppm, about 250 ppm to about 600 ppm, about 300 ppm to about 325 ppm, about 300 ppm to about 350 ppm, about 300 ppm to about 375 ppm, about 300 ppm to about 400 ppm, about 300 ppm to about 425 ppm, about 300 ppm to about 450 ppm, about 300 ppm to about 475 ppm, about 300 ppm to about 500 ppm, about 300 ppm to about 525 ppm, about 300 ppm to about 550 ppm, about 300 ppm to about 575 ppm, about 300 ppm to about 600 ppm, about 350 ppm to about 375 ppm, about 350 ppm to about 400 ppm, about 375 ppm to about 400 ppm, about 350 ppm to about 425 ppm, about 350 ppm to about 450 ppm, about 350 ppm to about 475 ppm, about 350 ppm to about 500 ppm, about 350 ppm to about 525 ppm, about 350 ppm to about 550 ppm, about 350 ppm to about 575 ppm, about 350 ppm to about 600 ppm, about 400 ppm to about 500 ppm, about 400 ppm to about 600 ppm, about 400 ppm to about 700 ppm, about 400 ppm to about 800 ppm, about 400 ppm to about 900 ppm, about 400 ppm to about 1,000 ppm, about 400 ppm to about 1,100 ppm, about 400 ppm to about 1,200 ppm, about 400 ppm to about 1,300 ppm, about 400 ppm to about 1,400 ppm, about 400 ppm to about 1,500 ppm, about 400 ppm to about 1,600 ppm, about 400 ppm to about 1,700 ppm, about 400 ppm to about 1,800 ppm, about 400 ppm to about 1,900 ppm, about 400 ppm to about 2,000 ppm, about 500 ppm to about 600 ppm, about 500 ppm to about 700 ppm, about 500 ppm to about 800 ppm, about 500 ppm to about 900 ppm, about 500 ppm to about 1,000 ppm, about 500 ppm to about 1,100 ppm, about 500 ppm to about 1,200 ppm, about 500 ppm to about 1,300 ppm, about 500 ppm to about 1,400 ppm, about 500 ppm to about 1,500 ppm, about 500 ppm to about 1,600 ppm, about 500 ppm to about 1,700 ppm, about 500 ppm to about 1,800 ppm, about 500 ppm to about 1,900 ppm, about 500 ppm to about 2,000 ppm, about 600 ppm to about 700 ppm, about 600 ppm to about 800 ppm, about 600 ppm to about 900 ppm, about 600 ppm to about 1,000 ppm, about 600 ppm to about 1,100 ppm, about 600 ppm to about 1,200 ppm, about 600 ppm to about 1,300 ppm, about 600 ppm to about 1,400 ppm, about 600 ppm to about 1,500 ppm, about 600 ppm to about 1,600 ppm, about 600 ppm to about 1,700 ppm, about 600 ppm to about 1,800 ppm, about 600 ppm to about 1,900 ppm, about 600 ppm to about 2,000 ppm, about 700 ppm to about 800 ppm, about 700 ppm to about 900 ppm, about 700 ppm to about 1,000 ppm, about 700 ppm to about 1,100 ppm, about 700 ppm to about 1,200 ppm, about 700 ppm to about 1,300 ppm, about 700 ppm to about 1,400 ppm, about 700 ppm to about 1,500 ppm, about 700 ppm to about 1,600 ppm, about 700 ppm to about 1,700 ppm, about 700 ppm to about 1,800 ppm, about 700 ppm to about 1,900 ppm, about 700 ppm to about 2,000 ppm, about 800 ppm to about 900 ppm, about 800 ppm to about 1,000 ppm, about 800 ppm to about 1,100 ppm, about 800 ppm to about 1,200 ppm, about 800 ppm to about 1,300 ppm, about 800 ppm to about 1,400 ppm, about 800 ppm to about 1,500 ppm, about 800 ppm to about 1,600 ppm, about 800 ppm to about 1,700 ppm, about 800 ppm to about 1,800 ppm, about 800 ppm to about 1,900 ppm, about 800 ppm to about 2,000 ppm, about 900 ppm to about 1,000 ppm, about 900 ppm to about 1,100 ppm, about 900 ppm to about 1,200 ppm, about 900 ppm to about 1,300 ppm, about 900 ppm to about 1,400 ppm, about 900 ppm to about 1,500 ppm, about 900 ppm to about 1,600 ppm, about 900 ppm to about 1,700 ppm, about 900 ppm to about 1,800 ppm, about 900 ppm to about 1,900 ppm, about 900 ppm to about 2,000 ppm, about 1,000 ppm to about 1,100 ppm, about 1,000 ppm to about 1,200 ppm, about 1,000 ppm to about 1,300 ppm, about 1,000 ppm to about 1,400 ppm, about 1,000 ppm to about 1,500 ppm, about 1,000 ppm to about 1,600 ppm, about 1,000 ppm to about 1,700 ppm, about 1,000 ppm to about 1,800 ppm, about 1,000 ppm to about 1,900 ppm, about 1,000 ppm to about 2,000 ppm, about 1,100 ppm to about 1,200 ppm, about 1,100 ppm to about 1,300 ppm, about 1,100 ppm to about 1,400 ppm, about 1,100 ppm to about 1,500 ppm, about 1,100 ppm to about 1,600 ppm, about 1,100 ppm to about 1,700 ppm, about 1,100 ppm to about 1,800 ppm, about 1,100 ppm to about 1,900 ppm, about 1,100 ppm to about 2,000 ppm, about 1,200 ppm to about 1,300 ppm, about 1,200 ppm to about 1,400 ppm, about 1,200 ppm to about 1,500 ppm, about 1,200 ppm to about 1,600 ppm, about 1,200 ppm to about 1,700 ppm, about 1,200 ppm to about 1,800 ppm, about 1,200 ppm to about 1,900 ppm, about 1,200 ppm to about 2,000 ppm, about 1,300 ppm to about 1,400 ppm, about 1,300 ppm to about 1,500 ppm, about 1,300 ppm to about 1,600 ppm, about 1,300 ppm to about 1,700 ppm, about 1,300 ppm to about 1,800 ppm, about 1,300 ppm to about 1,900 ppm, about 1,300 ppm to about 2,000 ppm, about 1,400 ppm to about 1,500 ppm, about 1,400 ppm to about 1,600 ppm, about 1,400 ppm to about 1,700 ppm, about 1,400 ppm to about 1,800 ppm, about 1,400 ppm to about 1,900 ppm, about 1,400 ppm to about 2,000 ppm, about 1,500 ppm to about 1,600 ppm, about 1,500 ppm to about 1,700 ppm, about 1,500 ppm to about 1,800 ppm, about 1,500 ppm to about 1,900 ppm, about 1,500 ppm to about 2,000 ppm, about 1,600 ppm to about 1,700 ppm, about 1,600 ppm to about 1,800 ppm, about 1,600 ppm to about 1,900 ppm, about 1,600 ppm to about 2,000 ppm, about 1,700 ppm to about 1,800 ppm, about 1,700 ppm to about 1,900 ppm, about 1,700 ppm to about 2,000 ppm, about 1,800 ppm to about 1,900 ppm, about 1,800 ppm to about 2,000 ppm, or about 1,900 ppm to about 2,000 ppm.

13. The composition according to any one of embodiments 1-4 and 9-11, wherein the hypochlorous acid or free available chlorine is in an amount of about 0.10%, about 0.11%, about 0.12%, about 0.13%, about 0.14%, about 0.15%, about 0.16%, about 0.17%, about 0.18%, about 0.19%, about 0.2%, about 0.25%, about 0.3%, about 0.35%, about 0.4%, about 0.45%, or about 0.5% by weight of the composition, or at least 0.10%, at least 0.11%, at least 0.12%, at least 0.13%, at least 0.14%, at least 0.15%, at least 0.16%, at least 0.17%, at least 0.18%, at least 0.19%, at least 0.2%, at least 0.25%, at least 0.3%, at least 0.35%, at least 0.4%, at least 0.45%, or at least 0.5% by weight of the composition, or at most 0.10%, at most 0.11%, at most 0.12%, at most 0.13%, at most 0.14%, at most 0.15%, at most 0.16%, at most 0.17%, at most 0.18%, at most 0.19%, at most 0.2%, at most 0.25%, at most 0.3%, at most 0.35%, at most 0.4%, at most 0.45%, or at most 0.5% by weight of the composition, or about 0.10% to about 0.15%, about 0.10% to about 0.20%, about 0.10% to about 0.25%, about 0.10% to about 0.30%, about 0.10% to about 0.35%, about 0.10% to about 0.40%, about 0.10% to about 0.45%, about 0.10% to about 0.50%, about 0.20% to about 0.25%, about 0.20% to about 0.30%, about 0.20% to about 0.35%, about 0.20% to about 0.40%, about 0.20% to about 0.45%, about 0.20% to about 0.50%, about 0.30% to about 0.35%, about 0.30% to about 0.40%, about 0.30% to about 0.45%, about 0.30% to about 0.50%, about 0.40% to about 0.45%, about 0.40% to about 0.50%, or about 0.40% to about 0.50% by weight of the composition.

14. The composition according to any one of embodiments 1, 3, 5, 12, or 13, wherein the one or more quaternary compounds include one or more dialkyl quaternary compounds and/or one or more polyether fatty quaternary compounds or wherein the one or more silicon quaternary compounds include one or more silicone dialkyl quaternary compounds and/or one or more silicone polyether fatty quaternary compounds.

15. The composition according to embodiment 14, wherein the one or more dialkyl quaternary compounds include didodecyldimethylammonium chloride and di-n-alkyldimethyl ammonium chloride and/or wherein the one or more silicone dialkyl quaternary compounds include dimethyloctadecyl[3-(trimethoxysilyl)propyl]ammonium chloride and tetradecyldimethyl-(3-trimethoxysilyl)propyl ammonium chloride.

16. The composition according to any one of embodiments 1, 3, 5, or 12-15, wherein the one or more quaternary compounds or silicon quaternary compounds are in an amount of about 0.01%, about 0.05%, about 0.075%, about 0.1%, about 0.2%, about 0.3%, about 0.4%, about 0.5%, about 0.6%, about 0.7%, about 0.8%, about 0.9%, about 1.0%, about 1.5%, about 2.0%, about 2.5%, about 3.0%, about 4.0%, about 5.0%, about 6.0%, about 7.0%, about 7.5%, about 8.0%, about 9.0%, about 10.0%, about 11.0%, about 12.0%, about 13.0%, about 14.0%, about 15.0%, about 16.0%, about 17.0%, 18.0%, about 19.0%, or about 20.0% by weight of the composition, or at least 0.01%, at least 0.05%, at least 0.075%, at least 0.1%, at least 0.25%, at least 0.5%, at least 0.75%, at least 1.0%, at least 1.5%, at least 2.0%, at least 2.5%, at least 3.0%, at least 4.0%, at least 5.0%, at least 6.0%, at least 7.0%, at least 7.5%, at least 8.0%, at least 9.0%, at least 10.0%, at least 11.0%, at least 12.0%, at least 13.0%, at least 14.0%, at least 15.0%, at least 16.0%, at least 17.0%, at least 18.0%, at least 19.0%, or at least 20.0% by weight of the composition by weight of the composition, or at most 0.01%, at most 0.05%, at most 0.075%, at most 0.1%, at most 0.25%, at most 0.5%, at most 0.75%, at most 1.0%, at most 1.5%, at most 2.0%, at most 2.5%, at most 3.0%, at most 4.0%, at most 5.0%, at most 6.0%, at most 7.5%, at most 8.0%, at most 9.0%, at most 10.0%, at most 11.0%, at most 12.0%, at most 13.0%, at most 14.0%, at most 15.0%, at most 16.0%, at most 17.0%, at most 18.0%, at most 19.0%, or at most 20.0% by weight of the composition by weight of the composition, or about 0.1% to about 0.5%, about 0.1% to about 0.75%, about 0.1% to about 1.0%, about 0.1% to about 1.5%, about 0.1% to about 2.0%, about 0.1% to about 2.5%, about 0.2% to about 0.5%, about 0.2% to about 0.75%, about 0.2% to about 1.0%, about 0.2% to about 1.5%, about 0.2% to about 2.0%, about 0.2% to about 2.5%, about 0.5% to about 1.0%, about 0.5% to about 1.5%, about 0.5% to about 2.0%, about 0.5% to about 2.5%, about 0.5% to about 3.0%, about 0.5% to about 4.0%, about 0.5% to about 5.0%, about 1.0% to about 2.0%, about 1.0% to about 3.0%, about 1.0% to about 4.0%, about 1.0% to about 5.0%, about 1.0% to about 6.0%, about 1.0% to about 7.0%, about 1.0% to about 8.0%, about 1.0% to about 9.0%, about 1.0% to about 10%, about 1.0% to about 11%, about 1.0% to about 12%, about 1.0% to about 13%, about 1.0% to about 14%, about 1.0% to about 15%, about 2.0% to about 3.0%, about 2.0% to about 4.0%, about 2.0% to about 5.0%, about 2.0% to about 6.0%, about 2.0% to about 7.0%, about 2.0% to about 8.0%, about 2.0% to about 9.0%, about 2.0% to about 10%, about 2.0% to about 11%, about 2.0% to about 12%, about 2.0% to about 13%, about 2.0% to about 14%, about 2.0% to about 15%, about 3.0% to about 4.0%, about 3.0% to about 5.0%, about 3.0% to about 6.0%, about 3.0% to about 7.0%, about 3.0% to about 8.0%, about 3.0% to about 9.0%, about 3.0% to about 10%, about 3.0% to about 11%, about 3.0% to about 12%, about 3.0% to about 13%, about 3.0% to about 14%, about 3.0% to about 15%, about 4.0% to about 5.0%, about 4.0% to about 6.0%, about 4.0% to about 7.0%, about 4.0% to about 8.0%, about 4.0% to about 9.0%, about 4.0% to about 10%, about 4.0% to about 11%, about 4.0% to about 12%, about 4.0% to about 13%, about 4.0% to about 14%, about 4.0% to about 15%, about 5.0% to about 6.0%, about 5.0% to about 7.0%, about 5.0% to about 8.0%, about 5.0% to about 9.0%, about 5.0% to about 10%, about 5.0% to about 11%, about 5.0% to about 12%, about 5.0% to about 13%, about 5.0% to about 14%, about 5.0% to about 15%, about 6.0% to about 7.0%, about 6.0% to about 8.0%, about 6.0% to about 9.0%, about 6.0% to about 10%, about 6.0% to about 11%, about 6.0% to about 12%, about 6.0% to about 13%, about 6.0% to about 14%, about 6.0% to about 15%, about 7.0% to about 8.0%, about 7.0% to about 9.0%, about 7.0% to about 10%, about 7.0% to about 11%, about 7.0% to about 12%, about 7.0% to about 13%, about 7.0% to about 14%, about 7.0% to about 15%, about 8.0% to about 9.0%, about 8.0% to about 10%, about 8.0% to about 11%, about 8.0% to about 12%, about 8.0% to about 13%, about 8.0% to about 14%, about 8.0% to about 15%, about 9.0% to about 10%, about 9.0% to about 11%, about 9.0% to about 12%, about 9.0% to about 13%, about 9.0% to about 14%, about 9.0% to about 15%, about 10% to about 11%, about 10% to about 12%, about 10% to about 13%, about 10% to about 14%, about 10% to about 15%, about 11% to about 12%, about 11% to about 13%, about 11% to about 14%, about 11% to about 15%, about 12% to about 13%, about 12% to about 14%, about 12% to about 15%, about 13% to about 14%, about 13% to about 15%, or 14% to about 15% by weight of the composition.

17. The composition according to any one of embodiments 1, 3, 5, or 12-15, wherein the one or more quaternary compounds or silicon quaternary compounds is in an amount of 0.05 ppm, 0.10 ppm, 0.15 ppm, 0.20 ppm, 0.25 ppm, 0.30 ppm, 0.35 ppm, 0.40 ppm, 0.45 ppm, 0.50 ppm, 0.55 ppm, 0.60 ppm, 0.65 ppm, 0.70 ppm, 0.75 ppm, 0.80 ppm, 0.85 ppm, 0.90 ppm, 0.95 ppm, 1 ppm, 5 ppm, 10 ppm, 15 ppm, 20 ppm, 25 ppm, 30 ppm, 35 ppm, 40 ppm, 45 ppm, 50 ppm, 55 ppm, 60 ppm, 65 ppm, 70 ppm, 75 ppm, 80 ppm, 85 ppm, 90 ppm, 95 ppm, 100 ppm, 125 ppm, 150 ppm, 175 ppm, 200 ppm, 225 ppm, 250 ppm, 275 ppm, 300 ppm, 325 ppm, 350 ppm, 375 ppm, 400 ppm, 425 ppm, 450 ppm, 475 ppm, 500 ppm, 525 ppm, 550 ppm, 575 ppm, 600 ppm, 625 ppm, 650 ppm, 675 ppm, 700 ppm, 725 ppm, 750 ppm, 775 ppm, 800 ppm, 825 ppm, 850 ppm, 875 ppm, 900 ppm, 925 ppm, 950 ppm, 975 ppm, 1,000 ppm, 1,025 ppm, 1,050 ppm, 1075 ppm, 1,100 ppm, 1,125 ppm, 1,150 ppm, 1,175 ppm, 1,200 ppm, 1,225 ppm, 1,250 ppm, 1,275 ppm, 1,300 ppm, 1,325 ppm, 1,350 ppm, 1,375 ppm, 1,400 ppm, 1,425 ppm, 1,450 ppm, 1,475 ppm, or 1,500 ppm or at least 0.05 ppm, at least 0.10 ppm, at least 0.20 ppm, at least 0.30 ppm, at least 0.40 ppm, at least 0.50 ppm, at least 0.60 ppm, at least 0.70 ppm, at least 0.80 ppm, at least 0.90 ppm, at least 1 ppm, at least 10 ppm, at least 20 ppm, at least 30 ppm, at least 40 ppm, at least 50 ppm, at least 60 ppm, at least 70 ppm, at least 80 ppm, at least 90 ppm, at least 100 ppm, at least 125 ppm, at least 150 ppm, at least 175 ppm, at least 200 ppm, at least 225 ppm, at least 250 ppm, at least 275 ppm, at least 300 ppm, at least 325 ppm, at least 350 ppm, at least 375 ppm, at least 400 ppm, at least 425 ppm, at least 450 ppm, at least 475 ppm, at least 500 ppm, at least 525 ppm, at least 550 ppm, at least 575 ppm, at least 600 ppm, at least 625 ppm, at least 650 ppm, at least 675 ppm, at least 700 ppm, at least 725 ppm, at least 750 ppm, at least 775 ppm, at least 800 ppm, at least 825 ppm, at least 850 ppm, at least 875 ppm, at least 900 ppm, at least 925 ppm, at least 950 ppm, at least 975 ppm, at least 1,000 ppm, at least 1,025 ppm, at least 1,050 ppm, at least 1075 ppm, at least 1,100 ppm, at least 1,125 ppm, at least 1,150 ppm, at least 1,175 ppm, at least 1,200 ppm, at least 1,225 ppm, at least 1,250 ppm, at least 1,275 ppm, at least 1,300 ppm, at least 1,325 ppm, at least 1,350 ppm, at least 1,375 ppm, at least 1,400 ppm, at least 1,425 ppm, at least 1,450 ppm, at least 1,475 ppm, or at least 1,500 ppm or at most 0.05 ppm, at most 0.10 ppm, at most 0.20 ppm, at most 0.30 ppm, at most 0.40 ppm, at most 0.50 ppm, at most 0.60 ppm, at most 0.70 ppm, at most 0.80 ppm, at most 0.90 ppm, at most 1 ppm, at most 10 ppm, at most 20 ppm, at most 30 ppm, at most 40 ppm, at most 50 ppm, at most 60 ppm, at most 70 ppm, at most 80 ppm, at most 90 ppm, at most 100 ppm, at most 125 ppm, at most 150 ppm, at most 175 ppm, at most 200 ppm, at most 225 ppm, at most 250 ppm, at most 275 ppm, at most 300 ppm, at most 325 ppm, at most 350 ppm, at most 375 ppm, at most 400 ppm, at most 425 ppm, at most 450 ppm, at most 475 ppm, at most 500 ppm, at most 525 ppm, at most 550 ppm, at most 575 ppm, at most 600 ppm, at most 625 ppm, at most 650 ppm, at most 675 ppm, at most 700 ppm, at most 725 ppm, at most 750 ppm, at most 775 ppm, at most 800 ppm, at most 825 ppm, at most 850 ppm, at most 875 ppm, at most 900 ppm, at most 925 ppm, at most 950 ppm, at most 975 ppm, at most 1,000 ppm, at most 1,025 ppm, at most 1,050 ppm, at most 1075 ppm, at most 1,100 ppm, at most 1,125 ppm, at most 1,150 ppm, at most 1,175 ppm, at most 1,200 ppm, at most 1,225 ppm, at most 1,250 ppm, at most 1,275 ppm, at most 1,300 ppm, at most 1,325 ppm, at most 1,350 ppm, at most 1,375 ppm, at most 1,400 ppm, at most 1,425 ppm, at most 1,450 ppm, at most 1,475 ppm, or at most 1,500 ppm or about 0.5 ppm to about 20 ppm, about 0.5 ppm to about 25 ppm, about 0.5 ppm to about 30 ppm, about 0.5 ppm to about 35 ppm, about 0.5 ppm to about 40 ppm, about 0.5 ppm to about 45 ppm, about 0.5 ppm to about 50 ppm, about 0.5 ppm to about 55 ppm, about 0.5 ppm to about 60 ppm, about 0.5 ppm to about 65 ppm, about 0.5 ppm to about 70 ppm, about 0.5 ppm to about 75 ppm, about 0.5 ppm to about 80 ppm, about 0.5 ppm to about 85 ppm, about 0.5 ppm to about 90 ppm, about 0.5 ppm to about 95 ppm, about 0.5 ppm to about 100 ppm, about 0.75 ppm to about 20 ppm, about 0.75 ppm to about 25 ppm, about 0.75 ppm to about 30 ppm, about 0.75 ppm to about 35 ppm, about 0.75 ppm to about 40 ppm, about 0.75 ppm to about 45 ppm, about 0.75 ppm to about 50 ppm, about 0.75 ppm to about 55 ppm, about 0.75 ppm to about 60 ppm, about 0.75 ppm to about 65 ppm, about 0.75 ppm to about 70 ppm, about 0.75 ppm to about 75 ppm, about 0.75 ppm to about 80 ppm, about 0.75 ppm to about 85 ppm, about 0.75 ppm to about 90 ppm, about 0.75 ppm to about 95 ppm, about 0.75 ppm to about 100 ppm, about 1 ppm to about 20 ppm, about 1 ppm to about 25 ppm, about 1 ppm to about 30 ppm, about 1 ppm to about 35 ppm, about 1 ppm to about 40 ppm, about 1 ppm to about 45 ppm, about 1 ppm to about 50 ppm, about 1 ppm to about 55 ppm, about 1 ppm to about 60 ppm, about 1 ppm to about 65 ppm, about 1 ppm to about 70 ppm, about 1 ppm to about 75 ppm, about 1 ppm to about 80 ppm, about 1 ppm to about 85 ppm, about 1 ppm to about 90 ppm, about 1 ppm to about 95 ppm, about 1 ppm to about 100 ppm, about 5 ppm to about 20 ppm, about 5 ppm to about 25 ppm, about 5 ppm to about 30 ppm, about 5 ppm to about 35 ppm, about 5 ppm to about 40 ppm, about 5 ppm to about 45 ppm, about 5 ppm to about 50 ppm, about 5 ppm to about 55 ppm, about 5 ppm to about 60 ppm, about 5 ppm to about 65 ppm, about 5 ppm to about 70 ppm, about 5 ppm to about 75 ppm, about 5 ppm to about 80 ppm, about 5 ppm to about 85 ppm, about 5 ppm to about 90 ppm, about 5 ppm to about 95 ppm, about 5 ppm to about 100 ppm, about 10 ppm to about 20 ppm, about 10 ppm to about 25 ppm, about 10 ppm to about 30 ppm, about 10 ppm to about 35 ppm, about 10 ppm to about 40 ppm, about 10 ppm to about 45 ppm, about 10 ppm to about 50 ppm, about 10 ppm to about 55 ppm, about 10 ppm to about 60 ppm, about 10 ppm to about 65 ppm, about 10 ppm to about 70 ppm, about 10 ppm to about 75 ppm, about 10 ppm to about 80 ppm, about 10 ppm to about 85 ppm, about 10 ppm to about 90 ppm, about 10 ppm to about 95 ppm, or about 10 ppm to about 100 ppm or about 1 ppm to about 25 ppm, about 1 ppm to about 50 ppm, about 1 ppm to about 75 ppm, about 1 ppm to about 100 ppm, about 1 ppm to about 125 ppm, about 1 ppm to about 150 ppm, about 1 ppm to about 175 ppm, about 1 ppm to about 200 ppm, about 1 ppm to about 225 ppm, about 1 ppm to about 250 ppm, about 1 ppm to about 275 ppm, about 1 ppm to about 300 ppm, about 1 ppm to about 325 ppm, about 1 ppm to about 350 ppm, about 1 ppm to about 375 ppm, about 1 ppm to about 400 ppm, about 10 ppm to about 25 ppm, about 10 ppm to about 50 ppm, about 10 ppm to about 75 ppm, about 10 ppm to about 100 ppm, about 10 ppm to about 125 ppm, about 10 ppm to about 150 ppm, about 10 ppm to about 175 ppm, about 10 ppm to about 200 ppm, about 10 ppm to about 225 ppm, about 10 ppm to about 250 ppm, about 10 ppm to about 275 ppm, about 10 ppm to about 300 ppm, about 10 ppm to about 325 ppm, about 10 ppm to about 350 ppm, about 10 ppm to about 375 ppm, about 10 ppm to about 400 ppm, about 25 ppm to about 50 ppm, about 25 ppm to about 75 ppm, about 25 ppm to about 100 ppm, about 25 ppm to about 125 ppm, about 25 ppm to about 150 ppm, about 25 ppm to about 175 ppm, about 25 ppm to about 200 ppm, about 25 ppm to about 225 ppm, about 25 ppm to about 250 ppm, about 25 ppm to about 275 ppm, about 25 ppm to about 300 ppm, about 25 ppm to about 325 ppm, about 25 ppm to about 350 ppm, about 25 ppm to about 375 ppm, about 25 ppm to about 400 ppm, about 50 ppm to about 75 ppm, about 50 ppm to about 100 ppm, about 50 ppm to about 125 ppm, about 50 ppm to about 150 ppm, about 50 ppm to about 175 ppm, about 50 ppm to about 200 ppm, about 50 ppm to about 225 ppm, about 50 ppm to about 250 ppm, about 50 ppm to about 275 ppm, about 50 ppm to about 300 ppm, about 50 ppm to about 325 ppm, about 50 ppm to about 350 ppm, about 50 ppm to about 375 ppm, about 50 ppm to about 400 ppm, about 75 ppm to about 100 ppm, about 75 ppm to about 125 ppm, about 75 ppm to about 150 ppm, about 75 ppm to about 175 ppm, about 75 ppm to about 200 ppm, about 75 ppm to about 225 ppm, about 75 ppm to about 250 ppm, about 75 ppm to about 275 ppm, about 75 ppm to about 300 ppm, about 75 ppm to about 325 ppm, about 75 ppm to about 350 ppm, about 75 ppm to about 375 ppm, about 75 ppm to about 400 ppm, about 100 ppm to about 125 ppm, about 100 ppm to about 150 ppm, about 100 ppm to about 175 ppm, about 100 ppm to about 200 ppm, about 100 ppm to about 225 ppm, about 100 ppm to about 250 ppm, about 100 ppm to about 275 ppm, about 100 ppm to about 300 ppm, about 100 ppm to about 325 ppm, about 100 ppm to about 350 ppm, about 100 ppm to about 375 ppm, about 100 ppm to about 400 ppm, about 150 ppm to about 175 ppm, about 150 ppm to about 200 ppm, about 150 ppm to about 225 ppm, about 150 ppm to about 250 ppm, about 150 ppm to about 275 ppm, about 150 ppm to about 300 ppm, about 150 ppm to about 325 ppm, about 150 ppm to about 350 ppm, about 150 ppm to about 375 ppm, about 150 ppm to about 400 ppm, about 200 ppm to about 225 ppm, about 200 ppm to about 250 ppm, about 200 ppm to about 275 ppm, about 200 ppm to about 300 ppm, about 200 ppm to about 325 ppm, about 200 ppm to about 350 ppm, about 200 ppm to about 375 ppm, about 200 ppm to about 400 ppm, about 250 ppm to about 275 ppm, about 250 ppm to about 300 ppm, about 250 ppm to about 325 ppm, about 250 ppm to about 350 ppm, about 250 ppm to about 375 ppm, about 250 ppm to about 400 ppm, about 300 ppm to about 325 ppm, about 300 ppm to about 350 ppm, about 300 ppm to about 375 ppm, about 300 ppm to about 400 ppm, about 350 ppm to about 375 ppm, about 350 ppm to about 400 ppm, about 375 ppm to about 400 ppm, about 400 ppm to about 500 ppm, about 400 ppm to about 600 ppm, about 400 ppm to about 700 ppm, about 400 ppm to about 800 ppm, about 400 ppm to about 900 ppm, about 400 ppm to about 1,000 ppm, about 400 ppm to about 1,100 ppm, about 400 ppm to about 1,200 ppm, about 400 ppm to about 1,300 ppm, about 400 ppm to about 1,400 ppm, about 400 ppm to about 1,500 ppm, about 500 ppm to about 600 ppm, about 500 ppm to about 700 ppm, about 500 ppm to about 800 ppm, about 500 ppm to about 900 ppm, about 500 ppm to about 1,000 ppm, about 500 ppm to about 1,100 ppm, about 500 ppm to about 1,200 ppm, about 500 ppm to about 1,300 ppm, about 500 ppm to about 1,400 ppm, about 500 ppm to about 1,500 ppm, about 600 ppm to about 700 ppm, about 600 ppm to about 800 ppm, about 600 ppm to about 900 ppm, about 600 ppm to about 1,000 ppm, about 600 ppm to about 1,100 ppm, about 600 ppm to about 1,200 ppm, about 600 ppm to about 1,300 ppm, about 600 ppm to about 1,400 ppm, about 600 ppm to about 1,500 ppm, about 700 ppm to about 800 ppm, about 700 ppm to about 900 ppm, about 700 ppm to about 1,000 ppm, about 700 ppm to about 1,100 ppm, about 700 ppm to about 1,200 ppm, about 700 ppm to about 1,300 ppm, about 700 ppm to about 1,400 ppm, about 700 ppm to about 1,500 ppm, about 800 ppm to about 900 ppm, about 800 ppm to about 1,000 ppm, about 800 ppm to about 1,100 ppm, about 800 ppm to about 1,200 ppm, about 800 ppm to about 1,300 ppm, about 800 ppm to about 1,400 ppm, about 800 ppm to about 1,500 ppm, about 900 ppm to about 1,000 ppm, about 900 ppm to about 1,100 ppm, about 900 ppm to about 1,200 ppm, about 900 ppm to about 1,300 ppm, about 900 ppm to about 1,400 ppm, about 900 ppm to about 1,500 ppm, about 1,000 ppm to about 1,100 ppm, about 1,000 ppm to about 1,200 ppm, about 1,000 ppm to about 1,300 ppm, about 1,000 ppm to about 1,400 ppm, about 1,000 ppm to about 1,500 ppm, about 1,100 ppm to about 1,200 ppm, about 1,100 ppm to about 1,300 ppm, about 1,100 ppm to about 1,400 ppm, about 1,100 ppm to about 1,500 ppm, about 1,200 ppm to about 1,300 ppm, about 1,200 ppm to about 1,400 ppm, about 1,200 ppm to about 1,500 ppm, about 1,300 ppm to about 1,400 ppm, about 1,300 ppm to about 1,500 ppm, or about 1,400 ppm to about 1,500 ppm.

18. The composition according to any one of embodiment 2, 3, 6, or 12-17, wherein the one or more guanide-containing compounds comprise, consist essentially of, or consist of a biguanide, a biguanide-containing compound, a biguanidine, a biguanidine-containing compound, a triguanide, a triguanide-containing compound, or any combination thereof.

19. The composition according to embodiment 18, wherein the one or more biguanide-containing compounds include a polyhexamethylene biguanide (PHMB), a polyaminopropyl biguanide (PAPB), a 1,1'-(1,6-Hexanediyl)bis{2-[N'-(2-ethylhexyl)carbamimidoyl]guanidine} (alexidine), a chlorhexidine, a chlorhexidine gluconate, or any combination thereof.

20. The composition according to any one of embodiments 2, 3, 6 or 12-19, wherein the one or more guanide-containing compounds are in an amount of about 0.01%, about 0.05%, about 0.075%, about 0.1%, about 0.2%, about 0.3%, about 0.4%, about 0.5%, about 0.6%, about 0.7%, about 0.8%, about 0.9%, about 1.0%, about 1.5%, about 2.0%, about 2.5%, about 3.0%, about 4.0%, about 5.0%, about 6.0%, about 7.0%, about 7.5%, about 8.0%, about 9.0%, about 10.0%, about 11%, about 12%, about 13%, about 14%, about 15%, about 20%, about 25%, or about 30% by weight of the composition, or at least 0.01%, at least 0.05%, at least 0.075%, at least 0.1%, at least 0.25%, at least 0.5%, at least 0.75%, at least 1.0%, at least 1.5%, at least 2.0%, at least 2.5%, at least 3.0%, at least 4.0%, at least 5.0%, at least 6.0%, at least 7.0%, at least 7.5%, at least 8.0%, at least 9.0%, at least 10.0%, at least 11%, at least 12%, at least 13%, at least 14%, at least 15%, at least 20%, at least 25%, or at least 30% by weight of the composition, or at most 0.01%, at most 0.05%, at most 0.075%, at most 0.1%, at most 0.25%, at most 0.5%, at most 0.75%, at most 1.0%, at most 1.5%, at most 2.0%, at most 2.5%, at most 3.0%, at most 4.0%, at most 5.0%, at most 6.0%, at most 7.5%, at most 8.0%, at most 9.0%, at most 10.0%, at most 11%, at most 12%, at most 13%, at most 14%, at most 15%, at most 20%, at most 25%, or at most 30% by weight of the composition, or about 0.1% to about 0.5%, about 0.1% to about 0.75%, about 0.1% to about 1.0%, about 0.1% to about 1.5%, about 0.1% to about 2.0%, about 0.1% to about 2.5%, about 0.1% to about 3.0%, about 0.1% to about 3.5%, about 0.1% to about 4.0%, about 0.1% to about 4.5%, about 0.1% to about 5.0%, about 0.2% to about 0.5%, about 0.2% to about 0.75%, about 0.2% to about 1.0%, about 0.2% to about 1.5%, about 0.2% to about 2.0%, about 0.2% to about 2.5%, about 0.2% to about 3.0%, about 0.2% to about 3.5%, about 0.2% to about 4.0%, about 0.2% to about 4.5%, about 0.2% to about 5.0%, about 0.5% to about 1.0%, about 0.5% to about 1.5%, about 0.5% to about 2.0%, about 0.5% to about 2.5%, about 0.5% to about 3.0%, about 0.5% to about 4.0%, about 0.5% to about 5.0%, about 0.5% to about 6.0%, about 0.5% to about 7.0%, about 0.5% to about 8.0%, about 0.5% to about 9.0%, about 0.5% to about 10.0%, about 1.0% to about 2.5%, about 1.0% to about 3.0%, about 1.0% to about 4.0%, about 1.0% to about 5.0%, about 1.0% to about 6.0%, about 1.0% to about 7.0%, about 1.0% to about 7.5%, about 1.0% to about 8.0%, about 1.0% to about 9.0%, about 1.0% to about 10.0%, about 1.0% to about 15.0%, about 1.0% to about 20.0%, about 1.0% to about 25.0%, about 1.0% to about 30.0%, about 2.0% to about 2.5%, about 2.0% to about 3.0%, about 2.0% to about 4.0%, about 2.0% to about 5.0%, about 2.0% to about 6.0%, about 2.0% to about 7.0%, about 2.0% to about 7.5%, about 2.0% to about 8.0%, about 2.0% to about 9.0%, about 2.0% to about 10.0%, about 2.0% to about 15.0%, about 2.0% to about 20.0%, about 2.0% to about 25.0%, about 2.0% to about 30.0%, about 5.0% to about 6.0%, about 5.0% to about 7.0%, about 5.0% to about 7.5%, about 5.0% to about 8.0%, about 5.0% to about 9.0%, about 5.0% to about 10.0%, about 5.0% to about 11.0%, about 5.0% to about 12.0%, about 5.0% to about 13.0%, about 5.0% to about 14.0%, about 5.0% to about 15.0%, about 5.0% to about 20.0%, about 5.0% to about 25.0%, about 5.0% to about 30.0%, about 10.0% to about 15.0%, about 10.0% to about 20.0%, about 10.0% to about 25.0%, about 10.0% to about 30.0%, about 15.0% to about 20.0%, about 15.0% to about 25.0%, about 15.0% to about 30.0%, about 20.0% to about 25.0%, about 20.0% to about 30.0%, or about 20.0% to about 30.0%, by weight of the composition.

21. The composition according to any one of embodiments 4-6 or 12-20, wherein the one or more alcohols include methanol, ethanol, propanol, isopropanol, butanol, pentanol, and/or 1-hexadecanol.

22. The composition according any one of embodiments 4-6 or 12-21, wherein the one or more alcohols are in an amount of about 0.5%, about 1%, about 2%, about 3%, about 4%, about 5%, about 6%, about 7%, about 8%, about 9%, about 10%, about 11%, about 12%, about 13%, about 14%, about 15%, about 20%, about 25%, about 30%, about 35%, about 40%, about 45%, about 50%, about 55%, about 60%, about 65%, about 70%, about 75%, about 80%, about 85%, about 90%, about 95%, about 96%, about 97%, about 98%, or about 99%, by weight of the composition, or at least 0.5%, at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 96%, at least 97%, at least 98%, or at least 99%, by weight of the composition, or at most 0.5%, at most 1%, at most 2%, at most 3%, at most 4%, at most 5%, at most 6%, at most 7%, at most 8%, at most 9%, at most 10%, at most 11%, at most 12%, at most 13%, at most 14%, at most 15%, at most 20%, at most 25%, at most 30%, at most 35%, at most 40%, at most 45%, at most 50%, at most 55%, at most 60%, at most 65%, at most 70%, at most 75%, at most 80%, at most 85%, at most 90%, at most 95%, at most 96%, at most 97%, at most 98%, or at most 99%, by weight of the composition, about 0.05% to about 0.75%, about 0.05% to about 1.0%, about 0.05% to about 1.5%, about 0.05% to about 2.0%, about 0.05% to about 2.5%, about 0.1% to about 0.5%, about 0.1% to about 0.75%, about 0.1% to about 1.0%, about 0.1% to about 1.5%, about 0.1% to about 2.0%, about 0.1% to about 2.5%, about 0.1% to about 3.0%, about 0.1% to about 4.0%, about 0.1% to about 5.0%, about 0.2% to about 0.5%, about 0.2% to about 0.75%, about 0.2% to about 1.0%, about 0.2% to about 1.5%, about 0.2% to about 2.0%, about 0.2% to about 2.5%, about 0.2% to about 3.0%, about 0.2% to about 4.0%, about 0.2% to about 5.0%, about 0.5% to about 1.0%, about 0.5% to about 1.5%, about 0.5% to about 2.0%, about 0.5% to about 2.5%, about 0.5% to about 3.0%, about 0.5% to about 4.0%, about 0.5% to about 5.0%, about 0.5% to about 6.0%, about 0.5% to about 7.0%, about 0.5% to about 8.0%, about 0.5% to about 9.0%, about 0.5% to about 10.0%, about 1.0% to about 2.5%, about 1.0% to about 3.0%, about 1.0% to about 4.0%, about 1.0% to about 5.0%, about 1.0% to about 6.0%, about 1.0% to about 7.0%, about 1.0% to about 7.5%, about 1.0% to about 8.0%, about 1.0% to about 9.0%, about 1.0% to about 10.0%, about 2.0% to about 2.5%, about 2.0% to about 3.0%, about 2.0% to about 4.0%, about 2.0% to about 5.0%, about 2.0% to about 6.0%, about 2.0% to about 7.0%, about 2.0% to about 7.5%, about 2.0% to about 8.0%, about 2.0% to about 9.0%, about 2.0% to about 10.0%, about 5.0% to about 6.0%, about 5.0% to about 7.0%, about 5.0% to about 7.5%, about 5.0% to about 8.0%, about 5.0% to about 9.0%, about 5.0% to about 10.0%, about 5.0% to about 11.0%, about 5.0% to about 12.0%, about 5.0% to about 13.0%, about 5.0% to about 14.0% or about 5.0% to about 15.0% by weight of the composition, or about 10% to about 20%, about 10% to about 30%, about 10% to about 40%, about 10% to about 50%, about 10% to about 60%, about 10% to about 70%, about 10% to about 80%, about 10% to about 90%, about 10% to about 95%, about 10% to about 97%, about 10% to about 99%, about 20% to about 30%, about 20% to about 40%, about 20% to about 50%, about 20% to about 60%, about 20% to about 70%, about 20% to about 80%, about 20% to about 90%, about 20% to about 95%, about 20% to about 97%, about 20% to about 99%, about 30% to about 40%, about 30% to about 50%, about 30% to about 60%, about 30% to about 70%, about 30% to about 80%, about 30% to about 90%, about 30% to about 95%, about 30% to about 97%, about 30% to about 99%, about 40% to about 50%, about 40% to about 60%, about 40% to about 70%, about 40% to about 80%, about 40% to about 90%, about 40% to about 95%, about 40% to about 97%, about 40% to about 99%, about 50% to about 60%, about 50% to about 70%, about 50% to about 80%, about 50% to about 90%, about 50% to about 95%, about 50% to about 97%, about 50% to about 99%, about 60% to about 70%, about 60% to about 80%, about 60% to about 90%, about 60% to about 95%, about 60% to about 97%, about 60% to about 99%, about 70% to about 80%, about 70% to about 90%, about 70% to about 95%, about 70% to about 97%, about 70% to about 99%, about 80% to about 90%, about 80% to about 95%, about 80% to about 97%, about 80% to about 99%, about 90% to about 95%, about 90% to about 97%, about 90% to about 99%, by weight of the composition.

23. The composition according to any one of embodiments 7, 9, or 11-22, wherein the one or more metallic particles include a metal acetate particle, a metal chloride particle, a metal nitrate particle, or a metal oxide particle, or any combination thereof.

24. The composition according to any one of embodiments 7, 9, or 11-23, wherein the one or more metallic particles are in an amount of 0.05 ppm, 0.10 ppm, 0.15 ppm, 0.20 ppm, 0.25 ppm, 0.30 ppm, 0.35 ppm, 0.40 ppm, 0.45 ppm, 0.50 ppm, 0.55 ppm, 0.60 ppm, 0.65 ppm, 0.70 ppm, 0.75 ppm, 0.80 ppm, 0.85 ppm, 0.90 ppm, 0.95 ppm, 1 ppm, 5 ppm, 10 ppm, 15 ppm, 20 ppm, 25 ppm, 30 ppm, 35 ppm, 40 ppm, 45 ppm, 50 ppm, 55 ppm, 60 ppm, 65 ppm, 70 ppm, 75 ppm, 80 ppm, 85 ppm, 90 ppm, 95 ppm, 100 ppm, 125 ppm, 150 ppm, 175 ppm, 200 ppm, 225 ppm, 250 ppm, 275 ppm, 300 ppm, 325 ppm, 350 ppm, 375 ppm, 400 ppm, 425 ppm, 450 ppm, 475 ppm, 500 ppm, 525 ppm, 550 ppm, 575 ppm, 600 ppm, 625 ppm, 650 ppm, 675 ppm, 700 ppm, 725 ppm, 750 ppm, 775 ppm, 800 ppm, 825 ppm, 850 ppm, 875 ppm, 900 ppm, 925 ppm, 950 ppm, 975 ppm, 1,000 ppm, 1,025 ppm, 1,050 ppm, 1075 ppm, 1,100 ppm, 1,125 ppm, 1,150 ppm, 1,175 ppm, 1,200 ppm, 1,225 ppm, 1,250 ppm, 1,275 ppm, 1,300 ppm, 1,325 ppm, 1,350 ppm, 1,375 ppm, 1,400 ppm, 1,425 ppm, 1,450 ppm, 1,475 ppm, 1,500 ppm, 1,600 ppm, 1,700 ppm, 1,800 ppm, 1,900 ppm, or 2,000 ppm or at least 0.05 ppm, at least 0.10 ppm, at least 0.20 ppm, at least 0.30 ppm, at least 0.40 ppm, at least 0.50 ppm, at least 0.60 ppm, at least 0.70 ppm, at least 0.80 ppm, at least 0.90 ppm, at least 1 ppm, at least 10 ppm, at least 20 ppm, at least 30 ppm, at least 40 ppm, at least 50 ppm, at least 60 ppm, at least 70 ppm, at least 80 ppm, at least 90 ppm, at least 100 ppm, at least 125 ppm, at least 150 ppm, at least 175 ppm, at least 200 ppm, at least 225 ppm, at least 250 ppm, at least 275 ppm, at least 300 ppm, at least 325 ppm, at least 350 ppm, at least 375 ppm, at least 400 ppm, at least 425 ppm, at least 450 ppm, at least 475 ppm, at least 500 ppm, at least 525 ppm, at least 550 ppm, at least 575 ppm, at least 600 ppm, at least 625 ppm, at least 650 ppm, at least 675 ppm, at least 700 ppm, at least 725 ppm, at least 750 ppm, at least 775 ppm, at least 800 ppm, at least 825 ppm, at least 850 ppm, at least 875 ppm, at least 900 ppm, at least 925 ppm, at least 950 ppm, at least 975 ppm, at least 1,000 ppm, at least 1,025 ppm, at least 1,050 ppm, at least 1075 ppm, at least 1,100 ppm, at least 1,125 ppm, at least 1,150 ppm, at least 1,175 ppm, at least 1,200 ppm, at least 1,225 ppm, at least 1,250 ppm, at least 1,275 ppm, at least 1,300 ppm, at least 1,325 ppm, at least 1,350 ppm, at least 1,375 ppm, at least 1,400 ppm, at least 1,425 ppm, at least 1,450 ppm, at least 1,475 ppm, at least 1,500 ppm, at least 1,600 ppm, at least 1,700 ppm, at least 1,800 ppm, at least 1,900 ppm, or at least 2,000 ppm or at most 0.05 ppm, at most 0.10 ppm, at most 0.20 ppm, at most 0.30 ppm, at most 0.40 ppm, at most 0.50 ppm, at most 0.60 ppm, at most 0.70 ppm, at most 0.80 ppm, at most 0.90 ppm, at most 1 ppm, at most 10 ppm, at most 20 ppm, at most 30 ppm, at most 40 ppm, at most 50 ppm, at most 60 ppm, at most 70 ppm, at most 80 ppm, at most 90 ppm, at most 100 ppm, at most 125 ppm, at most 150 ppm, at most 175 ppm, at most 200 ppm, at most 225 ppm, at most 250 ppm, at most 275 ppm, at most 300 ppm, at most 325 ppm, at most 350 ppm, at most 375 ppm, at most 400 ppm, at most 425 ppm, at most 450 ppm, at most 475 ppm, at most 500 ppm, at most 525 ppm, at most 550 ppm, at most 575 ppm, at most 600 ppm, at most 625 ppm, at most 650 ppm, at most 675 ppm, at most 700 ppm, at most 725 ppm, at most 750 ppm, at most 775 ppm, at most 800 ppm, at most 825 ppm, at most 850 ppm, at most 875 ppm, at most 900 ppm, at most 925 ppm, at most 950 ppm, at most 975 ppm, at most 1,000 ppm, at most 1,025 ppm, at most 1,050 ppm, at most 1075 ppm, at most 1,100 ppm, at most 1,125 ppm, at most 1,150 ppm, at most 1,175 ppm, at most 1,200 ppm, at most 1,225 ppm, at most 1,250 ppm, at most 1,275 ppm, at most 1,300 ppm, at most 1,325 ppm, at most 1,350 ppm, at most 1,375 ppm, at most 1,400 ppm, at most 1,425 ppm, at most 1,450 ppm, at most 1,475 ppm, at most 1,500 ppm, at most 1,600 ppm, at most 1,700 ppm, at most 1,800 ppm, at most 1,900 ppm, or at most 2,000 ppm or about 0.5 ppm to about 20 ppm, about 0.5 ppm to about 25 ppm, about 0.5 ppm to about 30 ppm, about 0.5 ppm to about 35 ppm, about 0.5 ppm to about 40 ppm, about 0.5 ppm to about 45 ppm, about 0.5 ppm to about 50 ppm, about 0.5 ppm to about 55 ppm, about 0.5 ppm to about 60 ppm, about 0.5 ppm to about 65 ppm, about 0.5 ppm to about 70 ppm, about 0.5 ppm to about 75 ppm, about 0.5 ppm to about 80 ppm, about 0.5 ppm to about 85 ppm, about 0.5 ppm to about 90 ppm, about 0.5 ppm to about 95 ppm, about 0.5 ppm to about 100 ppm, about 0.75 ppm to about 20 ppm, about 0.75 ppm to about 25 ppm, about 0.75 ppm to about 30 ppm, about 0.75 ppm to about 35 ppm, about 0.75 ppm to about 40 ppm, about 0.75 ppm to about 45 ppm, about 0.75 ppm to about 50 ppm, about 0.75 ppm to about 55 ppm, about 0.75 ppm to about 60 ppm, about 0.75 ppm to about 65 ppm, about 0.75 ppm to about 70 ppm, about 0.75 ppm to about 75 ppm, about 0.75 ppm to about 80 ppm, about 0.75 ppm to about 85 ppm, about 0.75 ppm to about 90 ppm, about 0.75 ppm to about 95 ppm, about 0.75 ppm to about 100 ppm, about 1 ppm to about 20 ppm, about 1 ppm to about 25 ppm, about 1 ppm to about 30 ppm, about 1 ppm to about 35 ppm, about 1 ppm to about 40 ppm, about 1 ppm to about 45 ppm, about 1 ppm to about 50 ppm, about 1 ppm to about 55 ppm, about 1 ppm to about 60 ppm, about 1 ppm to about 65 ppm, about 1 ppm to about 70 ppm, about 1 ppm to about 75 ppm, about 1 ppm to about 80 ppm, about 1 ppm to about 85 ppm, about 1 ppm to about 90 ppm, about 1 ppm to about 95 ppm, about 1 ppm to about 100 ppm, about 5 ppm to about 20 ppm, about 5 ppm to about 25 ppm, about 5 ppm to about 30 ppm, about 5 ppm to about 35 ppm, about 5 ppm to about 40 ppm, about 5 ppm to about 45 ppm, about 5 ppm to about 50 ppm, about 5 ppm to about 55 ppm, about 5 ppm to about 60 ppm, about 5 ppm to about 65 ppm, about 5 ppm to about 70 ppm, about 5 ppm to about 75 ppm, about 5 ppm to about 80 ppm, about 5 ppm to about 85 ppm, about 5 ppm to about 90 ppm, about 5 ppm to about 95 ppm, about 5 ppm to about 100 ppm, about 10 ppm to about 20 ppm, about 10 ppm to about 25 ppm, about 10 ppm to about 30 ppm, about 10 ppm to about 35 ppm, about 10 ppm to about 40 ppm, about 10 ppm to about 45 ppm, about 10 ppm to about 50 ppm, about 10 ppm to about 55 ppm, about 10 ppm to about 60 ppm, about 10 ppm to about 65 ppm, about 10 ppm to about 70 ppm, about 10 ppm to about 75 ppm, about 10 ppm to about 80 ppm, about 10 ppm to about 85 ppm, about 10 ppm to about 90 ppm, about 10 ppm to about 95 ppm, or about 10 ppm to about 100 ppm, about 1 ppm to about 25 ppm, about 1 ppm to about 50 ppm, about 1 ppm to about 75 ppm, about 1 ppm to about 100 ppm, about 1 ppm to about 125 ppm, about 1 ppm to about 150 ppm, about 1 ppm to about 175 ppm, about 1 ppm to about 200 ppm, about 1 ppm to about 225 ppm, about 1 ppm to about 250 ppm, about 1 ppm to about 275 ppm, about 1 ppm to about 300 ppm, about 1 ppm to about 325 ppm, about 1 ppm to about 350 ppm, about 1 ppm to about 375 ppm, about 1 ppm to about 400 ppm, about 10 ppm to about 25 ppm, about 10 ppm to about 50 ppm, about 10 ppm to about 75 ppm, about 10 ppm to about 100 ppm, about 10 ppm to about 125 ppm, about 10 ppm to about 150 ppm, about 10 ppm to about 175 ppm, about 10 ppm to about 200 ppm, about 10 ppm to about 225 ppm, about 10 ppm to about 250 ppm, about 10 ppm to about 275 ppm, about 10 ppm to about 300 ppm, about 10 ppm to about 325 ppm, about 10 ppm to about 350 ppm, about 10 ppm to about 375 ppm, about 10 ppm to about 400 ppm, about 25 ppm to about 50 ppm, about 25 ppm to about 75 ppm, about 25 ppm to about 100 ppm, about 25 ppm to about 125 ppm, about 25 ppm to about 150 ppm, about 25 ppm to about 175 ppm, about 25 ppm to about 200 ppm, about 25 ppm to about 225 ppm, about 25 ppm to about 250 ppm, about 25 ppm to about 275 ppm, about 25 ppm to about 300 ppm, about 25 ppm to about 325 ppm, about 25 ppm to about 350 ppm, about 25 ppm to about 375 ppm, about 25 ppm to about 400 ppm, about 50 ppm to about 75 ppm, about 50 ppm to about 100 ppm, about 50 ppm to about 125 ppm, about 50 ppm to about 150 ppm, about 50 ppm to about 175 ppm, about 50 ppm to about 200 ppm, about 50 ppm to about 225 ppm, about 50 ppm to about 250 ppm, about 50 ppm to about 275 ppm, about 50 ppm to about 300 ppm, about 50 ppm to about 325 ppm, about 50 ppm to about 350 ppm, about 50 ppm to about 375 ppm, about 50 ppm to about 400 ppm, about 75 ppm to about 100 ppm, about 75 ppm to about 125 ppm, about 75 ppm to about 150 ppm, about 75 ppm to about 175 ppm, about 75 ppm to about 200 ppm, about 75 ppm to about 225 ppm, about 75 ppm to about 250 ppm, about 75 ppm to about 275 ppm, about 75 ppm to about 300 ppm, about 75 ppm to about 325 ppm, about 75 ppm to about 350 ppm, about 75 ppm to about 375 ppm, about 75 ppm to about 400 ppm, about 100 ppm to about 125 ppm, about 100 ppm to about 150 ppm, about 100 ppm to about 175 ppm, about 100 ppm to about 200 ppm, about 100 ppm to about 225 ppm, about 100 ppm to about 250 ppm, about 100 ppm to about 275 ppm, about 100 ppm to about 300 ppm, about 100 ppm to about 325 ppm, about 100 ppm to about 350 ppm, about 100 ppm to about 375 ppm, about 100 ppm to about 400 ppm, about 150 ppm to about 175 ppm, about 150 ppm to about 200 ppm, about 150 ppm to about 225 ppm, about 150 ppm to about 250 ppm, about 150 ppm to about 275 ppm, about 150 ppm to about 300 ppm, about 150 ppm to about 325 ppm, about 150 ppm to about 350 ppm, about 150 ppm to about 375 ppm, about 150 ppm to about 400 ppm, about 200 ppm to about 225 ppm, about 200 ppm to about 250 ppm, about 200 ppm to about 275 ppm, about 200 ppm to about 300 ppm, about 200 ppm to about 325 ppm, about 200 ppm to about 350 ppm, about 200 ppm to about 375 ppm, about 200 ppm to about 400 ppm, about 200 ppm to about 425 ppm, about 200 ppm to about 450 ppm, about 200 ppm to about 475 ppm, about 200 ppm to about 500 ppm, about 200 ppm to about 525 ppm, about 200 ppm to about 550 ppm, about 200 ppm to about 575 ppm, about 200 ppm to about 600 ppm, about 250 ppm to about 275 ppm, about 250 ppm to about 300 ppm, about 250 ppm to about 325 ppm, about 250 ppm to about 350 ppm, about 250 ppm to about 375 ppm, about 250 ppm to about 400 ppm, about 250 ppm to about 425 ppm, about 250 ppm to about 450 ppm, about 250 ppm to about 475 ppm, about 250 ppm to about 500 ppm, about 250 ppm to about 525 ppm, about 250 ppm to about 550 ppm, about 250 ppm to about 575 ppm, about 250 ppm to about 600 ppm, about 300 ppm to about 325 ppm, about 300 ppm to about 350 ppm, about 300 ppm to about 375 ppm, about 300 ppm to about 400 ppm, about 300 ppm to about 425 ppm, about 300 ppm to about 450 ppm, about 300 ppm to about 475 ppm, about 300 ppm to about 500 ppm, about 300 ppm to about 525 ppm, about 300 ppm to about 550 ppm, about 300 ppm to about 575 ppm, about 300 ppm to about 600 ppm, about 350 ppm to about 375 ppm, about 350 ppm to about 400 ppm, about 375 ppm to about 400 ppm, about 350 ppm to about 425 ppm, about 350 ppm to about 450 ppm, about 350 ppm to about 475 ppm, about 350 ppm to about 500 ppm, about 350 ppm to about 525 ppm, about 350 ppm to about 550 ppm, about 350 ppm to about 575 ppm, about 350 ppm to about 600 ppm, about 400 ppm to about 500 ppm, about 400 ppm to about 600 ppm, about 400 ppm to about 700 ppm, about 400 ppm to about 800 ppm, about 400 ppm to about 900 ppm, about 400 ppm to about 1,000 ppm, about 400 ppm to about 1,100 ppm, about 400 ppm to about 1,200 ppm, about 400 ppm to about 1,300 ppm, about 400 ppm to about 1,400 ppm, about 400 ppm to about 1,500 ppm, about 400 ppm to about 1,600 ppm, about 400 ppm to about 1,700 ppm, about 400 ppm to about 1,800 ppm, about 400 ppm to about 1,900 ppm, about 400 ppm to about 2,000 ppm, about 500 ppm to about 600 ppm, about 500 ppm to about 700 ppm, about 500 ppm to about 800 ppm, about 500 ppm to about 900 ppm, about 500 ppm to about 1,000 ppm, about 500 ppm to about 1,100 ppm, about 500 ppm to about 1,200 ppm, about 500 ppm to about 1,300 ppm, about 500 ppm to about 1,400 ppm, about 500 ppm to about 1,500 ppm, about 500 ppm to about 1,600 ppm, about 500 ppm to about 1,700 ppm, about 500 ppm to about 1,800 ppm, about 500 ppm to about 1,900 ppm, about 500 ppm to about 2,000 ppm, about 600 ppm to about 700 ppm, about 600 ppm to about 800 ppm, about 600 ppm to about 900 ppm, about 600 ppm to about 1,000 ppm, about 600 ppm to about 1,100 ppm, about 600 ppm to about 1,200 ppm, about 600 ppm to about 1,300 ppm, about 600 ppm to about 1,400 ppm, about 600 ppm to about 1,500 ppm, about 600 ppm to about 1,600 ppm, about 600 ppm to about 1,700 ppm, about 600 ppm to about 1,800 ppm, about 600 ppm to about 1,900 ppm, about 600 ppm to about 2,000 ppm, about 700 ppm to about 800 ppm, about 700 ppm to about 900 ppm, about 700 ppm to about 1,000 ppm, about 700 ppm to about 1,100 ppm, about 700 ppm to about 1,200 ppm, about 700 ppm to about 1,300 ppm, about 700 ppm to about 1,400 ppm, about 700 ppm to about 1,500 ppm, about 700 ppm to about 1,600 ppm, about 700 ppm to about 1,700 ppm, about 700 ppm to about 1,800 ppm, about 700 ppm to about 1,900 ppm, about 700 ppm to about 2,000 ppm, about 800 ppm to about 900 ppm, about 800 ppm to about 1,000 ppm, about 800 ppm to about 1,100 ppm, about 800 ppm to about 1,200 ppm, about 800 ppm to about 1,300 ppm, about 800 ppm to about 1,400 ppm, about 800 ppm to about 1,500 ppm, about 800 ppm to about 1,600 ppm, about 800 ppm to about 1,700 ppm, about 800 ppm to about 1,800 ppm, about 800 ppm to about 1,900 ppm, about 800 ppm to about 2,000 ppm, about 900 ppm to about 1,000 ppm, about 900 ppm to about 1,100 ppm, about 900 ppm to about 1,200 ppm, about 900 ppm to about 1,300 ppm, about 900 ppm to about 1,400 ppm, about 900 ppm to about 1,500 ppm, about 900 ppm to about 1,600 ppm, about 900 ppm to about 1,700 ppm, about 900 ppm to about 1,800 ppm, about 900 ppm to about 1,900 ppm, about 900 ppm to about 2,000 ppm, about 1,000 ppm to about 1,100 ppm, about 1,000 ppm to about 1,200 ppm, about 1,000 ppm to about 1,300 ppm, about 1,000 ppm to about 1,400 ppm, about 1,000 ppm to about 1,500 ppm, about 1,000 ppm to about 1,600 ppm, about 1,000 ppm to about 1,700 ppm, about 1,000 ppm to about 1,800 ppm, about 1,000 ppm to about 1,900 ppm, about 1,000 ppm to about 2,000 ppm, about 1,100 ppm to about 1,200 ppm, about 1,100 ppm to about 1,300 ppm, about 1,100 ppm to about 1,400 ppm, about 1,100 ppm to about 1,500 ppm, about 1,100 ppm to about 1,600 ppm, about 1,100 ppm to about 1,700 ppm, about 1,100 ppm to about 1,800 ppm, about 1,100 ppm to about 1,900 ppm, about 1,100 ppm to about 2,000 ppm, about 1,200 ppm to about 1,300 ppm, about 1,200 ppm to about 1,400 ppm, about 1,200 ppm to about 1,500 ppm, about 1,200 ppm to about 1,600 ppm, about 1,200 ppm to about 1,700 ppm, about 1,200 ppm to about 1,800 ppm, about 1,200 ppm to about 1,900 ppm, about 1,200 ppm to about 2,000 ppm, about 1,300 ppm to about 1,400 ppm, about 1,300 ppm to about 1,500 ppm, about 1,300 ppm to about 1,600 ppm, about 1,300 ppm to about 1,700 ppm, about 1,300 ppm to about 1,800 ppm, about 1,300 ppm to about 1,900 ppm, about 1,300 ppm to about 2,000 ppm, about 1,400 ppm to about 1,500 ppm, about 1,400 ppm to about 1,600 ppm, about 1,400 ppm to about 1,700 ppm, about 1,400 ppm to about 1,800 ppm, about 1,400 ppm to about 1,900 ppm, about 1,400 ppm to about 2,000 ppm, about 1,500 ppm to about 1,600 ppm, about 1,500 ppm to about 1,700 ppm, about 1,500 ppm to about 1,800 ppm, about 1,500 ppm to about 1,900 ppm, about 1,500 ppm to about 2,000 ppm, about 1,600 ppm to about 1,700 ppm, about 1,600 ppm to about 1,800 ppm, about 1,600 ppm to about 1,900 ppm, about 1,600 ppm to about 2,000 ppm, about 1,700 ppm to about 1,800 ppm, about 1,700 ppm to about 1,900 ppm, about 1,700 ppm to about 2,000 ppm, about 1,800 ppm to about 1,900 ppm, about 1,800 ppm to about 2,000 ppm, or about 1,900 ppm to about 2,000 ppm.

25. The composition according to any one of embodiments 7, 9, or 11-23, wherein the one or more metallic particles are in an amount of about 0.10%, about 0.11%, about 0.12%, about 0.13%, about 0.14%, about 0.15%, about 0.16%, about 0.17%, about 0.18%, about 0.19%, about 0.2%, about 0.25%, about 0.3%, about 0.35%, about 0.4%, about 0.45%, or about 0.5% by weight of the composition, or at least 0.10%, at least 0.11%, at least 0.12%, at least 0.13%, at least 0.14%, at least 0.15%, at least 0.16%, at least 0.17%, at least 0.18%, at least 0.19%, at least 0.2%, at least 0.25%, at least 0.3%, at least 0.35%, at least 0.4%, at least 0.45%, or at least 0.5% by weight of the composition, or at most 0.10%, at most 0.11%, at most 0.12%, at most 0.13%, at most 0.14%, at most 0.15%, at most 0.16%, at most 0.17%, at most 0.18%, at most 0.19%, at most 0.2%, at most 0.25%, at most 0.3%, at most 0.35%, at most 0.4%, at most 0.45%, or at most 0.5% by weight of the composition, or about 0.10% to about 0.15%, about 0.10% to about 0.20%, about 0.10% to about 0.25%, about 0.10% to about 0.30%, about 0.10% to about 0.35%, about 0.10% to about 0.40%, about 0.10% to about 0.45%, about 0.10% to about 0.50%, about 0.20% to about 0.25%, about 0.20% to about 0.30%, about 0.20% to about 0.35%, about 0.20% to about 0.40%, about 0.20% to about 0.45%, about 0.20% to about 0.50%, about 0.30% to about 0.35%, about 0.30% to about 0.40%, about 0.30% to about 0.45%, about 0.30% to about 0.50%, about 0.40% to about 0.45%, about 0.40% to about 0.50%, or about 0.40% to about 0.50% by weight of the composition.

26. The composition according to any one of embodiments 9, or 11-25, wherein the one or more metallic particles have a mean diameter of about 10 nm, about 20 nm, about 30 nm, about 40 nm, about 50 nm, about 60 nm, about 70 nm, about 80 nm, about 90 nm, about 100 nm, or at least 10 nm, at least 20 nm, at least 30 nm, at least 40 nm, at least 50 nm, at least 60 nm, at least 70 nm, at least 80 nm, at least 90 nm, at least 100 nm, or at most 10 nm, at most 20 nm, at most 30 nm, at most 40 nm, at most 50 nm, at most 60 nm, at most 70 nm, at most 80 nm, at most 90 nm, at most 100 nm, or about 10 nm to about 20 nm, about 10 nm to about 30 nm, about 10 nm to about 40 nm, about 10 nm to about 50 nm, about 10 nm to about 60 nm, about 10 nm to about 70 nm, about 10 nm to about 80 nm, about 10 nm to about 90 nm, about 10 nm to about 100 nm, about 20 nm to about 30 nm, about 20 nm to about 40 nm, about 20 nm to about 50 nm, about 20 nm to about 60 nm, about 20 nm to about 70 nm, about 20 nm to about 80 nm, about 20 nm to about 90 nm, about 20 nm to about 100 nm, about 30 nm to about 40 nm, about 30 nm to about 50 nm, about 30 nm to about 60 nm, about 30 nm to about 70 nm, about 30 nm to about 80 nm, about 30 nm to about 90 nm, about 30 nm to about 100 nm, about 40 nm to about 50 nm, about 40 nm to about 60 nm, about 40 nm to about 70 nm, about 40 nm to about 80 nm, about 40 nm to about 90 nm, about 40 nm to about 100 nm, about 50 nm to about 60 nm, about 50 nm to about 70 nm, about 50 nm to about 80 nm, about 50 nm to about 90 nm, about 50 nm to about 100 nm, about 60 nm to about 70 nm, about 60 nm to about 80 nm, about 60 nm to about 90 nm, about 60 nm to about 100 nm, about 70 nm to about 80 nm, about 70 nm to about 90 nm, about 70 nm to about 100 nm, about 80 nm to about 90 nm, about 80 nm to about 100 nm, or about 90 nm to about 100 nm.

27. The composition according to any one of embodiments 8 or 10-27, wherein the one or more metal salts include copper chloride, iron chloride, titanium chloride, zinc chloride, silver nitrate, or any combination thereof.

28. The composition according to any one of embodiments 8 or 10-27, wherein the one or more metal salt are in an amount of 0.05 ppm, 0.10 ppm, 0.15 ppm, 0.20 ppm, 0.25 ppm, 0.30 ppm, 0.35 ppm, 0.40 ppm, 0.45 ppm, 0.50 ppm, 0.55 ppm, 0.60 ppm, 0.65 ppm, 0.70 ppm, 0.75 ppm, 0.80 ppm, 0.85 ppm, 0.90 ppm, 0.95 ppm, 1 ppm, 5 ppm, 10 ppm, 15 ppm, 20 ppm, 25 ppm, 30 ppm, 35 ppm, 40 ppm, 45 ppm, 50 ppm, 55 ppm, 60 ppm, 65 ppm, 70 ppm, 75 ppm, 80 ppm, 85 ppm, 90 ppm, 95 ppm, 100 ppm, 125 ppm, 150 ppm, 175 ppm, 200 ppm, 225 ppm, 250 ppm, 275 ppm, 300 ppm, 325 ppm, 350 ppm, 375 ppm, 400 ppm, 425 ppm, 450 ppm, 475 ppm, 500 ppm, 525 ppm, 550 ppm, 575 ppm, 600 ppm, 625 ppm, 650 ppm, 675 ppm, 700 ppm, 725 ppm, 750 ppm, 775 ppm, 800 ppm, 825 ppm, 850 ppm, 875 ppm, 900 ppm, 925 ppm, 950 ppm, 975 ppm, 1,000 ppm, 1,025 ppm, 1,050 ppm, 1075 ppm, 1,100 ppm, 1,125 ppm, 1,150 ppm, 1,175 ppm, 1,200 ppm, 1,225 ppm, 1,250 ppm, 1,275 ppm, 1,300 ppm, 1,325 ppm, 1,350 ppm, 1,375 ppm, 1,400 ppm, 1,425 ppm, 1,450 ppm, 1,475 ppm, 1,500 ppm, 1,600 ppm, 1,700 ppm, 1,800 ppm, 1,900 ppm, or 2,000 ppm or at least 0.05 ppm, at least 0.10 ppm, at least 0.20 ppm, at least 0.30 ppm, at least 0.40 ppm, at least 0.50 ppm, at least 0.60 ppm, at least 0.70 ppm, at least 0.80 ppm, at least 0.90 ppm, at least 1 ppm, at least 10 ppm, at least 20 ppm, at least 30 ppm, at least 40 ppm, at least 50 ppm, at least 60 ppm, at least 70 ppm, at least 80 ppm, at least 90 ppm, at least 100 ppm, at least 125 ppm, at least 150 ppm, at least 175 ppm, at least 200 ppm, at least 225 ppm, at least 250 ppm, at least 275 ppm, at least 300 ppm, at least 325 ppm, at least 350 ppm, at least 375 ppm, at least 400 ppm, at least 425 ppm, at least 450 ppm, at least 475 ppm, at least 500 ppm, at least 525 ppm, at least 550 ppm, at least 575 ppm, at least 600 ppm, at least 625 ppm, at least 650 ppm, at least 675 ppm, at least 700 ppm, at least 725 ppm, at least 750 ppm, at least 775 ppm, at least 800 ppm, at least 825 ppm, at least 850 ppm, at least 875 ppm, at least 900 ppm, at least 925 ppm, at least 950 ppm, at least 975 ppm, at least 1,000 ppm, at least 1,025 ppm, at least 1,050 ppm, at least 1075 ppm, at least 1,100 ppm, at least 1,125 ppm, at least 1,150 ppm, at least 1,175 ppm, at least 1,200 ppm, at least 1,225 ppm, at least 1,250 ppm, at least 1,275 ppm, at least 1,300 ppm, at least 1,325 ppm, at least 1,350 ppm, at least 1,375 ppm, at least 1,400 ppm, at least 1,425 ppm, at least 1,450 ppm, at least 1,475 ppm, at least 1,500 ppm, at least 1,600 ppm, at least 1,700 ppm, at least 1,800 ppm, at least 1,900 ppm, or at least 2,000 ppm or at most 0.05 ppm, at most 0.10 ppm, at most 0.20 ppm, at most 0.30 ppm, at most 0.40 ppm, at most 0.50 ppm, at most 0.60 ppm, at most 0.70 ppm, at most 0.80 ppm, at most 0.90 ppm, at most 1 ppm, at most 10 ppm, at most 20 ppm, at most 30 ppm, at most 40 ppm, at most 50 ppm, at most 60 ppm, at most 70 ppm, at most 80 ppm, at most 90 ppm, at most 100 ppm, at most 125 ppm, at most 150 ppm, at most 175 ppm, at most 200 ppm, at most 225 ppm, at most 250 ppm, at most 275 ppm, at most 300 ppm, at most 325 ppm, at most 350 ppm, at most 375 ppm, at most 400 ppm, at most 425 ppm, at most 450 ppm, at most 475 ppm, at most 500 ppm, at most 525 ppm, at most 550 ppm, at most 575 ppm, at most 600 ppm, at most 625 ppm, at most 650 ppm, at most 675 ppm, at most 700 ppm, at most 725 ppm, at most 750 ppm, at most 775 ppm, at most 800 ppm, at most 825 ppm, at most 850 ppm, at most 875 ppm, at most 900 ppm, at most 925 ppm, at most 950 ppm, at most 975 ppm, at most 1,000 ppm, at most 1,025 ppm, at most 1,050 ppm, at most 1075 ppm, at most 1,100 ppm, at most 1,125 ppm, at most 1,150 ppm, at most 1,175 ppm, at most 1,200 ppm, at most 1,225 ppm, at most 1,250 ppm, at most 1,275 ppm, at most 1,300 ppm, at most 1,325 ppm, at most 1,350 ppm, at most 1,375 ppm, at most 1,400 ppm, at most 1,425 ppm, at most 1,450 ppm, at most 1,475 ppm, at most 1,500 ppm, at most 1,600 ppm, at most 1,700 ppm, at most 1,800 ppm, at most 1,900 ppm, or at most 2,000 ppm or about 0.5 ppm to about 20 ppm, about 0.5 ppm to about 25 ppm, about 0.5 ppm to about 30 ppm, about 0.5 ppm to about 35 ppm, about 0.5 ppm to about 40 ppm, about 0.5 ppm to about 45 ppm, about 0.5 ppm to about 50 ppm, about 0.5 ppm to about 55 ppm, about 0.5 ppm to about 60 ppm, about 0.5 ppm to about 65 ppm, about 0.5 ppm to about 70 ppm, about 0.5 ppm to about 75 ppm, about 0.5 ppm to about 80 ppm, about 0.5 ppm to about 85 ppm, about 0.5 ppm to about 90 ppm, about 0.5 ppm to about 95 ppm, about 0.5 ppm to about 100 ppm, about 0.75 ppm to about 20 ppm, about 0.75 ppm to about 25 ppm, about 0.75 ppm to about 30 ppm, about 0.75 ppm to about 35 ppm, about 0.75 ppm to about 40 ppm, about 0.75 ppm to about 45 ppm, about 0.75 ppm to about 50 ppm, about 0.75 ppm to about 55 ppm, about 0.75 ppm to about 60 ppm, about 0.75 ppm to about 65 ppm, about 0.75 ppm to about 70 ppm, about 0.75 ppm to about 75 ppm, about 0.75 ppm to about 80 ppm, about 0.75 ppm to about 85 ppm, about 0.75 ppm to about 90 ppm, about 0.75 ppm to about 95 ppm, about 0.75 ppm to about 100 ppm, about 1 ppm to about 20 ppm, about 1 ppm to about 25 ppm, about 1 ppm to about 30 ppm, about 1 ppm to about 35 ppm, about 1 ppm to about 40 ppm, about 1 ppm to about 45 ppm, about 1 ppm to about 50 ppm, about 1 ppm to about 55 ppm, about 1 ppm to about 60 ppm, about 1 ppm to about 65 ppm, about 1 ppm to about 70 ppm, about 1 ppm to about 75 ppm, about 1 ppm to about 80 ppm, about 1 ppm to about 85 ppm, about 1 ppm to about 90 ppm, about 1 ppm to about 95 ppm, about 1 ppm to about 100 ppm, about 5 ppm to about 20 ppm, about 5 ppm to about 25 ppm, about 5 ppm to about 30 ppm, about 5 ppm to about 35 ppm, about 5 ppm to about 40 ppm, about 5 ppm to about 45 ppm, about 5 ppm to about 50 ppm, about 5 ppm to about 55 ppm, about 5 ppm to about 60 ppm, about 5 ppm to about 65 ppm, about 5 ppm to about 70 ppm, about 5 ppm to about 75 ppm, about 5 ppm to about 80 ppm, about 5 ppm to about 85 ppm, about 5 ppm to about 90 ppm, about 5 ppm to about 95 ppm, about 5 ppm to about 100 ppm, about 10 ppm to about 20 ppm, about 10 ppm to about 25 ppm, about 10 ppm to about 30 ppm, about 10 ppm to about 35 ppm, about 10 ppm to about 40 ppm, about 10 ppm to about 45 ppm, about 10 ppm to about 50 ppm, about 10 ppm to about 55 ppm, about 10 ppm to about 60 ppm, about 10 ppm to about 65 ppm, about 10 ppm to about 70 ppm, about 10 ppm to about 75 ppm, about 10 ppm to about 80 ppm, about 10 ppm to about 85 ppm, about 10 ppm to about 90 ppm, about 10 ppm to about 95 ppm, or about 10 ppm to about 100 ppm, about 1 ppm to about 25 ppm, about 1 ppm to about 50 ppm, about 1 ppm to about 75 ppm, about 1 ppm to about 100 ppm, about 1 ppm to about 125 ppm, about 1 ppm to about 150 ppm, about 1 ppm to about 175 ppm, about 1 ppm to about 200 ppm, about 1 ppm to about 225 ppm, about 1 ppm to about 250 ppm, about 1 ppm to about 275 ppm, about 1 ppm to about 300 ppm, about 1 ppm to about 325 ppm, about 1 ppm to about 350 ppm, about 1 ppm to about 375 ppm, about 1 ppm to about 400 ppm, about 10 ppm to about 25 ppm, about 10 ppm to about 50 ppm, about 10 ppm to about 75 ppm, about 10 ppm to about 100 ppm, about 10 ppm to about 125 ppm, about 10 ppm to about 150 ppm, about 10 ppm to about 175 ppm, about 10 ppm to about 200 ppm, about 10 ppm to about 225 ppm, about 10 ppm to about 250 ppm, about 10 ppm to about 275 ppm, about 10 ppm to about 300 ppm, about 10 ppm to about 325 ppm, about 10 ppm to about 350 ppm, about 10 ppm to about 375 ppm, about 10 ppm to about 400 ppm, about 25 ppm to about 50 ppm, about 25 ppm to about 75 ppm, about 25 ppm to about 100 ppm, about 25 ppm to about 125 ppm, about 25 ppm to about 150 ppm, about 25 ppm to about 175 ppm, about 25 ppm to about 200 ppm, about 25 ppm to about 225 ppm, about 25 ppm to about 250 ppm, about 25 ppm to about 275 ppm, about 25 ppm to about 300 ppm, about 25 ppm to about 325 ppm, about 25 ppm to about 350 ppm, about 25 ppm to about 375 ppm, about 25 ppm to about 400 ppm, about 50 ppm to about 75 ppm, about 50 ppm to about 100 ppm, about 50 ppm to about 125 ppm, about 50 ppm to about 150 ppm, about 50 ppm to about 175 ppm, about 50 ppm to about 200 ppm, about 50 ppm to about 225 ppm, about 50 ppm to about 250 ppm, about 50 ppm to about 275 ppm, about 50 ppm to about 300 ppm, about 50 ppm to about 325 ppm, about 50 ppm to about 350 ppm, about 50 ppm to about 375 ppm, about 50 ppm to about 400 ppm, about 75 ppm to about 100 ppm, about 75 ppm to about 125 ppm, about 75 ppm to about 150 ppm, about 75 ppm to about 175 ppm, about 75 ppm to about 200 ppm, about 75 ppm to about 225 ppm, about 75 ppm to about 250 ppm, about 75 ppm to about 275 ppm, about 75 ppm to about 300 ppm, about 75 ppm to about 325 ppm, about 75 ppm to about 350 ppm, about 75 ppm to about 375 ppm, about 75 ppm to about 400 ppm, about 100 ppm to about 125 ppm, about 100 ppm to about 150 ppm, about 100 ppm to about 175 ppm, about 100 ppm to about 200 ppm, about 100 ppm to about 225 ppm, about 100 ppm to about 250 ppm, about 100 ppm to about 275 ppm, about 100 ppm to about 300 ppm, about 100 ppm to about 325 ppm, about 100 ppm to about 350 ppm, about 100 ppm to about 375 ppm, about 100 ppm to about 400 ppm, about 150 ppm to about 175 ppm, about 150 ppm to about 200 ppm, about 150 ppm to about 225 ppm, about 150 ppm to about 250 ppm, about 150 ppm to about 275 ppm, about 150 ppm to about 300 ppm, about 150 ppm to about 325 ppm, about 150 ppm to about 350 ppm, about 150 ppm to about 375 ppm, about 150 ppm to about 400 ppm, about 200 ppm to about 225 ppm, about 200 ppm to about 250 ppm, about 200 ppm to about 275 ppm, about 200 ppm to about 300 ppm, about 200 ppm to about 325 ppm, about 200 ppm to about 350 ppm, about 200 ppm to about 375 ppm, about 200 ppm to about 400 ppm, about 200 ppm to about 425 ppm, about 200 ppm to about 450 ppm, about 200 ppm to about 475 ppm, about 200 ppm to about 500 ppm, about 200 ppm to about 525 ppm, about 200 ppm to about 550 ppm, about 200 ppm to about 575 ppm, about 200 ppm to about 600 ppm, about 250 ppm to about 275 ppm, about 250 ppm to about 300 ppm, about 250 ppm to about 325 ppm, about 250 ppm to about 350 ppm, about 250 ppm to about 375 ppm, about 250 ppm to about 400 ppm, about 250 ppm to about 425 ppm, about 250 ppm to about 450 ppm, about 250 ppm to about 475 ppm, about 250 ppm to about 500 ppm, about 250 ppm to about 525 ppm, about 250 ppm to about 550 ppm, about 250 ppm to about 575 ppm, about 250 ppm to about 600 ppm, about 300 ppm to about 325 ppm, about 300 ppm to about 350 ppm, about 300 ppm to about 375 ppm, about 300 ppm to about 400 ppm, about 300 ppm to about 425 ppm, about 300 ppm to about 450 ppm, about 300 ppm to about 475 ppm, about 300 ppm to about 500 ppm, about 300 ppm to about 525 ppm, about 300 ppm to about 550 ppm, about 300 ppm to about 575 ppm, about 300 ppm to about 600 ppm, about 350 ppm to about 375 ppm, about 350 ppm to about 400 ppm, about 375 ppm to about 400 ppm, about 350 ppm to about 425 ppm, about 350 ppm to about 450 ppm, about 350 ppm to about 475 ppm, about 350 ppm to about 500 ppm, about 350 ppm to about 525 ppm, about 350 ppm to about 550 ppm, about 350 ppm to about 575 ppm, about 350 ppm to about 600 ppm, about 400 ppm to about 500 ppm, about 400 ppm to about 600 ppm, about 400 ppm to about 700 ppm, about 400 ppm to about 800 ppm, about 400 ppm to about 900 ppm, about 400 ppm to about 1,000 ppm, about 400 ppm to about 1,100 ppm, about 400 ppm to about 1,200 ppm, about 400 ppm to about 1,300 ppm, about 400 ppm to about 1,400 ppm, about 400 ppm to about 1,500 ppm, about 400 ppm to about 1,600 ppm, about 400 ppm to about 1,700 ppm, about 400 ppm to about 1,800 ppm, about 400 ppm to about 1,900 ppm, about 400 ppm to about 2,000 ppm, about 500 ppm to about 600 ppm, about 500 ppm to about 700 ppm, about 500 ppm to about 800 ppm, about 500 ppm to about 900 ppm, about 500 ppm to about 1,000 ppm, about 500 ppm to about 1,100 ppm, about 500 ppm to about 1,200 ppm, about 500 ppm to about 1,300 ppm, about 500 ppm to about 1,400 ppm, about 500 ppm to about 1,500 ppm, about 500 ppm to about 1,600 ppm, about 500 ppm to about 1,700 ppm, about 500 ppm to about 1,800 ppm, about 500 ppm to about 1,900 ppm, about 500 ppm to about 2,000 ppm, about 600 ppm to about 700 ppm, about 600 ppm to about 800 ppm, about 600 ppm to about 900 ppm, about 600 ppm to about 1,000 ppm, about 600 ppm to about 1,100 ppm, about 600 ppm to about 1,200 ppm, about 600 ppm to about 1,300 ppm, about 600 ppm to about 1,400 ppm, about 600 ppm to about 1,500 ppm, about 600 ppm to about 1,600 ppm, about 600 ppm to about 1,700 ppm, about 600 ppm to about 1,800 ppm, about 600 ppm to about 1,900 ppm, about 600 ppm to about 2,000 ppm, about 700 ppm to about 800 ppm, about 700 ppm to about 900 ppm, about 700 ppm to about 1,000 ppm, about 700 ppm to about 1,100 ppm, about 700 ppm to about 1,200 ppm, about 700 ppm to about 1,300 ppm, about 700 ppm to about 1,400 ppm, about 700 ppm to about 1,500 ppm, about 700 ppm to about 1,600 ppm, about 700 ppm to about 1,700 ppm, about 700 ppm to about 1,800 ppm, about 700 ppm to about 1,900 ppm, about 700 ppm to about 2,000 ppm, about 800 ppm to about 900 ppm, about 800 ppm to about 1,000 ppm, about 800 ppm to about 1,100 ppm, about 800 ppm to about 1,200 ppm, about 800 ppm to about 1,300 ppm, about 800 ppm to about 1,400 ppm, about 800 ppm to about 1,500 ppm, about 800 ppm to about 1,600 ppm, about 800 ppm to about 1,700 ppm, about 800 ppm to about 1,800 ppm, about 800 ppm to about 1,900 ppm, about 800 ppm to about 2,000 ppm, about 900 ppm to about 1,000 ppm, about 900 ppm to about 1,100 ppm, about 900 ppm to about 1,200 ppm, about 900 ppm to about 1,300 ppm, about 900 ppm to about 1,400 ppm, about 900 ppm to about 1,500 ppm, about 900 ppm to about 1,600 ppm, about 900 ppm to about 1,700 ppm, about 900 ppm to about 1,800 ppm, about 900 ppm to about 1,900 ppm, about 900 ppm to about 2,000 ppm, about 1,000 ppm to about 1,100 ppm, about 1,000 ppm to about 1,200 ppm, about 1,000 ppm to about 1,300 ppm, about 1,000 ppm to about 1,400 ppm, about 1,000 ppm to about 1,500 ppm, about 1,000 ppm to about 1,600 ppm, about 1,000 ppm to about 1,700 ppm, about 1,000 ppm to about 1,800 ppm, about 1,000 ppm to about 1,900 ppm, about 1,000 ppm to about 2,000 ppm, about 1,100 ppm to about 1,200 ppm, about 1,100 ppm to about 1,300 ppm, about 1,100 ppm to about 1,400 ppm, about 1,100 ppm to about 1,500 ppm, about 1,100 ppm to about 1,600 ppm, about 1,100 ppm to about 1,700 ppm, about 1,100 ppm to about 1,800 ppm, about 1,100 ppm to about 1,900 ppm, about 1,100 ppm to about 2,000 ppm, about 1,200 ppm to about 1,300 ppm, about 1,200 ppm to about 1,400 ppm, about 1,200 ppm to about 1,500 ppm, about 1,200 ppm to about 1,600 ppm, about 1,200 ppm to about 1,700 ppm, about 1,200 ppm to about 1,800 ppm, about 1,200 ppm to about 1,900 ppm, about 1,200 ppm to about 2,000 ppm, about 1,300 ppm to about 1,400 ppm, about 1,300 ppm to about 1,500 ppm, about 1,300 ppm to about 1,600 ppm, about 1,300 ppm to about 1,700 ppm, about 1,300 ppm to about 1,800 ppm, about 1,300 ppm to about 1,900 ppm, about 1,300 ppm to about 2,000 ppm, about 1,400 ppm to about 1,500 ppm, about 1,400 ppm to about 1,600 ppm, about 1,400 ppm to about 1,700 ppm, about 1,400 ppm to about 1,800 ppm, about 1,400 ppm to about 1,900 ppm, about 1,400 ppm to about 2,000 ppm, about 1,500 ppm to about 1,600 ppm, about 1,500 ppm to about 1,700 ppm, about 1,500 ppm to about 1,800 ppm, about 1,500 ppm to about 1,900 ppm, about 1,500 ppm to about 2,000 ppm, about 1,600 ppm to about 1,700 ppm, about 1,600 ppm to about 1,800 ppm, about 1,600 ppm to about 1,900 ppm, about 1,600 ppm to about 2,000 ppm, about 1,700 ppm to about 1,800 ppm, about 1,700 ppm to about 1,900 ppm, about 1,700 ppm to about 2,000 ppm, about 1,800 ppm to about 1,900 ppm, about 1,800 ppm to about 2,000 ppm, or about 1,900 ppm to about 2,000 ppm.

29. The composition according to any one of embodiments 4, 8 or 10-27, wherein the one or more metal salt are in an amount of about 0.10%, about 0.11%, about 0.12%, about 0.13%, about 0.14%, about 0.15%, about 0.16%, about 0.17%, about 0.18%, about 0.19%, about 0.2%, about 0.25%, about 0.3%, about 0.35%, about 0.4%, about 0.45%, or about 0.5% by weight of the composition, or at least 0.10%, at least 0.11%, at least 0.12%, at least 0.13%, at least 0.14%, at least 0.15%, at least 0.16%, at least 0.17%, at least 0.18%, at least 0.19%, at least 0.2%, at least 0.25%, at least 0.3%, at least 0.35%, at least 0.4%, at least 0.45%, or at least 0.5% by weight of the composition, or at most 0.10%, at most 0.11%, at most 0.12%, at most 0.13%, at most 0.14%, at most 0.15%, at most 0.16%, at most 0.17%, at most 0.18%, at most 0.19%, at most 0.2%, at most 0.25%, at most 0.3%, at most 0.35%, at most 0.4%, at most 0.45%, or at most 0.5% by weight of the composition, or about 0.10% to about 0.15%, about 0.10% to about 0.20%, about 0.10% to about 0.25%, about 0.10% to about 0.30%, about 0.10% to about 0.35%, about 0.10% to about 0.40%, about 0.10% to about 0.45%, about 0.10% to about 0.50%, about 0.20% to about 0.25%, about 0.20% to about 0.30%, about 0.20% to about 0.35%, about 0.20% to about 0.40%, about 0.20% to about 0.45%, about 0.20% to about 0.50%, about 0.30% to about 0.35%, about 0.30% to about 0.40%, about 0.30% to about 0.45%, about 0.30% to about 0.50%, about 0.40% to about 0.45%, about 0.40% to about 0.50%, or about 0.40% to about 0.50% by weight of the composition.

30. The composition according to any one of embodiments 1-29, further comprising, consisting essentially of, or consisting of one or more carriers.

31. The composition according to embodiment 30, wherein the one or more carrier includes an aqueous carrier, a semi-solid carrier, a solid carrier, or any combination thereof.

32. The composition according to embodiment 30 or 31, wherein the one or more carrier includes water, a vegetable oil, a mineral oil, an ester oil, an ether, an alcohol, a fatty alcohol, an isoparaffin, a hydrocarbon oil, a polyol, a wax, or any combination thereof.

33. The composition according to embodiment 32, wherein the ester oil includes octal palmitate, isopropyl myristate or isopropyl palmitate.

34. The composition according to embodiment 32, wherein the ether includes dicapryl ether or dimethyl isosorbide.

35. The composition according to embodiment 32, wherein the alcohol includes ethanol or isopropanol.

36. The composition according to embodiment 32, wherein the fatty alcohol includes cetyl alcohol, cetearyl alcohol, stearyl alcohol or behenyl alcohol.

37. The composition according to embodiment 32, wherein the isoparaffin includes isooctane, isododecane (IDD) or isohexadecane.

38. The composition according to embodiment 32, wherein the hydrocarbon oil includes mineral oil, petrolatum, isoeicosane or a polyolefin.

39. The composition according to embodiment 32, wherein the polyol includes propylene glycol, glycerin, butylene glycol, pentylene glycol, hexylene glycol, or caprylyl glycol.

40. The composition according to embodiment 32, wherein the wax includes beeswax, carnauba, ozokerite, microcrystalline wax, polyethylene wax, or a botanical wax.

41. The composition according to any one of embodiments 30-40, wherein the one or more carriers are in an amount of at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 96%, at least 97%, at least 98% or at least 99% by weight of the composition or at most 5%, at most 10%, at most 15%, at most 20%, at most 25%, at most 30%, at most 35%, at most 40%, at most 45%, at most 50%, at most 55%, at most 60%, at most 65%, at most 70%, at most 75%, at most 80%, at most 85%, at most 90%, at most 95%, at most 96%, at most 97%, at most 98% or at most 99% by weight of the composition or about 5% to about 25%, about 5% to about 50%, about 5% to about 75%, about 5% to about 90%, about 5% to about 95%, about 5% to about 96%, about 5% to about 97%, about 5% to about 98%, about 5% to about 99%, about 25% to about 50%, about 25% to about 75%, about 25% to about 90%, about 25% to about 95%, about 25% to about 96%, about 25% to about 97%, about 25% to about 98%, about 25% to about 99%, about 50% to about 75%, about 50% to about 90%, about 50% to about 95%, about 50% to about 96%, about 50% to about 97%, about 50% to about 98%, about 50% to about 99%, about 75% to about 80%, about 75% to about 85%, about 75% to about 90%, about 75% to about 95%, about 75% to about 96%, about 75% to about 97%, about 75% to about 98%, about 75% to about 99%, about 80% to about 85%, about 80% to about 90%, about 80% to about 95%, about 80% to about 96%, about 80% to about 97%, about 80% to about 98%, about 80% to about 99%, about 85% to about 90%, about 85% to about 95%, about 85% to about 96%, about 85% to about 97%, about 85% to about 98%, about 85% to about 99%, about 90% to about 95%, about 90% to about 96%, about 90% to about 97%, about 90% to about 98%, about 90% to about 99%, or about 95% to about 99%, by weight of the composition.

42. The composition according to any one of embodiments 1-41, further comprising, consisting essentially of, or consisting of one or more additional ingredients.

43. The composition according to embodiment 42, wherein the one or more additional ingredient includes a preservative, a chelating agent, or any combination thereof.

44. The composition according to any one of embodiments 1-43, having a pH of about 2 to about 5, about 2 to about 5.5, about 2 to about 6, about 2 to about 6.5, about 2 to about 7, about 2 to about 7.5, about 2 to about 8, about 2 to about 8.5, about 2 to about 9, about 2.5 to about 5, about 2.5 to about 5.5, about 2.5 to about 6, about 2.5 to about 6.5, about 2.5 to about 7, about 2.5 to about 7.5, about 2.5 to about 8, about 2.5 to about 8.5, about 2.5 to about 9, about 3 to about 5, about 3 to about 5.5, about 3 to about 6, about 3 to about 6.5, about 3 to about 7, about 3 to about 7.5, about 3 to about 8, about 3 to about 8.5, about 3 to about 9, about 3.5 to about 5, about 3.5 to about 5.5, about 3.5 to about 6, about 3.5 to about 6.5, about 3.5 to about 7, about 3.5 to about 7.5, about 3.5 to about 8, about 3.5 to about 8.5, about 3.5 to about 9, about 4 to about 5, about 4 to about 5.5, about 4 to about 6, about 4 to about 6.5, about 4 to about 7, about 4 to about 7.5, about 4 to about 8, about 4 to about 8.5, about 4 to about 9, about 4.5 to about 5, about 4.5 to about 5.5, about 4.5 to about 6, about 4.5 to about 6.5, about 4.5 to about 7, about 4.5 to about 7.5, about 4.5 to about 8, about 4.5 to about 8.5, about 4.5 to about 9, about 5 to about 5.5, about 5 to about 6, about 5 to about 6.5, about 5 to about 7, about 5 to about 7.5, about 5 to about 8, about 5 to about 8.5, about 5 to about 9, about 5.5 to about 6, about 5.5 to about 6.5, about 5.5 to about 7, about 5.5 to about 7.5, about 5.5 to about 8, about 5.5 to about 8.5, about 5.5 to about 9, about 6 to about 6.5, about 6 to about 7, about 6 to about 7.5, about 6 to about 8, about 6 to about 8.5, about 6 to about 9, about 6.5 to about 7, about 6.5 to about 7.5, about 6.5 to about 8, about 6.5 to about 8.5, about 6.5 to about 9, about 7 to about 7.5, about 7 to about 8, about 7 to about 8.5, about 7 to about 9, about 7.5 to about 8, about 7.5 to about 8.5, about 7.5 to about 9, about 8 to about 8.5, about 8 to about 9, or about 8.5 to about 9.

45. A kit comprising, consisting essentially of, or consisting of a composition as defined in any one of embodiments 1-44.

46. The kit according to embodiment 45, further comprising, consisting essentially of, or consisting of one or more delivery or application systems, and/or instructions, and/or a container.

47. A kit comprising, consisting essentially of, or consisting of a first component including hypochlorous acid or free available chlorine and a second component including or more quaternary compounds or silicon quaternary compounds.

48. A kit comprising, consisting essentially of, or consisting of a first component including hypochlorous acid or free available chlorine and a second component including one or more guanide-containing compounds.

49. A kit comprising, consisting essentially of, or consisting of a first component including one or more alcohols and a second component including one or more quaternary compounds or silicon quaternary compounds.

50. A kit comprising, consisting essentially of, or consisting of a first component including one or more alcohols and a second component including one or more guanide-containing compounds.

51. A kit comprising, consisting essentially of, or consisting of a first component including hypochlorous acid or free available chlorine and a second component including one or more metallic particles.

52. A kit comprising, consisting essentially of, or consisting of a first component including hypochlorous acid or free available chlorine and a second component including one or more metal salts.

53. A kit comprising, consisting essentially of, or consisting of a first component including hypochlorous acid or free available chlorine, a second component including one or more metallic particles and a third component including one or more metal salts.

54. The kit according to any one of embodiments 47-53, further comprising, consisting essentially of, or consisting of a third component including one or more metallic particles and/or a fourth component including one or more metal salts, and/or a fifth component including one or more cationic surfactants, and/or a sixth component including a rinse solution and/or one or more delivery or application systems, and/or instructions, and/or a container 55. The kit according to embodiments 45-48 and 51-54, wherein the hypochlorous acid or free available chlorine is in an amount of 0.05 ppm, 0.10 ppm, 0.15 ppm, 0.20 ppm, 0.25 ppm, 0.30 ppm, 0.35 ppm, 0.40 ppm, 0.45 ppm, 0.50 ppm, 0.55 ppm, 0.60 ppm, 0.65 ppm, 0.70 ppm, 0.75 ppm, 0.80 ppm, 0.85 ppm, 0.90 ppm, 0.95 ppm, 1 ppm, 5 ppm, 10 ppm, 15 ppm, 20 ppm, 25 ppm, 30 ppm, 35 ppm, 40 ppm, 45 ppm, 50 ppm, 55 ppm, 60 ppm, 65 ppm, 70 ppm, 75 ppm, 80 ppm, 85 ppm, 90 ppm, 95 ppm, 100 ppm, 125 ppm, 150 ppm, 175 ppm, 200 ppm, 225 ppm, 250 ppm, 275 ppm, 300 ppm, 325 ppm, 350 ppm, 375 ppm, 400 ppm, 425 ppm, 450 ppm, 475 ppm, 500 ppm, 525 ppm, 550 ppm, 575 ppm, 600 ppm, 625 ppm, 650 ppm, 675 ppm, 700 ppm, 725 ppm, 750 ppm, 775 ppm, 800 ppm, 825 ppm, 850 ppm, 875 ppm, 900 ppm, 925 ppm, 950 ppm, 975 ppm, 1,000 ppm, 1,025 ppm, 1,050 ppm, 1075 ppm, 1,100 ppm, 1,125 ppm, 1,150 ppm, 1,175 ppm, 1,200 ppm, 1,225 ppm, 1,250 ppm, 1,275 ppm, 1,300 ppm, 1,325 ppm, 1,350 ppm, 1,375 ppm, 1,400 ppm, 1,425 ppm, 1,450 ppm, 1,475 ppm, 1,500 ppm, 1,600 ppm, 1,700 ppm, 1,800 ppm, 1,900 ppm, or 2,000 ppm or at least 0.05 ppm, at least 0.10 ppm, at least 0.20 ppm, at least 0.30 ppm, at least 0.40 ppm, at least 0.50 ppm, at least 0.60 ppm, at least 0.70 ppm, at least 0.80 ppm, at least 0.90 ppm, at least 1 ppm, at least 10 ppm, at least 20 ppm, at least 30 ppm, at least 40 ppm, at least 50 ppm, at least 60 ppm, at least 70 ppm, at least 80 ppm, at least 90 ppm, at least 100 ppm, at least 125 ppm, at least 150 ppm, at least 175 ppm, at least 200 ppm, at least 225 ppm, at least 250 ppm, at least 275 ppm, at least 300 ppm, at least 325 ppm, at least 350 ppm, at least 375 ppm, at least 400 ppm, at least 425 ppm, at least 450 ppm, at least 475 ppm, at least 500 ppm, at least 525 ppm, at least 550 ppm, at least 575 ppm, at least 600 ppm, at least 625 ppm, at least 650 ppm, at least 675 ppm, at least 700 ppm, at least 725 ppm, at least 750 ppm, at least 775 ppm, at least 800 ppm, at least 825 ppm, at least 850 ppm, at least 875 ppm, at least 900 ppm, at least 925 ppm, at least 950 ppm, at least 975 ppm, at least 1,000 ppm, at least 1,025 ppm, at least 1,050 ppm, at least 1075 ppm, at least 1,100 ppm, at least 1,125 ppm, at least 1,150 ppm, at least 1,175 ppm, at least 1,200 ppm, at least 1,225 ppm, at least 1,250 ppm, at least 1,275 ppm, at least 1,300 ppm, at least 1,325 ppm, at least 1,350 ppm, at least 1,375 ppm, at least 1,400 ppm, at least 1,425 ppm, at least 1,450 ppm, at least 1,475 ppm, at least 1,500 ppm, at least 1,600 ppm, at least 1,700 ppm, at least 1,800 ppm, at least 1,900 ppm, or at least 2,000 ppm or at most 0.05 ppm, at most 0.10 ppm, at most 0.20 ppm, at most 0.30 ppm, at most 0.40 ppm, at most 0.50 ppm, at most 0.60 ppm, at most 0.70 ppm, at most 0.80 ppm, at most 0.90 ppm, at most 1 ppm, at most 10 ppm, at most 20 ppm, at most 30 ppm, at most 40 ppm, at most 50 ppm, at most 60 ppm, at most 70 ppm, at most 80 ppm, at most 90 ppm, at most 100 ppm, at most 125 ppm, at most 150 ppm, at most 175 ppm, at most 200 ppm, at most 225 ppm, at most 250 ppm, at most 275 ppm, at most 300 ppm, at most 325 ppm, at most 350 ppm, at most 375 ppm, at most 400 ppm, at most 425 ppm, at most 450 ppm, at most 475 ppm, at most 500 ppm, at most 525 ppm, at most 550 ppm, at most 575 ppm, at most 600 ppm, at most 625 ppm, at most 650 ppm, at most 675 ppm, at most 700 ppm, at most 725 ppm, at most 750 ppm, at most 775 ppm, at most 800 ppm, at most 825 ppm, at most 850 ppm, at most 875 ppm, at most 900 ppm, at most 925 ppm, at most 950 ppm, at most 975 ppm, at most 1,000 ppm, at most 1,025 ppm, at most 1,050 ppm, at most 1075 ppm, at most 1,100 ppm, at most 1,125 ppm, at most 1,150 ppm, at most 1,175 ppm, at most 1,200 ppm, at most 1,225 ppm, at most 1,250 ppm, at most 1,275 ppm, at most 1,300 ppm, at most 1,325 ppm, at most 1,350 ppm, at most 1,375 ppm, at most 1,400 ppm, at most 1,425 ppm, at most 1,450 ppm, at most 1,475 ppm, at most 1,500 ppm, at most 1,600 ppm, at most 1,700 ppm, at most 1,800 ppm, at most 1,900 ppm, or at most 2,000 ppm or about 0.5 ppm to about 20 ppm, about 0.5 ppm to about 25 ppm, about 0.5 ppm to about 30 ppm, about 0.5 ppm to about 35 ppm, about 0.5 ppm to about 40 ppm, about 0.5 ppm to about 45 ppm, about 0.5 ppm to about 50 ppm, about 0.5 ppm to about 55 ppm, about 0.5 ppm to about 60 ppm, about 0.5 ppm to about 65 ppm, about 0.5 ppm to about 70 ppm, about 0.5 ppm to about 75 ppm, about 0.5 ppm to about 80 ppm, about 0.5 ppm to about 85 ppm, about 0.5 ppm to about 90 ppm, about 0.5 ppm to about 95 ppm, about 0.5 ppm to about 100 ppm, about 0.75 ppm to about 20 ppm, about 0.75 ppm to about 25 ppm, about 0.75 ppm to about 30 ppm, about 0.75 ppm to about 35 ppm, about 0.75 ppm to about 40 ppm, about 0.75 ppm to about 45 ppm, about 0.75 ppm to about 50 ppm, about 0.75 ppm to about 55 ppm, about 0.75 ppm to about 60 ppm, about 0.75 ppm to about 65 ppm, about 0.75 ppm to about 70 ppm, about 0.75 ppm to about 75 ppm, about 0.75 ppm to about 80 ppm, about 0.75 ppm to about 85 ppm, about 0.75 ppm to about 90 ppm, about 0.75 ppm to about 95 ppm, about 0.75 ppm to about 100 ppm, about 1 ppm to about 20 ppm, about 1 ppm to about 25 ppm, about 1 ppm to about 30 ppm, about 1 ppm to about 35 ppm, about 1 ppm to about 40 ppm, about 1 ppm to about 45 ppm, about 1 ppm to about 50 ppm, about 1 ppm to about 55 ppm, about 1 ppm to about 60 ppm, about 1 ppm to about 65 ppm, about 1 ppm to about 70 ppm, about 1 ppm to about 75 ppm, about 1 ppm to about 80 ppm, about 1 ppm to about 85 ppm, about 1 ppm to about 90 ppm, about 1 ppm to about 95 ppm, about 1 ppm to about 100 ppm, about 5 ppm to about 20 ppm, about 5 ppm to about 25 ppm, about 5 ppm to about 30 ppm, about 5 ppm to about 35 ppm, about 5 ppm to about 40 ppm, about 5 ppm to about 45 ppm, about 5 ppm to about 50 ppm, about 5 ppm to about 55 ppm, about 5 ppm to about 60 ppm, about 5 ppm to about 65 ppm, about 5 ppm to about 70 ppm, about 5 ppm to about 75 ppm, about 5 ppm to about 80 ppm, about 5 ppm to about 85 ppm, about 5 ppm to about 90 ppm, about 5 ppm to about 95 ppm, about 5 ppm to about 100 ppm, about 10 ppm to about 20 ppm, about 10 ppm to about 25 ppm, about 10 ppm to about 30 ppm, about 10 ppm to about 35 ppm, about 10 ppm to about 40 ppm, about 10 ppm to about 45 ppm, about 10 ppm to about 50 ppm, about 10 ppm to about 55 ppm, about 10 ppm to about 60 ppm, about 10 ppm to about 65 ppm, about 10 ppm to about 70 ppm, about 10 ppm to about 75 ppm, about 10 ppm to about 80 ppm, about 10 ppm to about 85 ppm, about 10 ppm to about 90 ppm, about 10 ppm to about 95 ppm, or about 10 ppm to about 100 ppm, about 1 ppm to about 25 ppm, about 1 ppm to about 50 ppm, about 1 ppm to about 75 ppm, about 1 ppm to about 100 ppm, about 1 ppm to about 125 ppm, about 1 ppm to about 150 ppm, about 1 ppm to about 175 ppm, about 1 ppm to about 200 ppm, about 1 ppm to about 225 ppm, about 1 ppm to about 250 ppm, about 1 ppm to about 275 ppm, about 1 ppm to about 300 ppm, about 1 ppm to about 325 ppm, about 1 ppm to about 350 ppm, about 1 ppm to about 375 ppm, about 1 ppm to about 400 ppm, about 10 ppm to about 25 ppm, about 10 ppm to about 50 ppm, about 10 ppm to about 75 ppm, about 10 ppm to about 100 ppm, about 10 ppm to about 125 ppm, about 10 ppm to about 150 ppm, about 10 ppm to about 175 ppm, about 10 ppm to about 200 ppm, about 10 ppm to about 225 ppm, about 10 ppm to about 250 ppm, about 10 ppm to about 275 ppm, about 10 ppm to about 300 ppm, about 10 ppm to about 325 ppm, about 10 ppm to about 350 ppm, about 10 ppm to about 375 ppm, about 10 ppm to about 400 ppm, about 25 ppm to about 50 ppm, about 25 ppm to about 75 ppm, about 25 ppm to about 100 ppm, about 25 ppm to about 125 ppm, about 25 ppm to about 150 ppm, about 25 ppm to about 175 ppm, about 25 ppm to about 200 ppm, about 25 ppm to about 225 ppm, about 25 ppm to about 250 ppm, about 25 ppm to about 275 ppm, about 25 ppm to about 300 ppm, about 25 ppm to about 325 ppm, about 25 ppm to about 350 ppm, about 25 ppm to about 375 ppm, about 25 ppm to about 400 ppm, about 50 ppm to about 75 ppm, about 50 ppm to about 100 ppm, about 50 ppm to about 125 ppm, about 50 ppm to about 150 ppm, about 50 ppm to about 175 ppm, about 50 ppm to about 200 ppm, about 50 ppm to about 225 ppm, about 50 ppm to about 250 ppm, about 50 ppm to about 275 ppm, about 50 ppm to about 300 ppm, about 50 ppm to about 325 ppm, about 50 ppm to about 350 ppm, about 50 ppm to about 375 ppm, about 50 ppm to about 400 ppm, about 75 ppm to about 100 ppm, about 75 ppm to about 125 ppm, about 75 ppm to about 150 ppm, about 75 ppm to about 175 ppm, about 75 ppm to about 200 ppm, about 75 ppm to about 225 ppm, about 75 ppm to about 250 ppm, about 75 ppm to about 275 ppm, about 75 ppm to about 300 ppm, about 75 ppm to about 325 ppm, about 75 ppm to about 350 ppm, about 75 ppm to about 375 ppm, about 75 ppm to about 400 ppm, about 100 ppm to about 125 ppm, about 100 ppm to about 150 ppm, about 100 ppm to about 175 ppm, about 100 ppm to about 200 ppm, about 100 ppm to about 225 ppm, about 100 ppm to about 250 ppm, about 100 ppm to about 275 ppm, about 100 ppm to about 300 ppm, about 100 ppm to about 325 ppm, about 100 ppm to about 350 ppm, about 100 ppm to about 375 ppm, about 100 ppm to about 400 ppm, about 150 ppm to about 175 ppm, about 150 ppm to about 200 ppm, about 150 ppm to about 225 ppm, about 150 ppm to about 250 ppm, about 150 ppm to about 275 ppm, about 150 ppm to about 300 ppm, about 150 ppm to about 325 ppm, about 150 ppm to about 350 ppm, about 150 ppm to about 375 ppm, about 150 ppm to about 400 ppm, about 200 ppm to about 225 ppm, about 200 ppm to about 250 ppm, about 200 ppm to about 275 ppm, about 200 ppm to about 300 ppm, about 200 ppm to about 325 ppm, about 200 ppm to about 350 ppm, about 200 ppm to about 375 ppm, about 200 ppm to about 400 ppm, about 200 ppm to about 425 ppm, about 200 ppm to about 450 ppm, about 200 ppm to about 475 ppm, about 200 ppm to about 500 ppm, about 200 ppm to about 525 ppm, about 200 ppm to about 550 ppm, about 200 ppm to about 575 ppm, about 200 ppm to about 600 ppm, about 250 ppm to about 275 ppm, about 250 ppm to about 300 ppm, about 250 ppm to about 325 ppm, about 250 ppm to about 350 ppm, about 250 ppm to about 375 ppm, about 250 ppm to about 400 ppm, about 250 ppm to about 425 ppm, about 250 ppm to about 450 ppm, about 250 ppm to about 475 ppm, about 250 ppm to about 500 ppm, about 250 ppm to about 525 ppm, about 250 ppm to about 550 ppm, about 250 ppm to about 575 ppm, about 250 ppm to about 600 ppm, about 300 ppm to about 325 ppm, about 300 ppm to about 350 ppm, about 300 ppm to about 375 ppm, about 300 ppm to about 400 ppm, about 300 ppm to about 425 ppm, about 300 ppm to about 450 ppm, about 300 ppm to about 475 ppm, about 300 ppm to about 500 ppm, about 300 ppm to about 525 ppm, about 300 ppm to about 550 ppm, about 300 ppm to about 575 ppm, about 300 ppm to about 600 ppm, about 350 ppm to about 375 ppm, about 350 ppm to about 400 ppm, about 375 ppm to about 400 ppm, about 350 ppm to about 425 ppm, about 350 ppm to about 450 ppm, about 350 ppm to about 475 ppm, about 350 ppm to about 500 ppm, about 350 ppm to about 525 ppm, about 350 ppm to about 550 ppm, about 350 ppm to about 575 ppm, about 350 ppm to about 600 ppm, about 400 ppm to about 500 ppm, about 400 ppm to about 600 ppm, about 400 ppm to about 700 ppm, about 400 ppm to about 800 ppm, about 400 ppm to about 900 ppm, about 400 ppm to about 1,000 ppm, about 400 ppm to about 1,100 ppm, about 400 ppm to about 1,200 ppm, about 400 ppm to about 1,300 ppm, about 400 ppm to about 1,400 ppm, about 400 ppm to about 1,500 ppm, about 400 ppm to about 1,600 ppm, about 400 ppm to about 1,700 ppm, about 400 ppm to about 1,800 ppm, about 400 ppm to about 1,900 ppm, about 400 ppm to about 2,000 ppm, about 500 ppm to about 600 ppm, about 500 ppm to about 700 ppm, about 500 ppm to about 800 ppm, about 500 ppm to about 900 ppm, about 500 ppm to about 1,000 ppm, about 500 ppm to about 1,100 ppm, about 500 ppm to about 1,200 ppm, about 500 ppm to about 1,300 ppm, about 500 ppm to about 1,400 ppm, about 500 ppm to about 1,500 ppm, about 500 ppm to about 1,600 ppm, about 500 ppm to about 1,700 ppm, about 500 ppm to about 1,800 ppm, about 500 ppm to about 1,900 ppm, about 500 ppm to about 2,000 ppm, about 600 ppm to about 700 ppm, about 600 ppm to about 800 ppm, about 600 ppm to about 900 ppm, about 600 ppm to about 1,000 ppm, about 600 ppm to about 1,100 ppm, about 600 ppm to about 1,200 ppm, about 600 ppm to about 1,300 ppm, about 600 ppm to about 1,400 ppm, about 600 ppm to about 1,500 ppm, about 600 ppm to about 1,600 ppm, about 600 ppm to about 1,700 ppm, about 600 ppm to about 1,800 ppm, about 600 ppm to about 1,900 ppm, about 600 ppm to about 2,000 ppm, about 700 ppm to about 800 ppm, about 700 ppm to about 900 ppm, about 700 ppm to about 1,000 ppm, about 700 ppm to about 1,100 ppm, about 700 ppm to about 1,200 ppm, about 700 ppm to about 1,300 ppm, about 700 ppm to about 1,400 ppm, about 700 ppm to about 1,500 ppm, about 700 ppm to about 1,600 ppm, about 700 ppm to about 1,700 ppm, about 700 ppm to about 1,800 ppm, about 700 ppm to about 1,900 ppm, about 700 ppm to about 2,000 ppm, about 800 ppm to about 900 ppm, about 800 ppm to about 1,000 ppm, about 800 ppm to about 1,100 ppm, about 800 ppm to about 1,200 ppm, about 800 ppm to about 1,300 ppm, about 800 ppm to about 1,400 ppm, about 800 ppm to about 1,500 ppm, about 800 ppm to about 1,600 ppm, about 800 ppm to about 1,700 ppm, about 800 ppm to about 1,800 ppm, about 800 ppm to about 1,900 ppm, about 800 ppm to about 2,000 ppm, about 900 ppm to about 1,000 ppm, about 900 ppm to about 1,100 ppm, about 900 ppm to about 1,200 ppm, about 900 ppm to about 1,300 ppm, about 900 ppm to about 1,400 ppm, about 900 ppm to about 1,500 ppm, about 900 ppm to about 1,600 ppm, about 900 ppm to about 1,700 ppm, about 900 ppm to about 1,800 ppm, about 900 ppm to about 1,900 ppm, about 900 ppm to about 2,000 ppm, about 1,000 ppm to about 1,100 ppm, about 1,000 ppm to about 1,200 ppm, about 1,000 ppm to about 1,300 ppm, about 1,000 ppm to about 1,400 ppm, about 1,000 ppm to about 1,500 ppm, about 1,000 ppm to about 1,600 ppm, about 1,000 ppm to about 1,700 ppm, about 1,000 ppm to about 1,800 ppm, about 1,000 ppm to about 1,900 ppm, about 1,000 ppm to about 2,000 ppm, about 1,100 ppm to about 1,200 ppm, about 1,100 ppm to about 1,300 ppm, about 1,100 ppm to about 1,400 ppm, about 1,100 ppm to about 1,500 ppm, about 1,100 ppm to about 1,600 ppm, about 1,100 ppm to about 1,700 ppm, about 1,100 ppm to about 1,800 ppm, about 1,100 ppm to about 1,900 ppm, about 1,100 ppm to about 2,000 ppm, about 1,200 ppm to about 1,300 ppm, about 1,200 ppm to about 1,400 ppm, about 1,200 ppm to about 1,500 ppm, about 1,200 ppm to about 1,600 ppm, about 1,200 ppm to about 1,700 ppm, about 1,200 ppm to about 1,800 ppm, about 1,200 ppm to about 1,900 ppm, about 1,200 ppm to about 2,000 ppm, about 1,300 ppm to about 1,400 ppm, about 1,300 ppm to about 1,500 ppm, about 1,300 ppm to about 1,600 ppm, about 1,300 ppm to about 1,700 ppm, about 1,300 ppm to about 1,800 ppm, about 1,300 ppm to about 1,900 ppm, about 1,300 ppm to about 2,000 ppm, about 1,400 ppm to about 1,500 ppm, about 1,400 ppm to about 1,600 ppm, about 1,400 ppm to about 1,700 ppm, about 1,400 ppm to about 1,800 ppm, about 1,400 ppm to about 1,900 ppm, about 1,400 ppm to about 2,000 ppm, about 1,500 ppm to about 1,600 ppm, about 1,500 ppm to about 1,700 ppm, about 1,500 ppm to about 1,800 ppm, about 1,500 ppm to about 1,900 ppm, about 1,500 ppm to about 2,000 ppm, about 1,600 ppm to about 1,700 ppm, about 1,600 ppm to about 1,800 ppm, about 1,600 ppm to about 1,900 ppm, about 1,600 ppm to about 2,000 ppm, about 1,700 ppm to about 1,800 ppm, about 1,700 ppm to about 1,900 ppm, about 1,700 ppm to about 2,000 ppm, about 1,800 ppm to about 1,900 ppm, about 1,800 ppm to about 2,000 ppm, or about 1,900 ppm to about 2,000 ppm.

56. The kit according to any one of embodiments 45-48 and 51-54, wherein the hypochlorous acid or free available chlorine is in an amount of about 0.10%, about 0.11%, about 0.12%, about 0.13%, about 0.14%, about 0.15%, about 0.16%, about 0.17%, about 0.18%, about 0.19%, about 0.2%, about 0.25%, about 0.3%, about 0.35%, about 0.4%, about 0.45%, or about 0.5% by weight of the composition, or at least 0.10%, at least 0.11%, at least 0.12%, at least 0.13%, at least 0.14%, at least 0.15%, at least 0.16%, at least 0.17%, at least 0.18%, at least 0.19%, at least 0.2%, at least 0.25%, at least 0.3%, at least 0.35%, at least 0.4%, at least 0.45%, or at least 0.5% by weight of the composition, or at most 0.10%, at most 0.11%, at most 0.12%, at most 0.13%, at most 0.14%, at most 0.15%, at most 0.16%, at most 0.17%, at most 0.18%, at most 0.19%, at most 0.2%, at most 0.25%, at most 0.3%, at most 0.35%, at most 0.4%, at most 0.45%, or at most 0.5% by weight of the composition, or about 0.10% to about 0.15%, about 0.10% to about 0.20%, about 0.10% to about 0.25%, about 0.10% to about 0.30%, about 0.10% to about 0.35%, about 0.10% to about 0.40%, about 0.10% to about 0.45%, about 0.10% to about 0.50%, about 0.20% to about 0.25%, about 0.20% to about 0.30%, about 0.20% to about 0.35%, about 0.20% to about 0.40%, about 0.20% to about 0.45%, about 0.20% to about 0.50%, about 0.30% to about 0.35%, about 0.30% to about 0.40%, about 0.30% to about 0.45%, about 0.30% to about 0.50%, about 0.40% to about 0.45%, about 0.40% to about 0.50%, or about 0.40% to about 0.50% by weight of the composition.

57. The kit according to any one of embodiments 45-47, 49 or 53, wherein the one or more quaternary compounds include one or more dialkyl quaternary compounds and/or one or more polyether fatty quaternary compounds and/or wherein the one or more silicon quaternary compounds include one or more silicone dialkyl quaternary compounds and/or one or more silicone polyether fatty quaternary compounds.

58. The kit according to embodiment 57, wherein the one or more dialkyl quaternary compounds include didodecyldimethylammonium chloride and di-n-alkyldimethyl ammonium chloride and/or wherein the one or more silicone dialkyl quaternary compounds include dimethyloctadecyl[3-(trimethoxysilyl)propyl]ammonium chloride and tetradecyldimethyl-(3-trimethoxysilyl)propyl ammonium chloride.

59. The kit according to any one of embodiments 45-47, 49, 53, 57 or 58, wherein the one or more quaternary compounds or silicon quaternary compounds are in an amount of about 0.01%, about 0.05%, about 0.075%, about 0.1%, about 0.2%, about 0.3%, about 0.4%, about 0.5%, about 0.6%, about 0.7%, about 0.8%, about 0.9%, about 1.0%, about 1.5%, about 2.0%, about 2.5%, about 3.0%, about 4.0%, about 5.0%, about 6.0%, about 7.0%, about 7.5%, about 8.0%, about 9.0%, about 10.0%, about 11.0%, about 12.0%, about 13.0%, about 14.0%, about 15.0%, about 16.0%, about 17.0%, 18.0%, about 19.0%, or about 20.0% by weight of the composition, or at least 0.01%, at least 0.05%, at least 0.075%, at least 0.1%, at least 0.25%, at least 0.5%, at least 0.75%, at least 1.0%, at least 1.5%, at least 2.0%, at least 2.5%, at least 3.0%, at least 4.0%, at least 5.0%, at least 6.0%, at least 7.0%, at least 7.5%, at least 8.0%, at least 9.0%, at least 10.0%, at least 11.0%, at least 12.0%, at least 13.0%, at least 14.0%, at least 15.0%, at least 16.0%, at least 17.0%, at least 18.0%, at least 19.0%, or at least 20.0% by weight of the composition by weight of the composition, or at most 0.01%, at most 0.05%, at most 0.075%, at most 0.1%, at most 0.25%, at most 0.5%, at most 0.75%, at most 1.0%, at most 1.5%, at most 2.0%, at most 2.5%, at most 3.0%, at most 4.0%, at most 5.0%, at most 6.0%, at most 7.5%, at most 8.0%, at most 9.0%, at most 10.0%, at most 11.0%, at most 12.0%, at most 13.0%, at most 14.0%, at most 15.0%, at most 16.0%, at most 17.0%, at most 18.0%, at most 19.0%, or at most 20.0% by weight of the composition by weight of the composition, or about 0.1% to about 0.5%, about 0.1% to about 0.75%, about 0.1% to about 1.0%, about 0.1% to about 1.5%, about 0.1% to about 2.0%, about 0.1% to about 2.5%, about 0.2% to about 0.5%, about 0.2% to about 0.75%, about 0.2% to about 1.0%, about 0.2% to about 1.5%, about 0.2% to about 2.0%, about 0.2% to about 2.5%, about 0.5% to about 1.0%, about 0.5% to about 1.5%, about 0.5% to about 2.0%, about 0.5% to about 2.5%, about 0.5% to about 3.0%, about 0.5% to about 4.0%, about 0.5% to about 5.0%, about 1.0% to about 2.0%, about 1.0% to about 3.0%, about 1.0% to about 4.0%, about 1.0% to about 5.0%, about 1.0% to about 6.0%, about 1.0% to about 7.0%, about 1.0% to about 8.0%, about 1.0% to about 9.0%, about 1.0% to about 10%, about 1.0% to about 11%, about 1.0% to about 12%, about 1.0% to about 13%, about 1.0% to about 14%, about 1.0% to about 15%, about 2.0% to about 3.0%, about 2.0% to about 4.0%, about 2.0% to about 5.0%, about 2.0% to about 6.0%, about 2.0% to about 7.0%, about 2.0% to about 8.0%, about 2.0% to about 9.0%, about 2.0% to about 10%, about 2.0% to about 11%, about 2.0% to about 12%, about 2.0% to about 13%, about 2.0% to about 14%, about 2.0% to about 15%, about 3.0% to about 4.0%, about 3.0% to about 5.0%, about 3.0% to about 6.0%, about 3.0% to about 7.0%, about 3.0% to about 8.0%, about 3.0% to about 9.0%, about 3.0% to about 10%, about 3.0% to about 11%, about 3.0% to about 12%, about 3.0% to about 13%, about 3.0% to about 14%, about 3.0% to about 15%, about 4.0% to about 5.0%, about 4.0% to about 6.0%, about 4.0% to about 7.0%, about 4.0% to about 8.0%, about 4.0% to about 9.0%, about 4.0% to about 10%, about 4.0% to about 11%, about 4.0% to about 12%, about 4.0% to about 13%, about 4.0% to about 14%, about 4.0% to about 15%, about 5.0% to about 6.0%, about 5.0% to about 7.0%, about 5.0% to about 8.0%, about 5.0% to about 9.0%, about 5.0% to about 10%, about 5.0% to about 11%, about 5.0% to about 12%, about 5.0% to about 13%, about 5.0% to about 14%, about 5.0% to about 15%, about 6.0% to about 7.0%, about 6.0% to about 8.0%, about 6.0% to about 9.0%, about 6.0% to about 10%, about 6.0% to about 11%, about 6.0% to about 12%, about 6.0% to about 13%, about 6.0% to about 14%, about 6.0% to about 15%, about 7.0% to about 8.0%, about 7.0% to about 9.0%, about 7.0% to about 10%, about 7.0% to about 11%, about 7.0% to about 12%, about 7.0% to about 13%, about 7.0% to about 14%, about 7.0% to about 15%, about 8.0% to about 9.0%, about 8.0% to about 10%, about 8.0% to about 11%, about 8.0% to about 12%, about 8.0% to about 13%, about 8.0% to about 14%, about 8.0% to about 15%, about 9.0% to about 10%, about 9.0% to about 11%, about 9.0% to about 12%, about 9.0% to about 13%, about 9.0% to about 14%, about 9.0% to about 15%, about 10% to about 11%, about 10% to about 12%, about 10% to about 13%, about 10% to about 14%, about 10% to about 15%, about 11% to about 12%, about 11% to about 13%, about 11% to about 14%, about 11% to about 15%, about 12% to about 13%, about 12% to about 14%, about 12% to about 15%, about 13% to about 14%, about 13% to about 15%, or 14% to about 15% by weight of the composition.

60. The kit according to any one of embodiments 45-47, 49, 53, 57 or 58, wherein the one or more quaternary compounds or silicon quaternary compounds is in an amount of 0.05 ppm, 0.10 ppm, 0.15 ppm, 0.20 ppm, 0.25 ppm, 0.30 ppm, 0.35 ppm, 0.40 ppm, 0.45 ppm, 0.50 ppm, 0.55 ppm, 0.60 ppm, 0.65 ppm, 0.70 ppm, 0.75 ppm, 0.80 ppm, 0.85 ppm, 0.90 ppm, 0.95 ppm, 1 ppm, 5 ppm, 10 ppm, 15 ppm, 20 ppm, 25 ppm, 30 ppm, 35 ppm, 40 ppm, 45 ppm, 50 ppm, 55 ppm, 60 ppm, 65 ppm, 70 ppm, 75 ppm, 80 ppm, 85 ppm, 90 ppm, 95 ppm, 100 ppm, 125 ppm, 150 ppm, 175 ppm, 200 ppm, 225 ppm, 250 ppm, 275 ppm, 300 ppm, 325 ppm, 350 ppm, 375 ppm, 400 ppm, 425 ppm, 450 ppm, 475 ppm, 500 ppm, 525 ppm, 550 ppm, 575 ppm, 600 ppm, 625 ppm, 650 ppm, 675 ppm, 700 ppm, 725 ppm, 750 ppm, 775 ppm, 800 ppm, 825 ppm, 850 ppm, 875 ppm, 900 ppm, 925 ppm, 950 ppm, 975 ppm, 1,000 ppm, 1,025 ppm, 1,050 ppm, 1075 ppm, 1,100 ppm, 1,125 ppm, 1,150 ppm, 1,175 ppm, 1,200 ppm, 1,225 ppm, 1,250 ppm, 1,275 ppm, 1,300 ppm, 1,325 ppm, 1,350 ppm, 1,375 ppm, 1,400 ppm, 1,425 ppm, 1,450 ppm, 1,475 ppm, or 1,500 ppm or at least 0.05 ppm, at least 0.10 ppm, at least 0.20 ppm, at least 0.30 ppm, at least 0.40 ppm, at least 0.50 ppm, at least 0.60 ppm, at least 0.70 ppm, at least 0.80 ppm, at least 0.90 ppm, at least 1 ppm, at least 10 ppm, at least 20 ppm, at least 30 ppm, at least 40 ppm, at least 50 ppm, at least 60 ppm, at least 70 ppm, at least 80 ppm, at least 90 ppm, at least 100 ppm, at least 125 ppm, at least 150 ppm, at least 175 ppm, at least 200 ppm, at least 225 ppm, at least 250 ppm, at least 275 ppm, at least 300 ppm, at least 325 ppm, at least 350 ppm, at least 375 ppm, at least 400 ppm, at least 425 ppm, at least 450 ppm, at least 475 ppm, at least 500 ppm, at least 525 ppm, at least 550 ppm, at least 575 ppm, at least 600 ppm, at least 625 ppm, at least 650 ppm, at least 675 ppm, at least 700 ppm, at least 725 ppm, at least 750 ppm, at least 775 ppm, at least 800 ppm, at least 825 ppm, at least 850 ppm, at least 875 ppm, at least 900 ppm, at least 925 ppm, at least 950 ppm, at least 975 ppm, at least 1,000 ppm, at least 1,025 ppm, at least 1,050 ppm, at least 1075 ppm, at least 1,100 ppm, at least 1,125 ppm, at least 1,150 ppm, at least 1,175 ppm, at least 1,200 ppm, at least 1,225 ppm, at least 1,250 ppm, at least 1,275 ppm, at least 1,300 ppm, at least 1,325 ppm, at least 1,350 ppm, at least 1,375 ppm, at least 1,400 ppm, at least 1,425 ppm, at least 1,450 ppm, at least 1,475 ppm, or at least 1,500 ppm or at most 0.05 ppm, at most 0.10 ppm, at most 0.20 ppm, at most 0.30 ppm, at most 0.40 ppm, at most 0.50 ppm, at most 0.60 ppm, at most 0.70 ppm, at most 0.80 ppm, at most 0.90 ppm, at most 1 ppm, at most 10 ppm, at most 20 ppm, at most 30 ppm, at most 40 ppm, at most 50 ppm, at most 60 ppm, at most 70 ppm, at most 80 ppm, at most 90 ppm, at most 100 ppm, at most 125 ppm, at most 150 ppm, at most 175 ppm, at most 200 ppm, at most 225 ppm, at most 250 ppm, at most 275 ppm, at most 300 ppm, at most 325 ppm, at most 350 ppm, at most 375 ppm, at most 400 ppm, at most 425 ppm, at most 450 ppm, at most 475 ppm, at most 500 ppm, at most 525 ppm, at most 550 ppm, at most 575 ppm, at most 600 ppm, at most 625 ppm, at most 650 ppm, at most 675 ppm, at most 700 ppm, at most 725 ppm, at most 750 ppm, at most 775 ppm, at most 800 ppm, at most 825 ppm, at most 850 ppm, at most 875 ppm, at most 900 ppm, at most 925 ppm, at most 950 ppm, at most 975 ppm, at most 1,000 ppm, at most 1,025 ppm, at most 1,050 ppm, at most 1075 ppm, at most 1,100 ppm, at most 1,125 ppm, at most 1,150 ppm, at most 1,175 ppm, at most 1,200 ppm, at most 1,225 ppm, at most 1,250 ppm, at most 1,275 ppm, at most 1,300 ppm, at most 1,325 ppm, at most 1,350 ppm, at most 1,375 ppm, at most 1,400 ppm, at most 1,425 ppm, at most 1,450 ppm, at most 1,475 ppm, or at most 1,500 ppm or about 0.5 ppm to about 20 ppm, about 0.5 ppm to about 25 ppm, about 0.5 ppm to about 30 ppm, about 0.5 ppm to about 35 ppm, about 0.5 ppm to about 40 ppm, about 0.5 ppm to about 45 ppm, about 0.5 ppm to about 50 ppm, about 0.5 ppm to about 55 ppm, about 0.5 ppm to about 60 ppm, about 0.5 ppm to about 65 ppm, about 0.5 ppm to about 70 ppm, about 0.5 ppm to about 75 ppm, about 0.5 ppm to about 80 ppm, about 0.5 ppm to about 85 ppm, about 0.5 ppm to about 90 ppm, about 0.5 ppm to about 95 ppm, about 0.5 ppm to about 100 ppm, about 0.75 ppm to about 20 ppm, about 0.75 ppm to about 25 ppm, about 0.75 ppm to about 30 ppm, about 0.75 ppm to about 35 ppm, about 0.75 ppm to about 40 ppm, about 0.75 ppm to about 45 ppm, about 0.75 ppm to about 50 ppm, about 0.75 ppm to about 55 ppm, about 0.75 ppm to about 60 ppm, about 0.75 ppm to about 65 ppm, about 0.75 ppm to about 70 ppm, about 0.75 ppm to about 75 ppm, about 0.75 ppm to about 80 ppm, about 0.75 ppm to about 85 ppm, about 0.75 ppm to about 90 ppm, about 0.75 ppm to about 95 ppm, about 0.75 ppm to about 100 ppm, about 1 ppm to about 20 ppm, about 1 ppm to about 25 ppm, about 1 ppm to about 30 ppm, about 1 ppm to about 35 ppm, about 1 ppm to about 40 ppm, about 1 ppm to about 45 ppm, about 1 ppm to about 50 ppm, about 1 ppm to about 55 ppm, about 1 ppm to about 60 ppm, about 1 ppm to about 65 ppm, about 1 ppm to about 70 ppm, about 1 ppm to about 75 ppm, about 1 ppm to about 80 ppm, about 1 ppm to about 85 ppm, about 1 ppm to about 90 ppm, about 1 ppm to about 95 ppm, about 1 ppm to about 100 ppm, about 5 ppm to about 20 ppm, about 5 ppm to about 25 ppm, about 5 ppm to about 30 ppm, about 5 ppm to about 35 ppm, about 5 ppm to about 40 ppm, about 5 ppm to about 45 ppm, about 5 ppm to about 50 ppm, about 5 ppm to about 55 ppm, about 5 ppm to about 60 ppm, about 5 ppm to about 65 ppm, about 5 ppm to about 70 ppm, about 5 ppm to about 75 ppm, about 5 ppm to about 80 ppm, about 5 ppm to about 85 ppm, about 5 ppm to about 90 ppm, about 5 ppm to about 95 ppm, about 5 ppm to about 100 ppm, about 10 ppm to about 20 ppm, about 10 ppm to about 25 ppm, about 10 ppm to about 30 ppm, about 10 ppm to about 35 ppm, about 10 ppm to about 40 ppm, about 10 ppm to about 45 ppm, about 10 ppm to about 50 ppm, about 10 ppm to about 55 ppm, about 10 ppm to about 60 ppm, about 10 ppm to about 65 ppm, about 10 ppm to about 70 ppm, about 10 ppm to about 75 ppm, about 10 ppm to about 80 ppm, about 10 ppm to about 85 ppm, about 10 ppm to about 90 ppm, about 10 ppm to about 95 ppm, or about 10 ppm to about 100 ppm or about 1 ppm to about 25 ppm, about 1 ppm to about 50 ppm, about 1 ppm to about 75 ppm, about 1 ppm to about 100 ppm, about 1 ppm to about 125 ppm, about 1 ppm to about 150 ppm, about 1 ppm to about 175 ppm, about 1 ppm to about 200 ppm, about 1 ppm to about 225 ppm, about 1 ppm to about 250 ppm, about 1 ppm to about 275 ppm, about 1 ppm to about 300 ppm, about 1 ppm to about 325 ppm, about 1 ppm to about 350 ppm, about 1 ppm to about 375 ppm, about 1 ppm to about 400 ppm, about 10 ppm to about 25 ppm, about 10 ppm to about 50 ppm, about 10 ppm to about 75 ppm, about 10 ppm to about 100 ppm, about 10 ppm to about 125 ppm, about 10 ppm to about 150 ppm, about 10 ppm to about 175 ppm, about 10 ppm to about 200 ppm, about 10 ppm to about 225 ppm, about 10 ppm to about 250 ppm, about 10 ppm to about 275 ppm, about 10 ppm to about 300 ppm, about 10 ppm to about 325 ppm, about 10 ppm to about 350 ppm, about 10 ppm to about 375 ppm, about 10 ppm to about 400 ppm, about 25 ppm to about 50 ppm, about 25 ppm to about 75 ppm, about 25 ppm to about 100 ppm, about 25 ppm to about 125 ppm, about 25 ppm to about 150 ppm, about 25 ppm to about 175 ppm, about 25 ppm to about 200 ppm, about 25 ppm to about 225 ppm, about 25 ppm to about 250 ppm, about 25 ppm to about 275 ppm, about 25 ppm to about 300 ppm, about 25 ppm to about 325 ppm, about 25 ppm to about 350 ppm, about 25 ppm to about 375 ppm, about 25 ppm to about 400 ppm, about 50 ppm to about 75 ppm, about 50 ppm to about 100 ppm, about 50 ppm to about 125 ppm, about 50 ppm to about 150 ppm, about 50 ppm to about 175 ppm, about 50 ppm to about 200 ppm, about 50 ppm to about 225 ppm, about 50 ppm to about 250 ppm, about 50 ppm to about 275 ppm, about 50 ppm to about 300 ppm, about 50 ppm to about 325 ppm, about 50 ppm to about 350 ppm, about 50 ppm to about 375 ppm, about 50 ppm to about 400 ppm, about 75 ppm to about 100 ppm, about 75 ppm to about 125 ppm, about 75 ppm to about 150 ppm, about 75 ppm to about 175 ppm, about 75 ppm to about 200 ppm, about 75 ppm to about 225 ppm, about 75 ppm to about 250 ppm, about 75 ppm to about 275 ppm, about 75 ppm to about 300 ppm, about 75 ppm to about 325 ppm, about 75 ppm to about 350 ppm, about 75 ppm to about 375 ppm, about 75 ppm to about 400 ppm, about 100 ppm to about 125 ppm, about 100 ppm to about 150 ppm, about 100 ppm to about 175 ppm, about 100 ppm to about 200 ppm, about 100 ppm to about 225 ppm, about 100 ppm to about 250 ppm, about 100 ppm to about 275 ppm, about 100 ppm to about 300 ppm, about 100 ppm to about 325 ppm, about 100 ppm to about 350 ppm, about 100 ppm to about 375 ppm, about 100 ppm to about 400 ppm, about 150 ppm to about 175 ppm, about 150 ppm to about 200 ppm, about 150 ppm to about 225 ppm, about 150 ppm to about 250 ppm, about 150 ppm to about 275 ppm, about 150 ppm to about 300 ppm, about 150 ppm to about 325 ppm, about 150 ppm to about 350 ppm, about 150 ppm to about 375 ppm, about 150 ppm to about 400 ppm, about 200 ppm to about 225 ppm, about 200 ppm to about 250 ppm, about 200 ppm to about 275 ppm, about 200 ppm to about 300 ppm, about 200 ppm to about 325 ppm, about 200 ppm to about 350 ppm, about 200 ppm to about 375 ppm, about 200 ppm to about 400 ppm, about 250 ppm to about 275 ppm, about 250 ppm to about 300 ppm, about 250 ppm to about 325 ppm, about 250 ppm to about 350 ppm, about 250 ppm to about 375 ppm, about 250 ppm to about 400 ppm, about 300 ppm to about 325 ppm, about 300 ppm to about 350 ppm, about 300 ppm to about 375 ppm, about 300 ppm to about 400 ppm, about 350 ppm to about 375 ppm, about 350 ppm to about 400 ppm, about 375 ppm to about 400 ppm, about 400 ppm to about 500 ppm, about 400 ppm to about 600 ppm, about 400 ppm to about 700 ppm, about 400 ppm to about 800 ppm, about 400 ppm to about 900 ppm, about 400 ppm to about 1,000 ppm, about 400 ppm to about 1,100 ppm, about 400 ppm to about 1,200 ppm, about 400 ppm to about 1,300 ppm, about 400 ppm to about 1,400 ppm, about 400 ppm to about 1,500 ppm, about 500 ppm to about 600 ppm, about 500 ppm to about 700 ppm, about 500 ppm to about 800 ppm, about 500 ppm to about 900 ppm, about 500 ppm to about 1,000 ppm, about 500 ppm to about 1,100 ppm, about 500 ppm to about 1,200 ppm, about 500 ppm to about 1,300 ppm, about 500 ppm to about 1,400 ppm, about 500 ppm to about 1,500 ppm, about 600 ppm to about 700 ppm, about 600 ppm to about 800 ppm, about 600 ppm to about 900 ppm, about 600 ppm to about 1,000 ppm, about 600 ppm to about 1,100 ppm, about 600 ppm to about 1,200 ppm, about 600 ppm to about 1,300 ppm, about 600 ppm to about 1,400 ppm, about 600 ppm to about 1,500 ppm, about 700 ppm to about 800 ppm, about 700 ppm to about 900 ppm, about 700 ppm to about 1,000 ppm, about 700 ppm to about 1,100 ppm, about 700 ppm to about 1,200 ppm, about 700 ppm to about 1,300 ppm, about 700 ppm to about 1,400 ppm, about 700 ppm to about 1,500 ppm, about 800 ppm to about 900 ppm, about 800 ppm to about 1,000 ppm, about 800 ppm to about 1,100 ppm, about 800 ppm to about 1,200 ppm, about 800 ppm to about 1,300 ppm, about 800 ppm to about 1,400 ppm, about 800 ppm to about 1,500 ppm, about 900 ppm to about 1,000 ppm, about 900 ppm to about 1,100 ppm, about 900 ppm to about 1,200 ppm, about 900 ppm to about 1,300 ppm, about 900 ppm to about 1,400 ppm, about 900 ppm to about 1,500 ppm, about 1,000 ppm to about 1,100 ppm, about 1,000 ppm to about 1,200 ppm, about 1,000 ppm to about 1,300 ppm, about 1,000 ppm to about 1,400 ppm, about 1,000 ppm to about 1,500 ppm, about 1,100 ppm to about 1,200 ppm, about 1,100 ppm to about 1,300 ppm, about 1,100 ppm to about 1,400 ppm, about 1,100 ppm to about 1,500 ppm, about 1,200 ppm to about 1,300 ppm, about 1,200 ppm to about 1,400 ppm, about 1,200 ppm to about 1,500 ppm, about 1,300 ppm to about 1,400 ppm, about 1,300 ppm to about 1,500 ppm, or about 1,400 ppm to about 1,500 ppm.

61. The kit according to any one of embodiments 45, 46, 48, 50 or 54, wherein the one or more guanide-containing compounds comprise, consist essentially of, or consist of a biguanide, a biguanide-containing compound, a biguanidine, a biguanidine-containing compound, a triguanide, a triguanide-containing compound, or any combination thereof.

62. The kit according to embodiment 61, wherein the one or more biguanide-containing compounds include a polyhexamethylene biguanide (PHMB), a polyaminopropyl biguanide (PAPB), a 1,1'-(1,6-Hexanediyl)bis{2-[N'-(2-ethylhexyl)carbamimidoyl]guanidine} (alexidine), a chlorhexidine, a chlorhexidine gluconate, or any combination thereof.

63. The kit according to any one of embodiments 45, 46, 48, 50, 54, 61 or 62, wherein the one or more guanide-containing compounds are in an amount of about 0.01%, about 0.05%, about 0.075%, about 0.1%, about 0.2%, about 0.3%, about 0.4%, about 0.5%, about 0.6%, about 0.7%, about 0.8%, about 0.9%, about 1.0%, about 1.5%, about 2.0%, about 2.5%, about 3.0%, about 4.0%, about 5.0%, about 6.0%, about 7.0%, about 7.5%, about 8.0%, about 9.0%, about 10.0%, about 11%, about 12%, about 13%, about 14%, about 15%, about 20%, about 25%, or about 30% by weight of the composition, or at least 0.01%, at least 0.05%, at least 0.075%, at least 0.1%, at least 0.25%, at least 0.5%, at least 0.75%, at least 1.0%, at least 1.5%, at least 2.0%, at least 2.5%, at least 3.0%, at least 4.0%, at least 5.0%, at least 6.0%, at least 7.0%, at least 7.5%, at least 8.0%, at least 9.0%, at least 10.0%, at least 11%, at least 12%, at least 13%, at least 14%, at least 15%, at least 20%, at least 25%, or at least 30% by weight of the composition, or at most 0.01%, at most 0.05%, at most 0.075%, at most 0.1%, at most 0.25%, at most 0.5%, at most 0.75%, at most 1.0%, at most 1.5%, at most 2.0%, at most 2.5%, at most 3.0%, at most 4.0%, at most 5.0%, at most 6.0%, at most 7.5%, at most 8.0%, at most 9.0%, at most 10.0%, at most 11%, at most 12%, at most 13%, at most 14%, at most 15%, at most 20%, at most 25%, or at most 30% by weight of the composition, or about 0.1% to about 0.5%, about 0.1% to about 0.75%, about 0.1% to about 1.0%, about 0.1% to about 1.5%, about 0.1% to about 2.0%, about 0.1% to about 2.5%, about 0.1% to about 3.0%, about 0.1% to about 3.5%, about 0.1% to about 4.0%, about 0.1% to about 4.5%, about 0.1% to about 5.0%, about 0.2% to about 0.5%, about 0.2% to about 0.75%, about 0.2% to about 1.0%, about 0.2% to about 1.5%, about 0.2% to about 2.0%, about 0.2% to about 2.5%, about 0.2% to about 3.0%, about 0.2% to about 3.5%, about 0.2% to about 4.0%, about 0.2% to about 4.5%, about 0.2% to about 5.0%, about 0.5% to about 1.0%, about 0.5% to about 1.5%, about 0.5% to about 2.0%, about 0.5% to about 2.5%, about 0.5% to about 3.0%, about 0.5% to about 4.0%, about 0.5% to about 5.0%, about 0.5% to about 6.0%, about 0.5% to about 7.0%, about 0.5% to about 8.0%, about 0.5% to about 9.0%, about 0.5% to about 10.0%, about 1.0% to about 2.5%, about 1.0% to about 3.0%, about 1.0% to about 4.0%, about 1.0% to about 5.0%, about 1.0% to about 6.0%, about 1.0% to about 7.0%, about 1.0% to about 7.5%, about 1.0% to about 8.0%, about 1.0% to about 9.0%, about 1.0% to about 10.0%, about 1.0% to about 15.0%, about 1.0% to about 20.0%, about 1.0% to about 25.0%, about 1.0% to about 30.0%, about 2.0% to about 2.5%, about 2.0% to about 3.0%, about 2.0% to about 4.0%, about 2.0% to about 5.0%, about 2.0% to about 6.0%, about 2.0% to about 7.0%, about 2.0% to about 7.5%, about 2.0% to about 8.0%, about 2.0% to about 9.0%, about 2.0% to about 10.0%, about 2.0% to about 15.0%, about 2.0% to about 20.0%, about 2.0% to about 25.0%, about 2.0% to about 30.0%, about 5.0% to about 6.0%, about 5.0% to about 7.0%, about 5.0% to about 7.5%, about 5.0% to about 8.0%, about 5.0% to about 9.0%, about 5.0% to about 10.0%, about 5.0% to about 11.0%, about 5.0% to about 12.0%, about 5.0% to about 13.0%, about 5.0% to about 14.0%, about 5.0% to about 15.0%, about 5.0% to about 20.0%, about 5.0% to about 25.0%, about 5.0% to about 30.0%, about 10.0% to about 15.0%, about 10.0% to about 20.0%, about 10.0% to about 25.0%, about 10.0% to about 30.0%, about 15.0% to about 20.0%, about 15.0% to about 25.0%, about 15.0% to about 30.0%, about 20.0% to about 25.0%, about 20.0% to about 30.0%, or about 20.0% to about 30.0%, by weight of the composition.

64. The kit according to any one of embodiments 45, 46, 49, 50 or 54, wherein the one or more alcohols include methanol, ethanol, propanol, isopropanol, butanol, pentanol, and/or 1-hexadecanol.

65. The kit according to any one of embodiments 45, 46, 49, 50, 54 or 64, wherein the one or more alcohols are in an amount of about 0.5%, about 1%, about 2%, about 3%, about 4%, about 5%, about 6%, about 7%, about 8%, about 9%, about 10%, about 11%, about 12%, about 13%, about 14%, about 15%, about 20%, about 25%, about 30%, about 35%, about 40%, about 45%, about 50%, about 55%, about 60%, about 65%, about 70%, about 75%, about 80%, about 85%, about 90%, about 95%, about 96%, about 97%, about 98%, or about 99%, by weight of the composition, or at least 0.5%, at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 96%, at least 97%, at least 98%, or at least 99%, by weight of the composition, or at most 0.5%, at most 1%, at most 2%, at most 3%, at most 4%, at most 5%, at most 6%, at most 7%, at most 8%, at most 9%, at most 10%, at most 11%, at most 12%, at most 13%, at most 14%, at most 15%, at most 20%, at most 25%, at most 30%, at most 35%, at most 40%, at most 45%, at most 50%, at most 55%, at most 60%, at most 65%, at most 70%, at most 75%, at most 80%, at most 85%, at most 90%, at most 95%, at most 96%, at most 97%, at most 98%, or at most 99%, by weight of the composition, about 0.05% to about 0.75%, about 0.05% to about 1.0%, about 0.05% to about 1.5%, about 0.05% to about 2.0%, about 0.05% to about 2.5%, about 0.1% to about 0.5%, about 0.1% to about 0.75%, about 0.1% to about 1.0%, about 0.1% to about 1.5%, about 0.1% to about 2.0%, about 0.1% to about 2.5%, about 0.1% to about 3.0%, about 0.1% to about 4.0%, about 0.1% to about 5.0%, about 0.2% to about 0.5%, about 0.2% to about 0.75%, about 0.2% to about 1.0%, about 0.2% to about 1.5%, about 0.2% to about 2.0%, about 0.2% to about 2.5%, about 0.2% to about 3.0%, about 0.2% to about 4.0%, about 0.2% to about 5.0%, about 0.5% to about 1.0%, about 0.5% to about 1.5%, about 0.5% to about 2.0%, about 0.5% to about 2.5%, about 0.5% to about 3.0%, about 0.5% to about 4.0%, about 0.5% to about 5.0%, about 0.5% to about 6.0%, about 0.5% to about 7.0%, about 0.5% to about 8.0%, about 0.5% to about 9.0%, about 0.5% to about 10.0%, about 1.0% to about 2.5%, about 1.0% to about 3.0%, about 1.0% to about 4.0%, about 1.0% to about 5.0%, about 1.0% to about 6.0%, about 1.0% to about 7.0%, about 1.0% to about 7.5%, about 1.0% to about 8.0%, about 1.0% to about 9.0%, about 1.0% to about 10.0%, about 2.0% to about 2.5%, about 2.0% to about 3.0%, about 2.0% to about 4.0%, about 2.0% to about 5.0%, about 2.0% to about 6.0%, about 2.0% to about 7.0%, about 2.0% to about 7.5%, about 2.0% to about 8.0%, about 2.0% to about 9.0%, about 2.0% to about 10.0%, about 5.0% to about 6.0%, about 5.0% to about 7.0%, about 5.0% to about 7.5%, about 5.0% to about 8.0%, about 5.0% to about 9.0%, about 5.0% to about 10.0%, about 5.0% to about 11.0%, about 5.0% to about 12.0%, about 5.0% to about 13.0%, about 5.0% to about 14.0% or about 5.0% to about 15.0% by weight of the composition, or about 10% to about 20%, about 10% to about 30%, about 10% to about 40%, about 10% to about 50%, about 10% to about 60%, about 10% to about 70%, about 10% to about 80%, about 10% to about 90%, about 10% to about 95%, about 10% to about 97%, about 10% to about 99%, about 20% to about 30%, about 20% to about 40%, about 20% to about 50%, about 20% to about 60%, about 20% to about 70%, about 20% to about 80%, about 20% to about 90%, about 20% to about 95%, about 20% to about 97%, about 20% to about 99%, about 30% to about 40%, about 30% to about 50%, about 30% to about 60%, about 30% to about 70%, about 30% to about 80%, about 30% to about 90%, about 30% to about 95%, about 30% to about 97%, about 30% to about 99%, about 40% to about 50%, about 40% to about 60%, about 40% to about 70%, about 40% to about 80%, about 40% to about 90%, about 40% to about 95%, about 40% to about 97%, about 40% to about 99%, about 50% to about 60%, about 50% to about 70%, about 50% to about 80%, about 50% to about 90%, about 50% to about 95%, about 50% to about 97%, about 50% to about 99%, about 60% to about 70%, about 60% to about 80%, about 60% to about 90%, about 60% to about 95%, about 60% to about 97%, about 60% to about 99%, about 70% to about 80%, about 70% to about 90%, about 70% to about 95%, about 70% to about 97%, about 70% to about 99%, about 80% to about 90%, about 80% to about 95%, about 80% to about 97%, about 80% to about 99%, about 90% to about 95%, about 90% to about 97%, about 90% to about 99%, by weight of the composition.

66. The kit according to any one of embodiments 45, 46, 51, 53, or 54, wherein the one or more metallic particles include a metal acetate particle, a metal chloride particle, a metal nitrate particle, or a metal oxide particle, or any combination thereof.

67. The kit according to any one of embodiments 45, 46, 51, 53, 54 or 66, wherein the one or more metallic particles are in an amount of 0.05 ppm, 0.10 ppm, 0.15 ppm, 0.20 ppm, 0.25 ppm, 0.30 ppm, 0.35 ppm, 0.40 ppm, 0.45 ppm, 0.50 ppm, 0.55 ppm, 0.60 ppm, 0.65 ppm, 0.70 ppm, 0.75 ppm, 0.80 ppm, 0.85 ppm, 0.90 ppm, 0.95 ppm, 1 ppm, 5 ppm, 10 ppm, 15 ppm, 20 ppm, 25 ppm, 30 ppm, 35 ppm, 40 ppm, 45 ppm, 50 ppm, 55 ppm, 60 ppm, 65 ppm, 70 ppm, 75 ppm, 80 ppm, 85 ppm, 90 ppm, 95 ppm, 100 ppm, 125 ppm, 150 ppm, 175 ppm, 200 ppm, 225 ppm, 250 ppm, 275 ppm, 300 ppm, 325 ppm, 350 ppm, 375 ppm, 400 ppm, 425 ppm, 450 ppm, 475 ppm, 500 ppm, 525 ppm, 550 ppm, 575 ppm, 600 ppm, 625 ppm, 650 ppm, 675 ppm, 700 ppm, 725 ppm, 750 ppm, 775 ppm, 800 ppm, 825 ppm, 850 ppm, 875 ppm, 900 ppm, 925 ppm, 950 ppm, 975 ppm, 1,000 ppm, 1,025 ppm, 1,050 ppm, 1075 ppm, 1,100 ppm, 1,125 ppm, 1,150 ppm, 1,175 ppm, 1,200 ppm, 1,225 ppm, 1,250 ppm, 1,275 ppm, 1,300 ppm, 1,325 ppm, 1,350 ppm, 1,375 ppm, 1,400 ppm, 1,425 ppm, 1,450 ppm, 1,475 ppm, 1,500 ppm, 1,600 ppm, 1,700 ppm, 1,800 ppm, 1,900 ppm, or 2,000 ppm or at least 0.05 ppm, at least 0.10 ppm, at least 0.20 ppm, at least 0.30 ppm, at least 0.40 ppm, at least 0.50 ppm, at least 0.60 ppm, at least 0.70 ppm, at least 0.80 ppm, at least 0.90 ppm, at least 1 ppm, at least 10 ppm, at least 20 ppm, at least 30 ppm, at least 40 ppm, at least 50 ppm, at least 60 ppm, at least 70 ppm, at least 80 ppm, at least 90 ppm, at least 100 ppm, at least 125 ppm, at least 150 ppm, at least 175 ppm, at least 200 ppm, at least 225 ppm, at least 250 ppm, at least 275 ppm, at least 300 ppm, at least 325 ppm, at least 350 ppm, at least 375 ppm, at least 400 ppm, at least 425 ppm, at least 450 ppm, at least 475 ppm, at least 500 ppm, at least 525 ppm, at least 550 ppm, at least 575 ppm, at least 600 ppm, at least 625 ppm, at least 650 ppm, at least 675 ppm, at least 700 ppm, at least 725 ppm, at least 750 ppm, at least 775 ppm, at least 800 ppm, at least 825 ppm, at least 850 ppm, at least 875 ppm, at least 900 ppm, at least 925 ppm, at least 950 ppm, at least 975 ppm, at least 1,000 ppm, at least 1,025 ppm, at least 1,050 ppm, at least 1075 ppm, at least 1,100 ppm, at least 1,125 ppm, at least 1,150 ppm, at least 1,175 ppm, at least 1,200 ppm, at least 1,225 ppm, at least 1,250 ppm, at least 1,275 ppm, at least 1,300 ppm, at least 1,325 ppm, at least 1,350 ppm, at least 1,375 ppm, at least 1,400 ppm, at least 1,425 ppm, at least 1,450 ppm, at least 1,475 ppm, at least 1,500 ppm, at least 1,600 ppm, at least 1,700 ppm, at least 1,800 ppm, at least 1,900 ppm, or at least 2,000 ppm or at most 0.05 ppm, at most 0.10 ppm, at most 0.20 ppm, at most 0.30 ppm, at most 0.40 ppm, at most 0.50 ppm, at most 0.60 ppm, at most 0.70 ppm, at most 0.80 ppm, at most 0.90 ppm, at most 1 ppm, at most 10 ppm, at most 20 ppm, at most 30 ppm, at most 40 ppm, at most 50 ppm, at most 60 ppm, at most 70 ppm, at most 80 ppm, at most 90 ppm, at most 100 ppm, at most 125 ppm, at most 150 ppm, at most 175 ppm, at most 200 ppm, at most 225 ppm, at most 250 ppm, at most 275 ppm, at most 300 ppm, at most 325 ppm, at most 350 ppm, at most 375 ppm, at most 400 ppm, at most 425 ppm, at most 450 ppm, at most 475 ppm, at most 500 ppm, at most 525 ppm, at most 550 ppm, at most 575 ppm, at most 600 ppm, at most 625 ppm, at most 650 ppm, at most 675 ppm, at most 700 ppm, at most 725 ppm, at most 750 ppm, at most 775 ppm, at most 800 ppm, at most 825 ppm, at most 850 ppm, at most 875 ppm, at most 900 ppm, at most 925 ppm, at most 950 ppm, at most 975 ppm, at most 1,000 ppm, at most 1,025 ppm, at most 1,050 ppm, at most 1075 ppm, at most 1,100 ppm, at most 1,125 ppm, at most 1,150 ppm, at most 1,175 ppm, at most 1,200 ppm, at most 1,225 ppm, at most 1,250 ppm, at most 1,275 ppm, at most 1,300 ppm, at most 1,325 ppm, at most 1,350 ppm, at most 1,375 ppm, at most 1,400 ppm, at most 1,425 ppm, at most 1,450 ppm, at most 1,475 ppm, at most 1,500 ppm, at most 1,600 ppm, at most 1,700 ppm, at most 1,800 ppm, at most 1,900 ppm, or at most 2,000 ppm or about 0.5 ppm to about 20 ppm, about 0.5 ppm to about 25 ppm, about 0.5 ppm to about 30 ppm, about 0.5 ppm to about 35 ppm, about 0.5 ppm to about 40 ppm, about 0.5 ppm to about 45 ppm, about 0.5 ppm to about 50 ppm, about 0.5 ppm to about 55 ppm, about 0.5 ppm to about 60 ppm, about 0.5 ppm to about 65 ppm, about 0.5 ppm to about 70 ppm, about 0.5 ppm to about 75 ppm, about 0.5 ppm to about 80 ppm, about 0.5 ppm to about 85 ppm, about 0.5 ppm to about 90 ppm, about 0.5 ppm to about 95 ppm, about 0.5 ppm to about 100 ppm, about 0.75 ppm to about 20 ppm, about 0.75 ppm to about 25 ppm, about 0.75 ppm to about 30 ppm, about 0.75 ppm to about 35 ppm, about 0.75 ppm to about 40 ppm, about 0.75 ppm to about 45 ppm, about 0.75 ppm to about 50 ppm, about 0.75 ppm to about 55 ppm, about 0.75 ppm to about 60 ppm, about 0.75 ppm to about 65 ppm, about 0.75 ppm to about 70 ppm, about 0.75 ppm to about 75 ppm, about 0.75 ppm to about 80 ppm, about 0.75 ppm to about 85 ppm, about 0.75 ppm to about 90 ppm, about 0.75 ppm to about 95 ppm, about 0.75 ppm to about 100 ppm, about 1 ppm to about 20 ppm, about 1 ppm to about 25 ppm, about 1 ppm to about 30 ppm, about 1 ppm to about 35 ppm, about 1 ppm to about 40 ppm, about 1 ppm to about 45 ppm, about 1 ppm to about 50 ppm, about 1 ppm to about 55 ppm, about 1 ppm to about 60 ppm, about 1 ppm to about 65 ppm, about 1 ppm to about 70 ppm, about 1 ppm to about 75 ppm, about 1 ppm to about 80 ppm, about 1 ppm to about 85 ppm, about 1 ppm to about 90 ppm, about 1 ppm to about 95 ppm, about 1 ppm to about 100 ppm, about 5 ppm to about 20 ppm, about 5 ppm to about 25 ppm, about 5 ppm to about 30 ppm, about 5 ppm to about 35 ppm, about 5 ppm to about 40 ppm, about 5 ppm to about 45 ppm, about 5 ppm to about 50 ppm, about 5 ppm to about 55 ppm, about 5 ppm to about 60 ppm, about 5 ppm to about 65 ppm, about 5 ppm to about 70 ppm, about 5 ppm to about 75 ppm, about 5 ppm to about 80 ppm, about 5 ppm to about 85 ppm, about 5 ppm to about 90 ppm, about 5 ppm to about 95 ppm, about 5 ppm to about 100 ppm, about 10 ppm to about 20 ppm, about 10 ppm to about 25 ppm, about 10 ppm to about 30 ppm, about 10 ppm to about 35 ppm, about 10 ppm to about 40 ppm, about 10 ppm to about 45 ppm, about 10 ppm to about 50 ppm, about 10 ppm to about 55 ppm, about 10 ppm to about 60 ppm, about 10 ppm to about 65 ppm, about 10 ppm to about 70 ppm, about 10 ppm to about 75 ppm, about 10 ppm to about 80 ppm, about 10 ppm to about 85 ppm, about 10 ppm to about 90 ppm, about 10 ppm to about 95 ppm, or about 10 ppm to about 100 ppm, about 1 ppm to about 25 ppm, about 1 ppm to about 50 ppm, about 1 ppm to about 75 ppm, about 1 ppm to about 100 ppm, about 1 ppm to about 125 ppm, about 1 ppm to about 150 ppm, about 1 ppm to about 175 ppm, about 1 ppm to about 200 ppm, about 1 ppm to about 225 ppm, about 1 ppm to about 250 ppm, about 1 ppm to about 275 ppm, about 1 ppm to about 300 ppm, about 1 ppm to about 325 ppm, about 1 ppm to about 350 ppm, about 1 ppm to about 375 ppm, about 1 ppm to about 400 ppm, about 10 ppm to about 25 ppm, about 10 ppm to about 50 ppm, about 10 ppm to about 75 ppm, about 10 ppm to about 100 ppm, about 10 ppm to about 125 ppm, about 10 ppm to about 150 ppm, about 10 ppm to about 175 ppm, about 10 ppm to about 200 ppm, about 10 ppm to about 225 ppm, about 10 ppm to about 250 ppm, about 10 ppm to about 275 ppm, about 10 ppm to about 300 ppm, about 10 ppm to about 325 ppm, about 10 ppm to about 350 ppm, about 10 ppm to about 375 ppm, about 10 ppm to about 400 ppm, about 25 ppm to about 50 ppm, about 25 ppm to about 75 ppm, about 25 ppm to about 100 ppm, about 25 ppm to about 125 ppm, about 25 ppm to about 150 ppm, about 25 ppm to about 175 ppm, about 25 ppm to about 200 ppm, about 25 ppm to about 225 ppm, about 25 ppm to about 250 ppm, about 25 ppm to about 275 ppm, about 25 ppm to about 300 ppm, about 25 ppm to about 325 ppm, about 25 ppm to about 350 ppm, about 25 ppm to about 375 ppm, about 25 ppm to about 400 ppm, about 50 ppm to about 75 ppm, about 50 ppm to about 100 ppm, about 50 ppm to about 125 ppm, about 50 ppm to about 150 ppm, about 50 ppm to about 175 ppm, about 50 ppm to about 200 ppm, about 50 ppm to about 225 ppm, about 50 ppm to about 250 ppm, about 50 ppm to about 275 ppm, about 50 ppm to about 300 ppm, about 50 ppm to about 325 ppm, about 50 ppm to about 350 ppm, about 50 ppm to about 375 ppm, about 50 ppm to about 400 ppm, about 75 ppm to about 100 ppm, about 75 ppm to about 125 ppm, about 75 ppm to about 150 ppm, about 75 ppm to about 175 ppm, about 75 ppm to about 200 ppm, about 75 ppm to about 225 ppm, about 75 ppm to about 250 ppm, about 75 ppm to about 275 ppm, about 75 ppm to about 300 ppm, about 75 ppm to about 325 ppm, about 75 ppm to about 350 ppm, about 75 ppm to about 375 ppm, about 75 ppm to about 400 ppm, about 100 ppm to about 125 ppm, about 100 ppm to about 150 ppm, about 100 ppm to about 175 ppm, about 100 ppm to about 200 ppm, about 100 ppm to about 225 ppm, about 100 ppm to about 250 ppm, about 100 ppm to about 275 ppm, about 100 ppm to about 300 ppm, about 100 ppm to about 325 ppm, about 100 ppm to about 350 ppm, about 100 ppm to about 375 ppm, about 100 ppm to about 400 ppm, about 150 ppm to about 175 ppm, about 150 ppm to about 200 ppm, about 150 ppm to about 225 ppm, about 150 ppm to about 250 ppm, about 150 ppm to about 275 ppm, about 150 ppm to about 300 ppm, about 150 ppm to about 325 ppm, about 150 ppm to about 350 ppm, about 150 ppm to about 375 ppm, about 150 ppm to about 400 ppm, about 200 ppm to about 225 ppm, about 200 ppm to about 250 ppm, about 200 ppm to about 275 ppm, about 200 ppm to about 300 ppm, about 200 ppm to about 325 ppm, about 200 ppm to about 350 ppm, about 200 ppm to about 375 ppm, about 200 ppm to about 400 ppm, about 200 ppm to about 425 ppm, about 200 ppm to about 450 ppm, about 200 ppm to about 475 ppm, about 200 ppm to about 500 ppm, about 200 ppm to about 525 ppm, about 200 ppm to about 550 ppm, about 200 ppm to about 575 ppm, about 200 ppm to about 600 ppm, about 250 ppm to about 275 ppm, about 250 ppm to about 300 ppm, about 250 ppm to about 325 ppm, about 250 ppm to about 350 ppm, about 250 ppm to about 375 ppm, about 250 ppm to about 400 ppm, about 250 ppm to about 425 ppm, about 250 ppm to about 450 ppm, about 250 ppm to about 475 ppm, about 250 ppm to about 500 ppm, about 250 ppm to about 525 ppm, about 250 ppm to about 550 ppm, about 250 ppm to about 575 ppm, about 250 ppm to about 600 ppm, about 300 ppm to about 325 ppm, about 300 ppm to about 350 ppm, about 300 ppm to about 375 ppm, about 300 ppm to about 400 ppm, about 300 ppm to about 425 ppm, about 300 ppm to about 450 ppm, about 300 ppm to about 475 ppm, about 300 ppm to about 500 ppm, about 300 ppm to about 525 ppm, about 300 ppm to about 550 ppm, about 300 ppm to about 575 ppm, about 300 ppm to about 600 ppm, about 350 ppm to about 375 ppm, about 350 ppm to about 400 ppm, about 375 ppm to about 400 ppm, about 350 ppm to about 425 ppm, about 350 ppm to about 450 ppm, about 350 ppm to about 475 ppm, about 350 ppm to about 500 ppm, about 350 ppm to about 525 ppm, about 350 ppm to about 550 ppm, about 350 ppm to about 575 ppm, about 350 ppm to about 600 ppm, about 400 ppm to about 500 ppm, about 400 ppm to about 600 ppm, about 400 ppm to about 700 ppm, about 400 ppm to about 800 ppm, about 400 ppm to about 900 ppm, about 400 ppm to about 1,000 ppm, about 400 ppm to about 1,100 ppm, about 400 ppm to about 1,200 ppm, about 400 ppm to about 1,300 ppm, about 400 ppm to about 1,400 ppm, about 400 ppm to about 1,500 ppm, about 400 ppm to about 1,600 ppm, about 400 ppm to about 1,700 ppm, about 400 ppm to about 1,800 ppm, about 400 ppm to about 1,900 ppm, about 400 ppm to about 2,000 ppm, about 500 ppm to about 600 ppm, about 500 ppm to about 700 ppm, about 500 ppm to about 800 ppm, about 500 ppm to about 900 ppm, about 500 ppm to about 1,000 ppm, about 500 ppm to about 1,100 ppm, about 500 ppm to about 1,200 ppm, about 500 ppm to about 1,300 ppm, about 500 ppm to about 1,400 ppm, about 500 ppm to about 1,500 ppm, about 500 ppm to about 1,600 ppm, about 500 ppm to about 1,700 ppm, about 500 ppm to about 1,800 ppm, about 500 ppm to about 1,900 ppm, about 500 ppm to about 2,000 ppm, about 600 ppm to about 700 ppm, about 600 ppm to about 800 ppm, about 600 ppm to about 900 ppm, about 600 ppm to about 1,000 ppm, about 600 ppm to about 1,100 ppm, about 600 ppm to about 1,200 ppm, about 600 ppm to about 1,300 ppm, about 600 ppm to about 1,400 ppm, about 600 ppm to about 1,500 ppm, about 600 ppm to about 1,600 ppm, about 600 ppm to about 1,700 ppm, about 600 ppm to about 1,800 ppm, about 600 ppm to about 1,900 ppm, about 600 ppm to about 2,000 ppm, about 700 ppm to about 800 ppm, about 700 ppm to about 900 ppm, about 700 ppm to about 1,000 ppm, about 700 ppm to about 1,100 ppm, about 700 ppm to about 1,200 ppm, about 700 ppm to about 1,300 ppm, about 700 ppm to about 1,400 ppm, about 700 ppm to about 1,500 ppm, about 700 ppm to about 1,600 ppm, about 700 ppm to about 1,700 ppm, about 700 ppm to about 1,800 ppm, about 700 ppm to about 1,900 ppm, about 700 ppm to about 2,000 ppm, about 800 ppm to about 900 ppm, about 800 ppm to about 1,000 ppm, about 800 ppm to about 1,100 ppm, about 800 ppm to about 1,200 ppm, about 800 ppm to about 1,300 ppm, about 800 ppm to about 1,400 ppm, about 800 ppm to about 1,500 ppm, about 800 ppm to about 1,600 ppm, about 800 ppm to about 1,700 ppm, about 800 ppm to about 1,800 ppm, about 800 ppm to about 1,900 ppm, about 800 ppm to about 2,000 ppm, about 900 ppm to about 1,000 ppm, about 900 ppm to about 1,100 ppm, about 900 ppm to about 1,200 ppm, about 900 ppm to about 1,300 ppm, about 900 ppm to about 1,400 ppm, about 900 ppm to about 1,500 ppm, about 900 ppm to about 1,600 ppm, about 900 ppm to about 1,700 ppm, about 900 ppm to about 1,800 ppm, about 900 ppm to about 1,900 ppm, about 900 ppm to about 2,000 ppm, about 1,000 ppm to about 1,100 ppm, about 1,000 ppm to about 1,200 ppm, about 1,000 ppm to about 1,300 ppm, about 1,000 ppm to about 1,400 ppm, about 1,000 ppm to about 1,500 ppm, about 1,000 ppm to about 1,600 ppm, about 1,000 ppm to about 1,700 ppm, about 1,000 ppm to about 1,800 ppm, about 1,000 ppm to about 1,900 ppm, about 1,000 ppm to about 2,000 ppm, about 1,100 ppm to about 1,200 ppm, about 1,100 ppm to about 1,300 ppm, about 1,100 ppm to about 1,400 ppm, about 1,100 ppm to about 1,500 ppm, about 1,100 ppm to about 1,600 ppm, about 1,100 ppm to about 1,700 ppm, about 1,100 ppm to about 1,800 ppm, about 1,100 ppm to about 1,900 ppm, about 1,100 ppm to about 2,000 ppm, about 1,200 ppm to about 1,300 ppm, about 1,200 ppm to about 1,400 ppm, about 1,200 ppm to about 1,500 ppm, about 1,200 ppm to about 1,600 ppm, about 1,200 ppm to about 1,700 ppm, about 1,200 ppm to about 1,800 ppm, about 1,200 ppm to about 1,900 ppm, about 1,200 ppm to about 2,000 ppm, about 1,300 ppm to about 1,400 ppm, about 1,300 ppm to about 1,500 ppm, about 1,300 ppm to about 1,600 ppm, about 1,300 ppm to about 1,700 ppm, about 1,300 ppm to about 1,800 ppm, about 1,300 ppm to about 1,900 ppm, about 1,300 ppm to about 2,000 ppm, about 1,400 ppm to about 1,500 ppm, about 1,400 ppm to about 1,600 ppm, about 1,400 ppm to about 1,700 ppm, about 1,400 ppm to about 1,800 ppm, about 1,400 ppm to about 1,900 ppm, about 1,400 ppm to about 2,000 ppm, about 1,500 ppm to about 1,600 ppm, about 1,500 ppm to about 1,700 ppm, about 1,500 ppm to about 1,800 ppm, about 1,500 ppm to about 1,900 ppm, about 1,500 ppm to about 2,000 ppm, about 1,600 ppm to about 1,700 ppm, about 1,600 ppm to about 1,800 ppm, about 1,600 ppm to about 1,900 ppm, about 1,600 ppm to about 2,000 ppm, about 1,700 ppm to about 1,800 ppm, about 1,700 ppm to about 1,900 ppm, about 1,700 ppm to about 2,000 ppm, about 1,800 ppm to about 1,900 ppm, about 1,800 ppm to about 2,000 ppm, or about 1,900 ppm to about 2,000 ppm.

68. The kit according to any one of embodiments 45, 46, 51, 53, 54 or 66, wherein the one or more metallic particles are in an amount of about 0.10%, about 0.11%, about 0.12%, about 0.13%, about 0.14%, about 0.15%, about 0.16%, about 0.17%, about 0.18%, about 0.19%, about 0.2%, about 0.25%, about 0.3%, about 0.35%, about 0.4%, about 0.45%, or about 0.5% by weight of the composition, or at least 0.10%, at least 0.11%, at least 0.12%, at least 0.13%, at least 0.14%, at least 0.15%, at least 0.16%, at least 0.17%, at least 0.18%, at least 0.19%, at least 0.2%, at least 0.25%, at least 0.3%, at least 0.35%, at least 0.4%, at least 0.45%, or at least 0.5% by weight of the composition, or at most 0.10%, at most 0.11%, at most 0.12%, at most 0.13%, at most 0.14%, at most 0.15%, at most 0.16%, at most 0.17%, at most 0.18%, at most 0.19%, at most 0.2%, at most 0.25%, at most 0.3%, at most 0.35%, at most 0.4%, at most 0.45%, or at most 0.5% by weight of the composition, or about 0.10% to about 0.15%, about 0.10% to about 0.20%, about 0.10% to about 0.25%, about 0.10% to about 0.30%, about 0.10% to about 0.35%, about 0.10% to about 0.40%, about 0.10% to about 0.45%, about 0.10% to about 0.50%, about 0.20% to about 0.25%, about 0.20% to about 0.30%, about 0.20% to about 0.35%, about 0.20% to about 0.40%, about 0.20% to about 0.45%, about 0.20% to about 0.50%, about 0.30% to about 0.35%, about 0.30% to about 0.40%, about 0.30% to about 0.45%, about 0.30% to about 0.50%, about 0.40% to about 0.45%, about 0.40% to about 0.50%, or about 0.40% to about 0.50% by weight of the composition.

69. The kit according to any one of embodiments 45, 46, 51, 53, 54 or 66-68, wherein the one or more metallic particles have a mean diameter of about 10 nm, about 20 nm, about 30 nm, about 40 nm, about 50 nm, about 60 nm, about 70 nm, about 80 nm, about 90 nm, about 100 nm, or at least 10 nm, at least 20 nm, at least 30 nm, at least 40 nm, at least 50 nm, at least 60 nm, at least 70 nm, at least 80 nm, at least 90 nm, at least 100 nm, or at most 10 nm, at most 20 nm, at most 30 nm, at most 40 nm, at most 50 nm, at most 60 nm, at most 70 nm, at most 80 nm, at most 90 nm, at most 100 nm, or about 10 nm to about 20 nm, about 10 nm to about 30 nm, about 10 nm to about 40 nm, about 10 nm to about 50 nm, about 10 nm to about 60 nm, about 10 nm to about 70 nm, about 10 nm to about 80 nm, about 10 nm to about 90 nm, about 10 nm to about 100 nm, about 20 nm to about 30 nm, about 20 nm to about 40 nm, about 20 nm to about 50 nm, about 20 nm to about 60 nm, about 20 nm to about 70 nm, about 20 nm to about 80 nm, about 20 nm to about 90 nm, about 20 nm to about 100 nm, about 30 nm to about 40 nm, about 30 nm to about 50 nm, about 30 nm to about 60 nm, about 30 nm to about 70 nm, about 30 nm to about 80 nm, about 30 nm to about 90 nm, about 30 nm to about 100 nm, about 40 nm to about 50 nm, about 40 nm to about 60 nm, about 40 nm to about 70 nm, about 40 nm to about 80 nm, about 40 nm to about 90 nm, about 40 nm to about 100 nm, about 50 nm to about 60 nm, about 50 nm to about 70 nm, about 50 nm to about 80 nm, about 50 nm to about 90 nm, about 50 nm to about 100 nm, about 60 nm to about 70 nm, about 60 nm to about 80 nm, about 60 nm to about 90 nm, about 60 nm to about 100 nm, about 70 nm to about 80 nm, about 70 nm to about 90 nm, about 70 nm to about 100 nm, about 80 nm to about 90 nm, about 80 nm to about 100 nm, or about 90 nm to about 100 nm.

70. The kit according to any one of embodiments 45, 46, or 53-54, wherein the one or more metal salts include copper chloride, iron chloride, titanium chloride, zinc chloride, silver nitrate, or any combination thereof.

71. The kit according to any one of embodiments 45, 46, 53-54 or 70, wherein the one or more metal salts are in an amount of 0.05 ppm, 0.10 ppm, 0.15 ppm, 0.20 ppm, 0.25 ppm, 0.30 ppm, 0.35 ppm, 0.40 ppm, 0.45 ppm, 0.50 ppm, 0.55 ppm, 0.60 ppm, 0.65 ppm, 0.70 ppm, 0.75 ppm, 0.80 ppm, 0.85 ppm, 0.90 ppm, 0.95 ppm, 1 ppm, 5 ppm, 10 ppm, 15 ppm, 20 ppm, 25 ppm, 30 ppm, 35 ppm, 40 ppm, 45 ppm, 50 ppm, 55 ppm, 60 ppm, 65 ppm, 70 ppm, 75 ppm, 80 ppm, 85 ppm, 90 ppm, 95 ppm, 100 ppm, 125 ppm, 150 ppm, 175 ppm, 200 ppm, 225 ppm, 250 ppm, 275 ppm, 300 ppm, 325 ppm, 350 ppm, 375 ppm, 400 ppm, 425 ppm, 450 ppm, 475 ppm, 500 ppm, 525 ppm, 550 ppm, 575 ppm, 600 ppm, 625 ppm, 650 ppm, 675 ppm, 700 ppm, 725 ppm, 750 ppm, 775 ppm, 800 ppm, 825 ppm, 850 ppm, 875 ppm, 900 ppm, 925 ppm, 950 ppm, 975 ppm, 1,000 ppm, 1,025 ppm, 1,050 ppm, 1075 ppm, 1,100 ppm, 1,125 ppm, 1,150 ppm, 1,175 ppm, 1,200 ppm, 1,225 ppm, 1,250 ppm, 1,275 ppm, 1,300 ppm, 1,325 ppm, 1,350 ppm, 1,375 ppm, 1,400 ppm, 1,425 ppm, 1,450 ppm, 1,475 ppm, 1,500 ppm, 1,600 ppm, 1,700 ppm, 1,800 ppm, 1,900 ppm, or 2,000 ppm or at least 0.05 ppm, at least 0.10 ppm, at least 0.20 ppm, at least 0.30 ppm, at least 0.40 ppm, at least 0.50 ppm, at least 0.60 ppm, at least 0.70 ppm, at least 0.80 ppm, at least 0.90 ppm, at least 1 ppm, at least 10 ppm, at least 20 ppm, at least 30 ppm, at least 40 ppm, at least 50 ppm, at least 60 ppm, at least 70 ppm, at least 80 ppm, at least 90 ppm, at least 100 ppm, at least 125 ppm, at least 150 ppm, at least 175 ppm, at least 200 ppm, at least 225 ppm, at least 250 ppm, at least 275 ppm, at least 300 ppm, at least 325 ppm, at least 350 ppm, at least 375 ppm, at least 400 ppm, at least 425 ppm, at least 450 ppm, at least 475 ppm, at least 500 ppm, at least 525 ppm, at least 550 ppm, at least 575 ppm, at least 600 ppm, at least 625 ppm, at least 650 ppm, at least 675 ppm, at least 700 ppm, at least 725 ppm, at least 750 ppm, at least 775 ppm, at least 800 ppm, at least 825 ppm, at least 850 ppm, at least 875 ppm, at least 900 ppm, at least 925 ppm, at least 950 ppm, at least 975 ppm, at least 1,000 ppm, at least 1,025 ppm, at least 1,050 ppm, at least 1075 ppm, at least 1,100 ppm, at least 1,125 ppm, at least 1,150 ppm, at least 1,175 ppm, at least 1,200 ppm, at least 1,225 ppm, at least 1,250 ppm, at least 1,275 ppm, at least 1,300 ppm, at least 1,325 ppm, at least 1,350 ppm, at least 1,375 ppm, at least 1,400 ppm, at least 1,425 ppm, at least 1,450 ppm, at least 1,475 ppm, at least 1,500 ppm, at least 1,600 ppm, at least 1,700 ppm, at least 1,800 ppm, at least 1,900 ppm, or at least 2,000 ppm or at most 0.05 ppm, at most 0.10 ppm, at most 0.20 ppm, at most 0.30 ppm, at most 0.40 ppm, at most 0.50 ppm, at most 0.60 ppm, at most 0.70 ppm, at most 0.80 ppm, at most 0.90 ppm, at most 1 ppm, at most 10 ppm, at most 20 ppm, at most 30 ppm, at most 40 ppm, at most 50 ppm, at most 60 ppm, at most 70 ppm, at most 80 ppm, at most 90 ppm, at most 100 ppm, at most 125 ppm, at most 150 ppm, at most 175 ppm, at most 200 ppm, at most 225 ppm, at most 250 ppm, at most 275 ppm, at most 300 ppm, at most 325 ppm, at most 350 ppm, at most 375 ppm, at most 400 ppm, at most 425 ppm, at most 450 ppm, at most 475 ppm, at most 500 ppm, at most 525 ppm, at most 550 ppm, at most 575 ppm, at most 600 ppm, at most 625 ppm, at most 650 ppm, at most 675 ppm, at most 700 ppm, at most 725 ppm, at most 750 ppm, at most 775 ppm, at most 800 ppm, at most 825 ppm, at most 850 ppm, at most 875 ppm, at most 900 ppm, at most 925 ppm, at most 950 ppm, at most 975 ppm, at most 1,000 ppm, at most 1,025 ppm, at most 1,050 ppm, at most 1075 ppm, at most 1,100 ppm, at most 1,125 ppm, at most 1,150 ppm, at most 1,175 ppm, at most 1,200 ppm, at most 1,225 ppm, at most 1,250 ppm, at most 1,275 ppm, at most 1,300 ppm, at most 1,325 ppm, at most 1,350 ppm, at most 1,375 ppm, at most 1,400 ppm, at most 1,425 ppm, at most 1,450 ppm, at most 1,475 ppm, at most 1,500 ppm, at most 1,600 ppm, at most 1,700 ppm, at most 1,800 ppm, at most 1,900 ppm, or at most 2,000 ppm or about 0.5 ppm to about 20 ppm, about 0.5 ppm to about 25 ppm, about 0.5 ppm to about 30 ppm, about 0.5 ppm to about 35 ppm, about 0.5 ppm to about 40 ppm, about 0.5 ppm to about 45 ppm, about 0.5 ppm to about 50 ppm, about 0.5 ppm to about 55 ppm, about 0.5 ppm to about 60 ppm, about 0.5 ppm to about 65 ppm, about 0.5 ppm to about 70 ppm, about 0.5 ppm to about 75 ppm, about 0.5 ppm to about 80 ppm, about 0.5 ppm to about 85 ppm, about 0.5 ppm to about 90 ppm, about 0.5 ppm to about 95 ppm, about 0.5 ppm to about 100 ppm, about 0.75 ppm to about 20 ppm, about 0.75 ppm to about 25 ppm, about 0.75 ppm to about 30 ppm, about 0.75 ppm to about 35 ppm, about 0.75 ppm to about 40 ppm, about 0.75 ppm to about 45 ppm, about 0.75 ppm to about 50 ppm, about 0.75 ppm to about 55 ppm, about 0.75 ppm to about 60 ppm, about 0.75 ppm to about 65 ppm, about 0.75 ppm to about 70 ppm, about 0.75 ppm to about 75 ppm, about 0.75 ppm to about 80 ppm, about 0.75 ppm to about 85 ppm, about 0.75 ppm to about 90 ppm, about 0.75 ppm to about 95 ppm, about 0.75 ppm to about 100 ppm, about 1 ppm to about 20 ppm, about 1 ppm to about 25 ppm, about 1 ppm to about 30 ppm, about 1 ppm to about 35 ppm, about 1 ppm to about 40 ppm, about 1 ppm to about 45 ppm, about 1 ppm to about 50 ppm, about 1 ppm to about 55 ppm, about 1 ppm to about 60 ppm, about 1 ppm to about 65 ppm, about 1 ppm to about 70 ppm, about 1 ppm to about 75 ppm, about 1 ppm to about 80 ppm, about 1 ppm to about 85 ppm, about 1 ppm to about 90 ppm, about 1 ppm to about 95 ppm, about 1 ppm to about 100 ppm, about 5 ppm to about 20 ppm, about 5 ppm to about 25 ppm, about 5 ppm to about 30 ppm, about 5 ppm to about 35 ppm, about 5 ppm to about 40 ppm, about 5 ppm to about 45 ppm, about 5 ppm to about 50 ppm, about 5 ppm to about 55 ppm, about 5 ppm to about 60 ppm, about 5 ppm to about 65 ppm, about 5 ppm to about 70 ppm, about 5 ppm to about 75 ppm, about 5 ppm to about 80 ppm, about 5 ppm to about 85 ppm, about 5 ppm to about 90 ppm, about 5 ppm to about 95 ppm, about 5 ppm to about 100 ppm, about 10 ppm to about 20 ppm, about 10 ppm to about 25 ppm, about 10 ppm to about 30 ppm, about 10 ppm to about 35 ppm, about 10 ppm to about 40 ppm, about 10 ppm to about 45 ppm, about 10 ppm to about 50 ppm, about 10 ppm to about 55 ppm, about 10 ppm to about 60 ppm, about 10 ppm to about 65 ppm, about 10 ppm to about 70 ppm, about 10 ppm to about 75 ppm, about 10 ppm to about 80 ppm, about 10 ppm to about 85 ppm, about 10 ppm to about 90 ppm, about 10 ppm to about 95 ppm, or about 10 ppm to about 100 ppm, about 1 ppm to about 25 ppm, about 1 ppm to about 50 ppm, about 1 ppm to about 75 ppm, about 1 ppm to about 100 ppm, about 1 ppm to about 125 ppm, about 1 ppm to about 150 ppm, about 1 ppm to about 175 ppm, about 1 ppm to about 200 ppm, about 1 ppm to about 225 ppm, about 1 ppm to about 250 ppm, about 1 ppm to about 275 ppm, about 1 ppm to about 300 ppm, about 1 ppm to about 325 ppm, about 1 ppm to about 350 ppm, about 1 ppm to about 375 ppm, about 1 ppm to about 400 ppm, about 10 ppm to about 25 ppm, about 10 ppm to about 50 ppm, about 10 ppm to about 75 ppm, about 10 ppm to about 100 ppm, about 10 ppm to about 125 ppm, about 10 ppm to about 150 ppm, about 10 ppm to about 175 ppm, about 10 ppm to about 200 ppm, about 10 ppm to about 225 ppm, about 10 ppm to about 250 ppm, about 10 ppm to about 275 ppm, about 10 ppm to about 300 ppm, about 10 ppm to about 325 ppm, about 10 ppm to about 350 ppm, about 10 ppm to about 375 ppm, about 10 ppm to about 400 ppm, about 25 ppm to about 50 ppm, about 25 ppm to about 75 ppm, about 25 ppm to about 100 ppm, about 25 ppm to about 125 ppm, about 25 ppm to about 150 ppm, about 25 ppm to about 175 ppm, about 25 ppm to about 200 ppm, about 25 ppm to about 225 ppm, about 25 ppm to about 250 ppm, about 25 ppm to about 275 ppm, about 25 ppm to about 300 ppm, about 25 ppm to about 325 ppm, about 25 ppm to about 350 ppm, about 25 ppm to about 375 ppm, about 25 ppm to about 400 ppm, about 50 ppm to about 75 ppm, about 50 ppm to about 100 ppm, about 50 ppm to about 125 ppm, about 50 ppm to about 150 ppm, about 50 ppm to about 175 ppm, about 50 ppm to about 200 ppm, about 50 ppm to about 225 ppm, about 50 ppm to about 250 ppm, about 50 ppm to about 275 ppm, about 50 ppm to about 300 ppm, about 50 ppm to about 325 ppm, about 50 ppm to about 350 ppm, about 50 ppm to about 375 ppm, about 50 ppm to about 400 ppm, about 75 ppm to about 100 ppm, about 75 ppm to about 125 ppm, about 75 ppm to about 150 ppm, about 75 ppm to about 175 ppm, about 75 ppm to about 200 ppm, about 75 ppm to about 225 ppm, about 75 ppm to about 250 ppm, about 75 ppm to about 275 ppm, about 75 ppm to about 300 ppm, about 75 ppm to about 325 ppm, about 75 ppm to about 350 ppm, about 75 ppm to about 375 ppm, about 75 ppm to about 400 ppm, about 100 ppm to about 125 ppm, about 100 ppm to about 150 ppm, about 100 ppm to about 175 ppm, about 100 ppm to about 200 ppm, about 100 ppm to about 225 ppm, about 100 ppm to about 250 ppm, about 100 ppm to about 275 ppm, about 100 ppm to about 300 ppm, about 100 ppm to about 325 ppm, about 100 ppm to about 350 ppm, about 100 ppm to about 375 ppm, about 100 ppm to about 400 ppm, about 150 ppm to about 175 ppm, about 150 ppm to about 200 ppm, about 150 ppm to about 225 ppm, about 150 ppm to about 250 ppm, about 150 ppm to about 275 ppm, about 150 ppm to about 300 ppm, about 150 ppm to about 325 ppm, about 150 ppm to about 350 ppm, about 150 ppm to about 375 ppm, about 150 ppm to about 400 ppm, about 200 ppm to about 225 ppm, about 200 ppm to about 250 ppm, about 200 ppm to about 275 ppm, about 200 ppm to about 300 ppm, about 200 ppm to about 325 ppm, about 200 ppm to about 350 ppm, about 200 ppm to about 375 ppm, about 200 ppm to about 400 ppm, about 200 ppm to about 425 ppm, about 200 ppm to about 450 ppm, about 200 ppm to about 475 ppm, about 200 ppm to about 500 ppm, about 200 ppm to about 525 ppm, about 200 ppm to about 550 ppm, about 200 ppm to about 575 ppm, about 200 ppm to about 600 ppm, about 250 ppm to about 275 ppm, about 250 ppm to about 300 ppm, about 250 ppm to about 325 ppm, about 250 ppm to about 350 ppm, about 250 ppm to about 375 ppm, about 250 ppm to about 400 ppm, about 250 ppm to about 425 ppm, about 250 ppm to about 450 ppm, about 250 ppm to about 475 ppm, about 250 ppm to about 500 ppm, about 250 ppm to about 525 ppm, about 250 ppm to about 550 ppm, about 250 ppm to about 575 ppm, about 250 ppm to about 600 ppm, about 300 ppm to about 325 ppm, about 300 ppm to about 350 ppm, about 300 ppm to about 375 ppm, about 300 ppm to about 400 ppm, about 300 ppm to about 425 ppm, about 300 ppm to about 450 ppm, about 300 ppm to about 475 ppm, about 300 ppm to about 500 ppm, about 300 ppm to about 525 ppm, about 300 ppm to about 550 ppm, about 300 ppm to about 575 ppm, about 300 ppm to about 600 ppm, about 350 ppm to about 375 ppm, about 350 ppm to about 400 ppm, about 375 ppm to about 400 ppm, about 350 ppm to about 425 ppm, about 350 ppm to about 450 ppm, about 350 ppm to about 475 ppm, about 350 ppm to about 500 ppm, about 350 ppm to about 525 ppm, about 350 ppm to about 550 ppm, about 350 ppm to about 575 ppm, about 350 ppm to about 600 ppm, about 400 ppm to about 500 ppm, about 400 ppm to about 600 ppm, about 400 ppm to about 700 ppm, about 400 ppm to about 800 ppm, about 400 ppm to about 900 ppm, about 400 ppm to about 1,000 ppm, about 400 ppm to about 1,100 ppm, about 400 ppm to about 1,200 ppm, about 400 ppm to about 1,300 ppm, about 400 ppm to about 1,400 ppm, about 400 ppm to about 1,500 ppm, about 400 ppm to about 1,600 ppm, about 400 ppm to about 1,700 ppm, about 400 ppm to about 1,800 ppm, about 400 ppm to about 1,900 ppm, about 400 ppm to about 2,000 ppm, about 500 ppm to about 600 ppm, about 500 ppm to about 700 ppm, about 500 ppm to about 800 ppm, about 500 ppm to about 900 ppm, about 500 ppm to about 1,000 ppm, about 500 ppm to about 1,100 ppm, about 500 ppm to about 1,200 ppm, about 500 ppm to about 1,300 ppm, about 500 ppm to about 1,400 ppm, about 500 ppm to about 1,500 ppm, about 500 ppm to about 1,600 ppm, about 500 ppm to about 1,700 ppm, about 500 ppm to about 1,800 ppm, about 500 ppm to about 1,900 ppm, about 500 ppm to about 2,000 ppm, about 600 ppm to about 700 ppm, about 600 ppm to about 800 ppm, about 600 ppm to about 900 ppm, about 600 ppm to about 1,000 ppm, about 600 ppm to about 1,100 ppm, about 600 ppm to about 1,200 ppm, about 600 ppm to about 1,300 ppm, about 600 ppm to about 1,400 ppm, about 600 ppm to about 1,500 ppm, about 600 ppm to about 1,600 ppm, about 600 ppm to about 1,700 ppm, about 600 ppm to about 1,800 ppm, about 600 ppm to about 1,900 ppm, about 600 ppm to about 2,000 ppm, about 700 ppm to about 800 ppm, about 700 ppm to about 900 ppm, about 700 ppm to about 1,000 ppm, about 700 ppm to about 1,100 ppm, about 700 ppm to about 1,200 ppm, about 700 ppm to about 1,300 ppm, about 700 ppm to about 1,400 ppm, about 700 ppm to about 1,500 ppm, about 700 ppm to about 1,600 ppm, about 700 ppm to about 1,700 ppm, about 700 ppm to about 1,800 ppm, about 700 ppm to about 1,900 ppm, about 700 ppm to about 2,000 ppm, about 800 ppm to about 900 ppm, about 800 ppm to about 1,000 ppm, about 800 ppm to about 1,100 ppm, about 800 ppm to about 1,200 ppm, about 800 ppm to about 1,300 ppm, about 800 ppm to about 1,400 ppm, about 800 ppm to about 1,500 ppm, about 800 ppm to about 1,600 ppm, about 800 ppm to about 1,700 ppm, about 800 ppm to about 1,800 ppm, about 800 ppm to about 1,900 ppm, about 800 ppm to about 2,000 ppm, about 900 ppm to about 1,000 ppm, about 900 ppm to about 1,100 ppm, about 900 ppm to about 1,200 ppm, about 900 ppm to about 1,300 ppm, about 900 ppm to about 1,400 ppm, about 900 ppm to about 1,500 ppm, about 900 ppm to about 1,600 ppm, about 900 ppm to about 1,700 ppm, about 900 ppm to about 1,800 ppm, about 900 ppm to about 1,900 ppm, about 900 ppm to about 2,000 ppm, about 1,000 ppm to about 1,100 ppm, about 1,000 ppm to about 1,200 ppm, about 1,000 ppm to about 1,300 ppm, about 1,000 ppm to about 1,400 ppm, about 1,000 ppm to about 1,500 ppm, about 1,000 ppm to about 1,600 ppm, about 1,000 ppm to about 1,700 ppm, about 1,000 ppm to about 1,800 ppm, about 1,000 ppm to about 1,900 ppm, about 1,000 ppm to about 2,000 ppm, about 1,100 ppm to about 1,200 ppm, about 1,100 ppm to about 1,300 ppm, about 1,100 ppm to about 1,400 ppm, about 1,100 ppm to about 1,500 ppm, about 1,100 ppm to about 1,600 ppm, about 1,100 ppm to about 1,700 ppm, about 1,100 ppm to about 1,800 ppm, about 1,100 ppm to about 1,900 ppm, about 1,100 ppm to about 2,000 ppm, about 1,200 ppm to about 1,300 ppm, about 1,200 ppm to about 1,400 ppm, about 1,200 ppm to about 1,500 ppm, about 1,200 ppm to about 1,600 ppm, about 1,200 ppm to about 1,700 ppm, about 1,200 ppm to about 1,800 ppm, about 1,200 ppm to about 1,900 ppm, about 1,200 ppm to about 2,000 ppm, about 1,300 ppm to about 1,400 ppm, about 1,300 ppm to about 1,500 ppm, about 1,300 ppm to about 1,600 ppm, about 1,300 ppm to about 1,700 ppm, about 1,300 ppm to about 1,800 ppm, about 1,300 ppm to about 1,900 ppm, about 1,300 ppm to about 2,000 ppm, about 1,400 ppm to about 1,500 ppm, about 1,400 ppm to about 1,600 ppm, about 1,400 ppm to about 1,700 ppm, about 1,400 ppm to about 1,800 ppm, about 1,400 ppm to about 1,900 ppm, about 1,400 ppm to about 2,000 ppm, about 1,500 ppm to about 1,600 ppm, about 1,500 ppm to about 1,700 ppm, about 1,500 ppm to about 1,800 ppm, about 1,500 ppm to about 1,900 ppm, about 1,500 ppm to about 2,000 ppm, about 1,600 ppm to about 1,700 ppm, about 1,600 ppm to about 1,800 ppm, about 1,600 ppm to about 1,900 ppm, about 1,600 ppm to about 2,000 ppm, about 1,700 ppm to about 1,800 ppm, about 1,700 ppm to about 1,900 ppm, about 1,700 ppm to about 2,000 ppm, about 1,800 ppm to about 1,900 ppm, about 1,800 ppm to about 2,000 ppm, or about 1,900 ppm to about 2,000 ppm.

72. The kit according to any one of embodiments 45, 46, 53-54 or 70, wherein the one or more metal salts are in an amount of about 0.10%, about 0.11%, about 0.12%, about 0.13%, about 0.14%, about 0.15%, about 0.16%, about 0.17%, about 0.18%, about 0.19%, about 0.2%, about 0.25%, about 0.3%, about 0.35%, about 0.4%, about 0.45%, or about 0.5% by weight of the composition, or at least 0.10%, at least 0.11%, at least 0.12%, at least 0.13%, at least 0.14%, at least 0.15%, at least 0.16%, at least 0.17%, at least 0.18%, at least 0.19%, at least 0.2%, at least 0.25%, at least 0.3%, at least 0.35%, at least 0.4%, at least 0.45%, or at least 0.5% by weight of the composition, or at most 0.10%, at most 0.11%, at most 0.12%, at most 0.13%, at most 0.14%, at most 0.15%, at most 0.16%, at most 0.17%, at most 0.18%, at most 0.19%, at most 0.2%, at most 0.25%, at most 0.3%, at most 0.35%, at most 0.4%, at most 0.45%, or at most 0.5% by weight of the composition, or about 0.10% to about 0.15%, about 0.10% to about 0.20%, about 0.10% to about 0.25%, about 0.10% to about 0.30%, about 0.10% to about 0.35%, about 0.10% to about 0.40%, about 0.10% to about 0.45%, about 0.10% to about 0.50%, about 0.20% to about 0.25%, about 0.20% to about 0.30%, about 0.20% to about 0.35%, about 0.20% to about 0.40%, about 0.20% to about 0.45%, about 0.20% to about 0.50%, about 0.30% to about 0.35%, about 0.30% to about 0.40%, about 0.30% to about 0.45%, about 0.30% to about 0.50%, about 0.40% to about 0.45%, about 0.40% to about 0.50%, or about 0.40% to about 0.50% by weight of the composition.

73. A method to clean, disinfect and/or sterilize a device, the method comprising, consisting essentially of, or consisting of applying a composition as defined in any one of embodiments 1-44 or applying the components of a kit as defined in any one of embodiments 45-72, to a device, wherein application of the composition cleans, disinfects and/or sterilizes the device.

74. A composition as defined in any one of embodiments 1-44 or applying the components of a kit as defined in any one of embodiments 45-72 for use in cleaning, disinfecting and/or sterilizing a device.

75. Use of a composition as defined in any one of embodiments 1-44 or applying the components of a kit as defined in any one of embodiments 45-72 to clean, disinfect and/or sterilize a device.

76. A method to clean, disinfect and/or sterilize a surface area, the method comprising, consisting essentially of, or consisting of applying a composition as defined in any one of embodiments 1-44 or applying the components of a kit as defined in any one of embodiments 45-72, to a device, wherein application of the composition cleans, disinfects and/or sterilizes the device.

77. A composition as defined in any one of embodiments 1-44 or applying the components of a kit as defined in any one of embodiments 45-72 for use in cleaning, disinfecting and/or sterilizing a surface area.

78. Use of a composition as defined in any one of embodiments 1-44 or applying the components of a kit as defined in any one of embodiments 45-72 to clean, disinfect and/or sterilize a surface area.

79. The method of embodiment 76, or the use of embodiment 77 or 78, wherein the surface area is a porous surface area or a non-porous surface area.

80. The method of embodiment 76 or 79, or the use of any one of embodiments 77-79, wherein the surface area comprises a table top, counter top, floor, wall, ceiling, window, door, door handle, shower, bath, sink, faucet, toilet, toilet seat, drain, equipment, machinery, personal protective gear, personal biohazard gear, a medical device, dental device, pharmaceutical device, veterinary device, mortuary device or human skin.

81. A method to clean, disinfect and/or sterilize a microbial infection in an individual, the method comprising, consisting essentially of, or consisting of applying a composition as defined in any one of embodiments 1-44 or applying the components of a kit as defined in any one of embodiments 45-72 to the individual, wherein application of the composition cleans, disinfects and/or sterilizes the individual.

82. A composition as defined in any one of embodiments 1-44 or applying the components of a kit as defined in any one of embodiments 45-72 for use in cleaning, disinfecting and/or sterilizing a microbial infection in an individual.

83. Use of a composition as defined in any one of embodiments 1-44 or applying the components of a kit as defined in any one of embodiments 45-72 to clean, disinfect and/or sterilize a microbial infection in an individual.

84. The method of embodiment 81, or the use of embodiment 82 or 83, wherein application of the composition is applied topically or administered enterally or parenterally.

85. The method of any one of embodiments 76, 79, 80, 81 or 84, or the use of any one of embodiments 77-80 or 82-84, wherein the composition is applied daily, every other day, every third of day, once a week, multiple times per week, once a month, multiple times per month, once a year or multiple times per year, as desired.

86. The method of any one of embodiments 76, 79, 80, 81, 84 or 85, or the use of any one of embodiments 77-80 or 82-85, wherein the composition is applied multiple times per day.

87. A method to treat an individual, the method comprising, consisting essentially of, or consisting of applying a composition as defined in any one of embodiments 1-44 or applying the components of a kit as defined in any one of embodiments 45-72 to the individual, wherein application of the composition treats the individual.

88. A composition as defined in any one of embodiments 1-44 or applying the components of a kit as defined in any one of embodiments 45-72 for use in treating a condition an individual.

89. Use of a composition as defined in any one of embodiments 1-44 or applying the components of a kit as defined in any one of embodiments 45-72 in treating a condition an individual.

90. The method of embodiment 87, or the use of embodiment 88 or 89, wherein application of the composition is applied topically or administered enterally or parenterally.

91. The method of any one of embodiments 87 or 90, or the use of any one of embodiments 88-90, wherein the composition is applied daily, every other day, every third of day, once a week, multiple times per week, once a month, multiple times per month, once a year or multiple times per year, as desired.

92. The method of any one of embodiments 87, 90 or 91, or the use of any one of embodiments 88-91, wherein the composition is applied multiple times per day.

93. The method of any one of embodiments 87 or 90-92, or the use of any one of embodiments 88-92, wherein the condition is a wound, an ophthalmic condition, a dermatological condition, an inflammation, an ache or a pain.

EXAMPLES

The following non-limiting examples are provided for illustrative purposes only in order to facilitate a more complete understanding of representative embodiments now contemplated. These examples should not be construed to limit any of the embodiments described in the present specification, including those pertaining to the compositions, methods and uses disclosed herein.

Example 1

Compositions

This example illustrates how to formulate a composition disclosed herein. The components listed below were mixed at ambient temperature using a high shear mixer until the mixture was uniform. The pH of the mixture was adjusted as shown.

TABLE 1

| Composition Formulations | | | | | | |
|---|---|---|---|---|---|---|
| Component | F72 | F73 | F74 | F75 | F76 | F77 |
| Hypochlorous Acid/FAC | 273 ppm | 273 ppm | 273 ppm | 273 ppm | 273 ppm | 273 ppm |
| Titanium dioxide particles | — | — | 50 ppm | 100 ppm | — | — |
| Zinc oxide particles | 50 ppm | 100 ppm | — | — | — | — |
| DTSACl[a] | — | — | — | — | 100 ppm | 200 ppm |
| Water | q.s. | q.s. | q.s. | q.s. | q.s. | q.s. |
| pH | 5.5 | 6.3 | 4.1 | 3.9 | 3.9 | 3.6 |

[a]DTSACl: Dimethyloctadecyl[3-(trimethoxysilyl)propyl]ammonium chloride in 58% methanol.

TABLE 2

| Composition Formulations | | | | | | |
|---|---|---|---|---|---|---|
| Component | F78 | F79 | F80 | F81 | F82 | F83 |
| Hypochlorous Acid/FAC | 273 ppm | 273 ppm | 273 ppm | — | — | — |
| Copper oxide particles | 200 ppm | 300 ppm | — | — | — | — |
| DTSACl[a] | — | — | 300 ppm | 1% | 5% | 1% |
| Isopropanol | — | — | — | 50% | 50% | 98% |
| Methanol | — | — | — | 2% | 6% | 1% |
| Water | q.s. | q.s. | q.s. | q.s. | q.s. | q.s. |
| pH | 4.8 | 5.3 | 3.4 | 5.5 | 5.1 | 6.6 |

[a]DTSACl: Dimethyloctadecyl[3-(trimethoxysilyl)propyl]ammonium chloride in 58% methanol.

TABLE 3

| Composition Formulations | | | | | | |
|---|---|---|---|---|---|---|
| Component | F84 | F85 | F86 | F87 | F88 | F89 |
| Hypochlorous Acid/FAC | 273 ppm | 273 ppm | 273 ppm | 273 ppm | — | 530 ppm |
| Titanium dioxide particles | — | — | — | 200 ppm | — | — |
| DTSACl[a] | — | — | — | — | 5% | — |
| Copper (I) chloride | — | 300 ppm | — | — | — | — |
| Copper (II) chloride | — | — | 300 ppm | — | — | — |
| Zinc chloride | 300 ppm | — | — | — | — | — |
| Silver nitrate | — | — | — | — | — | 300 ppm |
| Isopropanol | — | — | — | — | 88.4% | — |
| Methanol | — | — | — | — | 6.6% | — |
| Water | q.s. | q.s | q.s | q.s. | q.s. | q.s. |
| pH | 3.9 | 4.4 | 3.9 | 3.6 | 6.4 | 3.7 |

[a]DTSACl: Dimethyloctadecyl[3-(trimethoxysilyl)propyl]ammonium chloride in 58% methanol.

TABLE 4

| Composition Formulations | | | | | | |
|---|---|---|---|---|---|---|
| Component | F90 | F91 | F92 | F93 | F94 | F95A |
| Hypochlorous Acid/FAC | 530 ppm | 530 ppm | — | 530 ppm | 530 ppm | 530 ppm |
| Iron oxide particles | — | 300 ppm | — | — | — | — |
| Titanium dioxide particles | 100 ppm | — | — | — | — | — |
| DTSACl[a] | — | — | — | — | — | 500 ppm |
| Didodecyldimethyl ammonium chloride | — | — | 10% | 300 ppm | 300 ppm | — |
| Silver nitrate | 200 ppm | — | — | — | — | — |
| Isopropanol | — | — | 50% | — | — | — |
| Water | q.s. | q.s | q.s | q.s. | q.s. | q.s. |
| pH | 3.5 | 3.8 | 8.4 | 3.7 | 3.5 | 3.4 |

[a]DTSACl: Dimethyloctadecyl[3-(trimethoxysilyl)propyl]ammonium chloride in 58% methanol or water.

TABLE 5

| Composition Formulations | | | | | | |
|---|---|---|---|---|---|---|
| Component | F96 | F100 | F101 | F102 | F103 | F104 |
| Hypochlorous Acid/FAC | 107 ppm | 530 ppm | 530 ppm | 530 ppm | — | — |
| Silver oxide particles | — | — | — | 200 ppm | — | — |
| Zinc oxide particles | — | — | — | 200 ppm | — | — |
| DTSACl[a] | 100 ppm | — | — | — | — | 5% |
| Didodecyldimethyl ammonium chloride | — | — | — | — | 5% | — |
| Copper (II) chloride | — | 500 ppm | — | — | — | — |
| Potassium chloride | — | — | 4000 ppm | — | — | — |
| Polyhexamethylene biguanide | — | — | — | — | 10% | 10% |
| Isopropanol | — | — | — | — | 45% | 45% |
| Water | q.s. | q.s. | q.s. | q.s. | q.s | q.s |
| pH | 3.7 | 3.4 | 3.7 | 6.4 | 8.3 | 6.8 |

[a]DTSACl: Dimethyloctadecyl[3-(trimethoxysilyhpropyl]ammonium chloride in 58% methanol.

TABLE 6

| Composition Formulations | | | | | | |
|---|---|---|---|---|---|---|
| Component | F105 | F106 | F107 | F108 | F109 | F110 |
| Hypochlorous Acid/FAC | — | — | 530 ppm | 530 ppm | 530 ppm | 530 ppm |
| DTSACl[a] | 4% | — | — | — | — | 1000 ppm |
| Didodecyldimethyl ammonium chloride | — | 4% | — | — | — | — |
| Potassium chloride | — | — | 600 ppm | 600 ppm | 600 ppm | — |
| Potassium phosphate | — | — | 6000 ppm | 2000 ppm | 2000 ppm | — |
| Polyhexamethylene biguanide | 6% | 6% | — | — | — | — |
| Isopropanol | 50% | 50% | — | — | — | — |
| Water | q.s. | q.s. | q.s. | q.s. | q.s | q.s |
| pH | 6.6 | 8.5 | 11.9 | 7.7 | 8.9 | 4.4 |

[a]DTSACl: Dimethyloctadecyl[3-(trimethoxysilyl)propyl]ammonium chloride in 58% methanol.

TABLE 7

| Composition Formulations | | | | | | |
|---|---|---|---|---|---|---|
| Component | F112 | F115 | F116 | F117 | F118 | F119 |
| Hypochlorous Acid/FAC | — | — | — | 281 ppm | 530 ppm | 1933 ppm |
| Chlorhexidine | 0.06% | 0.12% | — | — | — | — |
| DTSACl[a] | — | — | — | — | — | 2000 ppm |
| Zinc acetate | — | — | 0.14% | 300 ppm | 600 ppm | — |
| Polyhexamethylene biguanide | 0.06% | — | 0.12% | — | — | — |
| Ethanol | 15% | 15% | 15% | — | — | — |
| Water | q.s | q.s | q.s | q.s | q.s | q.s |
| pH | 7.6 | 7.3 | 6.9 | 5.4 | 5.4 | 3.7 |

[a]DTSACl: Dimethyloctadecyl[3-(trimethoxysilyl)propyl]ammonium chloride in 58% methanol.

TABLE 8

| Composition Formulations | | | | | | |
|---|---|---|---|---|---|---|
| Component | F120 | F121 | F122 | F123 | F124 | F125 |
| Hypochlorous Acid/FAC | 105 ppm | 105 ppm | 500 ppm | 281 ppm | 281 ppm | 530 ppm |
| Titanium dioxide particles | — | — | — | — | — | — |
| Copper zinc iron oxide particles | — | — | — | 300 ppm | — | — |
| DTSACl[a] | — | — | — | — | 300 ppm | 500 ppm |
| Potassium chloride | 600 ppm | 120 ppm | — | — | — | — |
| Potassium phosphate | 2000 ppm | 400 ppm | — | — | — | — |

TABLE 8-continued

| Composition Formulations | | | | | | |
|---|---|---|---|---|---|---|
| Component | F120 | F121 | F122 | F123 | F124 | F125 |
| Silver nitrate | — | — | — | — | 300 ppm | 500 ppm |
| Zinc Sulfate | — | — | 600 ppm | — | — | — |
| Water | q.s. | q.s | q.s. | q.s | q.s | q.s |
| pH | 7.0 | 7.6 | 3.7 | 5.2 | 3.5 | 3.5 |

[a]DTSACl: Dimethyloctadecyl[3-(trimethoxysilyl)propyl]ammonium chloride in 58% methanol.

TABLE 9

| Composition Formulations | | | | | | |
|---|---|---|---|---|---|---|
| Component | F126 | F127 | F128 | F129 | F130 | F131 |
| Hypochlorous Acid/FAC | 281 ppm | 530 ppm | 600 ppm | 278 ppm | 1,933 ppm | 600 ppm |
| Titanium dioxide particles | 100 ppm | 100 ppm | — | — | — | — |
| DTSACl[a] | 300 ppm | 500 ppm | — | — | — | — |
| Silver nitrate | 200 ppm | 300 ppm | — | — | — | — |
| Poly(acrylic acid) | — | — | 45% | 2% | 2% | 2% |
| Water | q.s. | q.s | q.s. | q.s. | q.s. | q.s. |
| pH | 3.7 | 3.5 | 2.9 | 2.8 | 2.9 | 7.3 |

[a]DTSACl: Dimethyloctadecyl[3-(trimethoxysilyl)propyl]ammonium chloride in 58% methanol.

TABLE 10

| Composition Formulations | | | | | | |
|---|---|---|---|---|---|---|
| Component | F132 | F133 | F134 | F135 | F138 | F139 |
| Hypochlorous Acid/FAC | 600 ppm | 600 ppm | 1,933 ppm | 600 ppm | 600 ppm | 600 ppm |
| DTSACl[a] | — | — | 600 ppm | — | 600 ppm | 1,200 ppm |
| Silver nitrate | 600 ppm | — | — | — | — | — |
| Zinc sulfate | — | 600 ppm | — | — | — | — |
| Polyhexamethylene biguanide | — | — | — | — | 600 ppm | 1,200 ppm |
| Poly(acrylic acid) | 2% | 2% | 2% | — | — | — |
| Cetylpyrdinium chloride | — | — | — | 600 ppm | — | — |
| Water | q.s. | q.s | q.s. | q.s. | q.s. | q.s |
| pH | 2.7 | 2.9 | 2.9 | 4.0 | 3.0 | 3.0 |

[a]DTSACl: Dimethyloctadecyl[3-(trimethoxysilyl)propyl]ammonium chloride in 58% methanol.

TABLE 11

| Composition Formulations | | | | | | |
|---|---|---|---|---|---|---|
| Component | F140 | F141 | F142 | F143 | F144 | F145 |
| Hypochlorous Acid/FAC | 600 ppm | 600 ppm | 600 ppm | 500 ppm | 500 ppm | 500 ppm |
| Copper zinc iron oxide particles | — | — | — | 600 ppm | 300 ppm | — |
| DTSACl[a] | — | 600 ppm | 1,200 ppm | 600 ppm | — | — |
| TTSACl[b] | — | — | — | — | — | 500 ppm |
| Polyhexamethylene biguanide | — | — | — | — | — | — |
| ortho-phthalaldehyde | 600 ppm | 600 ppm | 1,200 ppm | — | — | — |
| Water | q.s. | q.s. | q.s. | q.s. | q.s. | q.s |
| pH | 2.6 | 3.4 | 3.2 | 5.2 | 5.0 | 3.4 |

[a]DTSACl: Dimethyloctadecyl[3-(trimethoxysilyl)propyl]ammonium chloride in 58% methanol.

[b]TTSACl: Tetradecyldimethyl-(3-trimethoxysilyl)propyl ammonium chloride in water.

TABLE 12

| Composition Formulations | | | | | | |
|---|---|---|---|---|---|---|
| Component | F146 | F147 | F148 | F149 | F150 | F151A |
| Hypochlorous Acid/FAC | 2,200 ppm | 500 ppm | 500 ppm | 500 ppm | 500 ppm | 500 ppm |
| Copper zinc iron oxide particles | 300 ppm | — | — | — | — | 250 ppm |
| DTSACl[a] | — | 250 ppm | 125 ppm | 50 ppm | 25 ppm | — |
| Water | q.s. | q.s. | q.s. | q.s. | q.s. | q.s |
| pH | 4.6 | 3.6 | 3.7 | 3.7 | 3.6 | 4.7 |

[a]DTSACl: Dimethyloctadecyl[3-(trimethoxysilyhpropyl]ammonium chloride in 58% methanol.

TABLE 13

| Composition Formulations | | | | | | |
|---|---|---|---|---|---|---|
| Component | F152 | F153 | F154 | F155 | F156 | F157 |
| Hypochlorous Acid/FAC | 500 ppm | 500 ppm | 500 ppm | 500 ppm | 500 ppm | — |
| Copper zinc iron oxide particles | 200 ppm | 150 ppm | 100 ppm | 50 ppm | 25 ppm | — |
| DTSACl[a] | — | — | — | — | — | 10% |
| Isopropanol | — | — | — | — | — | 50% |
| Water | q.s. | q.s. | q.s. | q.s. | q.s. | q.s |
| pH | 4.3 | 3.8 | 3.2 | 3.8 | 3.7 | 4.6 |

[a]DTSACl: Dimethyloctadecyl[3-(trimethoxysilyl)propyl]ammonium chloride in 58% methanol.

TABLE 14

| Composition Formulations | | | | | | |
|---|---|---|---|---|---|---|
| Component | F158 | F163 | F168 | F169 | F170 | F171 |
| DTSACl[a] | — | 20% | 10% | — | — | — |
| Didodecyldimethylammonium chloride | 5% | — | — | — | — | — |
| Polyhexamethylene biguanide | 5% | — | — | — | — | — |
| Isopropanol | 5% | — | 50% | — | — | 5% |
| Methanol | — | 7% | — | 50% | — | — |
| TRITON CG-110 | 3% | — | — | — | — | — |

TABLE 14-continued

| Composition Formulations | | | | | | |
|---|---|---|---|---|---|---|
| Component | F158 | F163 | F168 | F169 | F170 | F171 |
| Poloxamer-407 | — | — | — | — | 2% | — |
| Quaternium-18 | — | — | — | 6% | 10% | 10% |
| Water | q.s. | q.s. | q.s. | q.s. | q.s. | q.s. |
| pH | ND | 6.4 | ND | ND | ND | ND |

[a]DTSACl: Dimethyloctadecyl[3-(trimethoxysilyhpropyl]ammonium chloride in 58% methanol.

TABLE 15

| Composition Formulations | | | | | | |
|---|---|---|---|---|---|---|
| Component | F172 | F173 | F177 | F178 | F179 | F180 |
| Hypochlorous Acid/FAC | | | | — | — | 540 ppm |
| DTSACl[a] | 500 ppm | 20% | — | — | — | — |
| Di-n-alkyldimethyl ammonium chloride | — | — | 500 ppm | — | — | — |
| Didodecyldimethyl ammonium chloride | — | — | — | 500 ppm | — | — |
| Methanol | — | 7% | — | — | — | — |
| Copper (II) chloride | — | — | — | — | — | 200 ppm |
| Iron (II) chloride or Iron (III) chloride | — | — | — | — | — | 200 ppm |
| Silver nitrate | — | — | — | — | 500 ppm | — |
| Zinc acetate | — | — | — | — | 500 ppm | — |
| Zinc chloride | — | — | — | — | 200 ppm | |
| Water | q.s. | q.s. | q.s. | q.s. | q.s. | q.s. |
| pH | 5.4 | 6.4 | 7.6 | 6.2 | 6.9 | 2.6 |

[a]DTSACl: Dimethyloctadecyl[3-(trimethoxysilyhpropyl]ammonium chloride in 58% methanol.

TABLE 16

| Composition Formulations | | | | | | |
|---|---|---|---|---|---|---|
| Component | F181 | F182 | F183 | F184 | F185 | F186 |
| Hypochlorous Acid/FAC | 540 ppm | 540 ppm | 540 ppm | 540 ppm | 540 ppm | 540 ppm |
| DTSACl[a] | — | 500 ppm | 500 ppm | 500 ppm | 500 ppm | 500 ppm |
| Copper (III) chloride | 200 ppm | — | — | — | — | — |
| Iron (II) chloride or Iron (III) chloride | 200 ppm | — | — | — | — | — |
| Zinc chloride | 200 ppm | — | — | — | — | — |
| Water | q.s. | q.s. | q.s. | q.s. | q.s. | q.s. |
| pH | 2.4 | 5.9 | 5.4 | 6.0 | 5.1 | 6.4 |

[a]DTSACl: Dimethyloctadecyl[3-(trimethoxysilyl)propyl]ammonium chloride in 58% methanol.

TABLE 17

| Composition Formulations | | | | | | |
|---|---|---|---|---|---|---|
| Component | F187 | F188 | F189 | F190 | F191 | F192 |
| Hypochlorous Acid/FAC | 540 ppm | 350 ppm | 350 ppm | 260 ppm | 260 ppm | 190 ppm |
| DTSACl[a] | 300 ppm | 500 ppm | 300 ppm | 500 ppm | 300 ppm | 500 ppm |
| Water | q.s. | q.s. | q.s. | q.s. | q.s. | q.s. |
| pH | 5.5 | 5.7 | 5.5 | 5.2 | 5.4 | 5.4 |

[a]DTSACl: Dimethyloctadecyl[3-(trimethoxysilyl)propyl]ammonium chloride in 58% methanol.

TABLE 18

| Composition Formulations | | | | | | |
|---|---|---|---|---|---|---|
| Component | F193 | F194 | F195 | F95B | F95C | F950 |
| Hypochlorous Acid/FAC | 190 ppm | 100 ppm | 100 ppm | 530 ppm | 75 ppm | 75 ppm |
| DTSACl[a] | 300 ppm | 500 ppm | 300 ppm | — | 500 ppm | 300 ppm |
| DTSACl[b] | — | — | — | 530 ppm | — | — |
| Water | q.s. | q.s. | q.s. | q.s. | q.s. | q.s. |
| pH | 5.5 | 5.8 | 5.4 | 3.2 | 5.8 | 5.4 |

[a]DTSACl: Dimethyloctadecyl[3-(trimethoxysilyl)propyl]ammonium chloride in 58% methanol.
[b]DTSACl: Dimethyloctadecyl[3-(trimethoxysilyl)propyl]ammonium chloride in water.

TABLE 19

| Composition Formulations | | | | | | |
|---|---|---|---|---|---|---|
| Component | F95E | F95F | F95G | F95H | F95I | F95J |
| Hypochlorous Acid/FAC | 50 ppm | 50 ppm | 40 ppm | 40 ppm | 35 ppm | 35 ppm |
| DTSACl[a] | 500 ppm | 300 ppm | 500 ppm | 300 ppm | 500 ppm | 300 ppm |
| Water | q.s. | q.s. | q.s. | q.s. | q.s. | q.s. |
| pH | 5.8 | 5.4 | 5.8 | 5.4 | 5.8 | 5.4 |

[a]DTSACl: Dimethyloctadecyl[3-(trimethoxysilyl)propyl]ammonium chloride in 58% methanol.

TABLE 20

| Composition Formulations | | | | | | |
|---|---|---|---|---|---|---|
| Component | F95K | F95L | F95M | F95N | F95O | F95P |
| Hypochlorous Acid/FAC | 25 ppm | 25 ppm | 10 ppm | 10 ppm | 5 ppm | 5 ppm |
| DTSACl[a] | 500 ppm | 300 ppm | 500 ppm | 300 ppm | 500 ppm | 300 ppm |
| Water | q.s. | q.s. | q.s. | q.s. | q.s. | q.s. |
| pH | 5.8 | 5.4 | 5.8 | 5.4 | 5.8 | 5.4 |

[a]DTSACl: Dimethyloctadecyl[3-(trimethoxysilyhpropyl]ammonium chloride in 58% methanol.

TABLE 21

| Composition Formulations | | | | | | |
|---|---|---|---|---|---|---|
| Component | F151B | F151C | F151D | F151E | F151F | F151G |
| Hypochlorous Acid/FAC | 350 ppm | 260 ppm | 190 ppm | 100 ppm | 75 ppm | 50 ppm |
| Copper zinc iron oxide particles | 250 ppm | 250 ppm | 250 ppm | 250 ppm | 250 ppm | 250 ppm |
| Water | q.s. | q.s. | q.s. | q.s. | q.s. | q.s. |
| pH | 4.7 | 4.7 | 4.7 | 4.7 | 4.7 | 4.7 |

TABLE 22

| Composition Formulations | | | | | | |
|---|---|---|---|---|---|---|
| Component | F151H | F151I | F151J | F151K | F151L | F180A |
| Hypochlorous Acid/FAC | 40 ppm | 35 ppm | 25 ppm | 10 ppm | 5 ppm | 350 ppm |
| Copper zinc iron oxide particles | 250 ppm | 250 ppm | 250 ppm | 250 ppm | 250 ppm | — |
| Copper (II) chloride | — | — | — | — | — | 200 ppm |
| Iron (II) chloride or Iron (III) chloride | — | — | — | — | — | 200 ppm |
| Zinc chloride | — | — | — | — | — | 200 ppm |
| Water | q.s. | q.s. | q.s. | q.s. | q.s. | q.s. |
| pH | 4.7 | 4.7 | 4.7 | 4.7 | 4.7 | 2.6 |

TABLE 23

| Composition Formulations | | | | | | |
|---|---|---|---|---|---|---|
| Component | F180B | F180C | F1800 | F180E | F180F | F180G |
| Hypochlorous Acid/FAC | 260 ppm | 190 ppm | 100 ppm | 75 ppm | 50 ppm | 40 ppm |
| Copper (II) chloride | 200 ppm | 200 ppm | 200 ppm | 200 ppm | 200 ppm | 200 ppm |
| Iron (II) chloride or Iron (III) chloride | 200 ppm | 200 ppm | 200 ppm | 200 ppm | 200 ppm | 200 ppm |
| Zinc chloride | 200 ppm | 200 ppm | 200 ppm | 200 ppm | 200 ppm | 200 ppm |
| Water | q.s. | q.s. | q.s. | q.s. | q.s. | q.s. |
| pH | 2.6 | 2.6 | 2.6 | 2.6 | 2.6 | 2.6 |

TABLE 24

| Composition Formulations | | | | |
|---|---|---|---|---|
| Component | F180H | F180I | F180J | F180K |
| Hypochlorous Acid/FAC | 35 ppm | 25 ppm | 10 ppm | 5 ppm |
| Copper (II) chloride | 200 ppm | 200 ppm | 200 ppm | 200 ppm |
| Iron (II) chloride or Iron (III) chloride | 200 ppm | 200 ppm | 200 ppm | 200 ppm |
| Zinc chloride | 200 ppm | 200 ppm | 200 ppm | 200 ppm |
| Water | q.s. | q.s. | q.s. | q.s. |
| pH | 2.6 | 2.6 | 2.6 | 2.6 |

Example 2

Spore Viability Assays

This example illustrates how to conduct a spore viability assay using a composition disclosed herein.

To prepare stock cultures of pathogenic spores, 10 mL nutrient broth was inoculated using a stock culture of *Bacillus subtilis* (ATCC #19659) and incubated on an orbital shaker for 24±2 hours at approximately 150 rpm at 36±1° C. This culture was used to inoculate Tryptic Soy Agar (TSA) plates. Each plate was inoculated with 500 μL of broth culture and the inoculum spread with a sterile L spreader. In addition, the purity of this culture was verified by streaking on TSA plates and incubating plates at 36±1° C. for 24±2 hours. Each plate was wrapped with parafilm, inverted and incubated for 12-14 days at 36±1° C. Following incubation, spores were harvested by adding 10 mL cold sterile water to each plate, the growth removed from the plates using a spreader, and the resulting suspensions were transferred into 15 mL sterile conical tubes. The suspensions were centrifuged at 5,000 rpm (4,500×g) for approximately 10 minutes at room temperature. After removal of the supernatant, the spore pellet was washed by re-suspending pellet with 10 mL cold sterile water and centrifuged at 5,000 rpm (4,500×g) for approximately 10 minutes. This washing step was repeated two more times. The spore pellet was re-suspended with 10 mL sterile water and the spore suspension was stored at 2-5° C. until needed. The spore suspension was stained using stain and the spores examined under the microscope to assess quality of the spores. A minimum of five fields were examined and the ratio of the spores to vegetative cells (or sporangia) was determined. Percentage of spores versus vegetative cells were about 95% spores. Spore titer was determined by preparing serial dilutions, plating the dilutions on TSA plates, incubating plates for 48±2 hours at 36±1° C., and counting the number of colonies formed to determine the titer. The test culture was standardized by using phosphate buffer to achieve a final test culture microbe population of $1.0\times10^6$ cfu/mL.

Assay samples were set up with or without serum, such as, e.g., Tryptic Soy Broth (TSB) or Bovine Serum (BS). The purpose of the serum was to better simulate the organic load of blood and other tissue which tends to deactivate an antimicrobial agent. In general, assays were conducted by first incubating a pathogen spore sample with a composition disclosed herein for a specified treatment time period, optionally with serum, and then culturing the sample on growth medium to measure bacterial colony formation, and hence spore viability.

In one series of experiments, samples from Compositions F72-F92 were treated with serum were set up to contain 100 μL of pathogen spore suspension (containing about $1\times10^3$ cfu/mL), 50 μL of serum, and 850 μL of a composition described in Example 1. For assays where the samples were not treated with serum, samples contained 100 μL of pathogen spore suspension (containing about $1\times10^3$ cfu/mL) and 900 μL of a composition described in Example 1. All samples were exposed for 15 minutes and then plated on petri dishes containing TSA growth medium. The inoculated plates were then incubated at 30° C. to 35° C. for 48 hours and the number of colonies, if any, counted. Please note that while specific amounts and volumes are described, different amounts and volumes can be used. For example, a treated sample can contain 100 μL of pathogen spore suspension (containing about $1\times10^6$ cfu/mL), 500 μL of serum, and 9,400 μL of a composition disclosed herein. An untreated sample can contain 100 μL of pathogen spore suspension (containing about $1\times10^3$ cfu/mL) and 9,900 μL of a composition disclosed herein. The results of this series of experiments are shown in Table 25.

In another series of experiments, samples from Compositions F103-F106, F112, F115, F116, F138, F139, and F157 were treated with serum were set up to contain 100 μL of pathogen spore suspension (containing about $1\times10^6$ cfu/mL), 50 μL of serum, and 850 μL of a composition described in Example 1. For assays where the samples were not treated with serum, samples contained 100 μL of pathogen spore suspension (containing about $1\times10^6$ cfu/mL) and 900 μL of a composition described in Example 1. All samples were exposed for 30 minutes, serially diluted 1 in 10 over a 6-fold range using DE broth, and then plated on petri dishes containing TSA growth medium. The inoculated plates were then incubated at 30° C. to 35° C. for 48 hours and the number of colonies, if any, counted. Please note that while specific amounts and volumes are described, different amounts and volumes can be used. For example, a treated sample can contain 100 μL of pathogen spore suspension (containing about $1\times10^6$ cfu/mL), 500 μL of serum, and 9,400 μL of a composition disclosed herein. An untreated sample can contain 100 μL of pathogen spore suspension (containing about $1\times10^6$ cfu/mL) and 9,900 μL of a composition disclosed herein. The results of this series of experiments are shown in Table 26.

The results indicate that at least Composition F81, F82, F83, F88 and F92 show greater potential as a disinfectant for applications disclosed herein.

TABLE 25

| Spore Viability Assay | | | |
|---|---|---|---|
| | Colony Count[a,b,c] | | |
| Formulation | 0% Serum | 2.5% Serum | 5% Serum |
| F81 | 0 | 0 | 0 |
| F82 | 0 | 0 | 0 |
| F83 | 0 | 0 | 0 |
| F88 | 0 | 0 | 0 |
| F92 | 0 | 0 | 0 |

[a]Values designated >500 indicate that there were too many bacterial colonies to count, so an estimate of greater than 500 was assigned.
[b]Positive controls for all assays conducted were >500 bacterial colonies.
[c]ND, Not Determined.

TABLE 26

| Spore Viability Assay | | | |
|---|---|---|---|
| | Log Growth Reduction[a,b,c] | | |
| Formulation | 0% Serum | 2.5% Serum | 5% Serum |
| F103 | ND | ND | ND |
| F104 | ND | ND | ND |
| F105 | ND | ND | ND |
| F106 | ND | ND | ND |
| F112 | ND | ND | ND |
| F115 | ND | ND | ND |
| F116 | ND | ND | ND |
| F138 | ND | ND | ND |
| F139 | ND | ND | ND |
| F157 | ND | ND | >1.7 log |

[a]A minimum of 3 log reduction in bacterial growth represents ≥99.9% kill of bacteria.
[b]Positive controls for all assays conducted exhibited 0 log reduction in bacterial growth.
[c]ND, Not Determined.

Similar spore viability assays can be performed as described above, except that the pathogen evaluated will be *Escherichia coli* and a *Pseudomonas* species.

Example 3

Bacterial Viability Assays

This example illustrates how to conduct a bacterial viability assay using a composition disclosed herein.

To prepare stock cultures of pathogenic bacteria, 10 mL nutrient broth was inoculated using a stock culture of *Staphylococcus epidermidis* (ATCC 12228) and incubated on an orbital shaker for 24±2 hours at approximately 150 rpm at 36±1° C. This culture was used to inoculate Tryptic Soy Agar (TSA) plates. Each plate was inoculated with the culture. Each plate was incubated for up to 5 days at 30° C. to 35° C. Following incubation, suspensions were prepared by adding growth from TSA plates into a tube containing sterile water. Each tube was then vortexed and an aliquot was serially diluted and plated onto TSA plate for further numeration. The final numeration count uses aliquot volume, count obtained on TSA plate and the total original volume of culture. The remaining amount in the tube was used to inoculate actual test samples.

Samples from each composition tested were set up with or without serum (TSB or Bovine Serum) as follows: 1) Assays with serum contained 100 μL of pathogenic bacteria suspension, 500 μL of serum and 9400 μL of a composition formulation disclosed herein; and 2) Assays without serum contained 100 μL of pathogen bacteria suspension and 9900 μL of a composition described in Example 1. Samples were exposed for 5 minutes at which point a neutralizing agent was used to inhibit the activity of the microbial agent being tested. For Compositions F72-F80, F84-F87, F89-F91, F93, F94, F96, and F100-F102, the treated sample was plated on petri dishes containing TSA growth medium and incubated at 30° C. to 35° C. for up to 5 days. The presence of viable bacteria was then measured by counting the number of colonies observed on the agar medium. The results of this series of experiments are shown in Table 27.

For Compositions F95, F107-F110, F117-F135, F140-F156, and F163, the treated samples were serially diluted 1 in 10 over a 6-fold range after treatment using a neutralizing agent, and the treated sample was plated on petri dishes containing TSA growth medium and incubated at 30° C. to 35° C. for up to 5 days. The presence of viable bacteria was then measured by counting the number of colonies observed on the agar medium. The results of this series of experiments are shown in Table 28.

The results indicate that at least Compositions F80, F81, F82, F83, F88, F89, F90, F92, F93, F94, F95, F102, F144, F145, F146, F147, F148, F149, F150, F151, F152, F153, F154, F155, and F156 show greater potential as a disinfectant for applications disclosed herein.

TABLE 27

| Bacterial Viability Assay | | | |
|---|---|---|---|
| | | Colony Count[a,b,c] | |
| Formulation | 0% Serum | 2.5% Serum | 5% Serum |
| F72 | 0 | 205 | 225 |
| F73 | 0 | 204 | 209 |
| F74 | 0 | 156 | 205 |
| F75 | 0 | 200 | 190 |
| F76 | 0 | 152 | 105 |
| F77 | 0 | 70 | 69 |
| F78 | 0 | 190 | 223 |
| F79 | 0 | 185 | 140 |
| F80 | 0 | 0 | 0 |
| F81 | 0 | 0 | 0 |
| F82 | 0 | 0 | 0 |
| F83 | 0 | 0 | 0 |
| F84 | 0 | 232 | 225 |
| F85 | 0 | 260 | 206 |
| F86 | 0 | 205 | 180 |
| F87 | 0 | 180 | 165 |
| F88 | 0 | 0 | 0 |
| F89 | 0 | 6 | 21 |
| F90 | 0 | 3 | 15 |
| F91 | 0 | 302 | 220 |
| F93 | 0 | 0 | 0 |
| F94 | 0 | 0 | 0 |
| F96 | 0 | >500 | >500 |
| F100 | 0 | >500 | >500 |
| F101 | 0 | >500 | >500 |
| F102 | 0 | 10 | 100 |

[a]Values designated >500 indicate that there were too many bacterial colonies to count, so an estimate of greater than 500 was assigned.
[b]Positive controls for all assays conducted were >500 bacterial colonies.
[c]ND, Not Determined.

TABLE 28

| Bacterial Viability Assay | | | |
|---|---|---|---|
| | | Log Growth Reduction[a,b,c] | |
| Formulation | 0% Serum | 2.5% Serum | 5% Serum |
| F95 | >7.2 log | >7.1 log | >6.8 log |
| F107 | ND | ND | ND |
| F108 | ND | ND | ND |
| F109 | ND | ND | ND |
| F110 | ND | ND | <6.0 log |
| F117 | ND | ND | ND |

TABLE 28-continued

| Bacterial Viability Assay | | | |
|---|---|---|---|
| | | Log Growth Reduction[a,b,c] | |
| Formulation | 0% Serum | 2.5% Serum | 5% Serum |
| F118 | ND | ND | ND |
| F119 | ND | ND | 6 log |
| F120 | ND | ND | ND |
| F121 | ND | ND | ND |
| F122 | ND | ND | ND |
| F123 | ND | ND | <6.0 log |
| F124 | ND | ND | ND |
| F125 | ND | ND | ND |
| F126 | ND | ND | ND |
| F127 | ND | ND | ND |
| F128 | ND | ND | ND |
| F129 | ND | ND | ND |
| F130 | ND | ND | ND |
| F131 | ND | ND | ND |
| F132 | ND | ND | ND |
| F133 | ND | ND | ND |
| F134 | ND | ND | ND |
| F135 | ND | ND | ND |
| F140 | ND | ND | ND |
| F141 | ND | ND | ND |
| F142 | ND | ND | ND |
| F143 | ND | ND | ND |
| F144 | ND | ND | >6.8 log |
| F145 | ND | ND | >7.4 log |
| F146 | ND | ND | >7.3 log |
| F147 | ND | ND | >7.4 log |
| F148 | ND | ND | <6.0 log |
| F149 | ND | ND | <6.0 log |
| F150 | ND | ND | <6.0 log |
| F151 | >7.2 log | >7.1 log | >7.2 log |
| F152 | ND | ND | >6.2 log |
| F153 | ND | ND | <6.0 log |
| F154 | ND | ND | <6.0 log |
| F155 | ND | ND | >7.1 log |
| F156 | ND | ND | >7.6 log |
| F157 | ND | ND | >7.1 log |
| F163 | ND | ND | ND |
| F168 | ND | ND | ND |
| F169 | ND | ND | ND |
| F170 | ND | ND | ND |
| F171 | ND | ND | ND |
| F172 | ND | ND | <6.0 log |
| F173 | ND | ND | <6.0 log |
| F177 | ND | ND | <6.0 log |
| F178 | ND | ND | >7.0 log |
| F179 | ND | ND | <6.0 log |
| F180 | ND | ND | >7.1 log |
| F181 | ND | ND | >7.1 log |
| F182 | ND | ND | <6.0 log |
| F183 | ND | ND | <6.0 log |
| F184 | ND | ND | <6.0 log |
| F185 | ND | ND | <6.0 log |
| F186 | ND | ND | <6.0 log |
| F187 | ND | ND | ND |
| F188 | ND | ND | ND |
| F189 | ND | ND | ND |
| F190 | ND | ND | ND |
| F191 | ND | ND | ND |
| F192 | ND | ND | ND |
| F193 | ND | ND | ND |
| F194 | ND | ND | ND |
| F195 | ND | ND | ND |

[a]A minimum of 3 log reduction in bacterial growth represents ≥99.9% kill of bacteria.
[b]Positive controls for all assays conducted exhibited 0 log reduction in bacterial growth.
[c]ND, Not Determined.

Example 4

Bacterial Viability Assays

This example illustrates how to conduct a bacterial viability assay using a composition disclosed herein.

Stock cultures of pathogenic bacteria *Staphylococcus epidermidis* (ATCC 12228) were prepared as described in Example 3. The final numeration count uses aliquot volume, count obtained on TSA plate and the total original volume of culture. The remaining amount in the tube was used to inoculate actual test samples.

Samples from each composition tested were set up with Bovine Serum as follows: 1) Assays with serum contained 100 μL of pathogenic bacteria suspension, 500 μL of Bovine Serum and 9400 μL of one of the composition formulations shown in Table 29; 2) HOCl control assays contained 100 μL of pathogen bacteria suspension, 500 μL of Bovine Serum and 9400 μL of 350 ppm, 200 ppm, 100 ppm or 50 ppm Hypochlorous acid; 3) Salt control assays contained 100 μL of pathogen bacteria suspension, 500 μL of Bovine Serum and 9400 μL of 140 ppm, 80 ppm, 40 ppm or 20 ppm each of Copper (II) chloride, Iron (II) chloride and zinc chloride or each of Copper (II) chloride, Iron (III) chloride and zinc chloride; and 4) Negative control assays contained 100 μL of pathogen bacteria suspension, 500 μL of Bovine Serum and 9400 μL of sterile water. Samples were exposed for five (5) minutes at which point a neutralizing agent was used to inhibit the activity of the microbial agent being tested. Compositions were plated on petri dishes containing TSA growth medium and incubated at 30° C. to 35° C. for 5 days. The presence of viable bacteria was then measured by counting the number of colonies observed on the agar medium. The results of this series of experiments are shown in Table 30.

TABLE 30

| Bacterial Viability Assay | | | |
|---|---|---|---|
| | Log Growth Reduction[a,b] | | |
| Formulation | Formulation | HOCl Control[c] | Salt Control[d] |
| F196 | 4.19 | 4.47 | 0 |
| F197 | 1.72 | 3.00 | 0 |
| F198 | 2.18 | 2.24 | 0 |
| F199 | 1.87 | 1.41 | 0 |
| F200 | 6.65 | 3.18 | 0 |
| F201 | 6.65 | 3.03 | 0 |
| F202 | 2.71 | 2.77 | 0 |
| F203 | 1.62 | 0.77 | 0 |

[a]A minimum of 3 log reduction in bacterial growth represents ≥99.9% kill of bacteria.
[b]Positive controls for all assays conducted exhibited 0 log reduction in bacterial growth.
[c]HOCl control corresponded to the concentration of hypochlorous acid present in the composition formulation.
[d]Metal salt control corresponded to the concentration of metal salt present in the composition formulation.

In a different series of experiments, formulations COL1 and COL2 were compared to six commercial products containing HOCl alone (Table 31). In this series of experiments, samples from each composition tested were set up with Bovine Serum as follows: 1) Assays with serum contained 100 μL of pathogenic bacteria suspension, 500 μL of Bovine Serum and 9400 μL of one of the composition formulations as shown in Table 31; and 2) positive HOCl control assays contained 100 μL of pathogen bacteria suspension and 9900 μL of sterile water. Samples were exposed for one (1) minute at which point a neutralizing agent was used to inhibit the activity of the microbial agent being tested. Compositions were plated on petri dishes containing TSA growth medium and incubated at 30° C. to 35° C. for 5 days. The presence of viable bacteria was then measured by counting the number of colonies observed on the agar medium. The results of this series of experiments are shown in Table 31.

TABLE 29

| Composition Formulations | | | | | | | | |
|---|---|---|---|---|---|---|---|---|
| Component | F196 | F197 | F198 | F199 | F200 | F201 | F202 | F203 |
| Hypochlorous Acid/FAC | 350 ppm | 200 ppm | 100 ppm | 50 ppm | 350 ppm | 200 ppm | 100 ppm | 50 ppm |
| Copper (II) chloride | 140 ppm | 80 ppm | 40 ppm | 20 ppm | 140 ppm | 80 ppm | 40 ppm | 20 ppm |
| Iron (II) chloride | 140 ppm | 80 ppm | 40 ppm | 20 ppm | — | — | — | — |
| Iron (III) chloride | — | — | — | — | 140 ppm | 80 ppm | 40 ppm | 20 ppm |
| Zinc chloride | 140 ppm | 80 ppm | 40 ppm | 20 ppm | 140 ppm | 80 ppm | 40 ppm | 20 ppm |
| Water | q.s. | q.s. | q.s. | q.s. | q.s. | q.s. | q.s. | q.s. |
| pH | 3.2 | 3.6 | 3.7 | 4.0 | 3.0 | 3.2 | 3.6 | 3.7 |

The results show that compositions comprising Iron (III) chloride demonstrated a synergistic effect on bacterial growth reduction relative to the controls. For example, F200 and F201 show over two times greater reduction in bacterial growth as compared to hypochlorous acid controls for applications disclosed herein. The metal salts mixtures of zinc chloride, Iron (II) chloride, and copper chloride or zinc chloride, Iron (III) chloride and copper chloride did not show any detectable antimicrobial activity in these assays. Another important finding is that F202 demonstrate an equivalent reduction in bacterial growth relative to the HOCl control comprising 200 ppm hypochlorous acid. F202 contains only 100 ppm hypochlorous acid and this 50% reduction is critical to conferring increased stability of the hypochlorous acid.

The results indicate compositions COL1 and COL2 show equal or greater potential as commercially available cleaners and disinfectants with equal or greater than levels of hypochlorous acid for applications disclosed herein. In particular, COL1, which contained 40 ppm hypochlorous acid and 1,000 ppm DTSACl exhibited over 3 times greater reduction in bacterial growth relative to Commercial Product 6 which solely contains 40 ppm hypochlorous acid. Similarly, COL2, which contained 90 ppm hypochlorous acid and 500 ppm DTSACl exhibited over 2 times greater reduction in bacterial growth relative to Commercial Product 3 which solely contains 104 ppm hypochlorous acid. The synergistic activity observed in COL1 and COL2 is explained by the presence of DTSACl in these formulations.

TABLE 31

| Bacterial Viability Assay | |
|---|---|
| Formulation | Log Growth Reduction[a,b] |
| COL1 (40 ppm HOCl and 1000 ppm DTSACl) | 3.6 |
| COL2 (99 ppm HOCl and 500 ppm DTSACl) | 2.3 |
| Commercial Product 1 (68 ppm HOCl) | 1.1 |
| Commercial Product 2 (104 ppm HOCl) | 1.0 |
| Commercial Product 3 (110 ppm HOCl) | 2.0 |
| Commercial Product 4 (154 ppm HOCl) | 1.2 |
| Commercial Product 5 (223 ppm HOCl) | 2.3 |
| Commercial Product 6 (270 ppm HOCl) | 3.0 |

[a]A minimum of 3 log reduction in bacterial growth represents ≥99.9% kill of bacteria.
[b]Positive controls for all assays conducted exhibited 0 log reduction in bacterial growth.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular compound, composition, article, apparatus, methodology, protocol, and/or reagent, etc., described herein, unless expressly stated as such. In addition, those of ordinary skill in the art will recognize that certain changes, modifications, permutations, alterations, additions, subtractions and sub-combinations thereof can be made in accordance with the teachings herein without departing from the spirit of the present specification. It is therefore intended that the following appended claims and claims hereafter introduced are interpreted to include all such changes, modifications, permutations, alterations, additions, subtractions and sub-combinations as are within their true spirit and scope.

Certain embodiments of the present invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. For instance, as mass spectrometry instruments can vary slightly in determining the mass of a given analyte, the term "about" in the context of the mass of an ion or the mass/charge ratio of an ion refers to +/−0.50 atomic mass unit. At the very least, and not as an attempt to limit the application of the doctrine of equivalents to the scope of the claims, each numerical indication should at least be construed in light of the number of reported significant digits and by applying ordinary rounding techniques.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising"

(and equivalent open-ended transitional phrases thereof like including, containing and having) encompasses all the expressly recited elements, limitations, steps and/or features alone or in combination with unrecited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amended for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (and equivalent open-ended transitional phrases thereof) includes within its meaning, as a limiting case, claimed subject matter specified by the closed-ended transitional phrases "consisting of" or "consisting essentially of." As such embodiments described herein or so claimed with the phrase "comprising" are expressly or inherently unambiguously described, enabled and supported herein for the phrases "consisting essentially of" and "consisting of."

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

Lastly, the terminology used herein is for the purpose of describing particular embodiments only, and is not intended to limit the scope of the present invention, which is defined solely by the claims. Accordingly, the present invention is not limited to that precisely as shown and described.

The invention claimed is:

1. A composition comprising:

(i) about 350 ppm to about 450 ppm of hypochlorous acid or about 350 ppm to about 450 ppm of free available chlorine;

(ii) at least 50 ppm to at most 100 ppm of a copper (II) chloride salt;

(iii) at least 50 ppm to at most 100 ppm of an iron (III) chloride salt; and (iv) at least 50 ppm to at most 100 ppm of a zinc chloride salt.

2. The composition according to claim 1, wherein the hypochlorous acid or the free available chlorine is present in an amount of at most 425 ppm.

3. The composition according to claim 2, wherein the hypochlorous acid or the free available chlorine is present in an amount of at most 400 ppm.

4. The composition according to claim 1, wherein the hypochlorous acid or the free available chlorine is present in an amount of about 375 to about 400 ppm.

5. The composition according to claim 1, wherein each of the copper (II) chloride salt, the iron (III) chloride salt and the zinc chloride salt is present in an amount of at least 70 ppm.

6. The composition according to claim 5, wherein each of the copper (II) chloride salt, the iron (III) chloride salt and the zinc chloride salt is present in an amount of at most 90 ppm.

7. The composition according to claim 1, wherein each of the copper (II) chloride salt, the iron (III) chloride salt and the zinc chloride salt is present in an amount of 60 ppm, 65 ppm, 70 ppm, 75 ppm, 80 ppm, 85 ppm, 90 ppm, 95 ppm or 100 ppm.

8. The composition according to claim 7, wherein each of the copper (II) chloride salt, the iron (I III) chloride salt and the zinc chloride salt is present in an amount of 75 ppm, 80 ppm or 85 ppm.

9. The composition according to claim 8, wherein each of the copper (II) chloride salt, the iron (III) chloride salt and the zinc chloride salt is present in an amount of 80 ppm.

10. The composition according to claim 1, wherein the the composition further comprises an aqueous carrier.

11. The composition according to claim 1, wherein the composition has a pH of about 2 to about 6, or has a pH of about 3 to about 5.

12. The composition of claim 1, wherein the composition does not contain a surfactant.

13. A composition consisting essentially of:

(i) about 350 ppm to about 450 ppm of hypochlorous acid or about 350 ppm to about 450 ppm free available chlorine;

(ii) at least 50 ppm to at most 100 ppm of a copper (II) chloride salt;

(iii) at least 50 ppm to at most 100 ppm of an iron (III) chloride salt; and (iv) at least 50 ppm to at most 100 ppm of a zinc chloride salt; and (v) one or more carriers.

14. The composition according to claim 13, wherein the hypochlorous acid or the free available chlorine is present in an amount of at most 425 ppm.

15. The composition according to claim 13, wherein each of the copper (II) chloride salt, the iron (III) chloride salt and the zinc chloride salt is present in an amount of at least 70 ppm to at most 90 ppm.

16. The composition of claim 13, wherein the hypochlorous acid or the free available chlorine is present in an amount of about 375 to about 400 ppm; and each of the copper (II) chloride salt, the iron (III) chloride salt and the zinc chloride salt is present in an amount of at least 70 ppm to at most 90 ppm.

17. The composition of claim 16, wherein each of the copper (II) chloride salt, the iron (III) chloride salt and the zinc chloride salt is present in an amount of 80 ppm.

18. The composition of claim 16, wherein the composition has a pH of about 3 to about 5.

19. The composition of claim 13, wherein the composition has a pH of about 2 to about 6 or has a pH of about 3 to about 5.

20. The composition of claim 13, wherein the composition does not contain a surfactant.

* * * * *